US011954143B2

(12) United States Patent
Lopez et al.

(10) Patent No.: US 11,954,143 B2
(45) Date of Patent: Apr. 9, 2024

(54) SYSTEMS AND METHODS FOR EARTH OBSERVATION

(71) Applicant: EARTHDAILY ANALYTICS CORP., Vancouver (CA)

(72) Inventors: Daniel Lopez, Oakland, CA (US); Alex Bain, Brisbane, CA (US); George Tyc, Delta (CA); Keith Dennis Richard Beckett, New Westminster (CA); Nathan David Weisiger, San Francisco, CA (US)

(73) Assignee: EARTHDAILY ANALYTICS CORP., Vancouver (CA)

( * ) Notice: Subject to any disclaimer, the term of this patent is extended or adjusted under 35 U.S.C. 154(b) by 0 days.

(21) Appl. No.: 17/585,320

(22) Filed: Jan. 26, 2022

(65) Prior Publication Data

US 2022/0164376 A1 May 26, 2022

Related U.S. Application Data

(63) Continuation of application No. 15/101,336, filed as application No. PCT/US2014/068645 on Dec. 4, 2014, now abandoned.

(Continued)

(51) Int. Cl.
*G06F 16/00* (2019.01)
*G06F 16/248* (2019.01)

(Continued)

(52) U.S. Cl.
CPC ........... *G06F 16/51* (2019.01); *G06F 16/248* (2019.01); *G06F 16/29* (2019.01); *G06F 16/738* (2019.01);

(Continued)

(58) Field of Classification Search
CPC ........ G06F 16/29; G06F 16/738; G06F 16/51; G06F 16/9535; G06F 16/248;

(Continued)

(56) References Cited

U.S. PATENT DOCUMENTS 9,648,075 B1 * 5/2017 Kalinke ................ H04L 65/612
2007/0112689 A1 * 5/2007 Brown .................. G06Q 50/01 705/14.69

(Continued)

*Primary Examiner* — Michelle N Owyang
(74) *Attorney, Agent, or Firm* — McCarthy Tétrault LLP

(57) ABSTRACT

Systems and methods are provided for obtaining and managing remote sensing data (e.g. Earth observation data). A remote sensing platform obtains imagery and other remote sensing data of the Earth and other planetary objects. The remote sensing platform includes the International Space Station, or manned and unmanned spacecraft or aircraft. A sensor captures observation data and transmits the data to ground stations on the Earth. A ground segment receives and stores the data. Users use an order management system to place orders for the observation data, which specify processing parameters for the remote sensing data. The remote sensing data is retrieved from storage is processed according to the parameters to generate a data product. This system provides tools for searching and analyzing the data, and for interacting with the system through an API. The system combines data that is produced by the remote sensing platform and by third parties.

18 Claims, 85 Drawing Sheets

Related U.S. Application Data

(60) Provisional application No. 61/911,914, filed on Dec. 4, 2013.

(51) Int. Cl.

| | |
|---|---|
| ***G06F 16/29*** | (2019.01) |
| ***G06F 16/51*** | (2019.01) |
| ***G06F 16/738*** | (2019.01) |
| ***G06F 16/9535*** | (2019.01) |
| *G06T 1/20* | (2006.01) |
| *G06T 1/60* | (2006.01) |
| *G06T 3/4092* | (2024.01) |
| *G06T 11/60* | (2006.01) |
| *G09B 29/00* | (2006.01) |

(52) U.S. Cl.

CPC ............ *G06F 16/9535* (2019.01); *G06T 1/20* (2013.01); *G06T 1/60* (2013.01); *G06T 3/4092* (2013.01); *G06T 11/60* (2013.01); *G06T 2207/20021* (2013.01); *G06T 2207/30181* (2013.01); *G09B 29/005* (2013.01)

(58) Field of Classification Search

CPC .. G06V 20/13; G06T 1/20; G06T 1/60; G06T 3/4092; G06T 11/60; G06T 2207/20021; G06T 2207/30181; G09B 29/005

USPC .................................................. 707/600–899

See application file for complete search history.

(56) References Cited

U.S. PATENT DOCUMENTS

2008/0140348 A1* 6/2008 Frank ..................... G06Q 10/06 702/179

2014/0149372 A1* 5/2014 Sankar .................. G06F 16/951 707/706

* cited by examiner

Continued in FIG. 9B

Example: Table for determining camera activation based on Interest Factor

1601

| Location | Visibility Factors | | Interest Factor | Camera activated/ deactivated |
|---|---|---|---|---|
| San Francisco | Day time | Clearsky | High | Activate |
| San Francisco | Nighttime | Clearsky | Low | Deactivate |
| San Francisco | Day time | Cloudy sky | Low | Deactivate |
| PacificOcean | Day time | Clear sky | Low | Deactivate |
| ... | ... | ... | ... | ... |

| Characteristics | Sentiment Value |
|---|---|
| -sunny | happy, bright |
| -night time | foreboding |
| -cloudy | sad, depressing |
| -hurricane | fierce, angry |
| -tsunami | fierce, angry |
| -volcanic eruption | fierce, angry |
| -earthquake | fierce, angry |
| -lightning | fierce, angry |
| -sunset | romantic |
| -sunrise | expectant |
| -moonrise | peaceful |
| -stars | peaceful |
| -comet | wishful, wish |
| ⋮ | ⋮ |

SYSTEMS AND METHODS FOR EARTH OBSERVATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

This application is a continuation of U.S. patent application Ser. No. 15/101,336, filed on Jun. 2, 2016, which is a 371 application of Patent Cooperation Treaty Patent Application No. PCT/US2014/068645 that claims priority to U.S. Provisional Patent Application Ser. No. 61/911,914, which applications are hereby incorporated in its entirety by reference.

TECHNICAL FIELD

The following relates generally to systems and method of Earth observation, and can be applied to observing other planetary objects.

BACKGROUND

Aerial imaging systems are becoming more popular as users wish to obtain images and video about the geography and landscape. For example, helicopters, airplanes and other aircraft are equipped with cameras to obtain aerial images of cities, forests, or other specific locations requested by a customer. Such systems are often limited to the flight time of the aircraft and the data is often very specific to a customer's request (e.g. surveying forests for forest fires, surveying a city for roads, or surveying land to inspect power lines).

Some satellite spacecraft are equipped with cameras to obtain imagery of the Earth. The images are sent from the satellite to a ground station on Earth, and the images are processed and sent to the customer. The satellite typically acquires a select or limited number of images targeting very specific areas of interest and at very specific times, as requested by a specific customer (e.g. weather companies, land development companies, security and defense organizations, etc.). The general public typically does not have access to the images.

BRIEF DESCRIPTION OF THE DRAWINGS

Embodiments will now be described by way of example only with reference to the appended drawings wherein.

DETAILED DESCRIPTION

Figure 1:
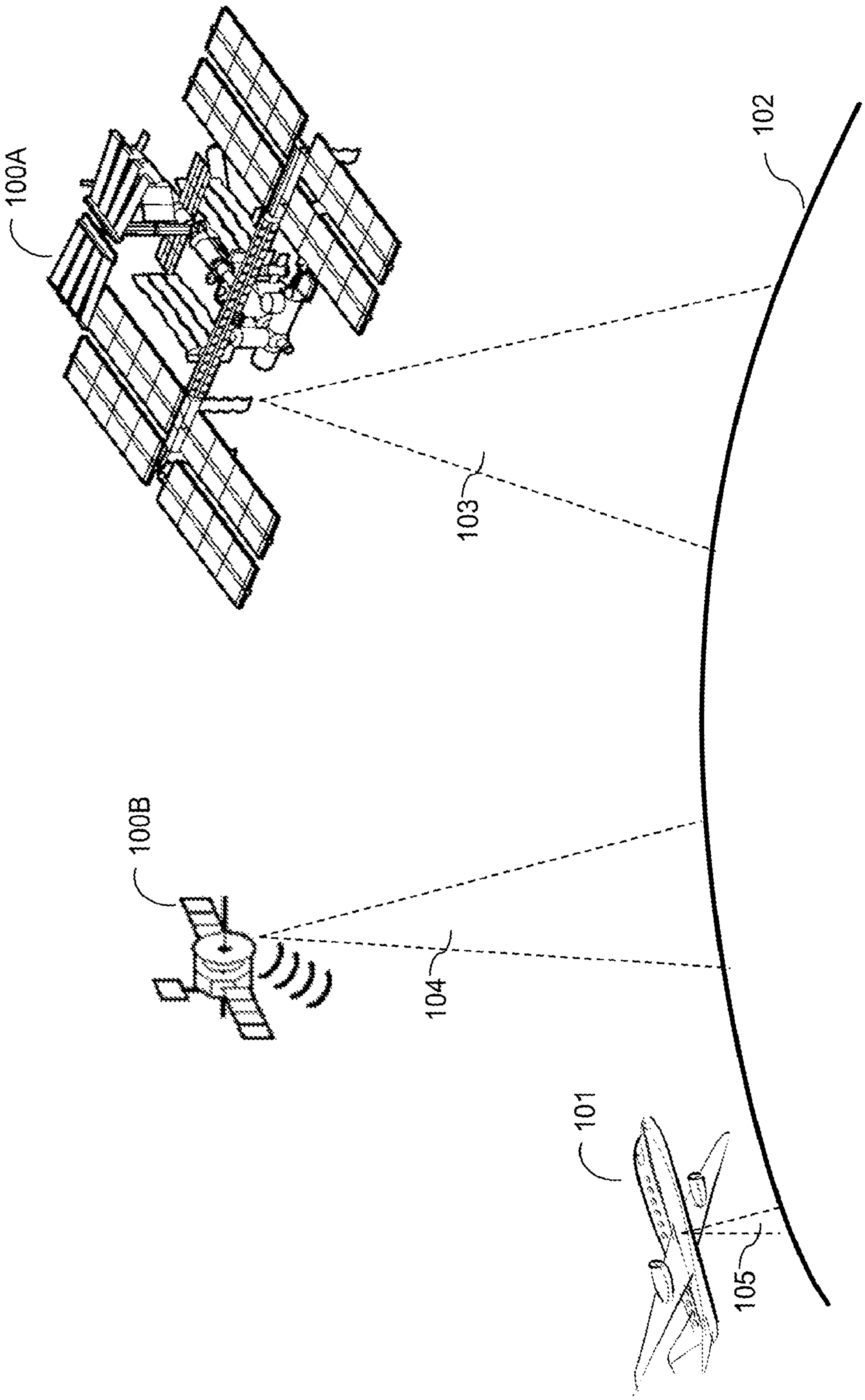
FIG. 1 is an illustration of spacecraft and aircraft collecting observation data of the Earth.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is recognized herein that there are a growing number of users who wish to consume or view imagery of the Earth, and that the users may vary. Non-limiting examples of users include the general public, consumer companies, advertising companies, social data networks, governments, security organizations, shipping companies, environmental companies, forestry organizations, etc. Providing images to these different types of users can be difficult in terms of acquiring the images and in terms of distributing the images.

It is also recognized that images from a single image provider may not be sufficient to meet the requests of customers, and that additional imagery data from other providers may be advantageous.

It is also recognized herein that users may find it difficult to know in advance of a certain time period that they would like imagery captured for the certain time. For example, a user may realize that after an event has occurred, they would like to have imagery documenting the event. However, the imagery may not be available, because the user did not give advance instructions to the aircraft operator or satellite operator to obtain the imagery for the event. Moreover, even if a user may know about an event, in many cases the user is not able to give the instructions to the aircraft or satellite operators with sufficient time before the event.

It is also recognized herein that even acquiring imagery data in an efficient manner, distributing the imagery data over computer networks, and storing the imagery data in memory to be searched later in a meaningful way, can be difficult.

The systems and methods described herein allow an imaging system from a spacecraft or aircraft to acquire imagery data of Earth, transmit the data to ground stations, process the data, and distribute the data over a Web platform to users. These systems and methods attempt to address at least one of the above recognized problems. It can be appreciated that there are other problems recognized herein, which may be explicitly stated or implicitly stated by describing the systems and the methods.

In an example embodiment, the system includes a high resolution camera (HRC) which captures high resolution (HR) imagery and a medium resolution camera (MRC) which captures medium resolution (MR) imagery. Further details about the imaging system are described below.

System Overview

Below is a table, i.e. Table 1, providing example meanings of terms used to throughout this document. It can be appreciated that other terms may be used in this document, which are not in the below table.

TABLE 1

| List of Terms and Example Meanings | |
|---|---|
| **External Users** | |
| Public Users | Users interacting with the Web Platform via Web and mobile devices to access the online map, image and video databases. |
| Customers/Distributors | Customers that order and pay for data or data products and Distributors that act as agents or resellers for Customers. |
| **Orders** | |
| Order | An Order defines a request for a set of products/services that the UrtheCast system will act on. |
| Tasking Request | A Tasking Request is a component part of an Order (or multiple orders) that requests that the cameras acquire new data. |
| Product Request | A Product Request is a component part of an Order that requests that a Customer Product be generated and delivered. |
| **Data Products** | |
| Products | Data or information products generated from newly received or archived data acquired by the MRC, the HRC, and/or other sources. The term "Product" as used herein may include one or more of the following:<br>Raw Product<br>Level 0 Product<br>Level 1 Product<br>Customer Product |
| Raw Product | Data received by an X-band ground station, for example, in Cortex Data File format. |
| Level 0 Product | Raw Optical Telescope System (OTS) sensor data, raw ancillary data and other log (telemetry) data in a format suitable for archiving and processing as defined in the Level 0 Product Specification. |
| Level 1 Product | Radiometrically corrected image or video data, together with the ancillary data required for processing. Intermediate format used internally by the Processing System, and not for delivery to customers. |
| Customer Product | Products ordered by and delivered to Customers/Distributors. Further subdivided into Level 1B and Level 2A, and Higher Level Products. Level 1B products include data that has undergone a sensor projection correction. Level 2A products include data has undergone an orthographic projection correction. |
| **Planning** | |
| HR Acquisition Request | An HR Acquisition Request is a request for a new HRC Acquisition originating from the Order Management System and sent to the Planning System. |
| MR Acquisition Region | An MR Acquisition Region is the definition of a region to be acquired by the MRC and the associated imaging parameters. It is sent from the Order Management System and sent to the Planning System. |
| Planning Session | The time period during which the Control and Planning System (CPS) Operator uses CPS to plan the activities for the next Execution Period. |
| **On-board Operations** | |
| Execution Period | A period of on-board operations controlled by one set of Operation Command Files (OCFs) uplinked in a single |

TABLE 1-continued

| List of Terms and Example Meanings | |
|---|---|
| | cluster of passes. In an example embodiment, Execution Periods are nominally 24 hours long. |
| | Camera Data Acquisition |
| Acquisition | A recording of new data by one of the cameras. An Acquisition can be one of two types:<br>Image Take - (e.g. taken by MRC)<br>Video Take - (e.g. taken by HRC) |
| Image Take | An image strip, for example taken by the MRC, that is collected with the same camera and compression configuration settings. Each Image Take is associated with a single unique Image Take ID. |
| Video Take | A video, for example taken by the HRC, that consists of a set of HRC frames taken of a specific target or target area. During the video the HRC is pointed at the target and tracks this target. Each Video Take has constant camera and compression configuration settings. Each Video Take is associated with a single unique Video Take ID. |
| Stow Position | Position for HRC where it is thermally and mechanically stable, and can be turned on without risk of sun blinding. |
| ICE Take | An image or video taken by Internal Camera Equipment (ICE) for presentation on the Web Platform. The ICE is camera equipment that is in addition to the HRC and MRC. |
| | Data Files and IDs |
| Image Take ID | Unique ID for MRC Image Takes assigned by CPS. The Image Take ID may be uplinked in the OCF. |
| Video Take ID | Unique ID for HRC Video Takes assigned by CPS. The Video Take ID may be uplinked in the OCF. |
| DHU Data ID | Unique ID for each file created by a Data Handling Unit (DHU). Includes the file type and a unique identifier for each file. The unique identifier is assigned as follows:<br>for MRC image data: the Image Take ID,<br>for HRC video data: the Video Take ID.<br>for ancillary and log data: the unique identifiers are assigned by the DHU using a consistent encoding convention. |
| Space Segment Log File | The Space Segment Log File contains both periodically sampled health, status and telemetry data, as well as activity-specific health, status and telemetry data.<br>Space Segment Log File data is gathered by the DHU from various sources, including, for example: the DHU itself, the MRC, the HRC, a Gyroscope Unit (GYU), the spacecraft's on-board terminal computer (TCI-S) and a Star Tracker Unity Assembly (STUA).<br>Log data is defined to be all health, status and telemetry data that is required by the Health and Monitoring System.<br>Each Log File contains data that was collected over a configurable duration (e.g. 10 minutes). |
| ISS/OTS Ancillary Data File | A File created by the DHU including spacecraft Ancillary data (e.g. periodically sampled spacecraft GPS, spacecraft orientation, Biaxial Pointing Platform (BPP) joint angles and STUA attitude) and Camera Ancillary data (e.g. periodically sampled telescope temperatures, focal plane temperatures and gyro data, as well as Image and Video Take specific data such as image size, number of frames, time, sensor settings, etc).<br>Ancillary data is defined to be telemetry data that is used for Image Processing.<br>Each Ancillary File includes data that was collected for a configurable duration (e.g. 10 minutes). |
| Downlink File | File created and stored in the DHU. Includes the following data:<br>Image Take File: File containing some number of J2K Files placed into a sequence of Space Packets, belonging to a single Image Take.<br>Video Take File: File containing some number of J2K Files placed into a sequence of Space Packets, belonging to a single Video Take.<br>Spacecraft/OTS Ancillary Data File<br>Space Segment Log Data File |
| Downlink Transfer Files (DTF) | Concatenation of Downlink Files relayed to the On-board Memory Unit (OMU) for downlink via the Data Transmission and Radio Engineering System (DTRES). In an example embodiment, each DTF is sized at 1 GB, or may be less. |

TABLE 1-continued

| List of Terms and Example Meanings | |
|---|---|
| X-band Downlink | |
| X-band Visibility Window | Time period when a ground station antenna has visibility of the spacecraft. Also known as a "Pass" or a "Contact Window". |
| Downlink Window | A Downlink Window is the portion of an X-band Visibility Window that has been allocated to OTS downlink operations. |
| Ground Station Availability Times | Ground Station Availability Times are the times when a ground station is available for receiving downlinks. The time when the station is able to receive downlinks is the intersection of the Visibility Windows and the Availability Times. |
| Space to Ground Command & Telemetry Interface | |
| Operational Command File (OCF) | Contains a series of time-tagged commands to the DHU and TC1-S. |
| OCF Session (DHU, STUA, MRC, HRC, Downlink) | An OCF Session is a logical block of commands. For DHU, STUA, MRC and HRC sessions it is defined by Power On/Power Off commands. The Downlink session is defined by the Start/Stop time of the earliest and latest Downlink Windows respectively. |
| Direct Commands | Time-tagged commands to the DHU from the TC1-S and/or MCC-M. |
| Telemetry Data | Data downlinked by TC1-S to MCC-M on S-Band for health and status. This data is not required for Image Processing. |
| S-band Up/Downlink | |
| S-band Visibility Window | Time period when an S-band commanding ground station antenna has visibility of the ISS. Also known as a "Pass" or a "Contact Window". |
| Uplink Window | An Uplink Window is the portion of an S-band Visibility Window that has been allocated to OTS commanding operations. |
| Operations Staff | |
| Operator | People that operate the Ground Segment systems. |
| Ordering Staff | People that interact with customers, enter orders on behalf of customers, perform feasibility analysis, perform preplanning, enter UrtheCast internal orders, and manage orders. Includes Customer Service Representatives and Ordering Managers. |
| Calibration Staff | People that operate the calibration system, performs detailed calibration analysis, and determines when updates are needed to the calibration parameters of the processing system. |
| CPS Operator | People that operates the Control and Planning System. This operator(s) will be co-located with the system, likely in Russia. |
| Mission Engineer | People that maintain the health of the system and resolve issues when they arise. |
| Web Platform | |
| Third Party Sourced Data | Data (e.g. images and video) received from the user community. There are two classes of such data: Remote sensing class, which provides sufficient radiometric and geometric qualities that enable the data to be merged into the map (for example, imagery or video data obtained from other satellite providers, commercial UAVs or aerial survey services), and Pinpoint class, which provides limited radiometric and geometric qualities that enable the data to be geo-tagged and shared as pinpoints on the map (for example imagery or video data obtained from consumer-level drones). |
| Map Tiles | A 2D array of small (e.g. 256 × 256 pixels ) image tiles that cover the "Earth" (e.g. from 85N to 85S) at fixed coordinates for each zoom level, which example ranges from 0 (entire Earth) to 22 (roughly 2.5 cm GSD). With each successive zoom level, the number of tiles in each direction doubles. |
| Pinpoint Data | Imagery or video that will appear on the Web map as a pinpoint. Examples of Pinpoint Data include: Video data Data that lacks sufficient radiometric or geometric qualities to incorporate it into the map. |
| Skin | A skin is a collection of map tiles at a zoom level commensurate with the resolution of the sensor by which |

TABLE 1-continued

| List of Terms and Example Meanings | |
|---|---|
| | the imagery was acquired. A skin will cover a subset or the entire earth.<br>For visual aesthetics and ease of interpretation by users, a skin should be comprised of imagery with highly similar characteristics, including sensor class, seasonal (leaf-on or leaf-off) and illumination (day, dawn, dusk, night, etc) aspects.<br>A skin is expected to be constructed from a compilation of cloud, haze and snow free image acquisitions, mosaicked and blended seamlessly.<br>As new image acquisitions become available, the images are radiometrically and geometrically matched with the skin prior to blending. This is done, for example, to avoid introducing radiometric and/or geometric discontinuities. |

Turning to FIG. 1, example embodiments of various spacecraft 100A, 100B and an aircraft 101 are shown orbiting or flying over the Earth 102. The International Space Station 100A is an example of a spacecraft and it is able to use an imaging system to capture a field of view 103 of the Earth 102. Another spacecraft is a satellite 100B which can use an imaging system to capture a field of view 104 of the Earth 102. It can be appreciated that other types of spacecraft, including rockets, shuttles, satellites, micro-satellites, nanosatellites, cubesats, and capsules, and generally spacecraft are herein generally referenced by the numeral 100. Aircraft 101, including airplanes, unmanned aerial vehicles (UAVs), helicopters, gliders, balloons, blimps, etc., can also be equipped with an imaging system to capture a field of view 105 of the Earth 102. It can also be appreciated that marine vehicles (e.g. boats, underwater vehicles, manned vehicles, unmanned vehicles, underwater or above-water drones, etc.) can also be equipped with sensing technology and this sensor data can be obtained, managed and processed using the principles described herein.

Although Earth is used as an example in this document, the principles described herein also apply to remote sensing operations for other planetary objects. Non-limiting examples include asteroids, *meteors*, Mars, the Moon, the Sun, etc.

It can be appreciated that spacecraft 100 and aircraft 101 orbit or fly at a distance above the Earth's surface to capture larger area of the Earth's surface. It can also be appreciated that the principles described herein are described with respect to spacecraft, but the principles also apply to aircraft.

Figure 2:
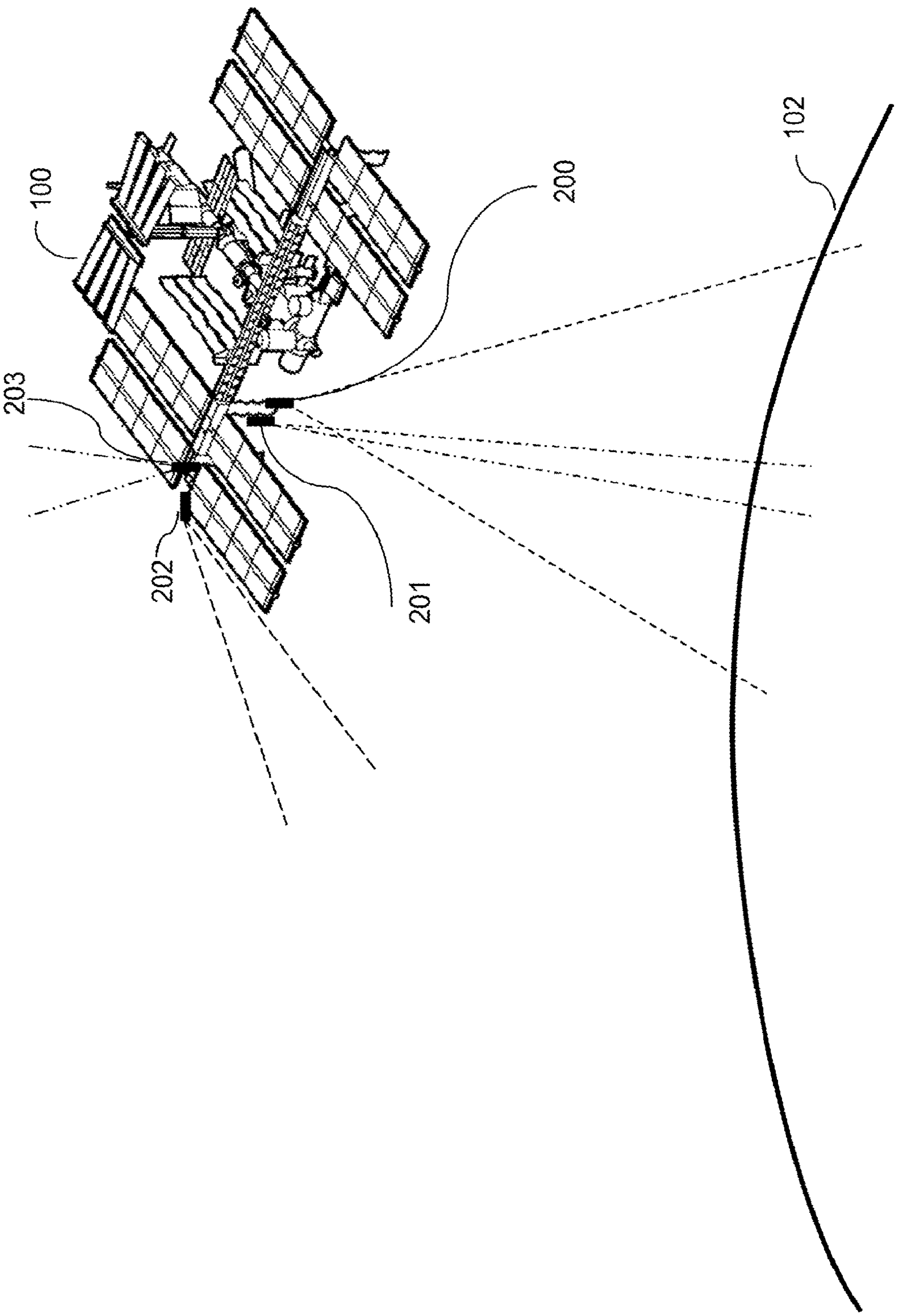
FIG. 2 is an illustration of the International Space Station using cameras to capture images of the Earth.

Turning to FIG. 2, an example embodiment of spacecraft 100 (e.g. the International Space Station, is equipped with several cameras. Cameras 200 and 201 are pointed towards the Earth's surface to capture images of the Earth's surface. In an example embodiment, camera 200 is a Medium Resolution Camera (MRC) that has a larger field of view and camera 201 is a High Resolution Camera (HRC) that has a smaller field of view relative to the MRC. The spacecraft is also equipped with a camera 202 that points towards the horizon of the Earth. Another camera 203 is mounted on the spacecraft to point towards space, away from the Earth. The camera 203 can capture images in the general opposite direction of cameras 200 and 201. For example, camera 203 can capture images of the stars in space.

It will be appreciated that although the principles described herein apply to aircraft and spacecraft, it is recognized that a spacecraft 100 is able to orbit the Earth. In other words, a spacecraft is able to cover vast distances of the Earth very quickly, compared to an aircraft, and the spacecraft is able to stay positioned above the Earth for extended periods of time, compared to the aircraft.

It will also be appreciated that although cameras and imaging systems are often described herein to observe the Earth, other types of sensors can be used to observe the Earth. Many of the principles described herein also apply to different types of sensors. Non-limiting examples of other types of sensors that can be used to observe the Earth include LiDAR, RADAR, infrared sensors, and Synthetic Aperture RADAR (SAR). Other types of remote sensing technology also applies.

Figure 3:
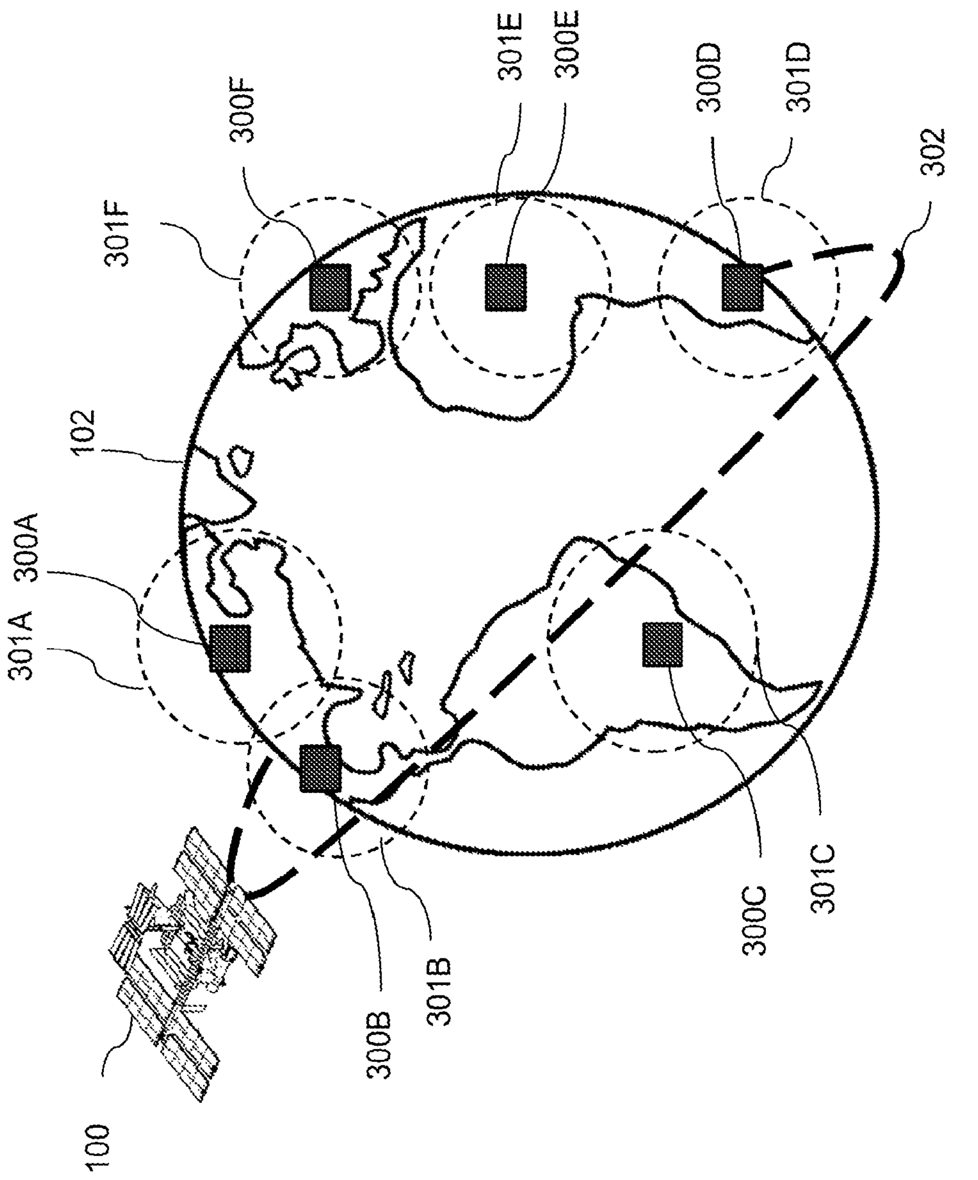
FIG. 3 is an example diagram of a spacecraft orbiting Earth and being in communication range with different ground stations.

Turning to FIG. 3, the spacecraft 100 is shown orbiting the Earth 102 along an example orbit path 302. The spacecraft 100 captures and stores data, such as image data, and wirelessly transmits the data to ground stations on the Earth. In an example embodiment, there are multiple ground stations 300A, 300B, 300C, 300D, 300E, 300F. It is noted that a ground station, generally referenced by the numeral 300, typically has to be within a certain position relative to the spacecraft 100 for data to be transmitted between the ground station and the spacecraft. The transmission regions of each of the ground stations is illustrated, for example, using the dotted circles 301A, 301B, 301C, 301D, 301E, 301F. It will be appreciated that when the spacecraft is within a range of a transmission region of a given ground station, the spacecraft and the given ground station are able to exchange data. For example, when the spacecraft 100 is within range of the transmission region 301B of the ground station 300B located in North America, the spacecraft and the ground station 300B can exchange data. As the area of a transmission region is limited, it is advantageous to have multiple ground stations located around the Earth so that the spacecraft can exchange data with different ground stations as the spacecraft orbits the Earth. For example, when the spacecraft moves to a position over South Africa and is within range of a local ground station 300D, the spacecraft can send or receive data from the ground station 300D. When the spacecraft is in range of the ground station 300D, the spacecraft may be out of range of the ground station 300B located in North America.

Figure 4:
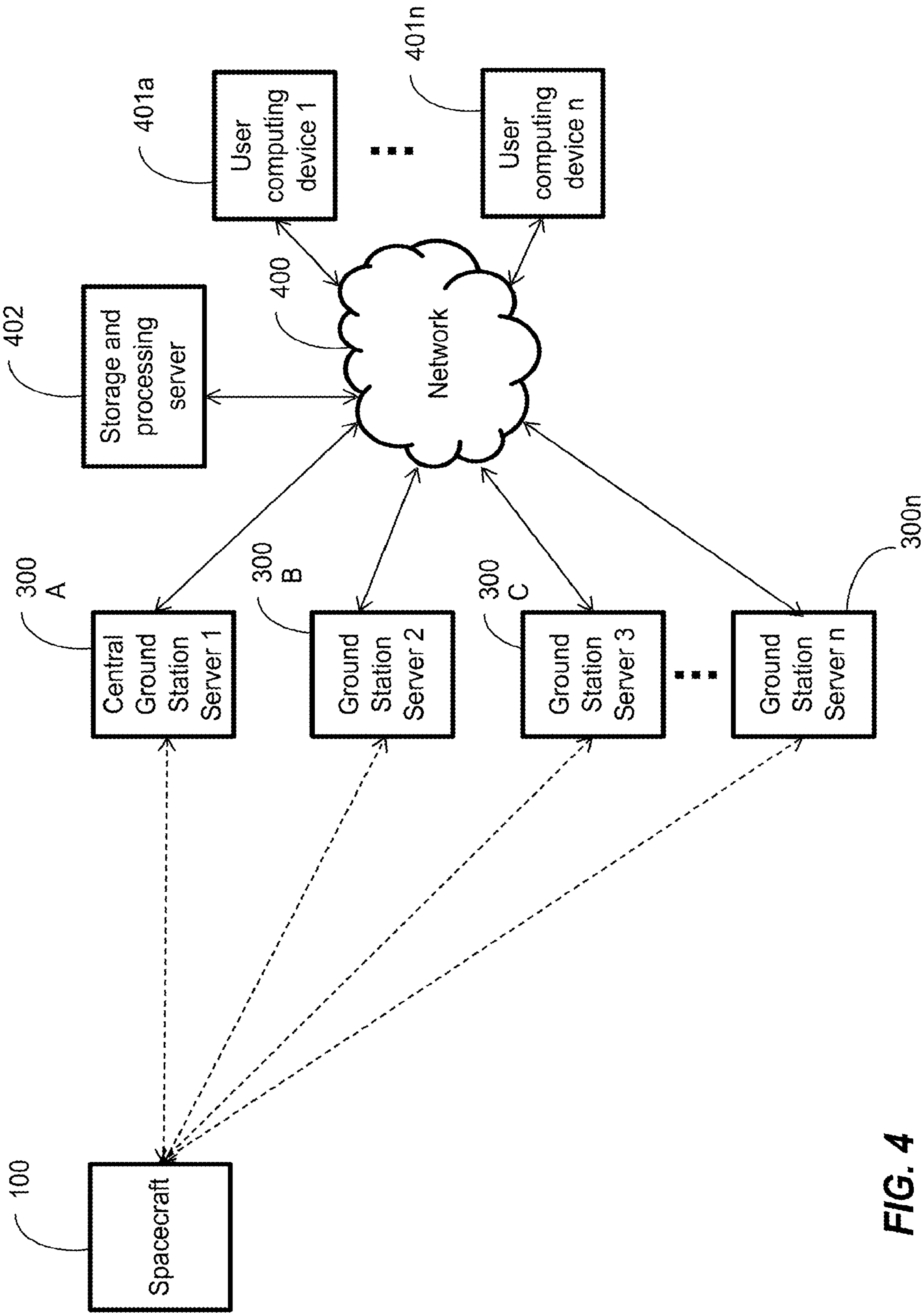
FIG. 4 is an example system showing the spacecraft, various ground stations, a server system, and user computing devices being in communication with each other.

In an example embodiment, the ground stations are in communication with each other. Turning to FIG. 4, an example embodiment of a network system is shown. The spacecraft 100 may communicate to one or more of the ground stations 300A, 300B, 300C, . . . , 300*n* at the same time or at different times. The ground stations are in communication with each other over a network 400. In an example embodiment, the ground stations include communication hardware (e.g. antennas, satellite receivers, etc.) to communicate with the spacecraft 100, computing devices (e.g. server systems) to store and process data, and communication hardware to communicate with the network 400. One of the ground stations 300A is a central ground station server which obtains the data from all the other ground stations. In an example embodiment, the central ground station stores and compiles all the data from the other ground stations together, and conducts the computing processes related to the data and any other data from external sources. In another example embodiment, another server 402 stores, compiles and processes the data from all the ground stations, including data from external sources. The other server 402 is not considered a ground station, but another server system. The network 400 may be wired network, a wireless network, or a combination of various currently known and future known network technologies. The network 400 may also be connected to the Internet or part of the Internet. User computing devices 401*a*, . . . , 401*n* are in communication with the network 400. Non-limiting examples of user computing devices include personal computers, laptops, mobile devices, smart phones, wearable computing devices, and tablets. Users can use these computing devices to upload data (e.g. request for data, additional imagery, etc.) via the network, and download data (e.g. raw imagery or processed imagery) via the network.

Figure 5:
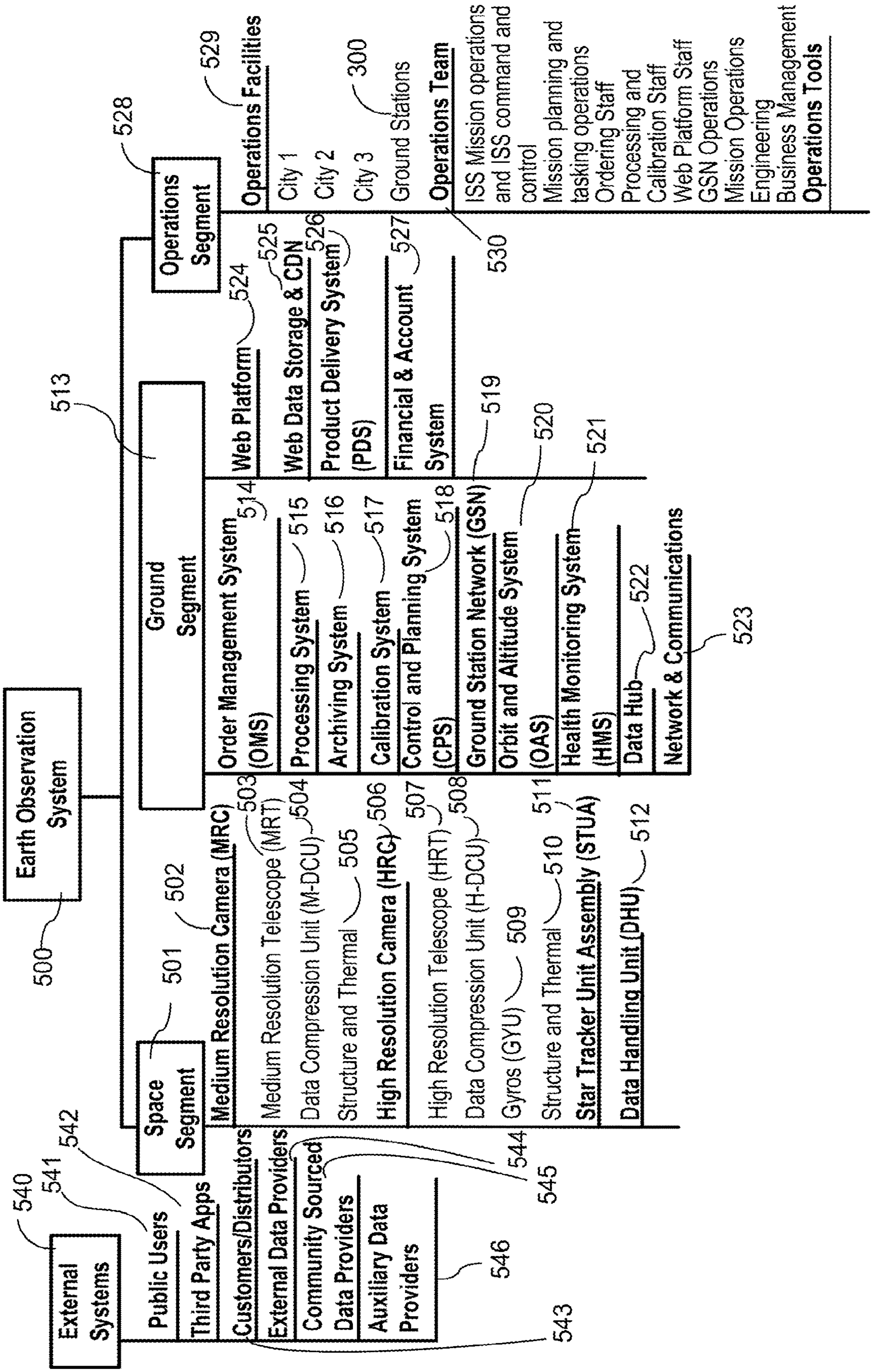
FIG. 5 is an example system decomposition of the Earth observation system showing example components.

FIG. 5 shows a decomposition of example components and modules of the Earth Observation System 500. The system 500 includes the following major components: the space segment 501, the ground segment 513 and the operation segment 528.

The space segment 501 includes a Medium Resolution Camera (MRC) 502. The MRC includes a Medium Resolution Telescope (MRT) 503, a data compression unit (M-DCU) 504, and structure and thermal components 505. The space segment also includes a High Resolution Camera (HRC) 506, which includes a High Resolution Telescope (HRT), a data compression unit (H-DCU) 508, gyroscopes (GYU) 509, and structure and thermal components 510. The space segment also includes a star tracker unit assembly (STUA) 511 and a Data Handling Unit (DHU) 512.

The ground segment 513 includes the following systems, components and modules: an order management system (OMS) 514, a processing system 515, an archiving system 516, a calibration system 517, a control and planning system (CPS) 518, a ground station network 519 (which comprises the ground stations 300 and the network 400), an orbit and attitude system (OAS) 520, a health monitoring system (HMS) 521, a data hub 522, network and communications 523, a Web platform 524, a Web data storage system and content delivery network (CDN) 525, a product delivery system (PDS) 526, and a financial and account system 527. The systems, components and modules described in the ground segment are implanted using server systems and software modules.

The operation segment 528 includes operation facilities 529, which are located at different locations and at the ground stations 300, and an operations team 530.

The observation system 500 may also include or interact with external systems 540, such as public users 541, third party applications 542, customers and distributors 543, external data providers 544, community-sourced data providers 545, and auxiliary data providers 546.

More generally, the space segment 500 includes camera systems installed on the International Space Station (ISS), or some other spacecraft. For example, the MRC 502 provides a medium resolution swath image of the Earth that is approximately 50 km across. The HRC 506 captures true video data, for example at approximately 3 frames/sec, having an area of approximately 5 km by 3.5 km for each image. Other cameras are mounted inside or outside the ISS looking out the windows.

Some high level operational scenarios are summarized below.

In an example operation scenario, the system acquires image and video data and makes it available on the Web Platform 524 (e.g. a Website or application accessed using the Internet). This includes ongoing collection and sufficient time to build up archives of a significant portion of the Earth. This involves very large data volumes. The benefits to users include constantly updating imagery. Image data is acquired to cover the accessible part of the Earth, with higher priority and quality given to areas of greater user interest. Image data, such as video data and high resolution imagery from the HRC, is acquired for specific areas of interest based on predictions from the system 500 and from input from users.

In another example operation scenario, the Web Platform 524 provides a user experience that incorporates continually refreshed and updated data. The system is able to publish the remote sensing data (e.g. imagery) to users in near real time. Users (e.g. public user 524) will be able to interact with the platform and schedule outdoor events around the time when they'll be viewable from our cameras. The Web Platform will also integrate currently known and future known social media platforms (e.g. Twitter, Facebook, Pinterest, etc.) allowing for a fully geo-located environment with Earth video content. In addition, the API will be open source, allowing developers to create their own educational, environmental, and commercially focused applications.

In another example operation scenario, customers and distributors interact with the systems to submit requests. Requests include Earth observation data (e.g. both existing and not-yet acquired data) and value added information services.

In another example operation scenario, an online platform is provided that incorporates components of various currently known and future known online stores (e.g. Amazon.com, the Apple AppStore, Facebook, etc.). The online platform or online store allows consumers to search and purchase software applications developed and uploaded by third party developers. The applications have access to the images obtained by the Earth observation system 500, including images obtained by external systems 540.

Figure 6:
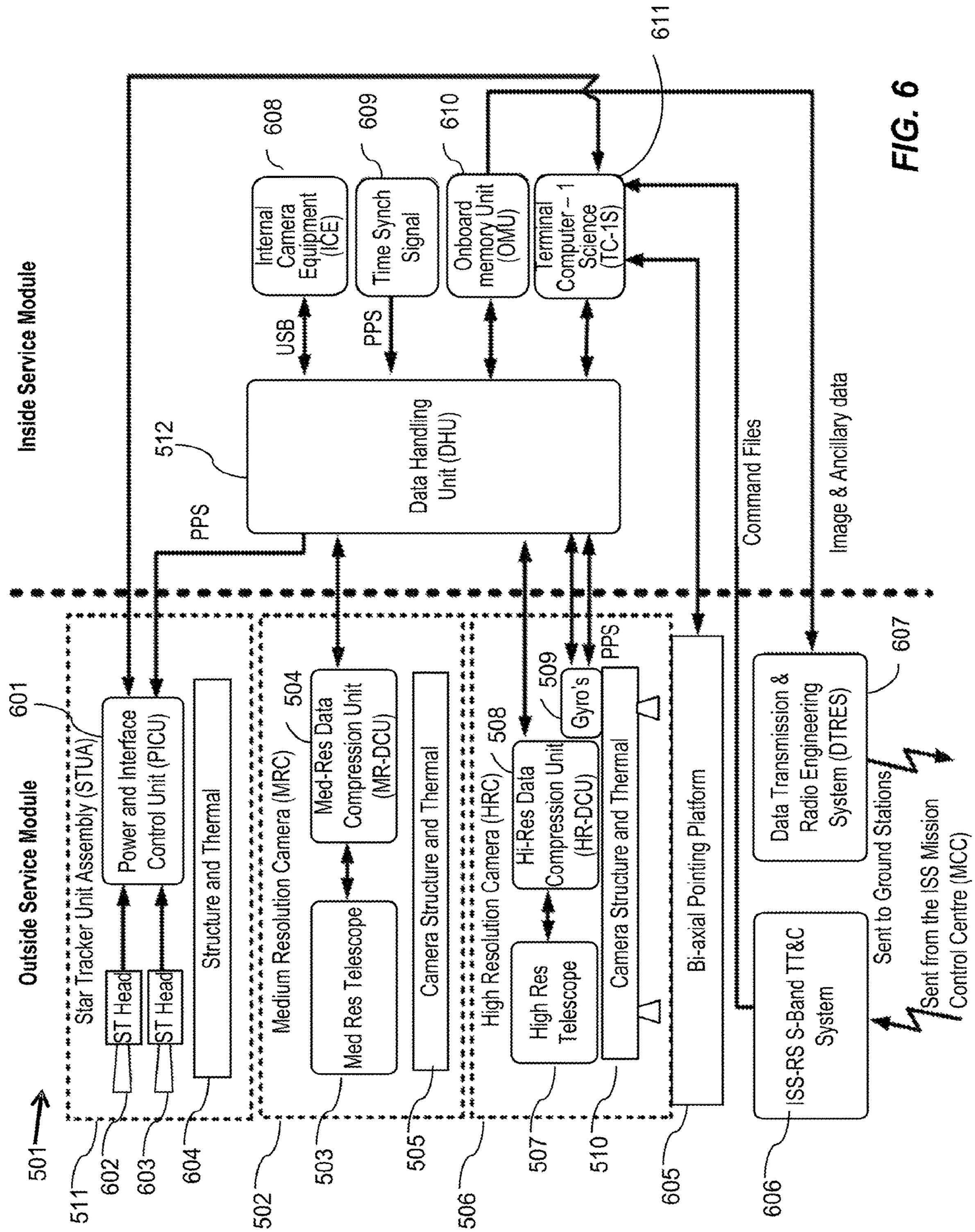
FIG. 6 is an example system diagram of the space segment.

Turning to FIG. 6, a system diagram shows example components of the space segment 501. The space segment includes imaging and computing equipment that is mounted to or part of a spacecraft 100, such as the ISS. The spacecraft provides the utilities of electrical power, downlink communications of data, pulse-per-second (PPS) signal and time messages for absolute time stamping, uplink of command files and software or configuration table uploads, 2-axis pointing of the HRC 506, and accommodations of equipment and cosmonaut installation of the equipment.

The space segment 501 includes the Biaxial Pointing Platform (BPP) 605, the On-board Memory Unit (OMU) 610, the TC1-S computer 611, the time synchronization signal generation 609, Internal Camera Equipment (ICE) 608, the Data Transmission Radio Engineering System (DTRES) 607 which is the X-band downlink transmitter, and the on-board S-band telemetry System 606 that is used to receive the command files and transmit real-time telemetry to the Mission Control Centre.

The TC1-S 611 is configured to receive a set of commands used for imaging and downlinking in an Operational Command File (OCF). OCFs are configured to be uplinked through the s-band telemetry system to the TC1-S 611. The TC1-S 611 checks the OCF and then sends the OCF to the DHU 512 which controls the cameras.

Image data, video data, ancillary data, telemetry data, and log data is collected by the Data Handling Unit 512 and then transferred to the OMU 610. This data is then transferred from the OMU 610 to the DTRES 607. The DTRES 607 downlinks this data to ground stations 300 around the Earth.

The Internal Camera Equipment (ICE) 608 would be used to provide imagery that is in addition to the MRC and HRC. The ICE includes, for example, a video camera pointed out of a viewing port to observe the earth's limb (e.g. camera 202), and a still-image camera would be pointed out a of different viewing port along nadir or as near to nadir as is possible. The cameras have a USB interface that can be used to get the data from the cameras into the DHU 512 to be subsequently downlinked. It will be appreciated that certain components (e.g. 512, 608, 609, 610, 611) are located inside the spacecraft 100 and other components are located outside the spacecraft.

Continuing with FIG. 6, example details regarding the optical telescope system are described.

The main elements of the MRC 502 are the Medium Resolution Telescope (MRT) 503, which includes the focal plane and associated electronics, the Data Compression Unit (M-DCU) 504, the structure and thermal enclosure 505, and the corresponding cable harnesses and a connector box.

In an example embodiment, the MRT 503 is a fixed pointing 'push broom' imaging system with four linear CCD arrays providing images in four separate spectral bands. For example, the images will have a Ground Sampling Distance (GSD) of approximately 5.4 m×6.2 m and will cover a swath of 47.4 km (at 350 km altitude).

The data from the MRT 503 is fed into the M-DCU 504 which uses a compression process (e.g. JPEG2000 or JPEG2K) to compress the data stream in real-time and then transmit the compressed image data to the DHU. In addition to performing the data compression, the M-DCU 504 is also the main interface to the DHU 512 for controlling the camera. It gathers camera telemetry to be put into log files that are downlinked with the imagery, sets up the MRT 503 for each imaging session (e.g. sets the integration time), and performs the operational thermal control.

The MRC 502 is able to take continuous, or near continuous, images of the Earth, producing long image strips. The image strips will be segmented so that each segment has a given set of parameters (i.e., compression ratio and integration time). Each image strip segment, made up of all 4 spectral bands, is referred to as an "Image Take" (IT). In some cases, there may be a very small gap between Image Takes whenever a control parameter such as compression ratio or integration time is changed.

The imagery is divided into "frames", each of which are JPEG2000 compressed and downlinked as a stream of J2K files. Other compression protocols and data formats may be used.

In an example embodiment, the integration time is varied in a series of steps over the course of the orbit, adjusting for the solar illumination level, including night imaging. The compression ratio may also be varied over the course of the orbit, according to the scene content. Images of the land with reasonable solar illumination levels may be acquired with relatively low compression ratios, yielding high quality products. Images of the ocean and land with low solar illumination levels, and all images at night may be acquired with higher compression ratios with little perceptible losses since they have much lower spatially varying content.

An along-track separation of the bands can occur because the linear CCD arrays are mounted on a common focal plane, but spatially offset with respect to the camera bore sight. The image take data collected by the individual spectral bands of the MRC are acquired at the same time, but are not geo-spatially aligned. In a particular example, the NIR-band (leading band) will record a scene 6 to 7 seconds before the red-band (trailing band). This temporal separation will also cause a cross-track band-to-band separation due to the fact that the Earth has rotated during this period.

The along-track and cross-track band-to-band spatial and temporal separations in the image take data sets are typical of push broom image data collection, and will be compensated for by the image processing performed on the ground by the processing system 515 when making the multi-band image products.

Continuing with FIG. 6, elements of the HRC 506 are the High Resolution Telescope (HRT) 507, which includes the focal plane and associated electronics, the Data Compression Unit (H-DCU) 508, a 3-axis rate gyro system 509, the structure and thermal enclosure 510, and the corresponding cable harnesses and a connector box.

In an example embodiment, the HRT 507 is configured to produce full frame RGB video at a rate of 3 frames per second. Throughout the system, the HRT video data is largely treated as a time series of independent images, both by the HRC 506 and the processing system 515.

In an example embodiment, the HRT 507 is a large aperture reflective (i.e. uses mirrors) telescope which also includes a refractive element. The HRT also includes a Bayer filter and a two-dimensional, 14 Megapixel CMOS RGB imaging sensor on the focal plane. In an example embodiment, the image area on the ground is 5 km×3.3 km with a GSD of 1.1 m when the space craft is at an altitude of 350 km.

The data from the HRT 507 is fed into the HR-DCU 508 which compresses the data stream in real-time and then transmit the compressed image data to the DHU 512. In addition to performing the data compression, the DCU 508 is also the main interface to the DHU for controlling the camera. The DCU 508 gathers camera telemetry to be put into log files that are downlinked with the imagery, sets-up the HRT for each imaging session (e.g., sets the integration time), and performs the operational thermal control.

The imagery is divided into "frames", each of which are JPEG2000 compressed and downlinked as a stream of J2K files. Like the MRC, the integration time for the HRC will be appropriately selected for the solar illumination level, including night imaging. The compression ratio will also be selected, according to the scene content. Videos of the land with reasonable solar illumination levels will be acquired with relatively low compression ratios, yielding high quality products. Videos of the ocean and land with low solar illumination levels, and all videos at night will be acquired with higher compression ratios with little perceptible losses since they have much lower spatially varying content.

The HRC 506 is mounted to a two-axis steerable platform (e.g. the Biaxial Pointing Platform—BPP). The BPP 605 is capable of pointing the camera's bore sight at a fixed point on the ground and maintaining tracking of the ground target. For example, the BPP will rotate the camera to continuously point at the same target while the spacecraft is moving for approximately a few minutes. A 3-axis gyro system 509 is also included in the HRC 506 that measures the angular rates at high frequency. The system 509 sends this angular data to the DHU 512 to be downlinked as ancillary data. This angular data is used in the image processing on the ground to improve the image quality.

Collection of a single video over a selected ground target is referred to as a "Video Take" (VT). A ground target may be a single point where all frames are centered on this one point, a 2D grid of points where a fixed number (e.g. 1-5) of frames is centered on each of the points in a serpentine sequence (resulting in a quilt-like pattern that covers a larger area), or a slowly varying series of points forming a ground track (following along a river, for example).

Continuing with FIG. 6, the DHU 512 is configured to control the MRC 502 and HRC 506 via their associated DCUs 504, 508. The DHU 512 configures and controls the cameras, and receives and stores the image data from the MRC and HRC before transmitting the image data to ground stations 300. The DHU also receives and stores the gyro data from the HRC.

The DHU 512 interfaces to a terminal computer 611. The terminal computer 611 receives the OCFs uplinked from mission control and transfers these files to the DHU 512 as well as inputs to ancillary data files and log files. The DHU 512 and the terminal computer 611 execute the time tagged commands listed in the OCF using their own internal clocks. The clocks are synchronized by use of a GPS-derived time synchronization signal (Pulse Per Second—PPS) to ensure that commands executed by both the DHU and the terminal computer are coordinated. The DHU also sends this same PPS signal to the Gyro Unit 509 in the HRC and to the Star Tracker Assembly Unit 511 so that the angular rate data and attitude data are also time synchronized to the commanding of the system.

Prior to each downlink, the DHU 512 sends the image and video data files to be downlinked, as well as the associated ancillary data and log files to the OMU 610 which then sends the data to the DTRES 607 for downlinking to a ground station 300.

Continuing with FIG. 6, the space segment also includes a Star Tracker 511 to provide increased accuracy attitude knowledge of the camera mounting location and is therefore mounted in the vicinity of the two cameras 502, 506. The data from the Star Tracker 511 may be used by the terminal computer 611 in real-time to control the pointing angles of the BPP 605 so that a given target on the ground is tracked with improved accuracy. The star tracker data is also be sent to the DHU 512 from the terminal computer 611 as ancillary data to be used for the ground processing.

Elements of the Star Tracker Unit Assembly (STUA) 511 include the Power and Interface Control Unit (PICU) 601, and two Star Tracker Heads 602, 603 (e.g. each pointed in a different direction). The STUA 511 also includes structural and thermal elements 604, such as a baseplate, secondary structural items (e.g., brackets), a thermal system (e.g. heaters, multi-layer insulation), and the associated cabling. The PICU 601 interfaces directly to the terminal computer 611 to provide the terminal computer 611 the real-time localized spacecraft attitude data that may be used to control the BPP 605.

Figure 7:
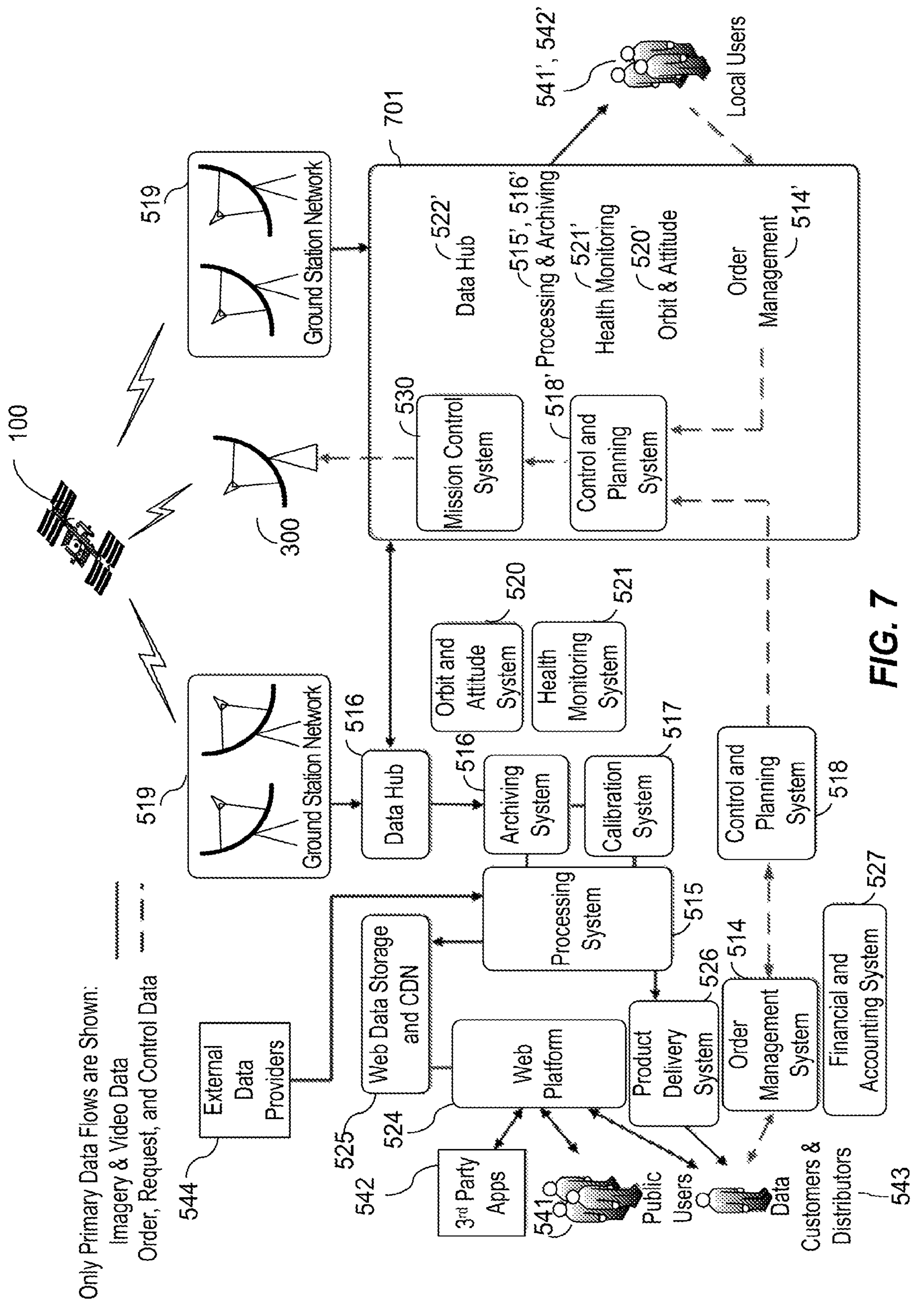
FIG. 7 is an example system diagram of the ground segment.
Figure 8:
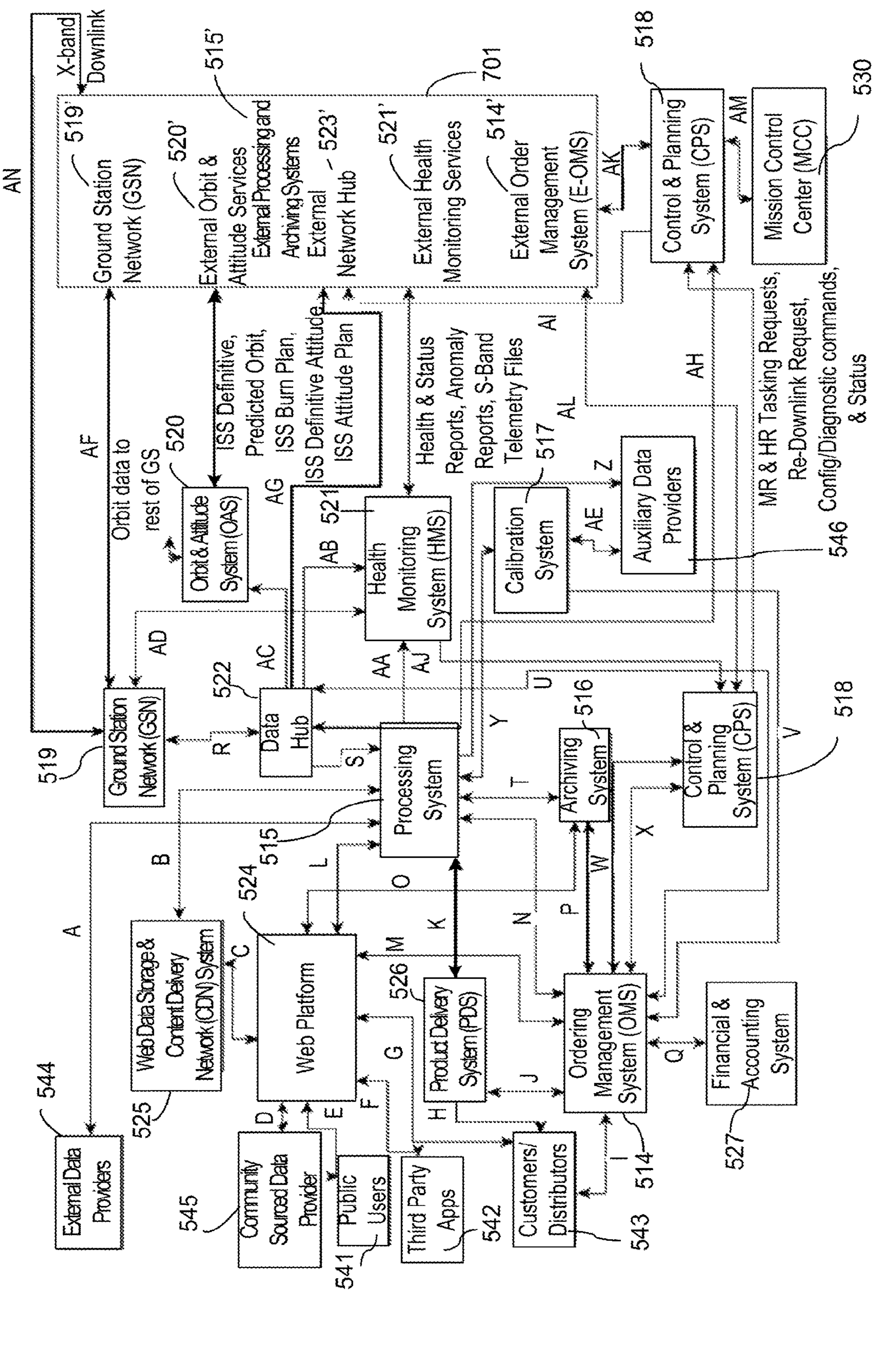
FIG. 8 is another example system diagram of the ground segment, further showing the data flow between components.

Turning to FIG. 7 and FIG. 8, example components of the ground segment 513 are shown in relation to each other. In FIG. 7, the solid connection lines show the flow of imagery and video data, and the dotted lines show the flow of other data (e.g. orders, requests, and control data). It can be appreciated these data flows are only examples, and that the direction and type of data flowing between the different components can be different from what is illustrated in FIG. 7.

As best shown in FIG. 7, data from the space segment 501 on the spacecraft 100 can be transmitted to ground station networks 519, which include ground stations 300.

As shown in FIG. 7 and FIG. 8, there are a number of external entities that can interact with the earth observation system.

Public Users (541): General public users can use the Web, internet, and mobile interfaces to look at imagery, video, and other information and to also contribute their own inputs.

Third Party Applications (542): Applications developed by third parties are configured to interact with the earth observation system's Internet services and resources via an application programming interface (API). The applications are expected to support mobile devices.

Customers/Distributors (543): Customers are those customers that place orders for new collections or specifically generated image and data products.

External Data Providers (544): In addition to the data acquired from the spacecraft 100, the ground segment of the earth observation system is configured to acquire imagery, video, and other data from External Data Providers such as other satellite data suppliers.

Community Sourced Data Providers (545): Data, including image and video, may also be obtained from the general public.

Auxiliary Data Providers (546): Auxiliary Data Providers provide supporting data such as Digital Elevation Models (DEMs), Ground Control Points (GCPs), Maps, and ground truth data, to the Earth observation system, such as the calibration system 517.

The Earth observation system includes a number of components, such as the Web platform 524. The Web platform 524 provides a Web interface to the general public. It includes capabilities to: browse and view imagery, videos and other geographic data; contribute additional information and social inputs; and accept requests for future data collection activities.

The Web Data Storage & Content Delivery Network (Web DS & CDN) 525 includes cloud infrastructure that is used to store the Web image data, video data, and community-sourced data, and distribute the data around the world using a Content Delivery Network (CDN) service.

The earth observation system also includes a Product Delivery System (PDS) 526. The PDS includes online storage that is used to serve up Products for retrieval by Customers/Distributors.

The Order Management System (OMS) 514 accepts orders for products and services and manages the fulfillment of those orders. The OMS is configured to task the CPS 518 for new acquisitions and the Processing System 515 for processing. Orders are tracked and feedback is provided to users.

The Control and Planning System (CPS) 518 is configured to provide the following functionality: assess the feasibility of future acquisitions; re-plan future acquisitions and downlinks to assess and adjust the feasibility of the overall collection plan for an upcoming time period; and, based on a resource model and updated resource status received from the mission control center (MCC) 530 and the ground station network (GSN) 519, create plans and command files for onboard activities including imaging and downlinks, and tasks for the GSN 519.

The Accounting & Financial, Billing and Customer Management Systems 527 are the general systems that are used to manage the sales and monetary funds of the image data and imaging services.

The Archiving System 516 archives the raw MRC & HRC image and video take data and associated ancillary data.

The Processing System 515 performs several functions. In an example embodiment, the processing system 515 processes the raw camera data to create image tiles (i.e. map tiles), near real-time live feed tiles, and video files for the Web platform 524. This includes, for example, additional compression and other degradation (e.g. adding watermarks) to differentiate this data from the data that is sold to Customers/Distributors 543.

The processing system 515 also processes the data received from External Data Providers 544 and community-sourced data providers 545 to create image tiles and video files for the Web platform 524.

The processing system 515 also processes the raw MRC and HRC data to generate the image products and video products for the Customers/Distributors 543. In an example embodiment, the data for the customers/distributors 543 is of higher quality compared to the data provided on the Web platform 524. In this way, data presented on the Web platform 524 can be more easily displayed and consumed by lower power user devices, like tablets, mobile devices and laptops.

The Calibration system 517 monitors the image quality performance of the system and generates updated parameters for use in the rest of the system. This includes creating HRC and MRC radiometric and geometric correction tables that will be provided to the Processing system 515. The correction tables may include gains and offsets for the radiometric correction, misalignment angles, and optical distortion coefficients for the geometric correction. The Calibration system 517 also includes automated functions to monitor the characteristics of the HRC and MRC and, when necessary, perform updates to the radiometric and geometric correction tables. The Calibration system 517 may also include tools to allow the operators to monitor the characteristics of the HRC and the MRC, and the tools may also allow operators to perform updated to the correction tables.

The Ground Station Network (GSN) 519 is the collection of X-Band Ground Stations that are used for the X-Band downlink of image, video, ancillary, and log data. The GSN is a distributed network of ground stations (e.g. ten ground stations) providing for frequent downlink opportunities.

The Data Hub 522 is responsible for collecting, preprocessing and routing of downlink data.

The Health Monitoring System (HMS) 521 is configured to perform a number of functions. The HMS monitors the health status of the space segment 501, and generates of health status reports. The HMS organizes and stores engineering telemetry and diagnostic logs, which can be transmitted to an operator for viewing. The HMS also logs behavior and performance, such as by computing long-term trends and statistical analysis. The HMS is also configured to receive and store engineering inputs for the generation of maintenance, configuration and diagnostic activities of the space segment 501. The HMS is also configured to monitor general performance of the Ground Station Network (GSN). For example, the HMS monitors signal levels and lock synchronization, and may monitor other characteristics.

The Orbit & Attitude System (OAS) 520 publishes definitive and predicted orbit data, definitive and predicted attitude data of the ISS. The OAS also provides some related orbit and attitude related services to the rest of the system.

The Mission Control Center (MCC) 530 is used to manage communications between the spacecraft 100 and the ground. For supporting earth observation, the MCC station is used for uplinking the command files (e.g. OCFs) and receiving real-time heath and status telemetry. The MCC 530 is also configured to transmit resource availability about the spacecraft and the space segment 501 to the CPS 518. This resource availability data may include data regarding power resources, planned orbit adjustment maneuvers, and any scheduled outages or other availability issues.

The MCC 530 receive OCFs from the CPS 518. The MCC 530 then confirms that it meets all resource constraints and availability constraints. If there is a conflict where any resources are not available to optical telescope system, it will either request a new plan from the CPS 518 or could cancel some imaging sessions to satisfy the constraint.

It will be appreciated that FIG. 7 and FIG. 8 also show secondary systems or external systems 701 that may be used in conjunction with the systems described above. These secondary or external systems include a data hub 522', a processing and archiving system 515', 516', a health monitoring system 521', an orbit and attitude system 520', an order and management system 514', a network hub 523', and a ground station network 519'.

With respect to FIG. 8, below is Table 2, which maps the letters used to identify types of data flowing between the different systems. For example, FIG. 8 shows the letter 'A' located on the data link between the processing system 515 and the external data providers 544. As per Table 2, the letter 'A' means that other raw imagery and ancillary data, as well as other product imagery and metadata are exchanged between the processing system 515 and the external data providers 544. Other letters used in FIG. 8 are detailed in the table below.

TABLE 2

Data Flow Mapping for FIG. 8

| Letter Code | Data Flow |
|---|---|
| A | Other Raw Imagery & Ancillary Data, Other Product Imagery & Metadata |
| B | Map Tiles, Live Feed Tiles, Pin-point data, Products, Crowd-sourced Data Retrieval |
| C | Tiles, pin = point data, crowd-sourced data |
| D | Community-Sourced Data |
| E | Web Platform Interactions |
| F | Web Platform API |
| G | Catalog Browse, Ordering TBD |
| H | Products |
| I | Feasibility Analysis, Order Management Delivery Notification |
| J | Delivery Status |
| K | Products |
| M | Requests, Status, Reports |
| N | Product Generation Request, Image/Video Take Notification |
| O | Catalog query |
| P | Catalog query |
| Q | Reports |
| R | Raw Product |
| S | Image/Video & Ancillary Level 0 Files |
| T | Dataset Submission, Dataset Retrieval, Catalogue Update |
| U | Data Hub, Log, Workflow Control File |
| V | Calibration Ordering |
| W | MR Acquisition Region, HR Acquisition Request, Re-Downlink Request & Status |
| X | Feasibility & Preplanning Dialogue |
| Y | Processing By-Products, Correction Parameters |
| Z | DEM, DSM, GCP, Map |
| AA | Anomaly Report |
| AB | Ancillary Level 0, Space Segment Log, Data Hub Log |
| AC | Ancillary Level 0 |
| AD | Pass Reports |
| AE | Truth Data |
| AF | Scheduling Coordination Dialogue, Reception Schedule |
| AH | Expected File List, Data Hub Log |
| AI | Expected File List |

TABLE 2-continued

| Data Flow Mapping for FIG. 8 | |
|---|---|
| Letter Code | Data Flow |
| AJ | Manual Command File, Resource Status |
| AK | MR Acquisition Regions & Status, HR Acquisition Requests & Status, Re-Downlink Request & Status |
| AM | Availability & Resource Status, Advance Operating Schedule, Activity Schedule |
| AN | X-Band Downlink |

Figure 9A:
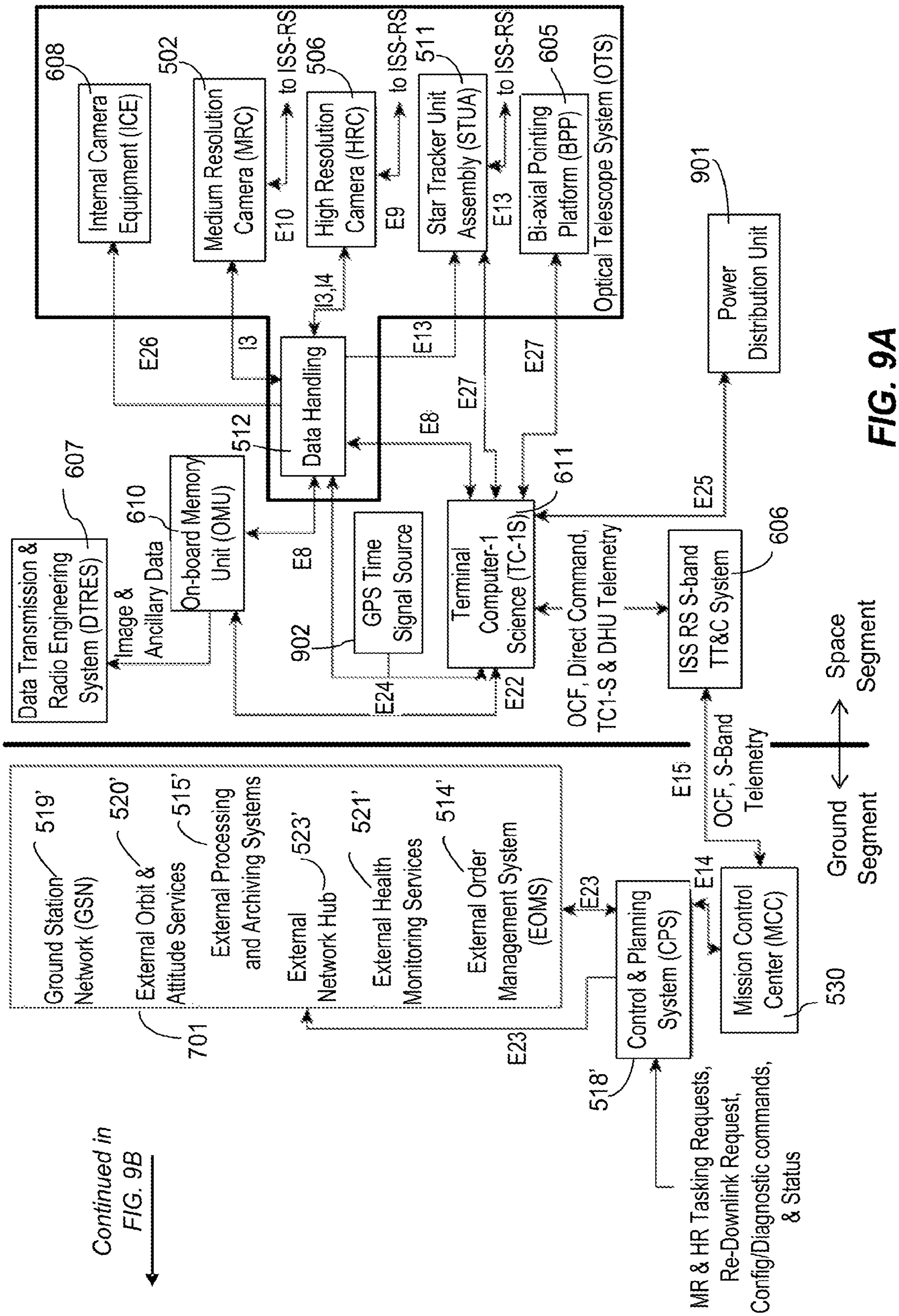
FIG. 9A and FIG. 9B are different parts of an example system diagram of the ground segment and the space segment, including the interactions between the components.
Figure 9B:
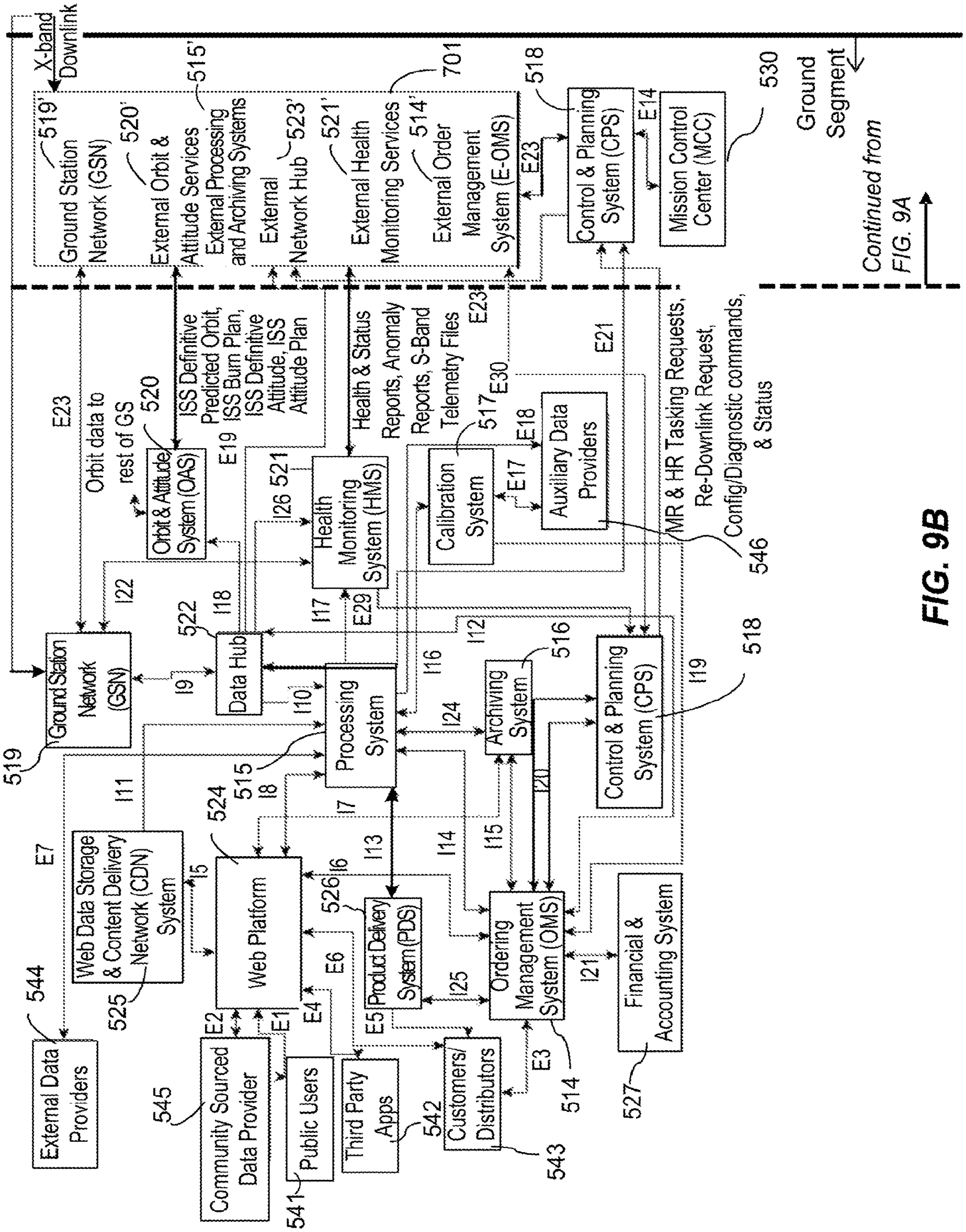

FIG. 9A and FIG. 9B show different parts of the same system diagram, which includes the components of the ground segment and the components of the space segment. The components or systems are the same as those described above. FIG. 9A further includes a power distribution unit 901 that is in communication with the terminal computer 611 on the space segment.

In FIGS. 9A and 9B the links between the components or systems further show reference IDs (e.g. E8, E23, I11, I23, etc.). These reference IDs are used to explain the interfaces between two components and are further described using Table 3A and Table 3B below.

TABLE 3A

| Reference IDs Used for Interfaces in FIG. 9A ad FIG. 9B | | |
|---|---|---|
| ID | Name | Description |
| | | Space Segment Interfaces |
| E8 | DHU to TC1-S | OCFs<br>Direct Commands<br>ISS Ancillary Messages<br>Time Messages<br>TCI-S Telemetry<br>DHU Telemetry |
| E8 | DHU to OMU | Downlink Transfer Files (DTF) |
| E9 | HRC to ISS-RS | External interfaces between HRC and equipment on the ISS RS.<br>Space environment pertinent to HRC equipment<br>Operational modes and power |
| E10 | MRC to ISS-RS | External interfaces between MRC and equipment on the ISS RS.<br>Space environment pertinent to MRC equipment<br>Operational modes and power |
| E13 | STUA to TC1-S and ISS-RS | Mechanical mounting and orientation of star trackers<br>Electrical & power interface<br>STUA Commands and Telemetry |
| E24 | TC1-S to GPS | Time signal |
| E25 | TCI-S to Power Distribution Unit | Power on/off commands |
| E26 | DHU to ICE | Note that this interface may be to another computer and not to the DHU.<br>TBD |
| E27 | TC1-S to BPP | BPP Commands and Telemetry |
| E28 | TC1-S to OMU | OMU Commands and Telemetry |
| | | Space to Ground Interfaces |
| E15 | MCC-M to ISS RS S-band TT&C System | S-band Commands and telemetry consisting of:<br>OCFs<br>Direct Commands<br>Telemetry Data |
| E11 | DTRES to GSN (RF) | RF link characteristics (centre frequency, data rate, modulation and encoding scheme)<br>RF image, video and ancillary data from DHU via the DTRES X-Band downlink |
| | | Ground Segment Interfaces |
| E1 | Public Users to the Web Platform | Interaction and data exchange with online users. This allows users to:<br>Browse, search imagery, video and other data.<br>Add feedback and social content<br>Enter requests for new data<br>Providing notifications to users about upcoming video takes over their requested target areas<br>Ordering functions TBD |
| E2 | Community Sourced Data Provider to Web Platform. | Uploading social media content (tweets, images & videos)<br>Uploading community-sourced imaging data to the data portal that will be processed and used for the imagery archive on the cloud |
| E3 | Customers/Distributors to Order Management System | Feasibility analysis<br>Order Management<br>Delivery Notification |
| E4 | Third Party Apps to Web Platform | Application Programming Interface (API) definition for mobile app developers |

TABLE 3A-continued

| Reference IDs Used for Interfaces in FIG. 9A ad FIG. 9B | | |
|---|---|---|
| ID | Name | Description |
| E5 | Customers/ Distributors to Product Delivery System | Product delivery |
| E6 | Customers/ Distributors to Web Platform | Catalogue interactions<br>Order management |
| E7 | Other Imagery Data Providers to Processing System | Other Raw Imagery & Ancillary Data, Other Product Imagery & Metadata |
| E12 | CPS to GSN | Scheduling Coordination Dialogue<br>Reception Schedule |
| E14 | CPS to MCC-M | Advance Operating Schedule<br>Resource status and availability of ground and onboard resources.<br>Activity Schedules |
| E17 | Auxiliary Data Providers to Calibration System | Truth Data |
| E18 | Auxiliary Data Providers to Processing System | DEMs, DSMs, GCPs Maps |
| E19 | Data Hub to External Network Hub | Raw Product |
| E20 | OAS to External Orbit Services | ISS Definitive Orbit<br>ISS Predicted Orbit<br>ISS Burn Plan<br>ISS Definitive Attitude<br>ISS Attitude Plan |
| E21 | CPS to Data Hub | Expected File List<br>Data Hub Log |
| E22 | HMS to External Health Monitoring Services | Health & Status Reports<br>Anomaly Reports<br>S-band Telemetry Files<br>Post Pass Report |
| E23 | CPS to External GS | MR Acquisition Region & Status<br>HR Acquisition Request & Status<br>Re-downlink Request & Status<br>Expected File List<br>Scheduling Coordination Dialogue<br>Reception Schedule |
| E29 | HMS to CPS | Resource Status<br>Manual Command Files |
| E30 | CPS to External GS | MR Planning Files |

TABLE 3B

| Reference IDs Used for Interfaces in FIG. 9A ad FIG. 9B | | |
|---|---|---|
| ID | Name | Description |
| | Space Segment Interfaces | |
| I1 | HRT to HR-DCU | Electrical interface between the High Resolution Telescope (HRT) and the High Resolution Data Compression Unit (HR-DCU).<br>HRT command and control<br>HRT power from HR-DCU<br>HRT programming and configuring<br>HRT data definition |
| I2 | MRT to MR-DCU | Electrical interface between the Medium Resolution Telescope (MRT) and the Medium Resolution Data Compression Unit (MR-DCU).<br>MRT command and control<br>MRT power from MR-DCU |

TABLE 3B-continued

| Reference IDs Used for Interfaces in FIG. 9A ad FIG. 9B | | |
|---|---|---|
| ID | Name | Description |
| | | MRT programming and configuring<br>MRT data definition |
| I3 | DHU to HR-DCU and MR-DCU | Data and electrical signal interface between the DHU and High Resolution Data Compression Unit (HR-DCU).<br>Data and electrical signal interface between the DHU and Medium Resolution Data Compression Unit (MR-DCU).<br>Command and control interfaces DHU to MR-DCU and HR-DCU<br>Telemetry interfaces DHU to MR-DCU and HR-DCU Operational behaviour and interaction between DHU and MR-DCU and HR-DCU |
| I4 | GYU to DHU/ ISS-RS | Electrical interface description between the GYU and the HR-DCU<br>GYU Command and Telemetry interface |

TABLE 3B-continued

Reference IDs Used for Interfaces in FIG. 9A ad FIG. 9B

| ID | Name | Description |
|---|---|---|
| | | between GYU and DHU |
| | | Ground Segment Interfaces |
| I5 | Web Platform to Web Storage & CDN | The Web Platform interacts with the cloud & CDN to retrieve all imagery and other content to push to users. The platform manages incoming social media data and community sourced image data and places on the cloud. |
| I6 | Web Platform to OMS | Web platform provides filtered lists of requests for the HRC video and MRC image targets. Request and Status (TBD) Web User Collection Plan (TBD) OMS provides Reports that contain upcoming planned Acquisitions that can be displayed by the Web Platform |
| I7 | Web Platform to Archiving System | Catalogue query |
| I8 | Processing System to Web Platform | Community-sourced data arrival notification |
| I9 | GSN to Data Hub | Raw Product |
| I10 | Data Hub to Processing System | HRC/MRC/ICE Image/Video Data (Level-0) Ancillary Data Level 0 |
| I11 | Processing to Web Storage & CDN | Processed MRC simulated videos, HRC videos, MR images and HR images for cloud data storage (online) Processed image data also from external data suppliers also added to the cloud data storage Community sourced image data sent to processing and the processed data then added to the cloud data storage |
| I12 | Data Hub to OMS | Data Hub Logs Workflow Control Files |
| I13 | Processing System to PDS | Products |
| I14 | OMS to Processing System | Product Generation Request & Status Image/Video Take Notification |
| I15 | OMS to Archiving System | Catalogue queries |
| I16 | Calibration System to Processing System | Radiometric and geometric image and video statistics from Processing Correction tables used in processing raw data Onboard correction tables (if required needed only to improve compression performance). Would be coordinated with planning system |
| I17 | Processing System to HMS | Anomaly Report |
| I18 | Data Hub to OAS | Ancillary Data |
| I19 | Calibration System to OMS | Calibration ordering Note this is the same interface as the Customers/Distributors to OMS interface with some extensions to allow additional control of parameters. |
| I20 | OMS to CPS | Feasibility & Preplanning Dialogue MR Acquisition Regions, HR Acquisition Requests, & Status Re-Downlink Requests & Status |
| I21 | OMS to Financial & Accounting System | Reports |
| I22 | GSN to HMS | Post Pass Reports |
| I23 | OAS to rest of system | Orbit and Attitude Data |
| I24 | Processing System to Archiving System | Dataset Submission Dataset Retrieval Catalogue Update |
| I25 | PDS to OMS | Delivery Status |
| I26 | Data Hub to HMS | Ancillary Data Level 0 Space Segment Log Data Hub Logs |
| I27 | CPS | CPS internal data exchange |

In an example embodiment, ancillary data for Level 0 products include orbit position, attitude and other data used for processing.

Figure 10:
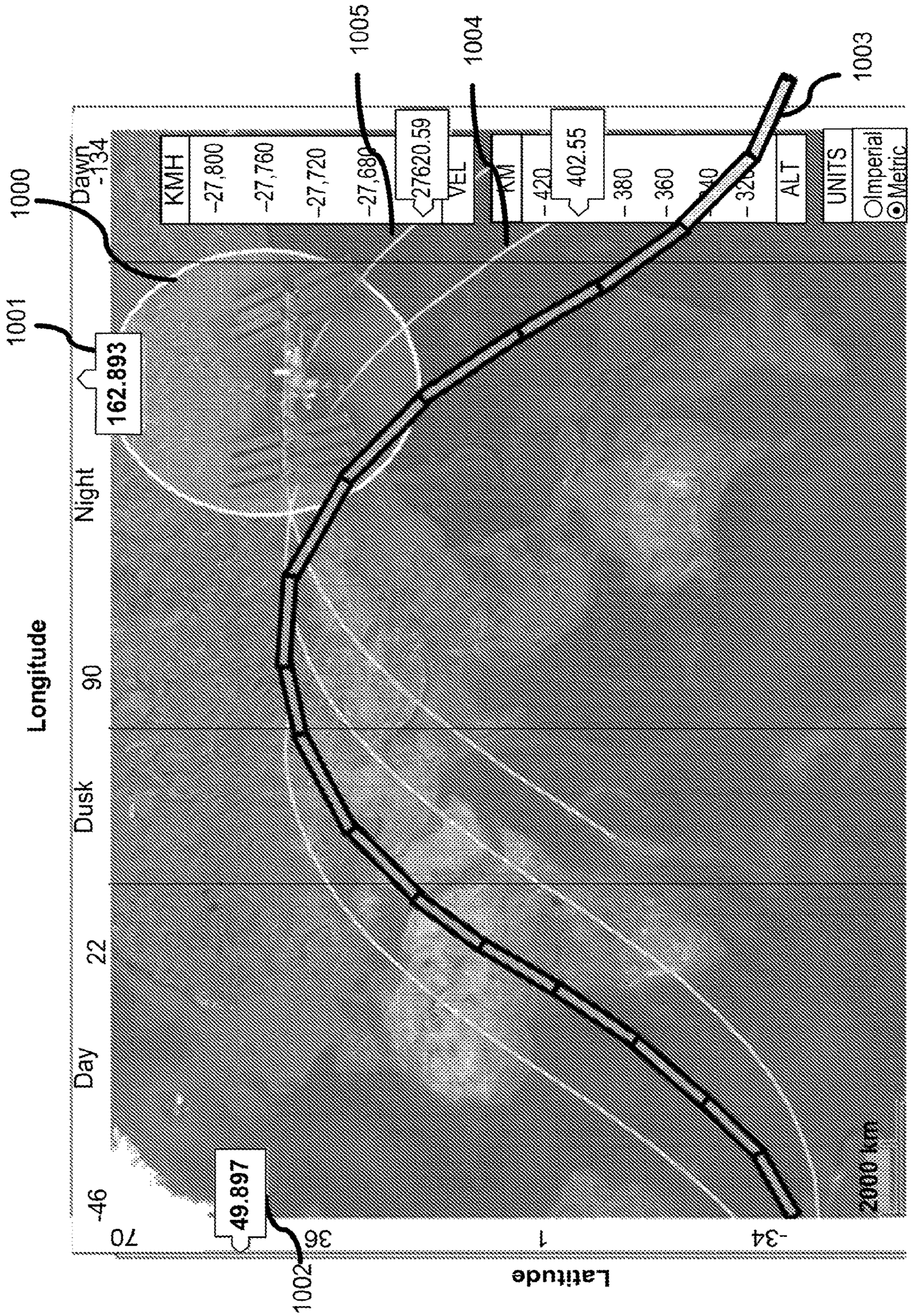
FIG. 10 is illustrates an example of different orbits of a spacecraft, during which the spacecraft captures Earth observation data.

Turning to FIG. 10, an illustration show an image of a spacecraft 1000 travelling at a certain latitude and longitude 1002, 1001, along an orbit path 1003. He segments in the orbit 1003 show the sections of video or image data acquired. For example, each section corresponds to an image take. Other orbit paths 1005 and 1004 can be used.

It will be appreciated that any module, component, or system exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems, modules or components of the Earth observation system 500, or accessible or connectable thereto. Any application, system or module herein described may be implemented using computer readable/executable or instructions or operations that may be stored or otherwise held by such computer readable media.

Camera System

Figure 11:
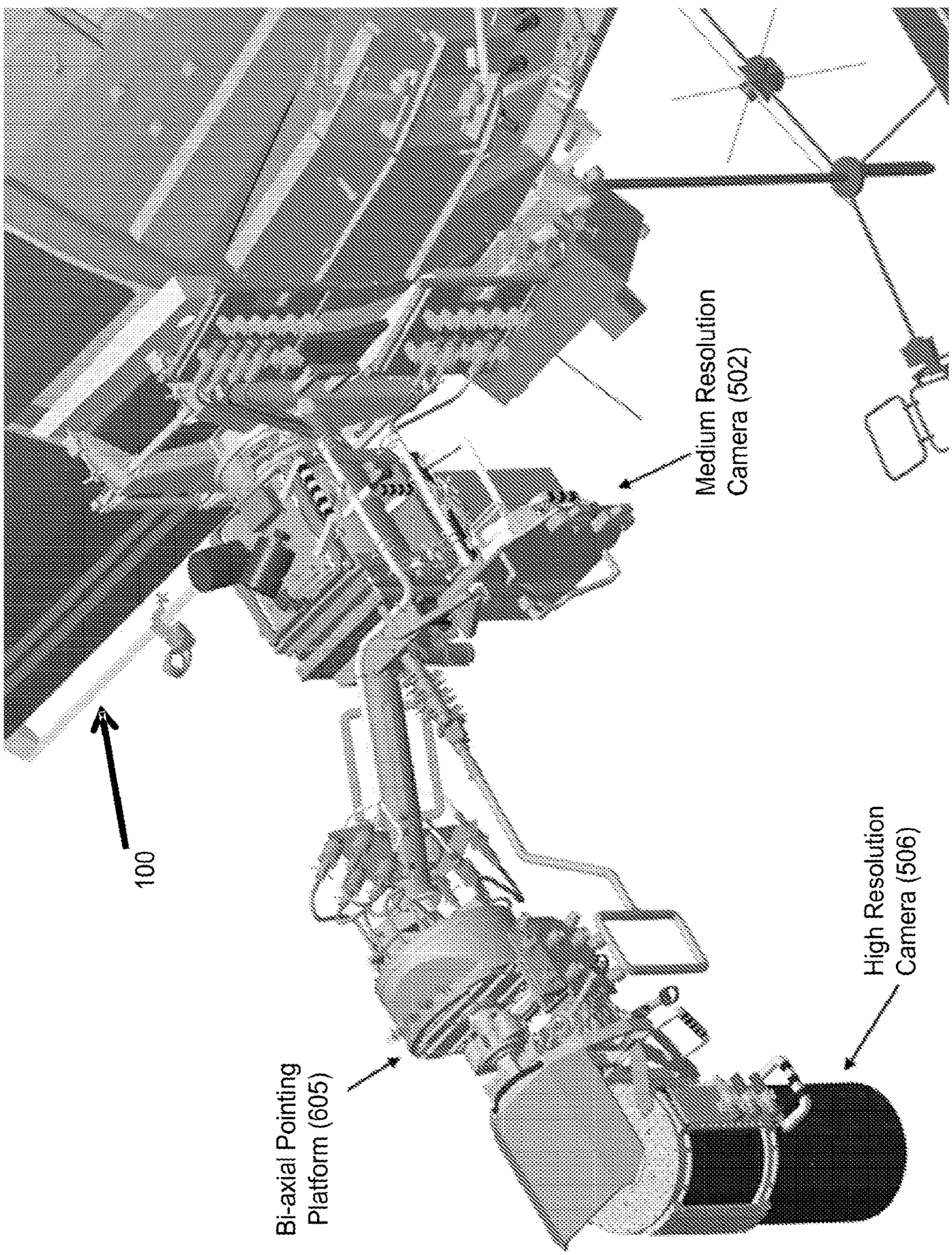
FIG. 11 is an example embodiment showing a high resolution camera (HRC) and medium resolution camera (MRC) mounted to a spacecraft.

Turning to FIG. 11, a perspective view of the camera system is shown mounted on the spacecraft 100. The illustration shows the MRC 502, and the HRC 506 mounted to the BPP 605.

Figure 12:
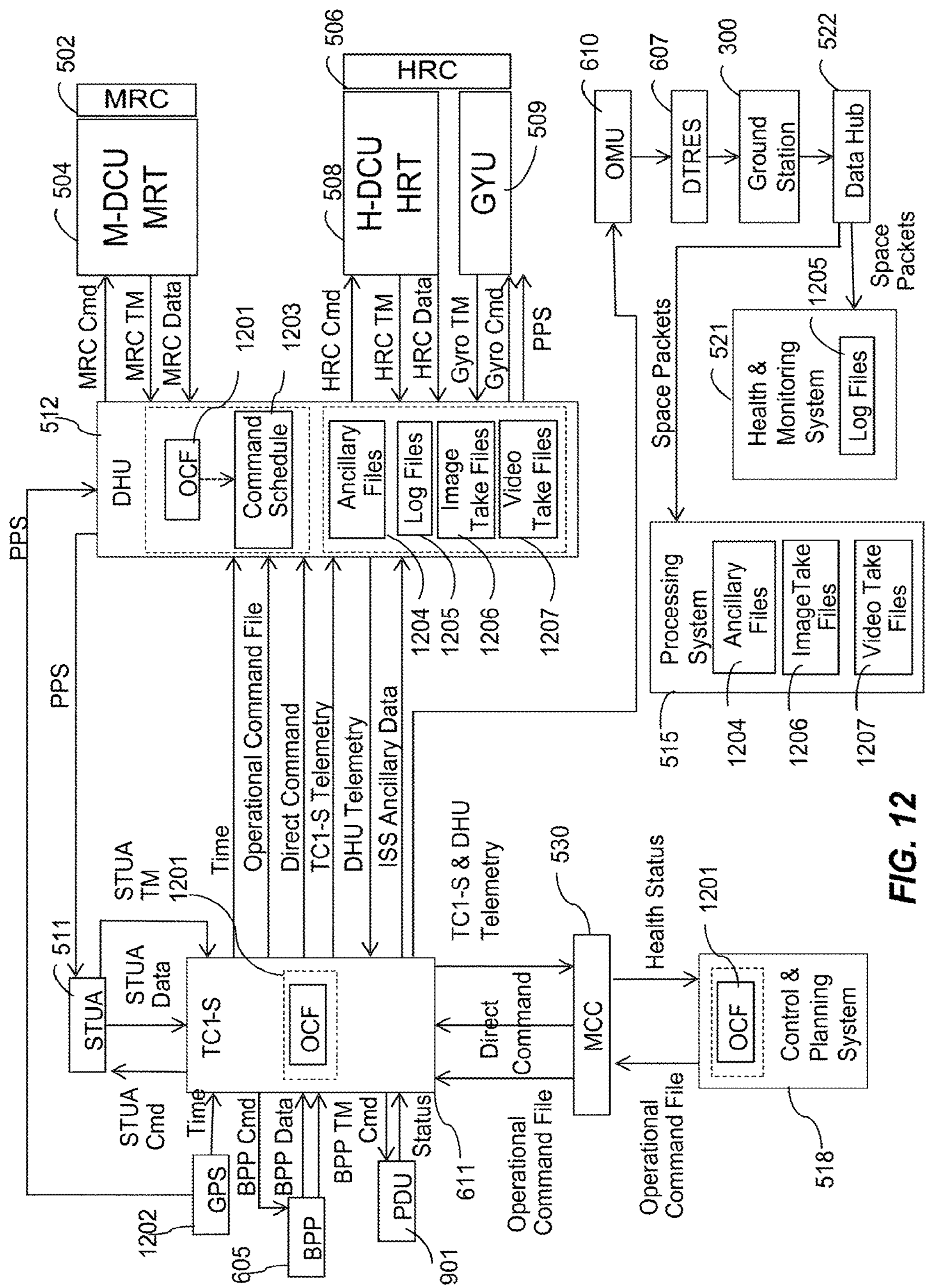
FIG. 12 is another example system diagram of the space segment, showing the data flowing between the components.

Turning to FIG. 12, an example embodiment of a system diagram of the space segment is shown, including the camera system MRC 502 and HRC 506. It can be appreciated that other camera configurations, other than the configurations described herein, can be used with the principles described herein.

The terminal computer 611 controls operations on the DHU 512. The terminal computer also controls the MRC and HRC units' power on/off transitions in accordance with the OCF content. The terminal computer 611 provides time updates, Operational Command Files (OCFs 1201), direct commands, spacecraft ancillary data (e.g. ephemeris and attitude data, BPP joint angles, STUA quaternions), and terminal computer telemetry data to the DHU 512. In return, the DHU 512 provides DHU telemetry (e.g. health status) information back to the terminal computer 611.

The Mission Control Center (MCC) 530, located on the Earth, performs checking on the OCFs. If no issues are found, MCC manages the uplink of the OCF to the spacecraft. If any issues are found, the OCF is rejected and is not sent to the spacecraft. The MCC manages the uplink of the OCFs via ground stations. The size of the command data that can be uplinked in one pass is limited. For example, the command data in an OCF is less than 8800 bytes. However, the limit varies from pass to pass (e.g. when the spacecraft passes over a region of a ground station). The MCC will enforce this restriction and will only uplink OCFs that fit within the restriction.

The CPS 518 sends OCFs to the MCC 530 and the MCC manages the communications with the spacecraft via the terminal computer 611.

The MCC also received telemetry from the terminal computer 611, including health and safety data.

In an example embodiment the health and safety data is sent from the spacecraft to a ground station 300 via the spacecraft's DTRES. In particular, space packets of data are generated by the terminal computer 611, and stored on the OMU 610 of the spacecraft. The space packets include image data (e.g. image take files 1206 and video take files 1207), ancillary data files 1204 and health monitoring data (e.g. log files 1205). When possible, the space packets are sent from the OMU to the ground station 300, via the DTRES 607. The ground station sends the data to a data hub 522. The space packets, including the log files, are sent to the HMS 521. The space packets including the ancillary files 1204, the image take files 1206, and the video take files 1207 are sent to the processing system 515.

The terminal computer 611 is configured to, for each Session in the OCF, execute the necessary steps to power on/off the DHU 512, STUA 511, MRC 502 and HRC 506. In some cases, the terminal computer 611 powers on/off the OMU 610 and DTRES (e.g. X-band transmitter) 607 to support the downlinks. For each STUA Session in the OCF, the terminal computers 611 execute the STUA commands. For each HRC Session in the OCF, the terminal computer executes the BPP control.

When the terminal computer 611 receives a new OCF, the terminal computer performs a check on the OCF. If any errors are found the OCF is discarded and is not passed onto the DHU 512. This occurrence would be reported to the DHU via an execution message and passed to the ground in a Space Segment Log (e.g. log file 1205).

In an example embodiment, the terminal computer 611 is configured to modify an OCF by deleting, inserting, or modifying commands. For example, the terminal computer introduces unplanned instructions (e.g. instructions not contained in the originally received OCF) to activate power off cycles to support off-nominal operations aboard the spacecraft.

After receiving a new OCF from the terminal computer 611, the DHU 512 computes a basic check on the OCF format and, if there is a discrepancy, the DHU 512 rejects the OCF. This discrepancy and rejections would also be noted in the Space Segment Log.

The DHU 512 generates internal command schedules based on the contents of the OCF. In addition to controlling its internal activities, the DHU 512 will control the MRC and HRC. This includes power on/off and any necessary warm-up/cool-down periods. In particular, the DHU sends MRC commands to the MRC 502, HRC commands to the HRC 506, gyro commands to the gyroscopic unit 509. The DHU also received image or video data from the cameras, telemetry data from the cameras, and telemetry data from the gyroscopic unit.

Continuing with FIG. 12, the GPS 1202 on the spacecraft is used to obtain the time and PPS. The time is sent to the terminal computer and the DHU. The PPS is sent to the DHU, and the DHU transmits the PPS to other components (e.g. 509, 511).

Although not shown in FIG. 12, the internal camera equipment, or other camera equipment (e.g. cameras 202, 203) can be controlled using OCFs and the DHU in the same way the HRC and MRC are controlled. The data from these other cameras can be downlinked and processed in the same or similar way data from the HRC and MRC are handled.

In an example embodiment, the DHU and the terminal computer are configured to process each OCF to create the internal commanding schedules without affecting the current schedule being executed. The DHU and the terminal computer are configured to stop all activities associated with the previous OCF at the start time of the new OCF and generate their new internal schedule based on this new OCF from that start time.

Regarding the camera system's configuration, onboard update activities such as maintenance, calibration and software patches may be controlled through OCF command files generated on the ground. Configuration parameters includes software patches, calibration and configuration settings. The specific configuration instructions that may be commanded include the update and dump of MRC and HRC configuration factors, uploading of any of the telescope configuration tables, update of compression selection tables, DHU configuration, software updates.

Software updates may be in the form of OCFs and the transport mechanism could be via the normal command uplink to the terminal computer 611. However the updates could also be, via memory stick, sent up on a flight to the spacecraft, where an astronaut or cosmonaut (or the like) inserts the memory stick into the terminal computer.

Regarding the MRC 502, the MRC is a fixed pointing camera that takes image strips. The configurable camera settings include ADC gain, integration time and compression ratio. The following are some overall considerations related to compression ratio, integration time. Examples of compression ratios for the MRC are provided below in Table 4.

TABLE 4

Compression Ratios for MRC

| Example Compression Ratio | Example intended application for Imagery |
|---|---|
| 4:1 | Highest quality |
| 8:1 | Lowest acceptable level of quality for land imagery (including for Web use) |
| Greater than 8:1 | Ocean or night |

An Image Take (IT) is a contiguous strip of four-band MRC data collected with the same camera and configuration settings. Four-band data refers Red, Green, Blue and Near Infrared (RBGN) data. In an example embodiment, all image takes will have a unique Image Take ID.

The MRC camera is primarily operated in a systematic image collection mode. In a default mode, the MRC camera collects imagery all the time, subject to resource constraints. Based on this mode of operation, most of the MR imagery will be part of a systematic background acquisition plan. Most of the imagery will be acquired as long strips. The length of individual strips (Image Takes) is limited in practice by the need to change the ADC gain, integration time and compression ratio as the sun illumination changes along the orbital ground track. This limit may be reached sooner than other limits, such as limits in the size of data that can be downlinked and handled in the rest of the system.

A request for imaging using the MRC can originate from a customer or external user are managed by OMS and allow a user to: request that imagery of a certain area is covered; request certain compression level (e.g. higher quality than the default setting); and request delivery to the customer. The request may also include details that exclude or delay the imagery from being placed in the public archive.

The default imaging routine of the MRC is systematic and includes capturing long images of strips of the Earth. The image strips are broken or separated into manageable lengths during planning. The systematic imaging is not done in response to any specific user requests. The imaging concept for the MRC is for continuous global coverage. However the specific Acquisitions may be influenced by: light conditions; land or ocean area; and data volume limitations on board or downlink capacity For the MRC, the operational Image Take executable instructions may be performed according to the following order: MRC On command; MRC Warmup delay; one or more Image Takes; MRC Power-off clean-up delay; and MRC off command.

Regarding the HRC, the HRC is an agile high-resolution video camera. For example, it has capture images at 3 frames per second, optionally decimated by integral factors. The HRC is capable of collecting video/imagery in several ways.

The HRC is configured to capture video centered on a single target on the ground. The camera remains pointed at the target as the spacecraft moves along its orbit. A video with one frame is equivalent to acquiring a single image. Sets of such videos or images can be used for specific purposes such as stereo pairs. If the images are not frames of a continuous video, then such scenarios are composed of multiple Image Takes.

The HRC is also configured to capture a one-dimensional or a two-dimensional grid of adjacent single frame takes where a fixed number (e.g. 1-5) of frames are acquired in a line or serpentine pointing sequence, resulting in a quilt-like pattern that covers an area longer and/or wider than a single swath. Such an imaging scenario can be commanded such that it is stored as a single Video Take.

In another example embodiment, the HRC is further configured to capture a video of a path on the ground (a video that slides along a path on the ground). Such an imaging scenario can be commanded such that it is stored as a single Video Take.

The HRC is also configured to capture a video of a celestial target (e.g. the moon).

The HRC's configurable camera settings include, for example, ADC gain, integration time and compression ratio. The following are some considerations related to compression ratio, integration time and ADC gain settings. Typical compression settings for the HRC are shown in Table 5 below.

TABLE 5

Example Compression Ratios for HRC

| Example Compression Ratio | Example intended application for Imagery |
|---|---|
| 3.3:1 | Highest Quality |
| 4:1 | Nominal |
| Between 8:1 and 15:1 | Minimum quality for Web |

A Video Take (VT) is defined as a set of HRC frames taken of a specific target. During this period, the BPP 605 will normally point the HRC boresight at the target and track this target during the VT. Each VT has constant camera and compression configuration settings.

The HRC may be operated in an order driven mode. These orders could originate from various sources, including Customers/Distributors, planners, and inputs from Public Users. The orders will specify targets, areas, or paths. The HRC operations include, for example, single target video, capturing a grid of images to cover an area, a video of a path, and celestial target video.

For terrestrial imaging, commands from the ground segment give the space segment coordinates of points on the Earth at which to point the HRC. The computing terminal 611 is configured to calculate the BPP pointing angles and commands the BPP. The CPS 518 is responsible for determining the timing of the HRC imaging activities such that slew and settling time rules are followed.

With respect to single target videos, the Order specifies the target's latitude, longitude and altitude. The BPP slews from the previous location, settles, and then dwells on the target for the entire Video Take. The result of this type of imaging is a video (or image if the video has only one frame) centered over a target.

With respect to a grid of images to cover an area, the Order specifies an area polygon. At the time of order entry, limits are automatically placed on the size of the area, based on the maximum area that the camera can acquire in one pass. The CPS 518 takes the requested area and breaks it into a series of individual single target Video Takes that form a grid pattern to cover the area. The BPP 605 slews from the previous location, settles, and then dwells on the first target for the duration of a single frame. The BPP 605 then slews, settles, and dwells on the second target for another single frame. And so it continues through all the individual single target Video Takes.

With respect to a video of a path, the Order specifies a path expressed as a sequence of video center coordinates. The CPS 518 creates a sequence of target center coordinates with appropriate spacing along the requested path. The BPP 605 slews from the previous location, settles, and then "sweeps" smoothly through each of the target center coordinates over the total Video Take duration. The required integration time (e.g. based on lighting level) determines the frame rate which determines the maximum path length. Based on typical values for integration time a swath of up to approximately 20 km could be swept. The result of this type of imaging is a single video that "sweeps" or "pans" over a path on the ground.

With respect to a Video Take of a celestial target, the order contains a coordinate in RAAN, Declination format. The BPP slews from the previous location, settles, and then dwells on the target for the entire Video Take. The result of this type of imaging is a video (or image if the video has only one frame) centered on a target.

In an example embodiment, the HRC operation executable instructions are executed according to the following timeline: HRC on command; gyro warm up delay; BPP on command; BPP align delay; HRC warm up delay; one or more Video Takes; BPP slews to position; acquisition begins and BPP tracks target position; at the end of the Video-take the BPP slews to its next position and wait to start the next video take; at the end of the last video take in the current HRC Session, the BPP performs a final slew manoeuvre to its stowed position, if so commanded; HRC Power Off Cleanup delay; HRC Off Command; and BPP Off Command.

Figure 13:
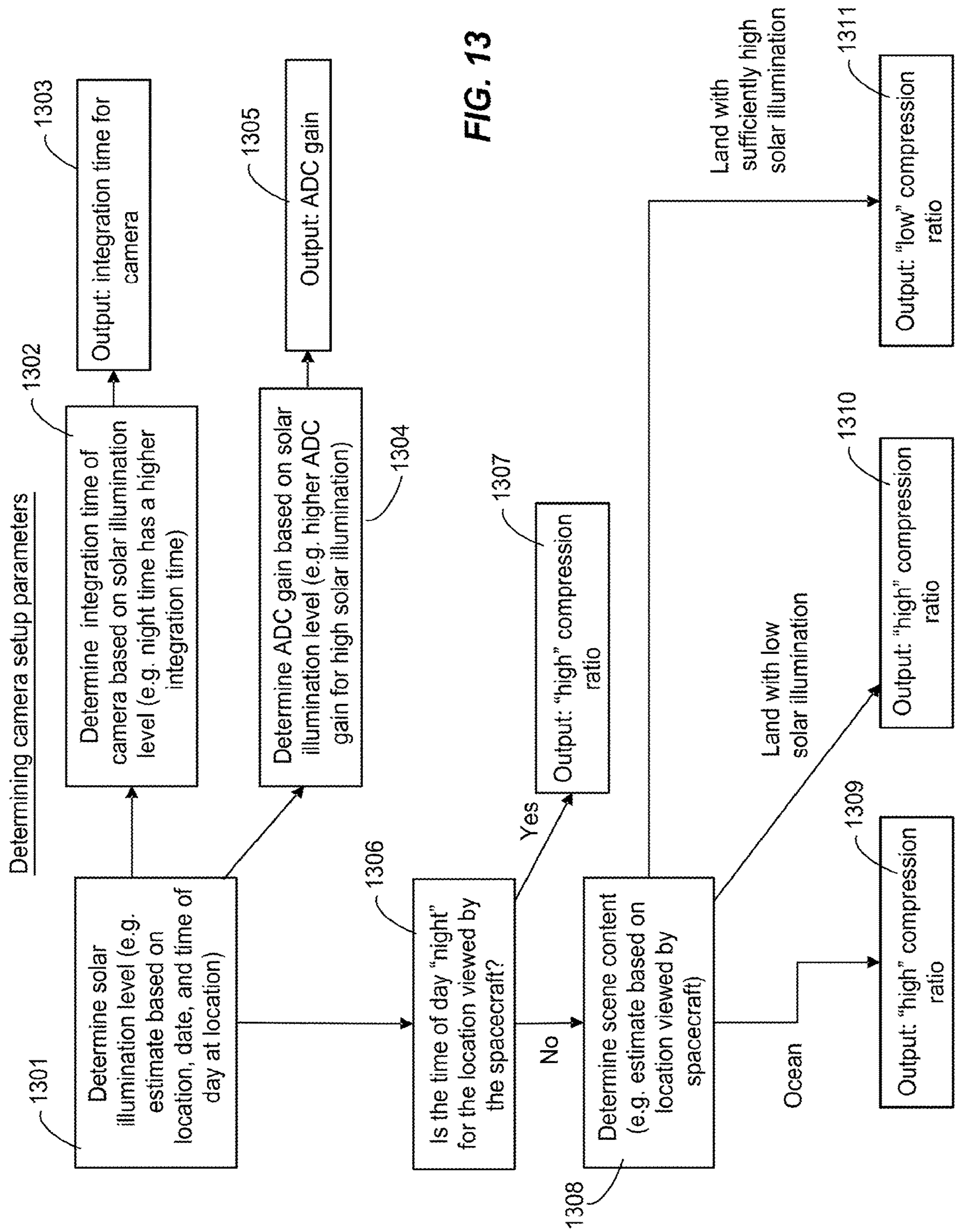
FIG. 13 is a flow diagram illustrating example computer executable or processor implemented instructions for determining camera setup parameters.

Turning to FIG. 13, example computer executable instructions are provided for determining camera configuration parameters. The parameters may apply to the MRC 502 and the HRC 506. These executable instructions may be performed on the space segment or the ground segment, or portions may be performed on the space segment and portions may be performed on the ground segment. A computing device executes the instructions. In an example embodiment, the computing device may include many computing devices (e.g. a computing device located on the ground and a computing device located on the spacecraft).

At block 1301, a computing device determines solar illumination level of the Earth, of which the camera will capture images and video. The solar illumination is be estimated based on location, date, and time of day at location, or can be obtained from measurements. At block 1302, the computing device determines integration time of the camera based on the solar illumination level (e.g. night time has a higher integration time). At block 1303, the computing device outputs the integration time for the camera.

Continuing with FIG. 13, to compute the ADC gain, using the determined solar illumination level from block 1301, the computing device determines the ADC gain based on the solar illumination level (e.g. higher ADC gain for high solar illumination), as per block 1304. The output is the ADC gain 1305.

Regarding compression ratio, after computing the solar illumination level, the computing device determines if the time of day is "night" for the location viewed by the spacecraft (block 1306). If so, and it is night, the computing device outputs a "high" compression ratio (block 1307). This is because there is little data to be obtained from night images, and higher quality images are not required for the night images. If the time of day for the specific location is not night (e.g. is the "day time"), the computing device determine the scene content (e.g. estimate based on location viewed by spacecraft) (block 1308). If the scene content is the ocean or water, the computing device outputs a "high" compression ratio (block 1309). If the scene content is land with low solar illumination, the output is a "high" compression ratio (block 1310). If the scene content is land with sufficiently high solar illumination, then the output is a "low" compression ratio (block 1311). It can therefore be appreciated that, by automatically adjusting the camera settings based on these factors, the size of the data files are appropriately smaller for less important images and are appropriately larger for more important images. This saves resources related to data storage and transfer.

Figure 14:
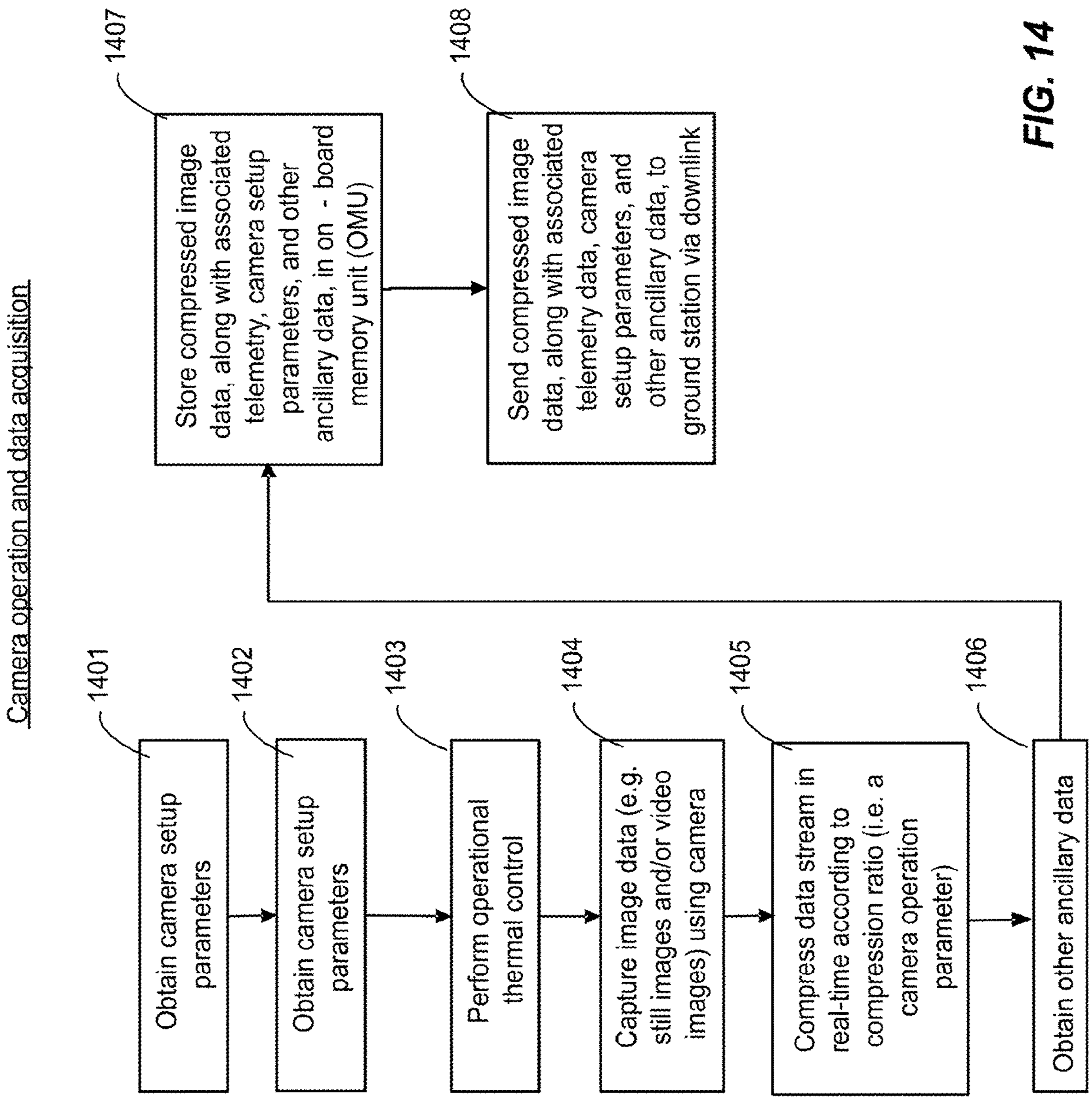
FIG. 14 is a flow diagram illustrating example computer executable or processor implemented instructions for camera operation and data acquisition.

Turning to FIG. 14, computer executable instructions are provided for camera operation and data acquisition. The instructions are performed by a computing device on the space segment. At block 1401, the computing device obtains camera setup parameters, such as per FIG. 13. At block 1402, the computing device performs operational thermal control of the camera to maintain temperature stability. At block 1403, the computing device instructs the camera to capture image data (e.g. still images and/or video images). At block 1405, the computing device compresses the data stream in real-time according to compression ratio (i.e. a camera operation parameter). The computing device obtains ancillary data (e.g. location, telemetry, etc.) (block 1406). The computing device stores the compressed image data, along with associated telemetry, camera setup parameters, and other ancillary data, in the on-board memory unit (OMU) (block 1407). The computing device then sends the compressed image data, along with associated telemetry data, camera setup parameters, and other ancillary data, to one or more ground stations via downlink (block 1408).

Figure 15:
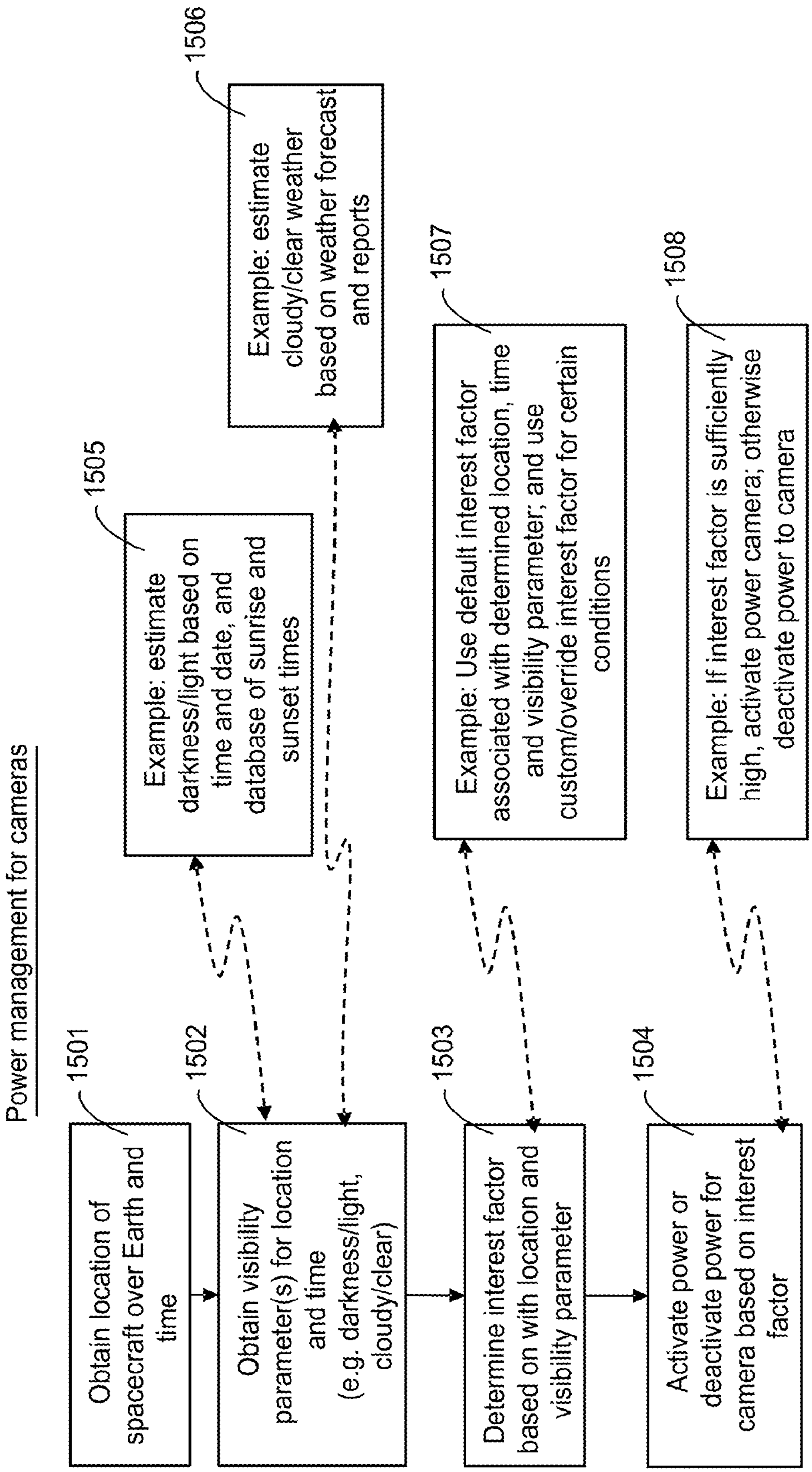
FIG. 15 is a flow diagram illustrating example computer executable or processor implemented instructions for managing power for the cameras.

Turning to FIG. 15, example computer executable instructions are provided for determining when to automatically power on or power off a camera on the spacecraft. At block 1501, the instructions include obtaining the location of the spacecraft over the Earth and the time. The location and time may be current location and time, or may be a future location and future time (e.g. several minutes or several hours in the future). AT block 1502, the instructions include obtaining visibility parameter(s) for the location and the time (e.g. darkness/light, cloudy/clear). For example, a computing device can estimate darkness/light based on the time and date, and comparing the same with a database of sunrise and sunset times (block 1556). In another example, the computing device estimates cloudy/clear weather based on weather forecast and reports (block 1506).

Continuing with FIG. 15, the instructions include determining an interest factor based on with location and visibility parameter (block 1503). For example, a default interest factor is used, and the default interest factor is associated with the determined location, time and visibility parameter. Alternatively, the interest factor is determined using a custom/override interest factor for certain conditions (e.g. based on customer orders or certain events). See block 1507.

After determining the interest factor, the computing device activates power or deactivates power for the camera based on the interest factor (block 1504). For example, if the interest factor is sufficiently high, activate power to the camera, or otherwise deactivate power to the camera (block 1508).

Figures 16, 17:
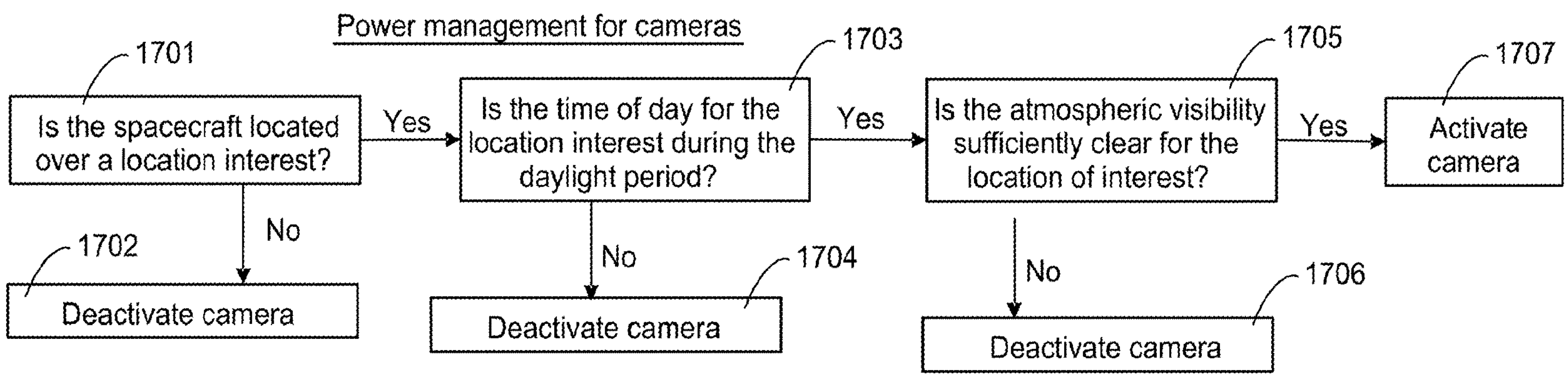
FIG. 16 is an example table used to determine camera activation based on an interest factor.
FIG. 17 is a flow diagram illustrating another set of example computer executable or processor implemented instructions for managing power for the cameras.

Turning to FIG. 16, an example of a table 1601 is used to determine a default interest factor for block 1503. The table considers location and visibility factors to determine an interest factor and corresponding power activation command. For example, if the location is San Francisco, the time is during the day time, and there is a clear sky, then the interest factor is high. Thus, the camera is activated. However, for similar conditions, but where the location is a water body (e.g. the Pacific Ocean), the interest is low. As there is typically little interest of images of water, the camera is deactivated to save power.

In another example embodiment, FIG. 17 describes another set of computer executable instructions. A computing device determines the answers to the following conditions: is the spacecraft located over a location interest? (block 1701); is the time of day for the location interest during the daylight period? (block 1702); and is the atmospheric visibility sufficiently clear for the location of interest? (block 1703). When all of these conditions are met, the camera is activated (block 1707). Otherwise, the camera is deactivated (blocks 1702, 1704, 1706).

Figure 18:
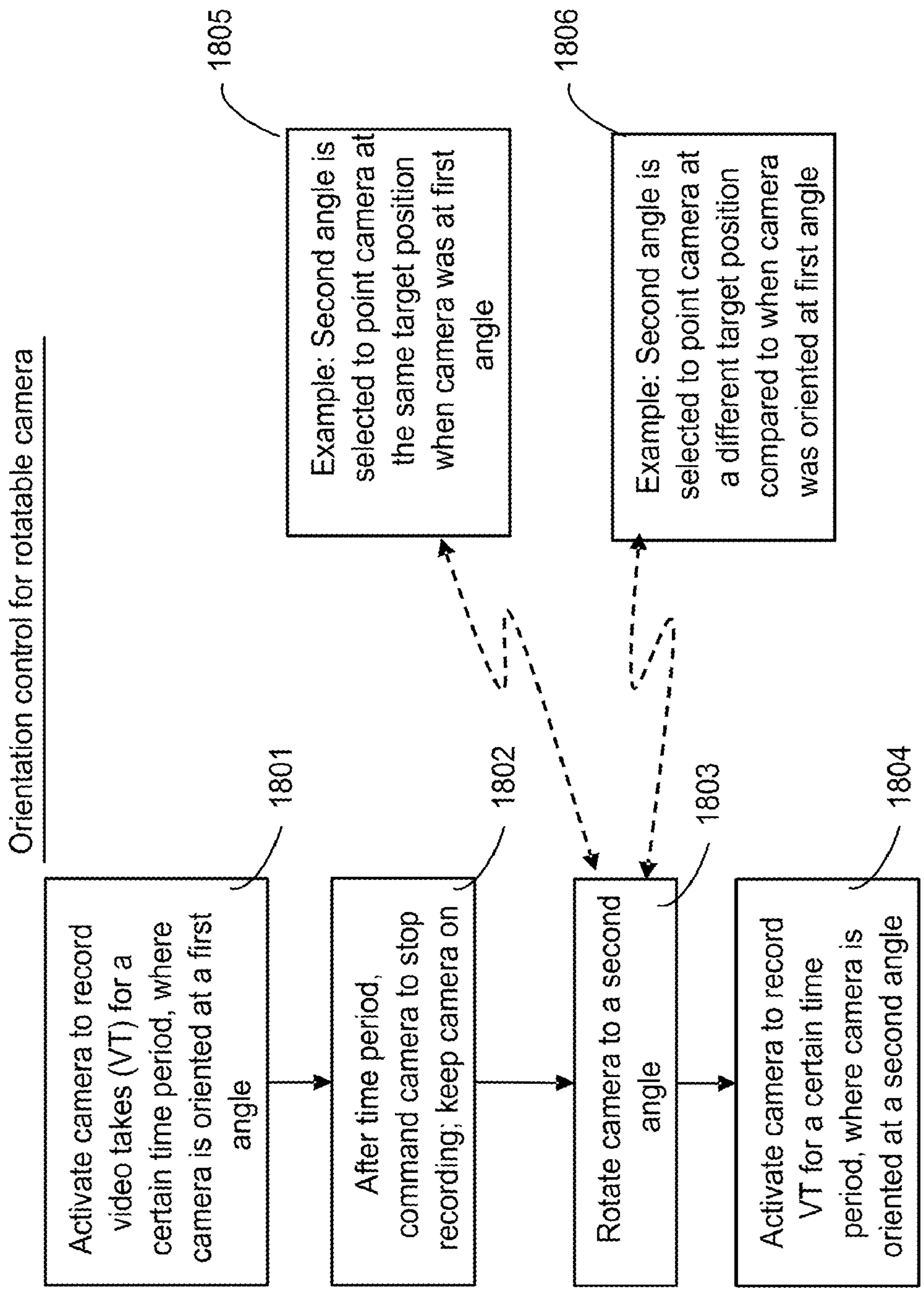
FIG. 18 is a flow diagram illustrating example computer executable or processor implemented instructions for controlling orientation of a rotatable camera.

Turning to FIG. 18, example computer executable instructions are provided for controlling orientation of a rotatable camera, such as the HRC 506 mounted to the BPP 605. The instructions include activating a camera to record video takes (VT) for a certain time period, where the camera is oriented at a first angle (block 1801). After a time period has passed, the instructions include commanding the camera to stop recording, but still keeping the camera on or powered (block 1802). The computing device executes instructions to rotate the camera to a second angle (block 1803). For example, the second angle is selected to point the camera at the same target position when the camera was at oriented at the first angle (block 1805). In another example, the second angle is selected to point the camera at a different target position compared to when the camera was oriented at the first angle (block 1806). At block 1804, following block 1803, the instructions include activating the camera to record another VT for a certain time period, where camera is oriented at the second angle. It can be appreciated that, in this example embodiment, the camera does not record video when the camera is being reoriented between video takes.

Figure 19:
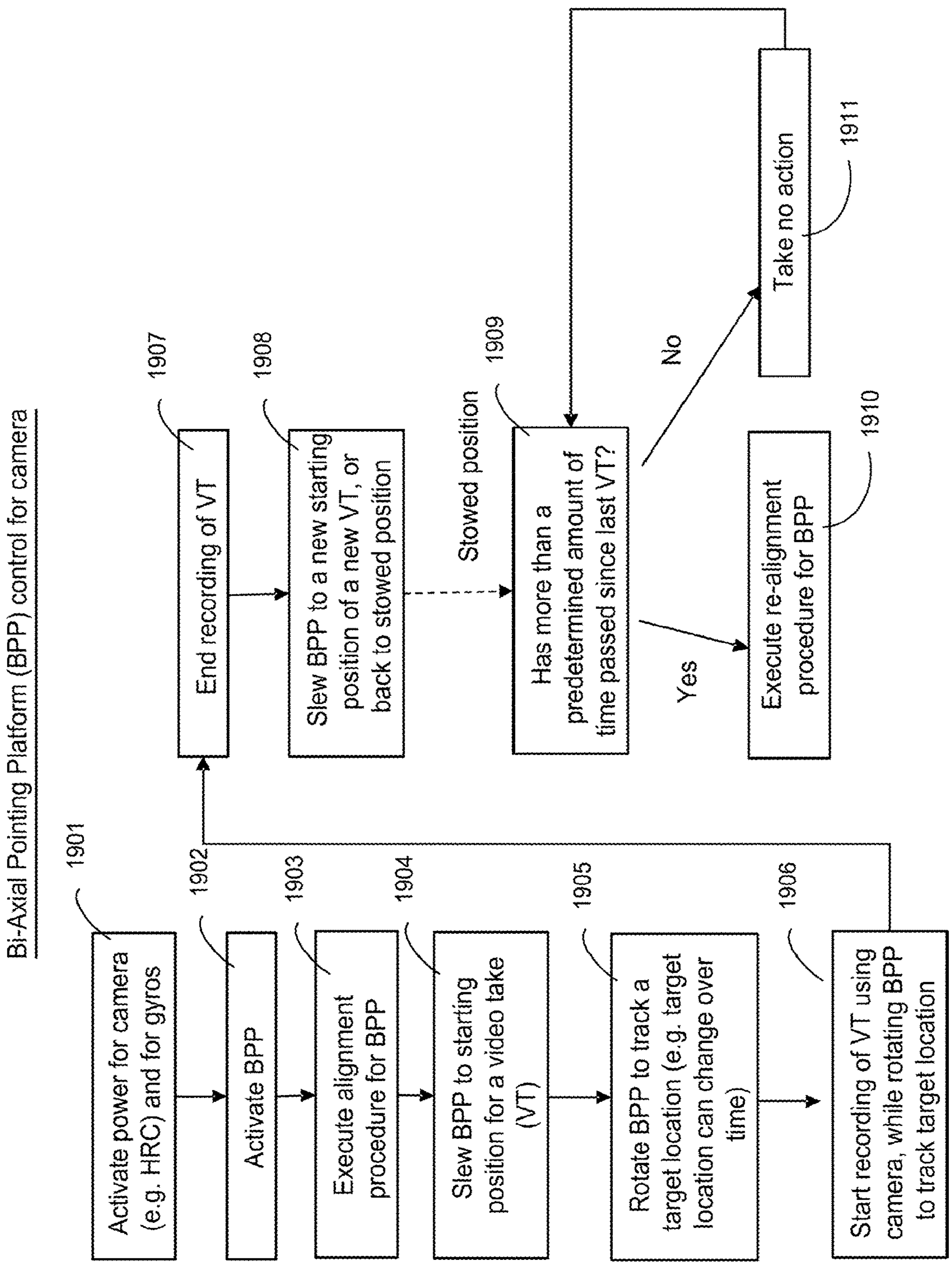
FIG. 19 is a flow diagram illustrating example computer executable or processor implemented instructions for controlling a bi-axial pointing platform that orients a camera.

Turning to FIG. 19, example computer executable instructions are provided for controlling the BPP 605. The instructions include: activating power for the camera (e.g. HRC) and for the gyros (block 1901); activating the BPP (block 1902); executing an alignment procedure for the BPP (block 1903); slewing the BPP to a starting position for a video take (VT) (block 1904); rotating the BPP to track a target location (e.g. target location can change over time) (block 1905); starting recording of the VT using the camera, while simultaneously rotating the BPP to track a target location (block 1906); ending the recording of the VT (block 1907); and slewing the BPP to a new starting position of a new VT, or back to a stowed position (block 1908).

If the BPP is commanded to slew to a starting position for another VT, the process starts again from block 1904. Otherwise, if the BPP is moved to a stowed position, the computing device determines if more than a predetermined amount of time passed since last VT (block 1909). If so, the computing device executes a re-alignment procedure for the BPP (block 1910). This realignment is to take into account the vibrations that may have caused the camera to be misaligned while being in the stowed position. If the predetermined amount of time has not yet passed, no action is taken, and the computing device re-evaluates the condition posed in block 1909.

Downlink Processes

Figure 20:
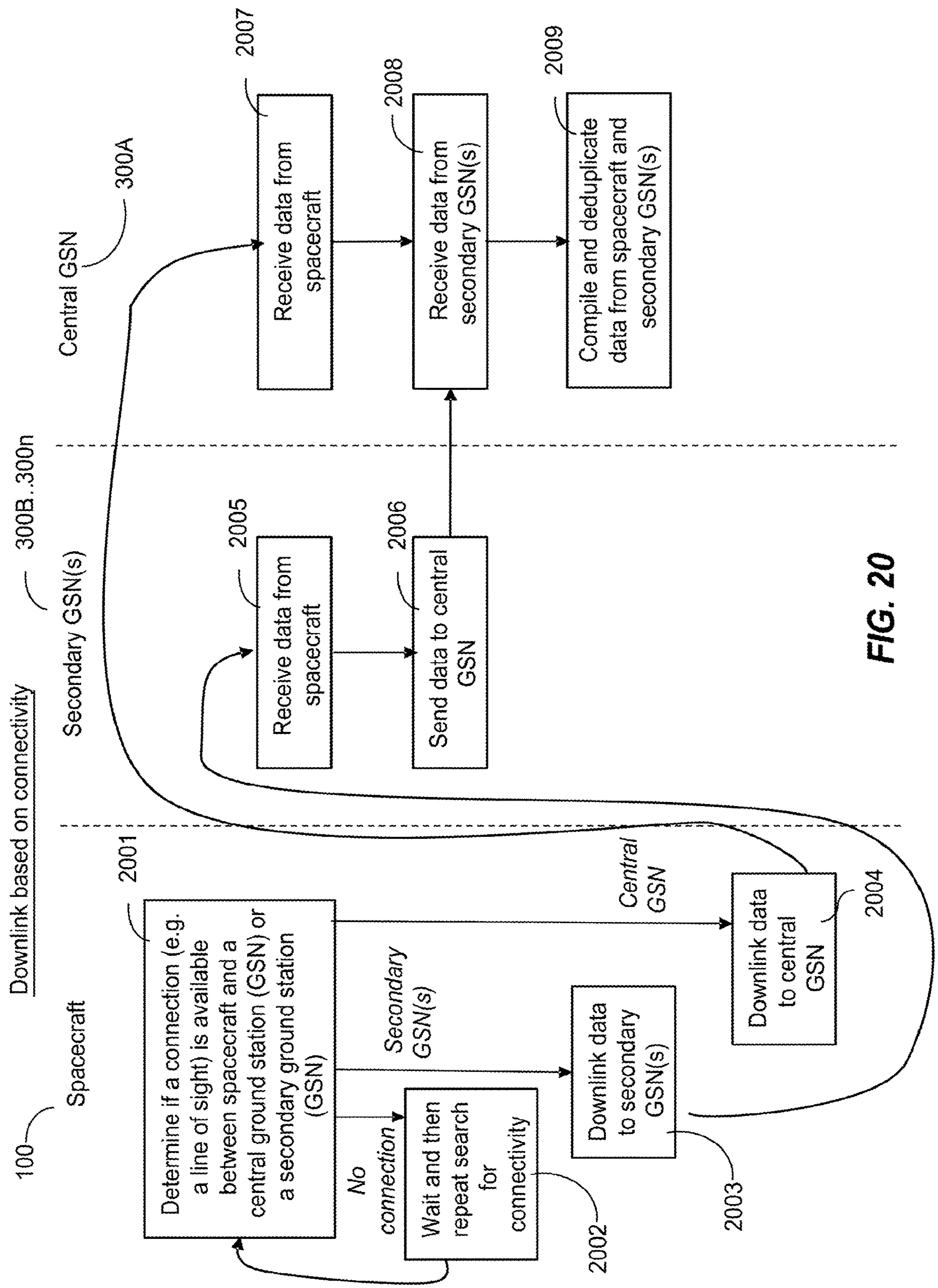
FIG. 20 is a flow diagram illustrating example computer executable or processor implemented instructions for downlinking data based on connectivity.

Turning to FIG. 20, an example embodiment of computer executable instructions is provided for downlinking data based on connectivity to a ground station. At block 2001, a computing device on the spacecraft 100 determines if a connection (e.g. a line of sight) is available between spacecraft and a central ground station (GSN) or a secondary ground station (GSN). If there is no connection to any ground station, the computing device on the spacecraft waits and then repeats the search for connectivity (block 2002). If the spacecraft connects to the central ground station, the computing device on the spacecraft downlinks data to the central ground station (block 2004). The central ground station 300A receives the data from the spacecraft (block 2007), and may receive data from one or more secondary ground stations (block 2008). The central ground station then compiles the data and removes duplications of data (block 2009).

Alternatively, or in addition, if the spacecraft connects to a secondary ground station, the computing device on the spacecraft downlinks the data to the secondary ground station (block 2003). The secondary ground station receives the data from the space craft 2005 and sends the data to the central ground station 2006, for example, over the network 400. The data is received by the central ground station at block 2008.

In this way, even if a spacecraft is not able to connect to the central ground station, the spacecraft can communicate data to another ground station and the data will be compiled on Earth.

Figure 21:
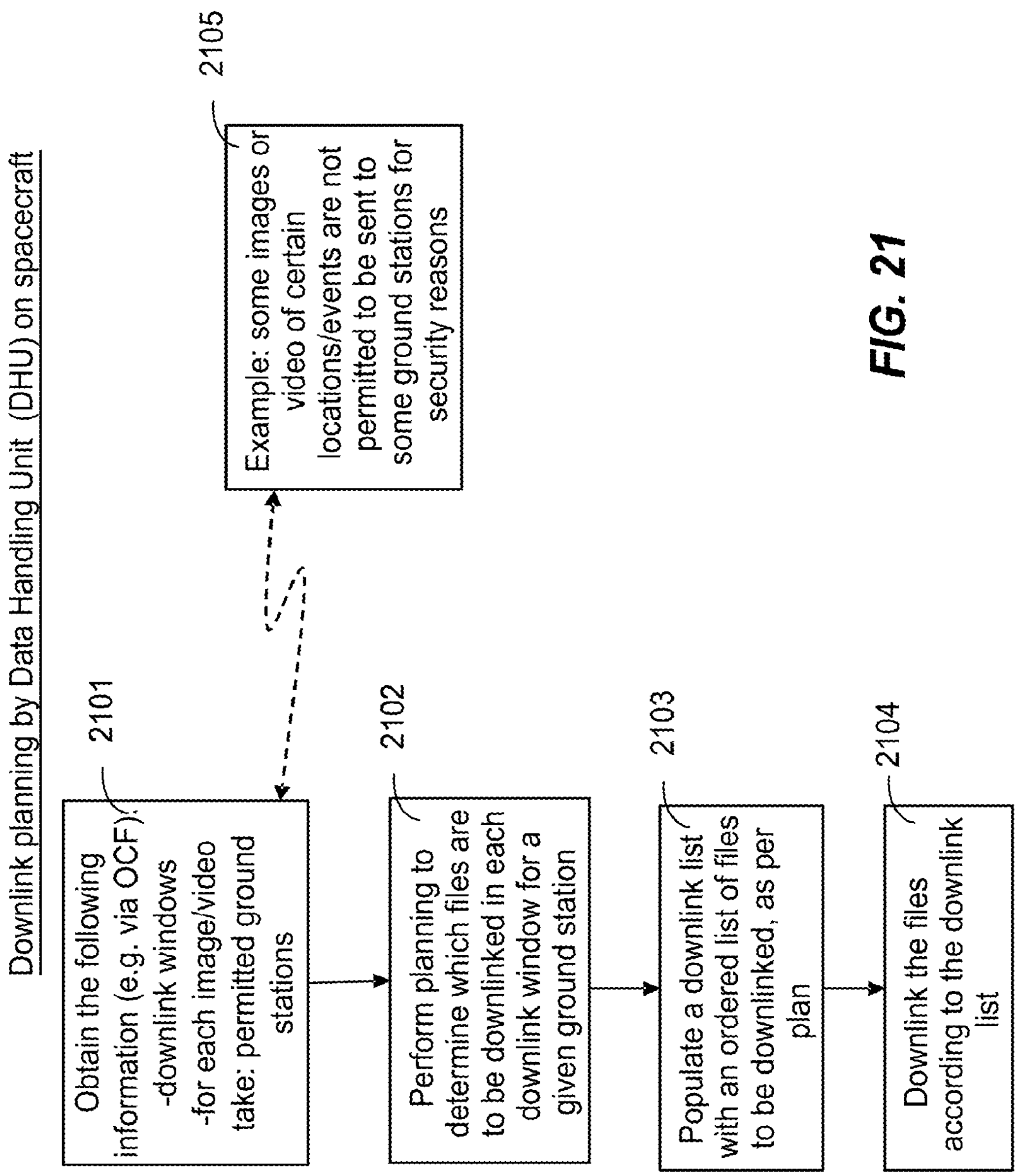
FIG. 21 is a flow diagram illustrating example computer executable or processor implemented instructions for planning downlink activity on the spacecraft.

Turning to FIG. 21, example computer executable instructions are provided, which can be implemented by the DHU 512 to perform the downlinking of files. At block 2101, obtains the following information (e.g. via OCF): downlink windows; and, for each image/video take, the permitted ground stations. In an example embodiment, some images or video of certain locations/events are not permitted to be sent to some ground stations for security reasons or other political reasons. Therefore, the OCF may designate which images, based on location or timing, or both, may be permitted to be sent to only certain ground stations.

At block 2102, the DHU performs planning operations to determine which files are to be downlinked in each downlink window for a given ground station. The DHU has a set of logic rules that implement querying priority. The DHU populates a downlink list with an ordered list of files to be downlinked, as per the derived plan (block 2103). The DHU then downlinks the files according to the downlink list (block 2104).

Figure 22:
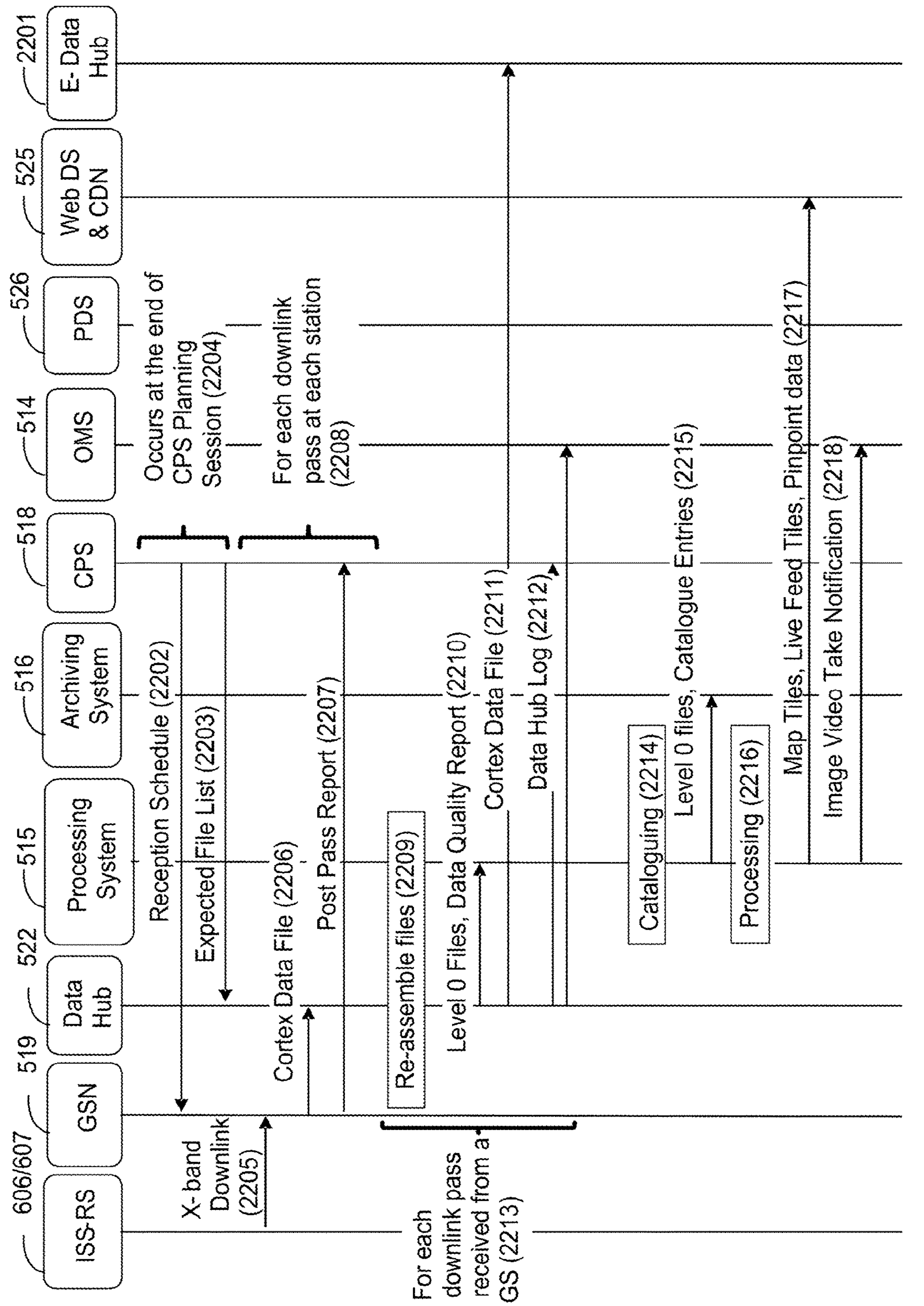
FIG. 22 is a flow diagram illustrating example computer executable or processor implemented instructions for downlinking and data handling.

Turning to FIG. 22, an example embodiment of computer executable instructions are provided for downlinking data and data handling, involving elements from both the space segment and the ground segment.

During a Downlink Window, the spacecraft 100 downlinks the data to a ground station, which records the data and sends it on to the Data Hub 522. The Data Hub re-assembles the Image/Video Take files which may have been split across several passes and ground stations. When the Image/Video Take files are assembled, the Data Hub 522 forwards them to the Processing System 515. The Processing System catalogues the new data, and then generates the systematic products which are sent to the Web DS & CDN 525.

In particular, the CPS 518 sends a reception schedule 2202 to the ground station network 519 and sends the expected file list 2203 to the data hub. This occurs at the end of a planning session 2204. The spacecraft, using components 606, 607, downlinks the image and video data via an X-band downlink 2205.

A set of operation 2208 are performed for each downlink pass at each ground station. The ground station receiving the data sends a compiled data file 2206, like a Cortex Data File, to the data hub 522 and sends a post-pass report 2207 to the CPS 518.

For each downlink pass received from a ground station, the data hub re-assembles the received files 2209. It is noted that Application Identifiers (APIDs) are embedded into the DATA ID and include SOF and EOF markers, which used to help reassemble the files. After assembling the files, the data hub sends Level 0 Files and a data quality report 2210 to the processing system 515. The assembled Cortex data file (2211) is also sent to the E-Data Hub 2201. The data hub also sends the data hub log to the CPS and the OMS (2212).

The processing system then performs a cataloguing process (2214) and then sends Level 0 files and catalogue entries to the archiving system (2215). The processing system also performs additional processing 2216 to generate map tiles, live-feed tiles and pinpoint data, amongst other types of processed data. The processed data is sent to the Web DS & CDN (2217). The image video take notification is sent to the OMS, for example to alert the users that their data has been acquired and is ready for downloading.

Figure 23:
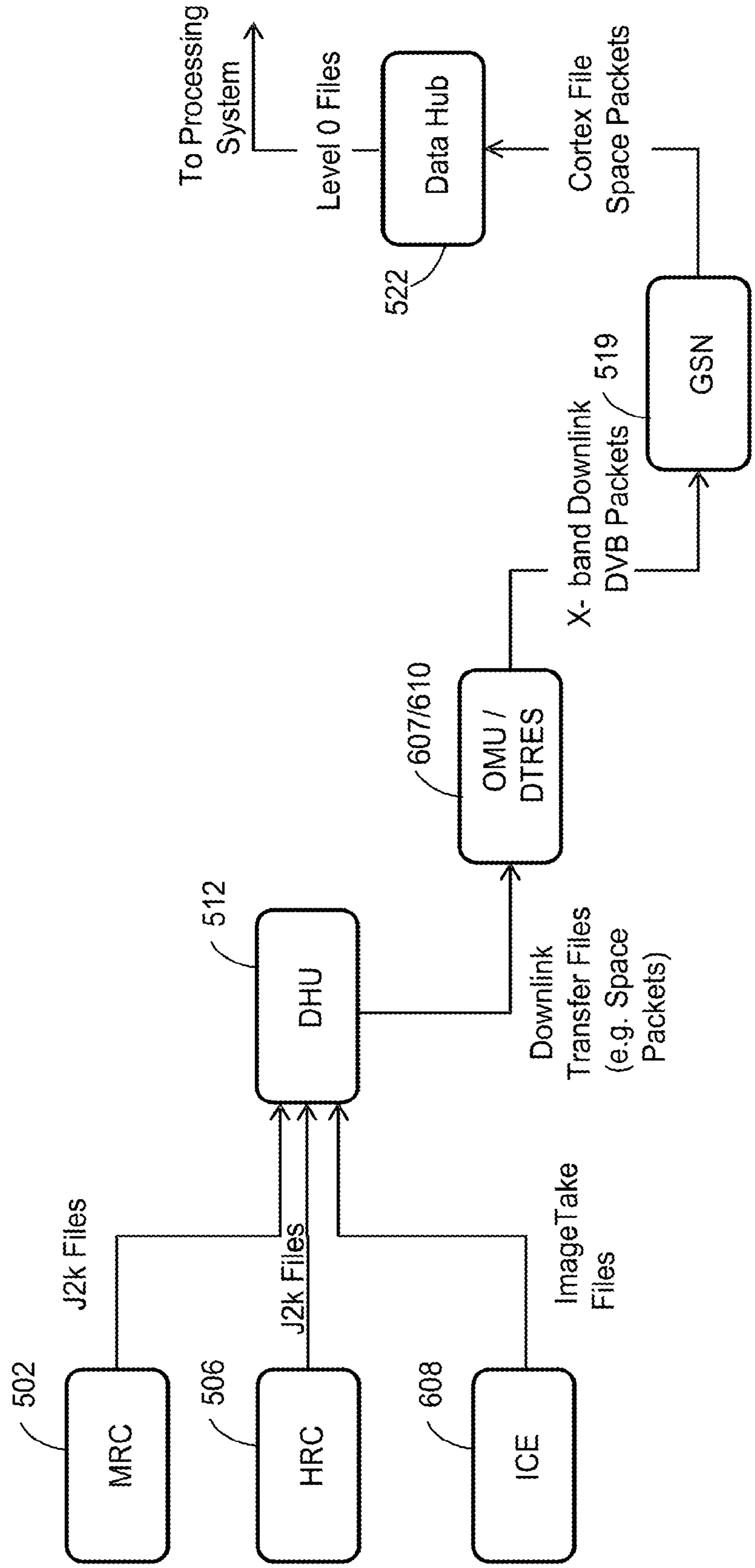
FIG. 23 is a flow diagram illustrating the data flow for images from a camera system on the spacecraft.

Turning to FIG. 23, the flow diagram shows the flow of image or video data from the space segment to the ground segment.

The DHU 512 receives compressed blocks of imagery/video from the DCU in each camera 502, 506, 608. The DHU 512 assembles these blocks into Downlink Files composed of space packets. Each file stored on the DHU will have a unique DHU Data ID which serves as a handle for the particular type of file to be accessed. The DHU Data ID for Image/Video Take files contains the Image/Video Take ID that was specified in the OCF.

The output from the DCUs in each camera to the DHU is a stream of image files. The DHU will manage the collection of these image files belonging to a single Image Take or Video Take as one file. The IT or VT will be uniquely identified by an ID included as part of the record command in the OCF. This same ID will be used to identify the file to the DHU when it is included in a downlink list, a delete list, or a do-not-delete list.

The Application Identifier (APID) field in each Space Packet is encoded to identify the downlink file type.

It will be appreciated that the Consultative Committee for Space Data Systems (CCSDS) maintains a set of recommendations that include Space Packets and Digital Video Broadcast transmission standards.

It will be appreciated that ancillary data and log information from both the camera systems and the spacecraft are used by the ground segment to monitor and control the collection of data, and also process the collected data. It may also be used by systems onboard to determine the status of other systems, for example for the DHU to monitor the status of the HRT and MRT.

The DHU is configured to receive ancillary data from the following different sources: the terminal computer 611 (e.g. the spacecraft position, the spacecraft attitude, BPP pointing angles, etc.); the HRC-DCU 508 (e.g. temperatures, dark pixel data, etc.); the HRC-Rate Gyros 509 (e.g. configuration settings); the MRC-DCU 504 (e.g. temperatures, dark pixel data, etc.); and from the DHU itself (e.g. status information). The DHU collects this data and periodically saves the data to a file, such as an ancillary data file and a DHU data log. A new file is created each time the data is saved.

In an example embodiment, the DHU collects log information from the same sources used to collect ancillary data. Log data is collected and written to files in the same manner as the Ancillary Data. The log data includes, for example, the execution result of each command in the OCF, and health/status telemetry.

Figure 24:
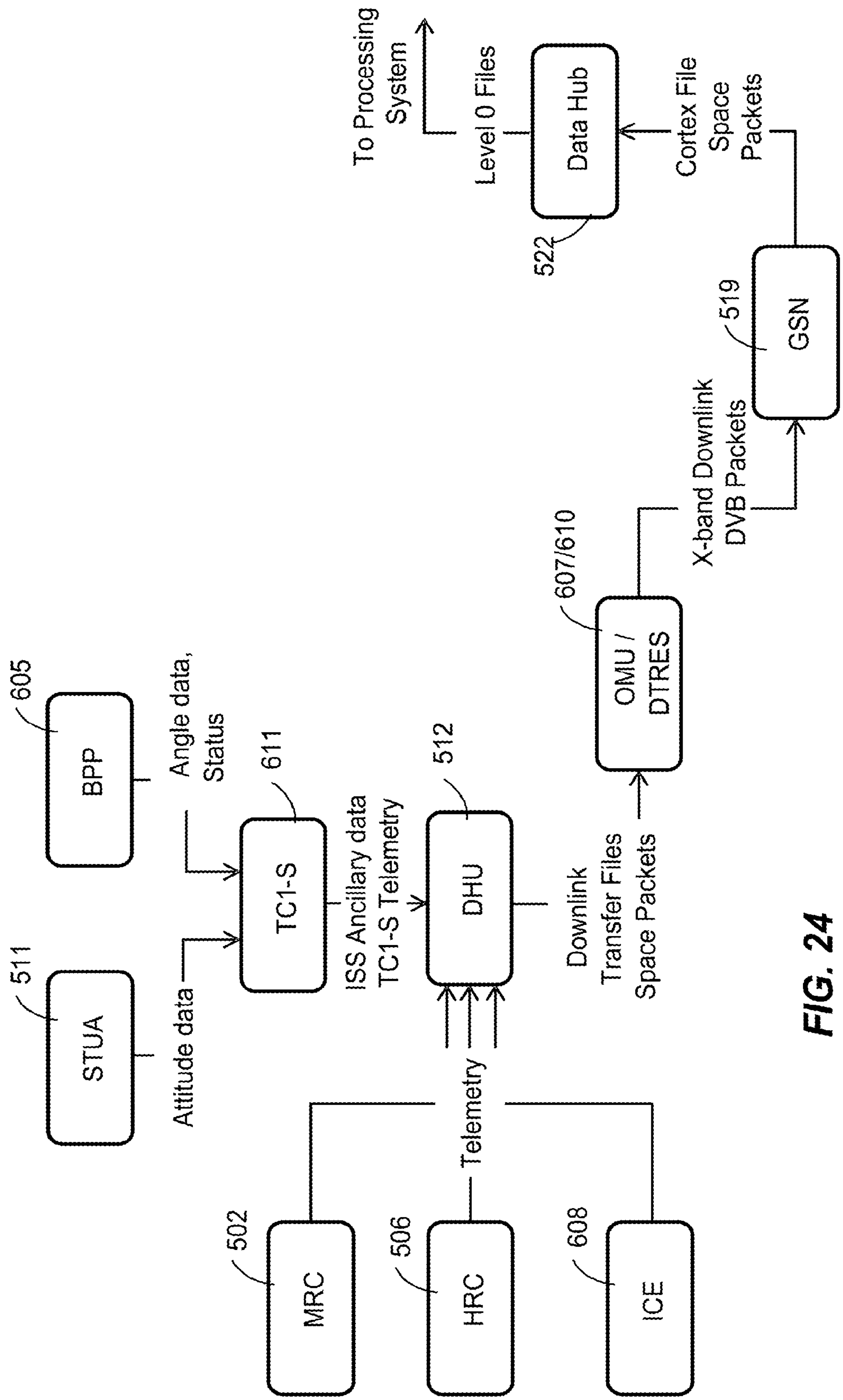
FIG. 24 is a flow diagram illustrating the data flow for telemetry and ancillary data from a camera system on the spacecraft.

Turning to FIG. 24, a flow diagram shows the flow ancillary data and log data from the space segment to the ground segment. In an example embodiment, ancillary data is downlinked upon request from the ground, by time window. Data files that overlap the requested time window are downlinked. The DHU automatically deletes the oldest files to clean up memory space.

With respect to X-band downlink operations, the OCF contains downlink commands to indicate the times of downlink passes and to indicate the data to be downlinked in each pass. For each upcoming Downlink Window, the DHU will create a list of files to be downlinked by taking the downlink list in the OCF, and the DHU will add other files based on predetermined and configurable rules.

The DHU may arrange for the files for downlinking to be transferred to the OMU just before the downlink start time. The transfer between DHU and OMU may be done in partitions based on data size (e.g. 1 GB). This means that a single Image/Video Take may be split up across 1 GB boundaries and that partial files may be received on the ground. Note that Space Packets are always downlinked in their entirely and are not split up.

The OMU/DTRES will then format the files to prepare for the downlink (DVB format). The OMU/DTRES will use the X-Band transmitter to downlink the data to the GSN.

As noted above, the image take files and video take files may be split and downlinked over multiple Downlink Windows and potentially the pieces of the image and video take file may go to different ground stations. The Data Hub is responsible for reconstructing the original files.

The CPS keeps track of the overall downlink usage of the system. The CPS accounts for the downlinks during planning based on identifying downlink windows, the downlink data rate, and the size of each image/video take file. The size of the each image/video take file can be computed by estimating the compression ratios to be used for each image.

Further information about the data to be downlinked is below. Table 6 identifies the types of files to be downlinked, for example using the X-band link.

TABLE 6

Types of files to be downlinked

| Type of file | Description |
|---|---|
| Image Data | Image Take |
| Video Data | Video Take |
| ICE Data | ICE Take |
| ISS and OTS Ancillary Data | Contains ancillary data, collected from the spacecraft. The spacecraft ancillary data includes the state vector (navigation and orientation data), the BPP pointing vector and the STUA attitude vectors.<br>Contains ancillary data, collected from the HRC, MRC and the GYU. |
| Space Segment Log Data | Contains a log of all events occurring due to the execution of the OCF, but also unplanned events, such as the commanded shutdowns from the terminal computer.<br>May also contain telemetry data as a result of executing certain commands. |

The DHU is able to identify the actual file sizes of each file and, shortly before each Downlink Window, the DHU constructs a plan for the Downlink Window using the actual file sizes, the Downlink Window duration and the downlink data rate.

Some image/video take files may be partially downlinked in a Downlink Window. The remainder of the files will be downlinked at the beginning of the next allowable Downlink Window. In an example embodiment, to increase the usage of the downlink resource, each downlink session produces at least one new partially downlinked file.

In an example embodiment, in order to reduce the risk of losing Ancillary data during downlinks, and since Ancillary data files are relatively small, Ancillary data files will be downlinked twice. For each Downlink Window the DHU will automatically downlink every Ancillary data file generated in the time period starting from the two prior Downlink Windows until the current Downlink Window. This concept is illustrated in the FIG. 25.

Figure 25:
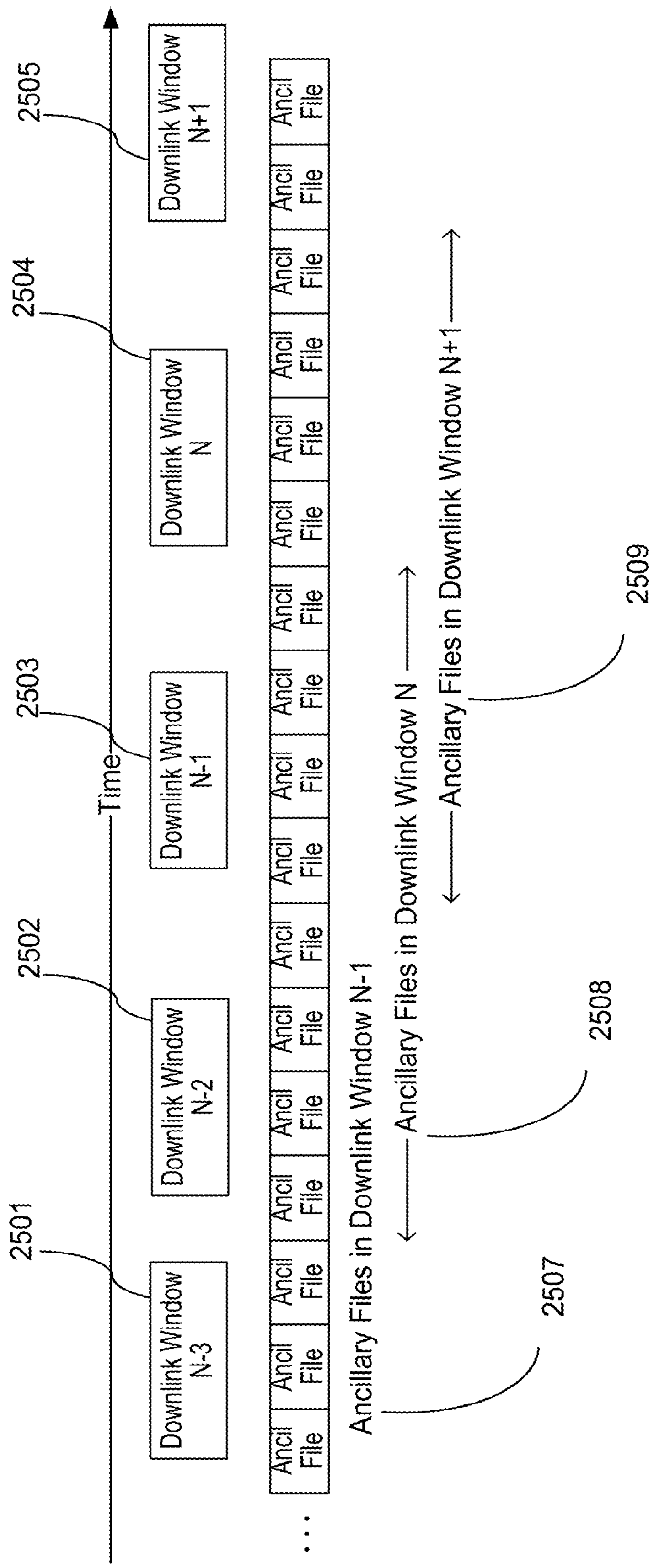
FIG. 25 is an illustration of an example ancillary data file downlink process.

In FIG. 25, different downlink windows 2501, 2502, 2503, 2504, and 2505 are shown relative to a time line. The ancillary data files 2507 generated during downlink window N−3 2501 and downlink window N−2 2502 are actually downlinked in downlink window N−1 2503. Similarly, the ancillary files 2508 generated during downlink window N−2 2502 and downlink window N−1 2503 are actually downlinked in downlink window N 2504. In this way, the ancillary files generated during downlink window N−2 are downloaded twice; a first time during downlink window N−1 2503 and a second time during downlink window N 2504.

Similarly, ancillary files 2509 generated during downlink window N−1 2503 and downlink window N 2504 are actually downlinked during downlink window N+1 2505. In this way, the ancillary files generated during downlink window N−1 are downloaded twice; a first time during downlink window N 2504 and a second time during downlink window N−1 2505.

The Ancillary data is downlinked to an allowable list of ground stations (e.g. one of the ground station lists stored in the DHU). In addition, the DHU can also be expressly commanded to downlink Ancillary data files through the OCF. This would be used in the case where the Ancillary data file needs to be re-downlinked because it could not be successfully reconstructed, or needs to be downlinked to another ground station.

In an example embodiment, the DHU places the Ancillary data files before the start of the second or third downlinked file, thus avoiding the beginning and end of the Downlink Window where there is a higher probability of data loss or corruption.

A similar process is used to downlink space segment Log files. In an example embodiment, however, Log files are downlinked once. The DHU will place the Log data files immediately after the Ancillary data files, thus avoiding the beginning and end of the Downlink Window where there is a higher probability of data loss or corruption.

With respect to downlink commanding, the commanding of downlinks is contained within the HRC, MRC, and downlink sessions in OCFs. The relevant fields and how they are determined by CPS is shown in the following table, Table 7.

TABLE 7

Downlink commands in OCF

| OCF Field | Example Aspects |
|---|---|
| MRC/HRC Session | |
| For each | Image/Video take |
| Permitted GS Index | Based on Acquisition Request origin, and contents |
| Protection Flag | Set if a very high priority level is specified in Acquisition Request |
| Priority Downlink Flag | Set if a very high priority level is specified in Acquisition Request |
| Downlink Session | |
| For each Downlink Window: | One grouping for each Downlink Window |
| Downlink Window start & end times | CPS calculates based on orbit geometry, ground station masks, and ground station availability periods. |
| Station identification | |
| Transmitter Configuration | Based on a configuration setting in CPS |
| Protected List | Used for very high priority data takes |
| DHU Data IDs | |
| Unprotected List | |
| DHU Data IDs | |
| List of data to be downlinked: | Used for re-downlink or contingency operations |
| DHU File ID | |
| 1st & last space packet to downlink | |

Each Image/Video take file is assigned one of two priorities (i.e. normal or urgent) in the OCF. The DHU places files with urgent priority at the beginning of its downlink list. It is expected that only a very small faction of files will be labeled as urgent priority.

If some part of a downlink has been lost for some reason, the OMS detects this based on the Data Hub Logs. If the OMS decides to request the re-downlink of the missing data, the OMS sends a Re-Downlink Request to the CPS. The CPS includes the file ID in the OCF, specifying certain space packets to downlink.

Within each Downlink Window, the sequence of files to be downlinked is shown in Table 8.

TABLE 8

Types of files to be downlinked

| | File Type | Number | Example Aspects |
|---|---|---|---|
| | Image/Video Take Files with Priority | 0 . . . N | Image/Video takes where the priority downlink flag was specified. Files are in order of creation |
| | Image/Video/ICE Take Files Re-downlink requests | 0 . . . N | Files for which a File ID and space packet range was specified in OCF. |
| | Image/Video/ICE(tbc) Take Files | 0 . . . N | Files are in order of creation. |
| * | spacecraft & OTS Ancillary Data | 0 . . . N | All files whose start/end times overlap with the time window |
| * | Space Segment Log Data | 0 . . . N | in the OCF. |

* Ancillary and Log data is downlinked after the 1st or 2nd Image/Video Take File.

As described above, the DHU downlinks files according to certain rules and ground commands. After a file has been downlinked (or in the case of an Ancillary file, downlinked twice) the file is deleted, unless the protection flag is set, in which case the DHU never deletes the file until a command is received from the ground. The process of handing the data after downlinks is shown in FIG. 26.

Figure 26:
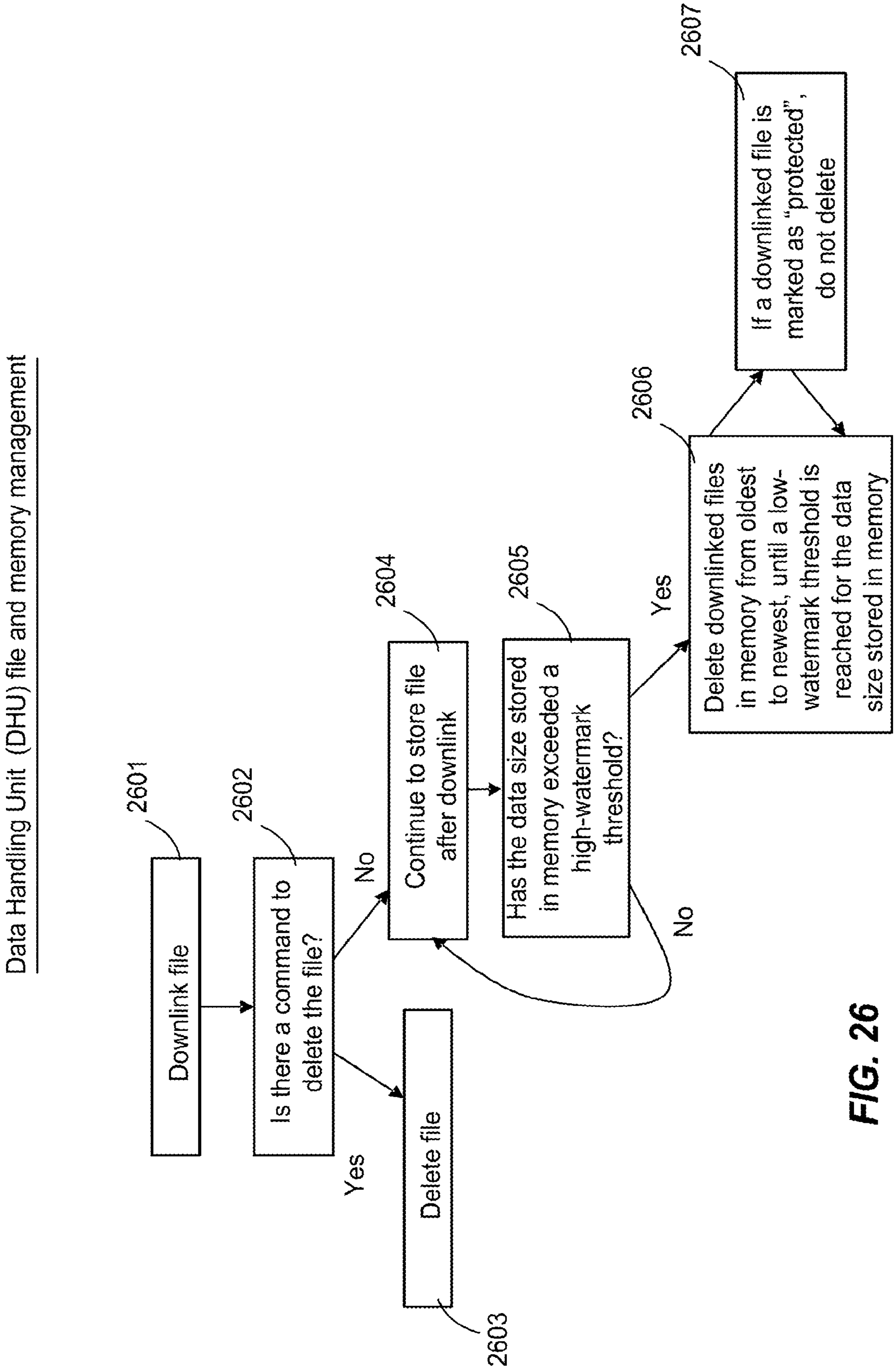
FIG. 26 is a flow diagram illustrating example computer executable or processor implemented instructions for file and memory management on the spacecraft.

FIG. 26 shows example computer executable instructions performed by the DHU 512. After the DHU downlinks a file 2601, the DHU determines if there is a command to delete the file 2602. If so, the file is deleted 2603. If there is no such command, the DHU continues to store the file after the downlink 2604. The DHU determines if the data size stored in memory has exceeded a high-watermark threshold 2605. If not, the process continues to block 2604 and the DHU continues to monitor the data size of files being stored on the spacecraft. If, however, the data size has exceeded a threshold, the DHU deletes downlinked files in memory from oldest to newest, until a low-watermark threshold is reached for the data size stored in memory 2606. However, for those downlinked filed that are marked as "protected", the DHU does not delete these files, regardless if the file is old 2607. In this way, the DHU ensures that, even after downlinking files, the files are still stored as backup on the spacecraft, and that some downlinked files are deleted to avoid consuming all the memory resources.

Orbit and Attitude System

It can be appreciated that a spacecraft, such as the ISS or another satellite, performs orbit/attitude maneuvers. The maneuvers are sometimes independent of the imaging operations. Predicted orbit data may be available in advance of the orbit maneuvers. During orbit maneuvers imaging operations can continue, or can be suspended via the insertion of an unavailability period.

Figure 27:
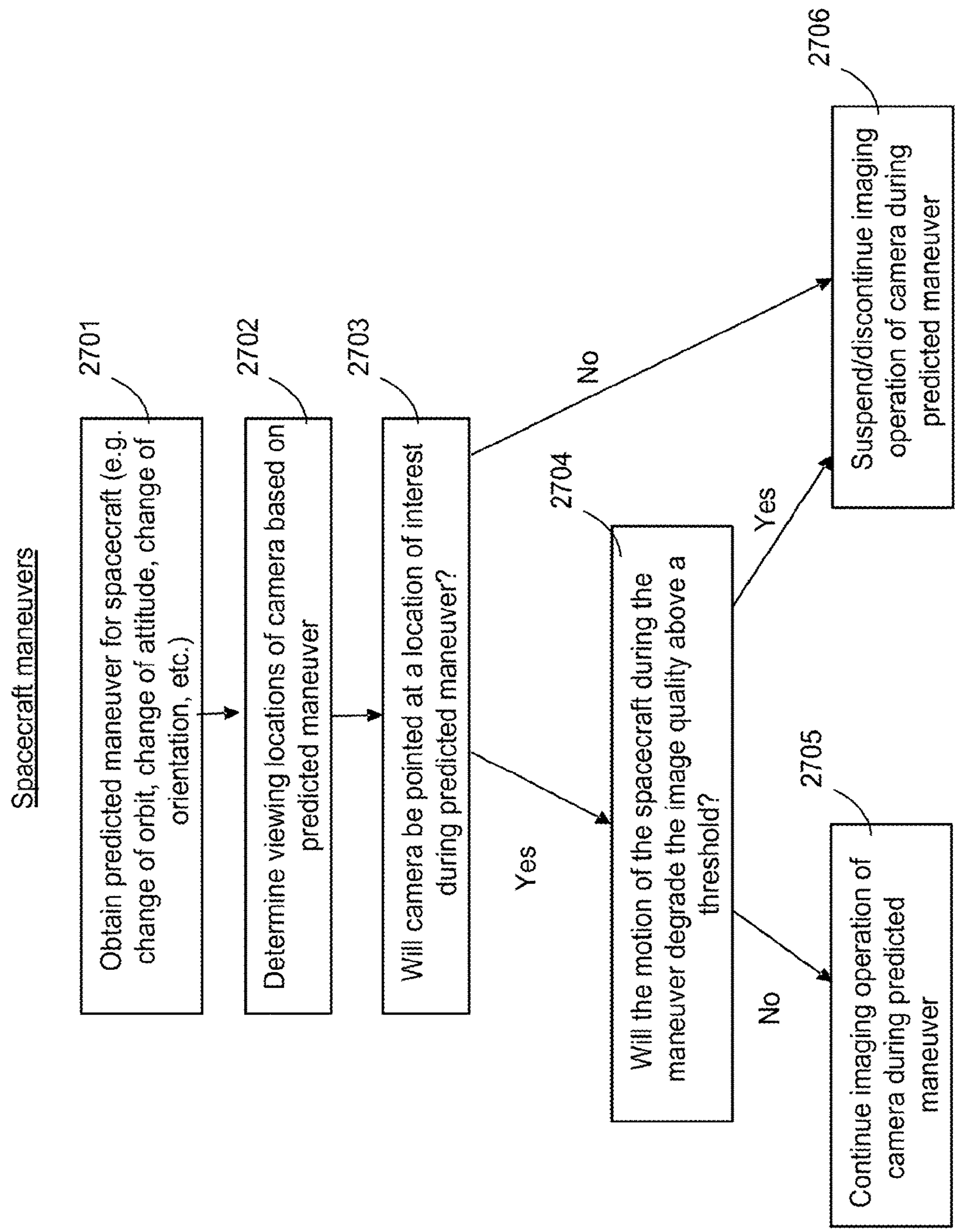
FIG. 27 is a flow diagram illustrating example computer executable or processor implemented instructions for operating a camera according to spacecraft maneuvers.

Turning to FIG. 27, example computer executable instructions are provided to control the cameras in view of spacecraft maneuvers. At block 2701, a computing device on the ground segment obtains a predicted maneuver for the spacecraft (e.g. change of orbit, change of attitude, change of orientation, etc.). At block 2702, the instructions include determining viewing locations of a camera based on the predicted maneuver. The computing device determines if the camera will be pointed at a location of interest during predicted maneuver (block 2703). If not, the camera is commanded to stop imaging operations during the predicted maneuver to save power and data resources (block 2706). If the camera is determined to point at a location of interest, the computing device computes whether the motion of the spacecraft during the maneuver will degrade the image quality above a certain threshold (block 2704). This determination can be made based on look-up tables relating the spacecraft's maneuver with expected vibrations that may affect the image quality to different extents. If the image will degrade above a certain threshold, the camera operation is discontinued for the predicted maneuver (2706). If not, the camera is commanded to continue imaging operations during the predicted maneuver (block 2705).

Planning

Figure 28:
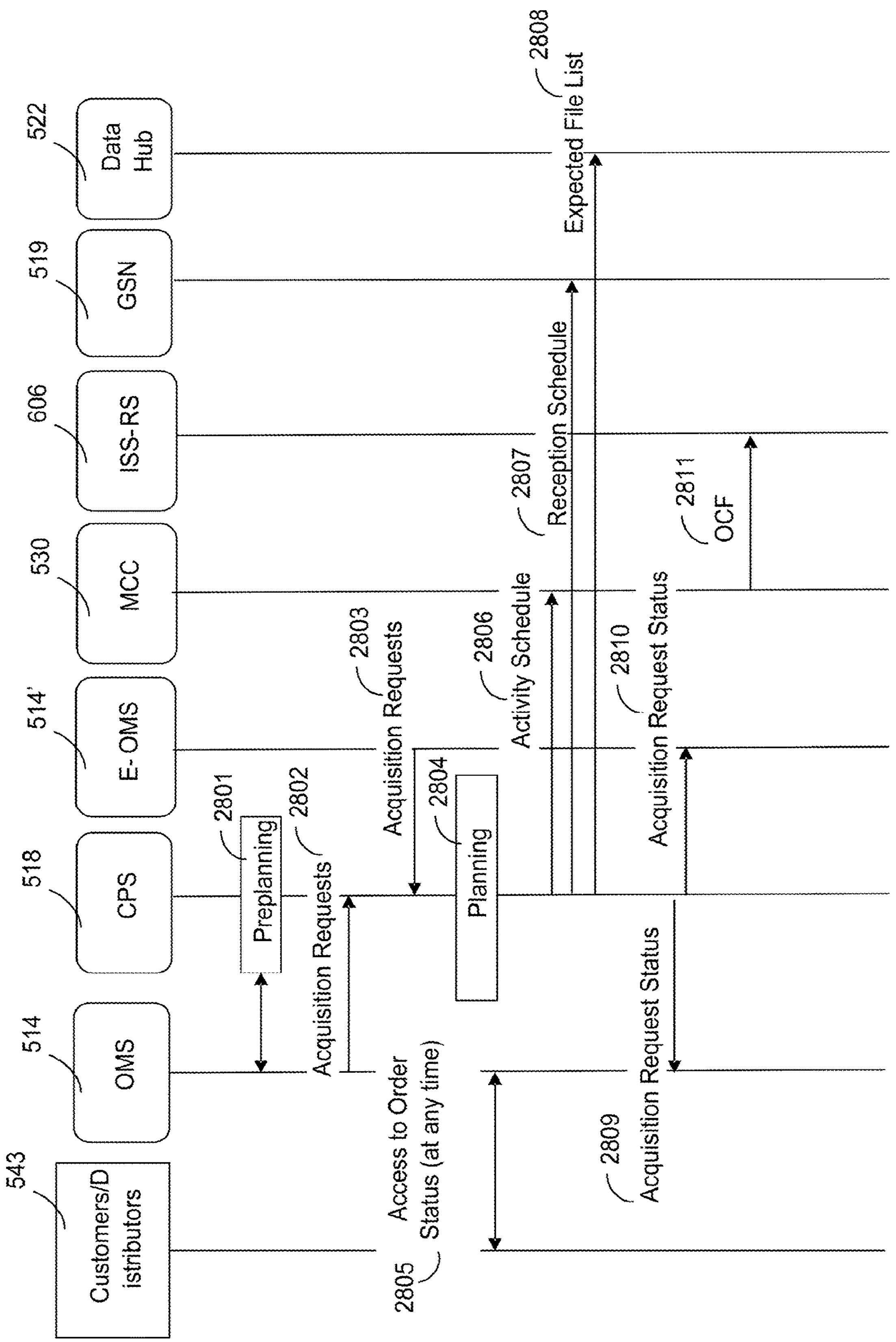
FIG. 28 is a flow diagram illustrating example computer executable or processor implemented instructions for planning and tasking.

Turning to FIG. 28, an example process for planning is performed. The OMS and the CPS conduct preplanning operations 2801. Based on the preplanning, the OMS sends acquisition requests to the CPS 2802. The CPS may also receive acquisition requests from the external OMS 2803. Based on the acquisition requests, the CPS performs planning operations 2804 to generate an activity schedule, reception schedule and an expected file list. The CPS sends the activity schedule to the mission control center, sends the reception schedule 2807 to the GSN, and sends the expected file list 2808 to the data hub 522. The acquisition request status is also sent the OMS and the external OMS (operations 2809, 2810), so that customers may access their order through the OMS to view the status of their requests at any time 2805. Using the activity schedule, the MCC generates the OCF and sends the same to the spacecraft.

Further details regarding the planning processes are described below.

Figure 29:
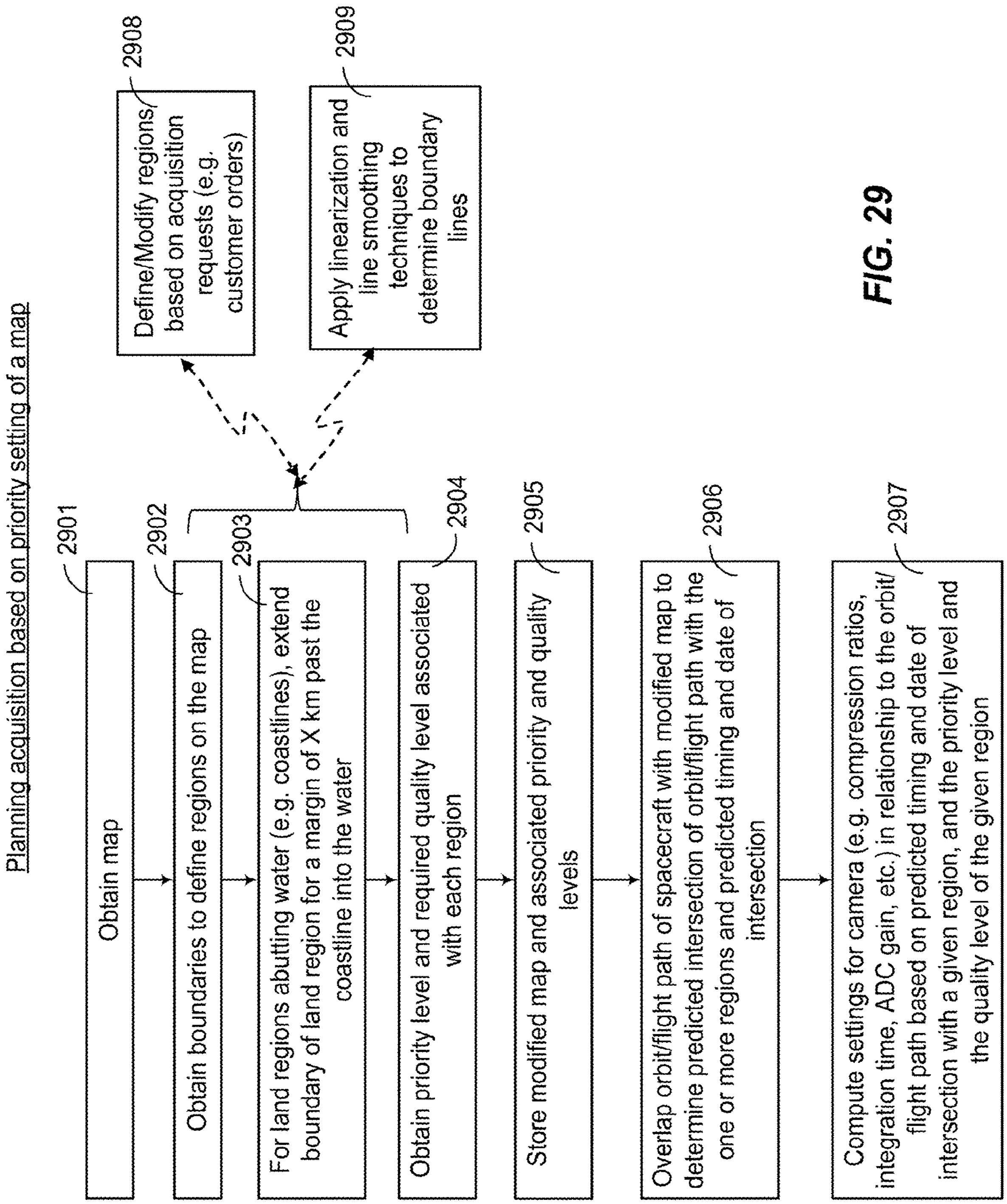
FIG. 29 is a flow diagram illustrating example computer executable or processor implemented instructions for performing planning acquisition based on priority settings of a map.

Turning to FIG. 29, example computer executable instructions are provided for planning an acquisition based on priority setting of a map. At block 2901, the CPS obtains a map. The CPS obtains boundaries to define regions of the map (block 2902). For land regions abutting the water (e.g. coastlines), the CPS extends the boundary of the land region for a margin of X km past the coastline into the water (block 2903). For example, the boundary may be extended 50 km into the water. In an example embodiment, the regions may be defined or modified based on acquisition requests, such as, but not limited to, customer orders (block 2908). Furthermore, when defining the boundary lines of the regions, linearization and line smoothing techniques are applied. Smoothed or straight lines make it easier to compute the areas to be imaged within a region for each image take or video take. It is also recognized that smooth lines help to reduce the number of transmissions from region to region, thereby reducing the number of image takes. This reduced number of image takes in turn leads to the OCF data size being reduced. This is desirable since a smaller amount of data is being transmitted to the space segment from the ground segment.

Continuing with FIG. 29, the CPS obtains the priority level and the required quality level associated with each region. The priority level and the quality level again may be derived from the acquisition request. The CPS stores the modified map and associated priority and quality levels in memory (block 2905). The CPS then overlaps the orbit or flight path of the spacecraft over the modified map, in order to determine the predicted intersection of the orbit/flight path with the one more regions. This cross-correlation between the map and the orbit path is also computed to determine the predicted timing and date that the spacecraft will fly over these regions, as per block 2906. The CPS then computes settings for the camera (e.g. compression ratios, integration time, ADC gain, etc.) in relationship to the orbit/flight path based on predicted timing and date of intersection with a given region, and the priority level and the quality level of the given region (block 2907). The timing, date, positioning, and camera configurations are marked in the OCF.

Figure 30:
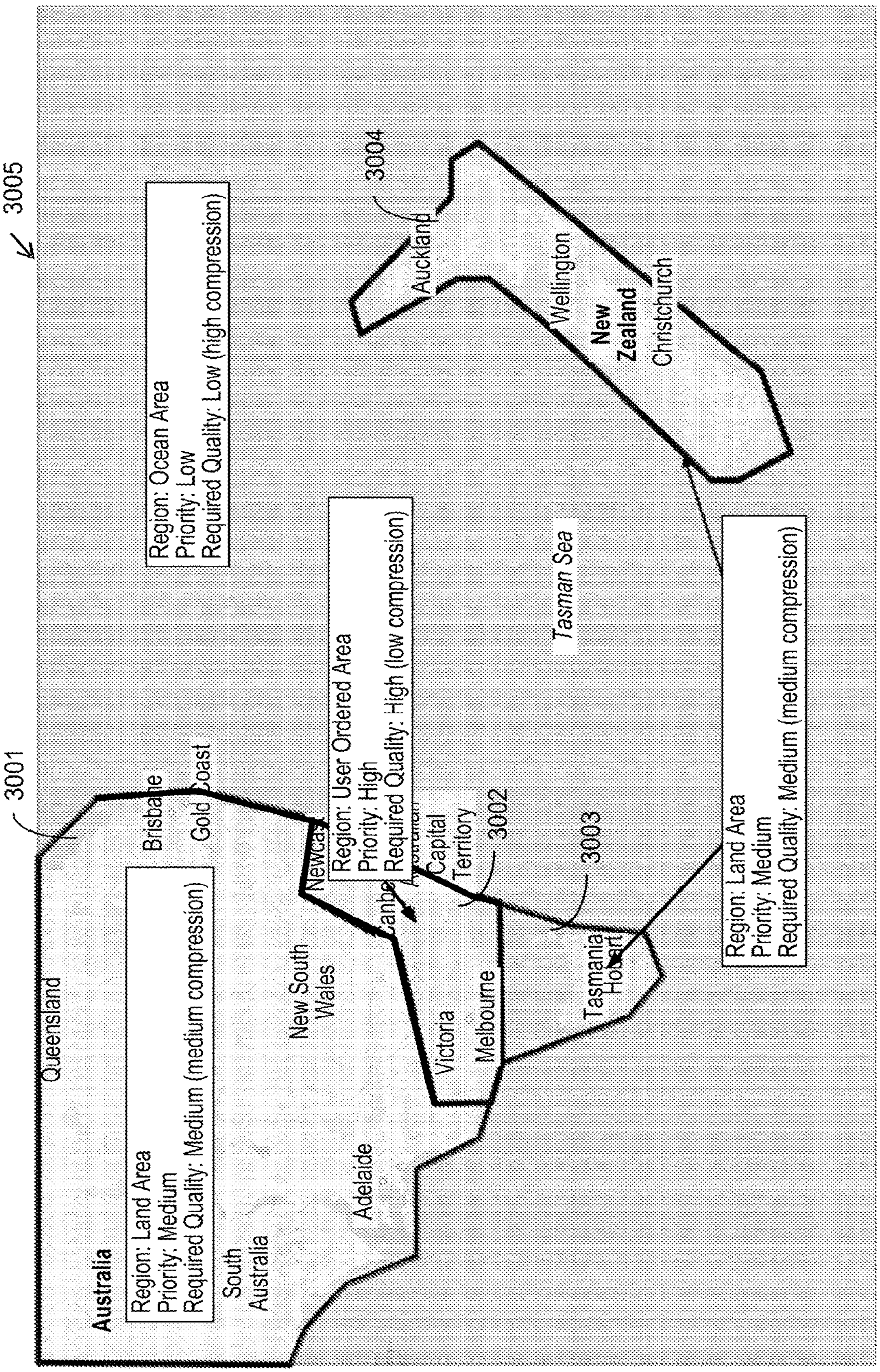
FIG. 30 is an example illustration of modified map showing regions.

An example of a modified map 3005 is shown in FIG. 30. It shows different regions 3001, 3002, 3003 and 3004 having boundary lines that are linearized. The regions are also identified as being land or ocean areas, or user ordered areas. The priority level and the required image quality level (e.g. compression ratio) are also associated with each region.

Figure 31:
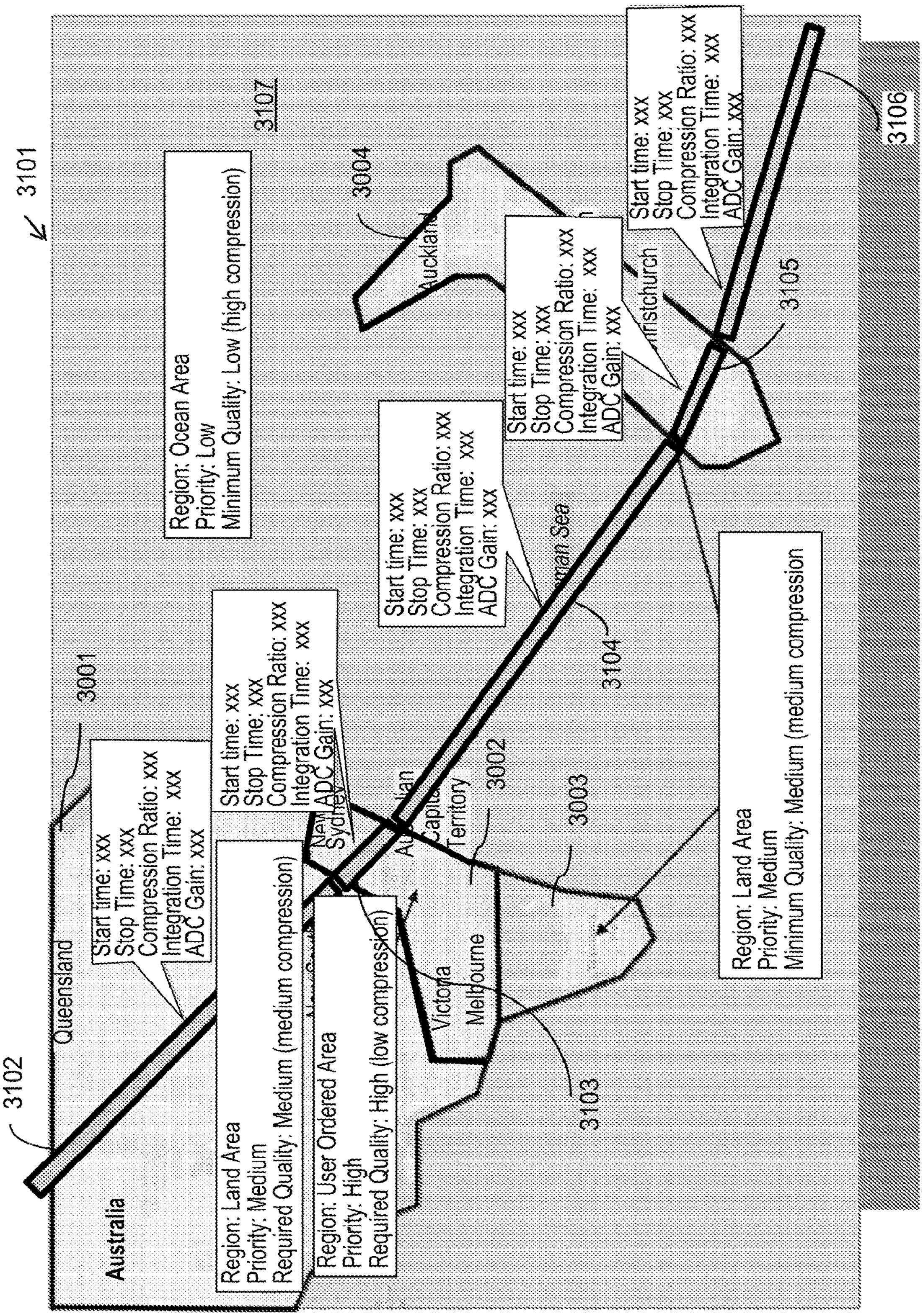
FIG. 31 is an example embodiment of the modified map of FIG. 30, and further showing planned image acquisition operations and settings overlaid the map.

Turning to FIG. 31, the computed image takes or video takes are shown overlapping the modified map in the image 3101. The image takes or video takes, or both, are strips can be acquired when a spacecraft follows a certain orbit or flight path. For example, image or video take strip 3102 is associated with region 3001, strip 3103 is associated with region 3002, strip 3104 is associated with region 3107 (i.e. the water region), strip 3105 is associated with region 3004, and strip 3106 is associated with region 3107. It can be seen that the collective of the strips show part of an orbit path of a spacecraft. Associated with each strip are the planned image take or video take parameters, including: start time, stop time, compression ratio, integration time, and ADC gain. As discussed above, these camera configurations are determined based on the region, the priority and the minimum quality, among other factors.

Note that night-time imaging may be handled differently compared to day-time imaging. Since the compression ratio is set to be high at night, there is less need to split Image Takes at map region boundaries. Having fewer Image Takes has the advantage of reducing the size of the OCF. An example planning process for night time would be for CPS to command night time imaging operations as a single long Image Take with a constant compression setting.

The quality level associated with each region may be identifies as one of three "quality index" values that are sent to the CPS: nominal quality index, maximum required quality index, and minimum required quality index. In the CPS, each quality index value is mapped via a table to camera compression ratio settings. Several tables are needed to allow for different lighting conditions, for example separate tables for Summer, Winter, and Night.

It is recognized that the total amount and quality of imaging will be limited by resource constraints, such as total data volume due to downlink limitations. The total data volume is kept within resource limits by the CPS by limiting the data quality and the imaging time.

Image takes that fill all orbits completely are planned using the nominal value of the compression ratio, also called image quality. The image quality is then adjusted using the approach described in FIG. 32. In an example embodiment, starting with the nominal value helps to ensure a base quality control while using a maximum threshold and a minimum threshold.

Figure 32:
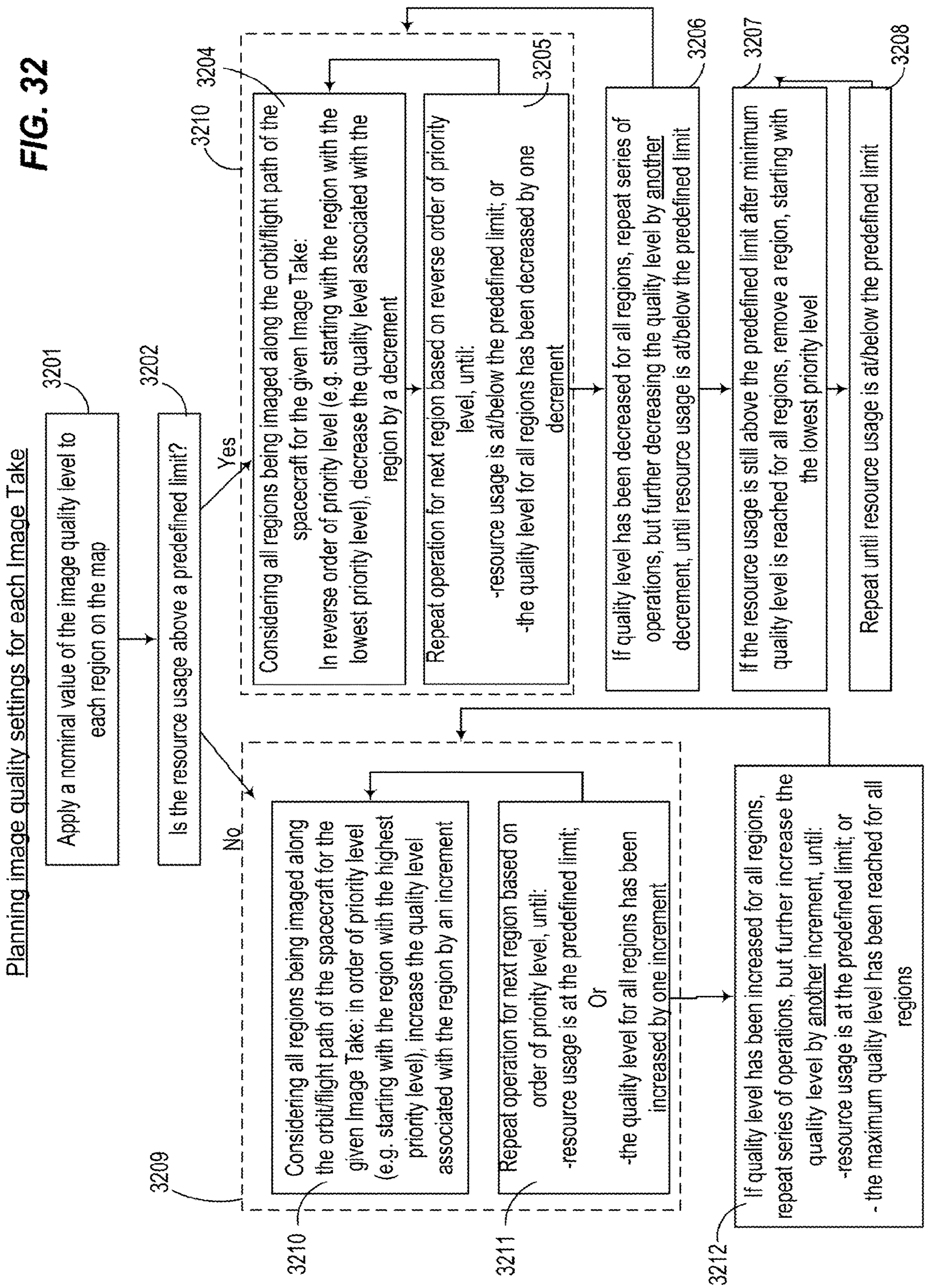
FIG. 32 is a flow diagram illustrating example computer executable or processor implemented instructions for planning image quality settings for each image take.

Turning to FIG. 32, example computer executable instructions are provided to plan the image quality for each image take. The instructions may be performed by the CPS.

At block 3201, the CPS applies a nominal value of the image quality level to each region on the map. The CPS determines if the resource usage is above a predefined limit (block 3202). If so, operations 3210 are performed.

In particular, at block 3204, the CPS considers all regions being imaged along the orbit/flight path of the spacecraft for the given Image Take. In reverse order of priority level (e.g. starting with the region with the lowest priority level), the CPS decreases the quality level associated with the region by a decrement. The operation of decreasing the priority level by a decrement is repeated for the next region, based on reverse order, until: resource usage is at/below the predefined limit; or the quality level for all regions has been decreased by one decrement (lock 3205). If the resource usage is at/below the predefined limit, the process stops.

However, after repeating the operation of block 3204 for all regions being imaged along the orbit/flight path, and if the resource usage is still above a predefined limit, then the series of operations in 3210 are repeated, but further decreasing the quality level by yet another decrement, until resource usage is at/below the predefined limit (block 3206). Again, if the resource usage is at/below the predefined limit, the process stops.

After implementing block 3206, and if the resource usage is still above the predefined limit after the minimum quality level is reached for all regions, then the CPS removes a region from the image taking or video taking plan, starting with the region having the lowest priority level (block 3207). This removal of regions, starting with the lowest priority regions, is repeated until resource usage is at/below the predefined limit (block 3208).

However, if at block 3202 it is decided that the planned resource usage is not above a predefined limit, then the image quality is increased. In particular, a set of operations 3209 is performed and includes blocks 3210 and 3211.

Block 3210 includes the CPS considering all regions being imaged along the orbit/flight path of the spacecraft for the given Image Take and, in order of priority level (e.g. starting with the region with the highest priority level), the CPS increases the quality level associated with the region by an increment. At block 3211, the CPS repeats this operation for the next region based on order of highest priority level, until: resource usage is at the predefined limit; or the quality level for all regions has been increased by one increment.

At block 3212, if the quality level has been increased for all regions (as per operations 3209), the CPS repeats the series of operations 3209, but further increases the quality level by yet another increment, until: resource usage is at the predefined limit; or the maximum quality level has been reached for all regions.

Figure 33:
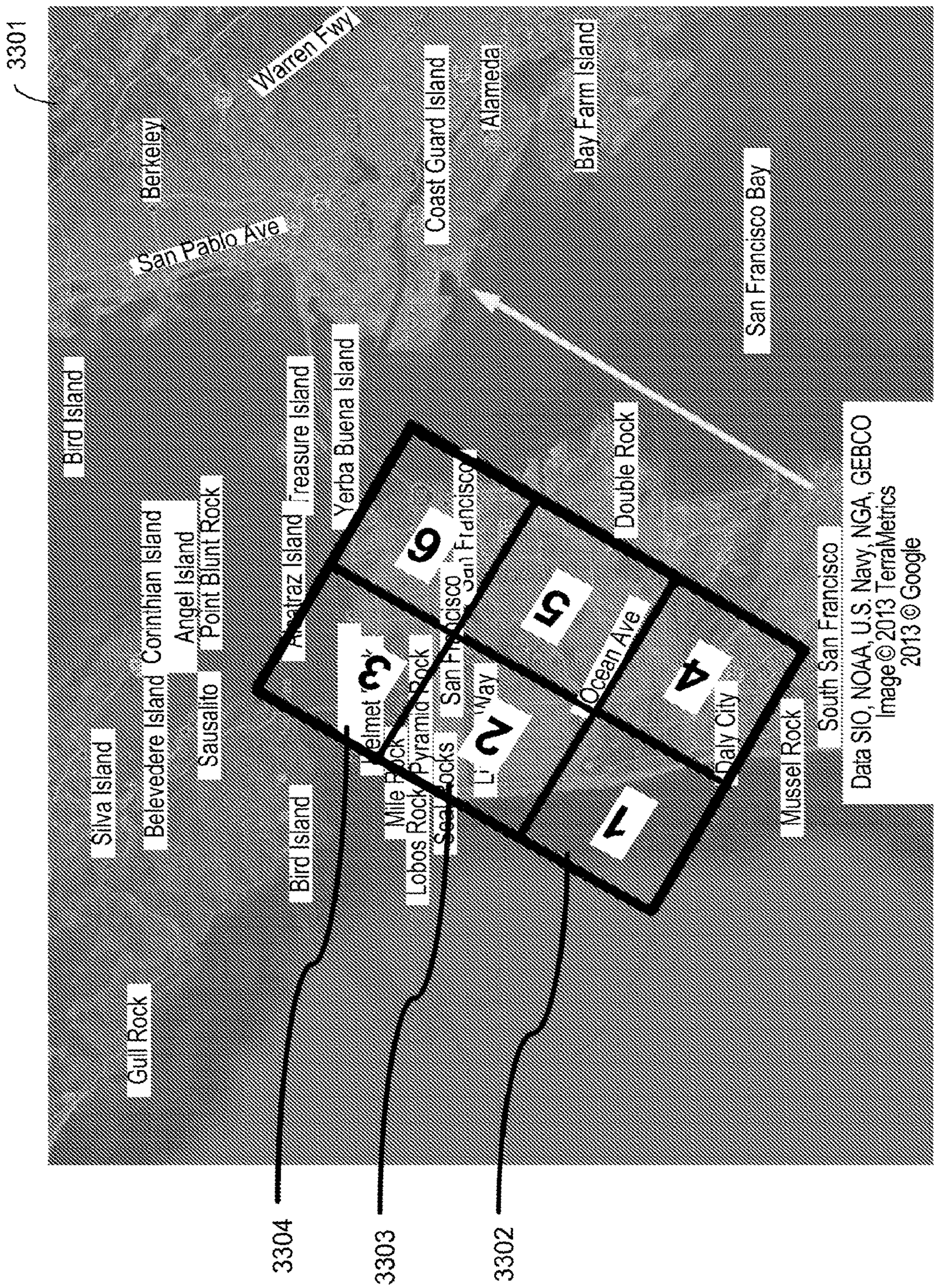
FIG. 33 is an example illustration of a video take for a grid of images to cover an area.

Turning to FIG. 33, an example of a video take is planned for a grid of images to cover an area. In the image 3301, grids 3302, 3303, and 3304, among other grids, show the areas of video takes. Combined, the video takes cover a desired area. The same principles can be applied to image takes.

Figure 34:
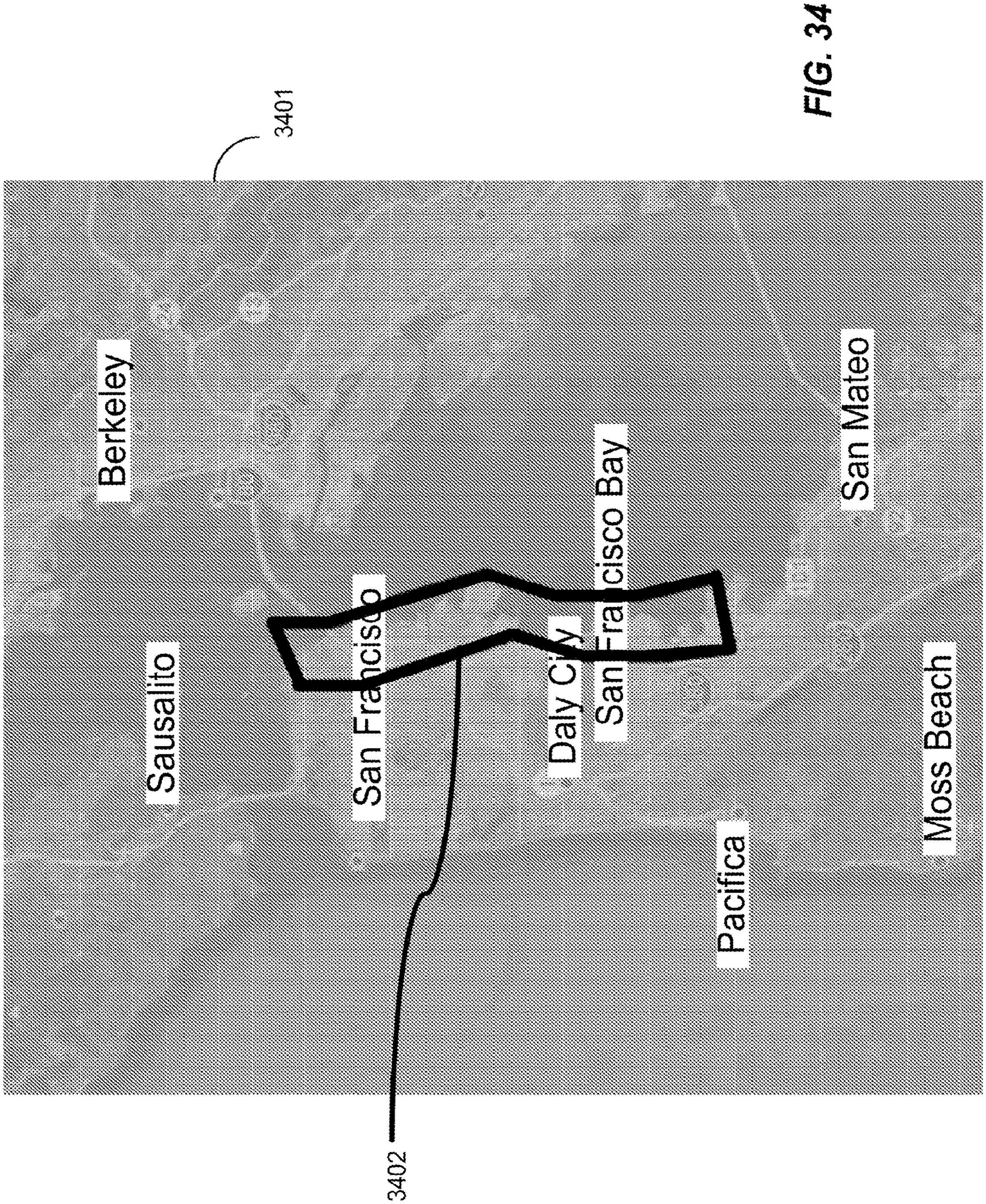
FIG. 34 is an example illustration of a video take for a path.

Turning to FIG. 34, an example of a video take of a path 3402 is shown in image 3401. The path is computed to follow a coastline in the image 3401, but can be computed to follow another target, such as a pipeline, a border, a river, etc.

Another aspect of planning is pre-planning, as per operation 2801 in FIG. 28. Example computer executable instructions, which the CPS can perform, are provided for pre-planning in FIG. 35. At block 3501, the CPS obtains the acquisition requests. The CPS determines which acquisition requests can be fulfilled within a given upcoming Execution Period, based on a requested time constraint of the acquisition request and based on orbit/flight path of spacecraft during the given upcoming Execution Period (block 3502). At block 3503, the CPS identifies regions associated with at least n or more acquisition requests. At block 3504, for each identified region, the CPS sorts acquisition requests by priority level. For example, if there are two or more requests for the same region, the CPS selects the request with the highest quality level, and generates instructions to provide the data from the selected request to fulfill the other requests for the same region (block 3507).

Figure 35:
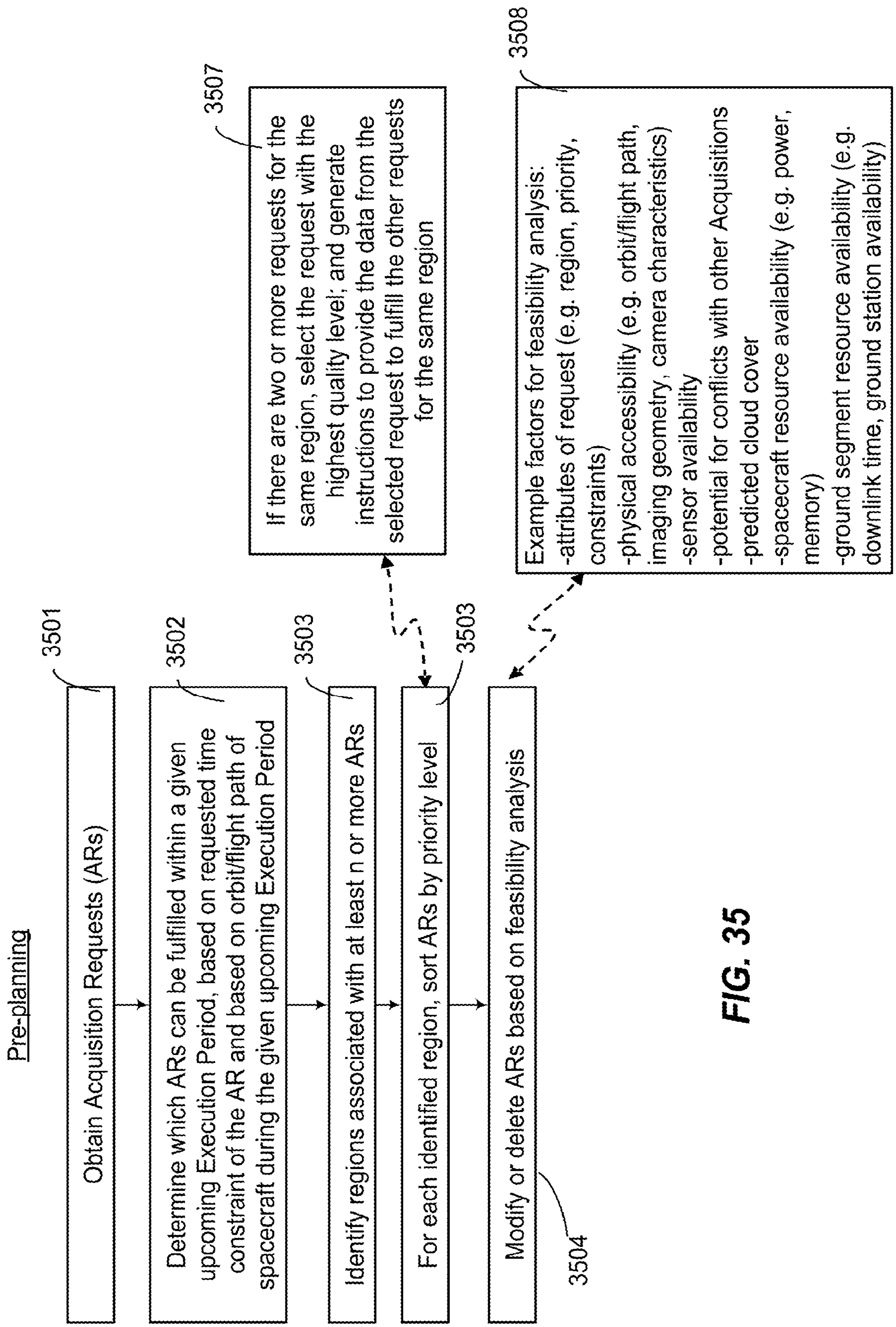
FIG. 35 is a flow diagram illustrating example computer executable or processor implemented instructions for performing pre-planning.

Continuing with FIG. 35, at block 3504, the CPS modifies or deletes acquisition requests based on feasibility analysis. As per block 3508, the computation of the feasibility analysis considers one or more of the following parameters: attributes of request (e.g. region, priority, constraints); physical accessibility (e.g. orbit/flight path, imaging geometry, camera characteristics); sensor availability; potential for conflicts with other acquisitions; predicted cloud cover; spacecraft resource availability (e.g. power, memory); and ground segment resource availability (e.g. downlink time, ground station availability).

Figure 36:
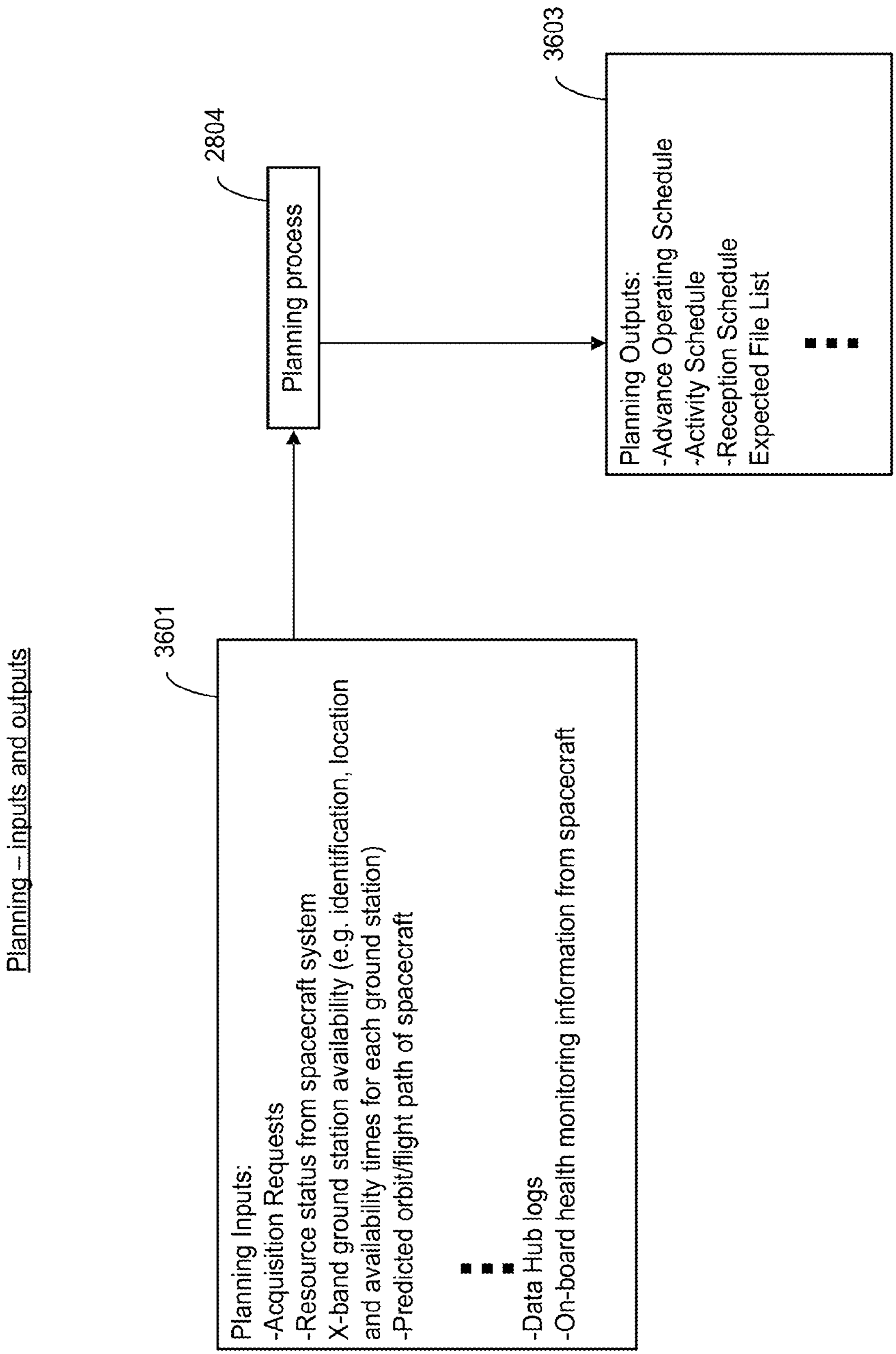
FIG. 36 is a flow diagram illustrating example computer executable or processor implemented instructions for planning, including the inputs and the outputs.

A more generalized representation of the planning process 2804 is shown in FIG. 36, and it includes planning inputs 3601 and planning outputs 3603. The planning inputs include: acquisition requests; resource status from spacecraft system; X-band ground station availability (e.g. identification, location and availability times for each ground station); predicted orbit/flight path of the spacecraft; data hub logs; and on-board health monitoring information from the spacecraft.

The planning process outputs include: an advance operating schedule; an activity schedule; a reception schedule; and an expected file list.

It can be appreciated that an acquisition request includes one or more of the following types of information: a region (e.g. area of polygon coordinates), a priority level, a time period, a quality index, camera configuration settings (e.g. integration time setting, ADC gain setting, compression ratio setting), a protection flag indicating the data should not be deleted from the OMU, an urgent downlink flag, a preferred ground station, cloud cover, sun elevation and azimuth angles, and incidence and azimuth angles.

For acquisition requests specific to video, acquisition requests may additionally include the location to be imaged and the length of the video. For a single target video, the information in the request additionally includes target coordinates and a video length. For a grid of images to cover an area, for each target grid, the request additionally includes: target coordinates, relative start time, and time duration. For a video of a path, the request additionally includes for each target along the path: target coordinates, relative start time, and time duration. For a celestial target video, the request additionally includes a vector to the target and a video length.

It can be appreciated that the CPS may also receive re-downlink requests. A re-downlink request is a request received by the CP to request the DHU on the spacecraft to downlink certain files or portions of files again. Re-downlink requests include the image/video take ID and a parameter specifying the whole file or a specific range of space packets. If the requested file is for an ancillary or log file, the re-downlink request includes the time range for a whole file, or an ancillary/log file ID and range of packets for a partial file. The re-downlink request may even include a preferred ground station to receive the data.

As described above, the CPS outputs activity schedules and these schedules are used to create OCFs. The contents of OCFs are summarized in Table 9 below.

TABLE 9

OCF Contents Used for Operations

| Types of OCF | OCF Contents | |
|---|---|---|
| | OCF Sessions | Content Summary |
| Operational OCF | DHU Session (0 or 1) | DHU Power on/off |
| | | Other DHU commands |
| | MRC Session (0 or more) | MRC Power on/off |
| | | Image Takes: |
| | | Image Take ID |
| | | Start/stop times |
| | | Compression ratio (target block file size) |
| | | Integration time |
| | | Downlink information |
| | | Permitted ground stations index |
| | | Protection flag |
| | | Urgent downlink flag |
| | | Russian/non-Russian flag |
| | | Other MRC commands |
| | HRC Session (0 or more) | HRC Power on/off |
| | | Video Takes: |
| | | Video Take ID |
| | | Start/stop times |
| | | Frame rate (video decimation factor) |
| | | Compression Ratio (target block file size) |
| | | Integration Time |
| | | Target type (type of vector) |
| | | Target Vector |
| | | Terrestrial: lat/long/altitude |
| | | Celestial: RAAN/Declination |
| | | Constant: alpha, beta angles |
| | | Stow flag |
| | | Downlink information |
| | | Permitted ground stations index |
| | | Protection flag |
| | | Urgent downlink flag |
| | | Russian/non-Russian flag |
| | | Other HRC commands |
| | STUA Session (0 or more) | STUA Power on/off |
| | | STUA Head selection |
| | | Other STUA commands |
| | Downlink Session (0 or more) | X-band Visibility windows |
| | | Start/end time |
| | | Ground station identification |
| | | Data to protect |
| | | Image/Video Take IDs |
| | | Data to unprotect |
| | | Image/Video Take IDs |
| | | Other Downlink commands |
| | Additional Downlink List (0 or more) | Image/Video Takes to downlink: |
| | | For Image/Video Files: |
| | | Image/Video Take ID |
| | | Whole file or specify range of Space Packets |
| | | Ancillary or Log File: |
| | | Whole file: time range |
| | | Partial file: Ancillary/Log file ID and range of Packets |

In an example embodiment, each OCF corresponds to a time range. One or more OCFs are uplinked on commanding passes. In an example embodiment, OCFs are not split between passes, while downlink files are split.

In an example embodiment, each OCF is divided into five different types of "Sessions" (e.g. DHU, STUA, MRC, DHU and Downlink) and an "Additional Downlink List". Each Session corresponds to a power-on/off time range, together with a set of time-keyed commands to execute. In the case where the power-on time of a Session is within some pre-defined time of the power-off time of the previous Session of the same type, the power-off/on cycle is not actually performed.

This commanding approach helps to ensure that the different subsystems will be automatically powered down in the event that an OCF does not arrive, arrives late or is corrupted. The configuration of the OCF also helps to ensure that the system is left in a well-defined or "whole" state at the end of each OCF time range.

As also note above, the CPS generates Reception Schedules for each Ground Station that receives X-band data. Each Reception Schedule contains the planned receptions for the Execution Period (e.g. 24 hours). The Reception Schedules include the following information: identification of the Ground Station and visibility mask in use; visibility start/end time; and approximations of downlink start/end time. Reception Schedules may also include draft information for a longer duration (1-2 weeks ahead) which is updated each time a Reception Schedule is created.

The CPS also generates Expected File Lists for the Data Hubs (the same Expected File List goes to all Data Hubs). The Expected File List includes, for example, a list of Downlink Files (e.g. each Image/Video Take that has been planned for the upcoming Execution Period). For each Image/Video Take Downlink File, the Expected File includes the following information: the type of file; the Image/Video Take ID; the file priority; the approximate file size (e.g. in bytes, number of space packets, or some other kind of counter); the Order ID or list of Order IDs (e.g. allows the data to be related back to a Customer/Distributor order); the Data Hub time out (e.g. maximum time to wait for the remainder of incomplete files); and the end-file-wait period (e.g. the time to wait for an end-of-file marker).

The Expected File List also includes a schedule of when Ancillary Data is to be generated on-board. The Data Hub can use this schedule to check if all expected Ancillary Data has been received.

The Expected File List also includes a schedule of when Space Segment Log Data is to be generated on-board. The Data Hub can use this schedule to check if all expected Space Segment Log Data has been received.

The Expected File List also includes a list of Downlink Windows for the Execution Period. The list may be, for example, a concatenation of all the Reception Schedules for all the ground stations. This list is used to flag failures like missed passes.

It can be appreciated that the scheduling algorithms, currently known or future known, can be applied to the planning process to take into account unavailability periods, acquisition requests, and other resource constraints.

Figure 37:
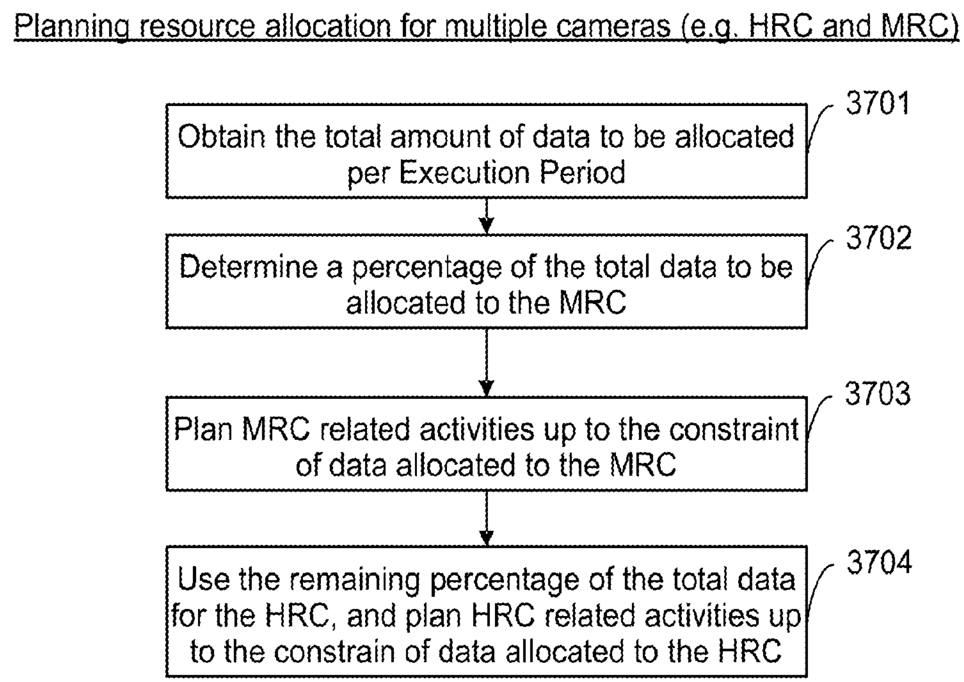
FIG. 37 is a flow diagram illustrating example computer executable or processor implemented instructions for planning resource allocation for multiple cameras.

Turning to FIG. 37, the CPS may use the example computer executable instructions provided therein to plan resource allocation for multiple cameras, such as the HRC and the MRC. At block 3701, the CPS obtains the total amount of data to be allocated per Execution Period. At block 3702, the CPS determines a percentage of the total data to be allocated to the MRC. At block 3703, the CPS plans MRC related activities up to the constraint of data allocated to the MRC. At block 3704, the CPS uses the remaining percentage of the total data for the HRC, and plans HRC related activities up to the constraint of data allocated to the HRC.

Figure 38:
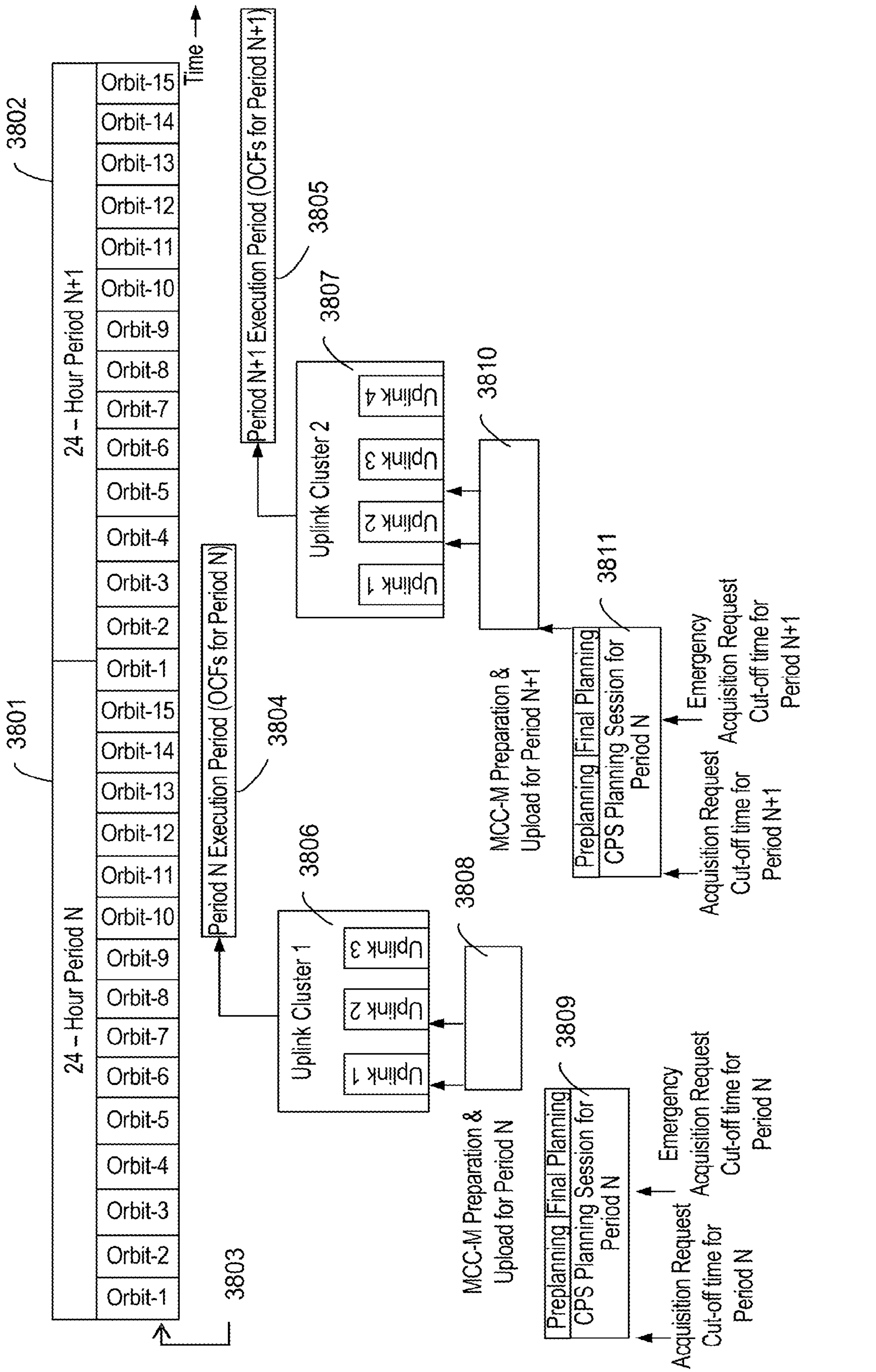
FIG. 38 is an illustration of an example planning timeline.

Turning to FIG. 38, an example a planning cycle is shown with respect to a series of orbits 3803 within 24-hour periods N and N+1 3801, 3802. A planning session is performed by the CPS for the period N 3804, at block 3809. The mission control center prepares the OCFs for uplink, and using one or more uplinks, uplinks the data to the spacecraft (block 3806). The spacecraft receives the uplink and executes the OCFs for the period N 3804. A similar process repeats using the planning session 3811, the uplink 3810 and the period N+1, which executes the OCFs. It will be appreciated that there are cut-off times for the CPS to receive the acquisition requests for the planning sessions. A later cut-off deadline for emergency acquisition requests is also available, but the later cut-off deadline is restricted to the CPS planning session period.

In an example embodiment, the CPS receives Post-Pass Reports from ground stations, and the CPS analyses this information to determine the status and detect anomalies.

With respect to planning downlink activities, the CPS maintains a database of all ground station visibility times based on orbit geometry and on ground station reported availability periods. Ground stations are assumed to be available within the periods that have been set-up in CPS based on coordination with the ground stations and Ground Station Availability Reports.

It is recognized that ground stations may have overlapping downlink windows. To accommodate for such overlap, the CPS or ground segment is configured to execute the example computer executable instructions shown in FIG. 39.

Figure 39:
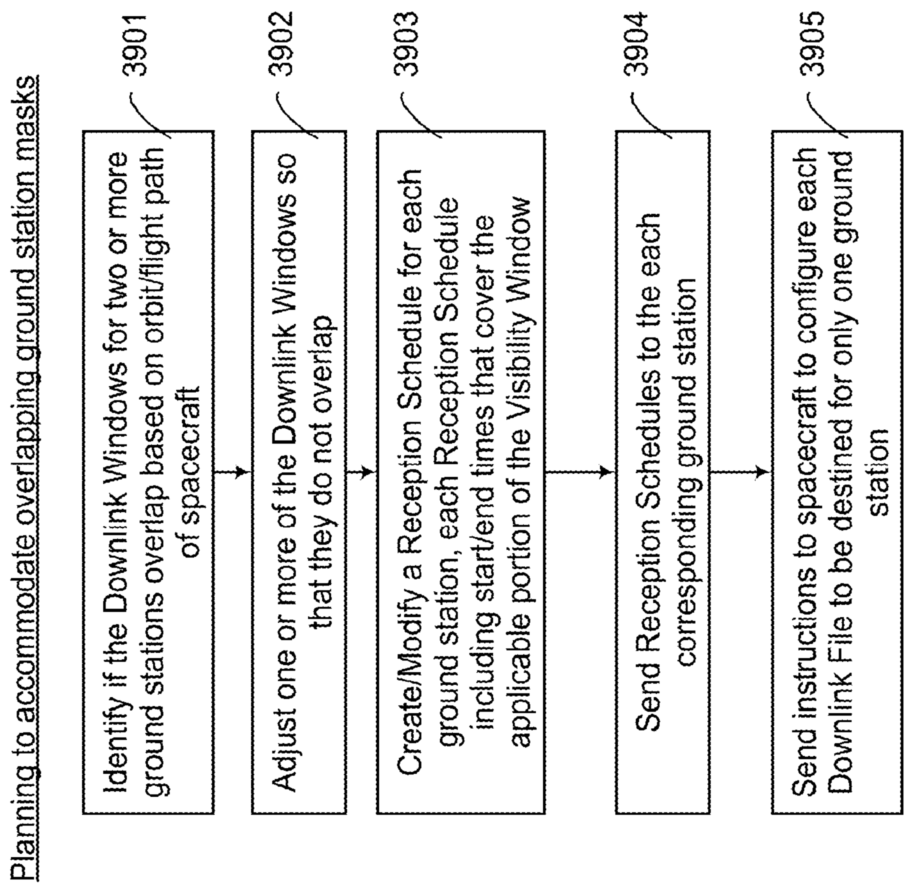
FIG. 39 is a flow diagram illustrating example computer executable or processor implemented instructions for planning to accommodate overlapping ground station masks.

Turning to FIG. 39, the CPS identifies if the Downlink Windows for two or more ground stations overlap based on orbit/flight path of spacecraft (block 3901). If so, the CPS adjusts one or more of the Downlink Windows so that they do not overlap (block 3902). The CPS then creates or modifies a Reception Schedule for each ground station, such that each Reception Schedule includes start/end times that cover the applicable portion of the Visibility Window (block 3903). The CPS sends the Reception Schedules to the each corresponding ground station (block 3904). At block 3905, the CPS, or the MCC, sends instructions to the spacecraft to configure each Downlink File to be destined for only one ground station. If image data or video data is still downlinked twice to one or more ground stations, the data hub is configured to remove duplicates of the data.

Calibration

Primary calibration includes collecting a data (primarily from processing by-products) and storing these in a database within the calibration system 517. The calibration system then performs trending analysis of this data. Statistical and heuristic methods can be employed. The calibration system also identifies degradations or issues with Image Quality. It makes any required adjustments to system parameters based on the identified trends and degradation issues.

Systems in involved in establishing and maintaining operational quality include the calibration system, the processing system and the HMS.

Figure 40:
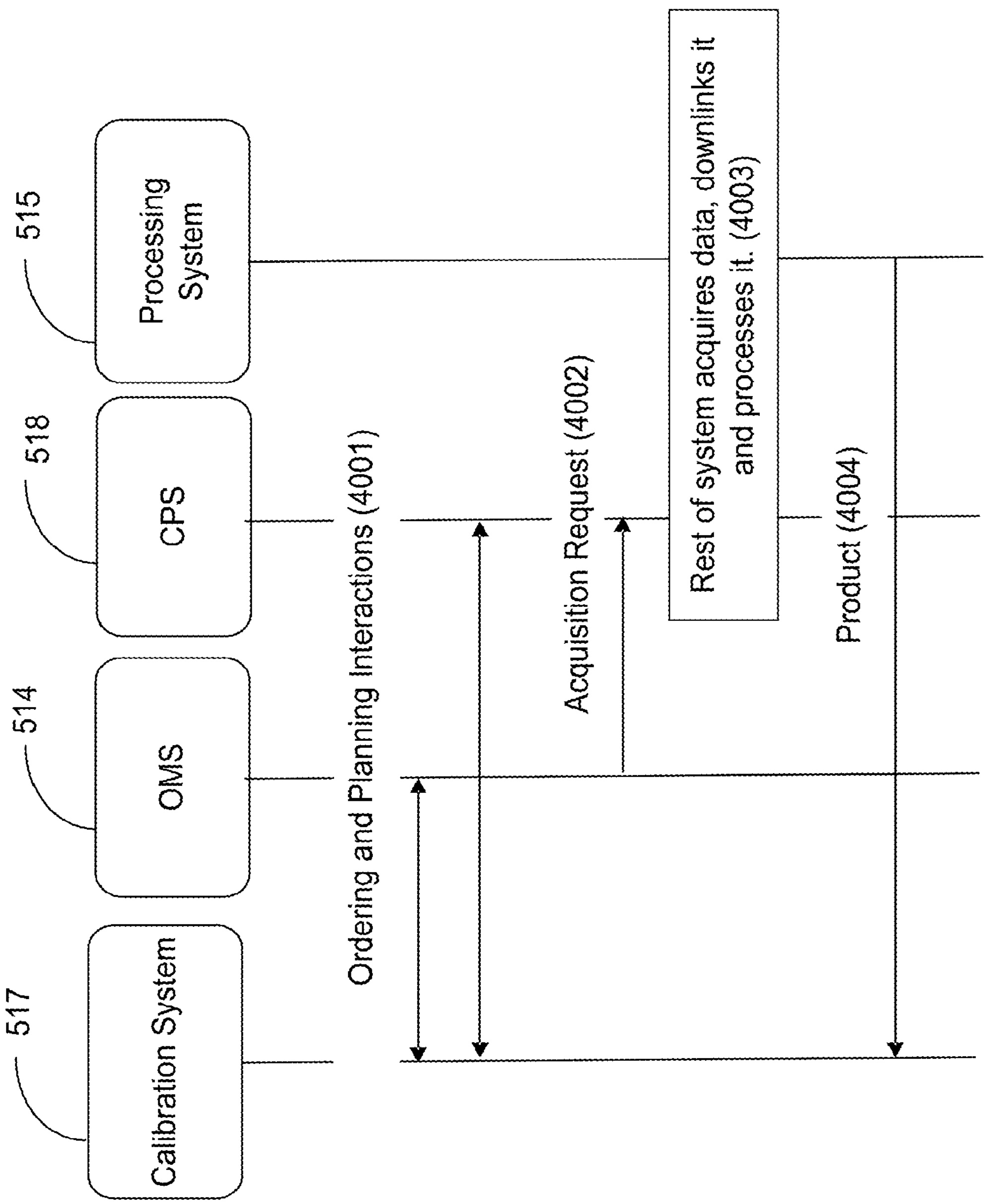
FIG. 40 is a flow diagram illustrating example computer executable or processor implemented instructions for calibration acquisition and processing.

Turning to FIG. 40, an example process is shown for the calibration system obtaining data from the OMS and CPS (operation 4001). The calibration system may also provide calibration commands to the OMS and CPS. The OMS sends an acquisition request to the CPS (operation 4002), which includes the calibration commands. The rest of the systems acquire the data, when putting the calibration into effect. The data is downlinked and processed (operation 4003). The product is also transmitted back to the calibration system (operation 4004) so that the calibration system can evaluate the effectiveness of the calibration commands.

Data Processing

Data processing is performed by a number of systems within the Earth observation system, including the processing system 515.

Data processing includes data reception at the ground segment. An example process of computer executable instructions for data reception is shown in FIG. 41.

Figure 41:
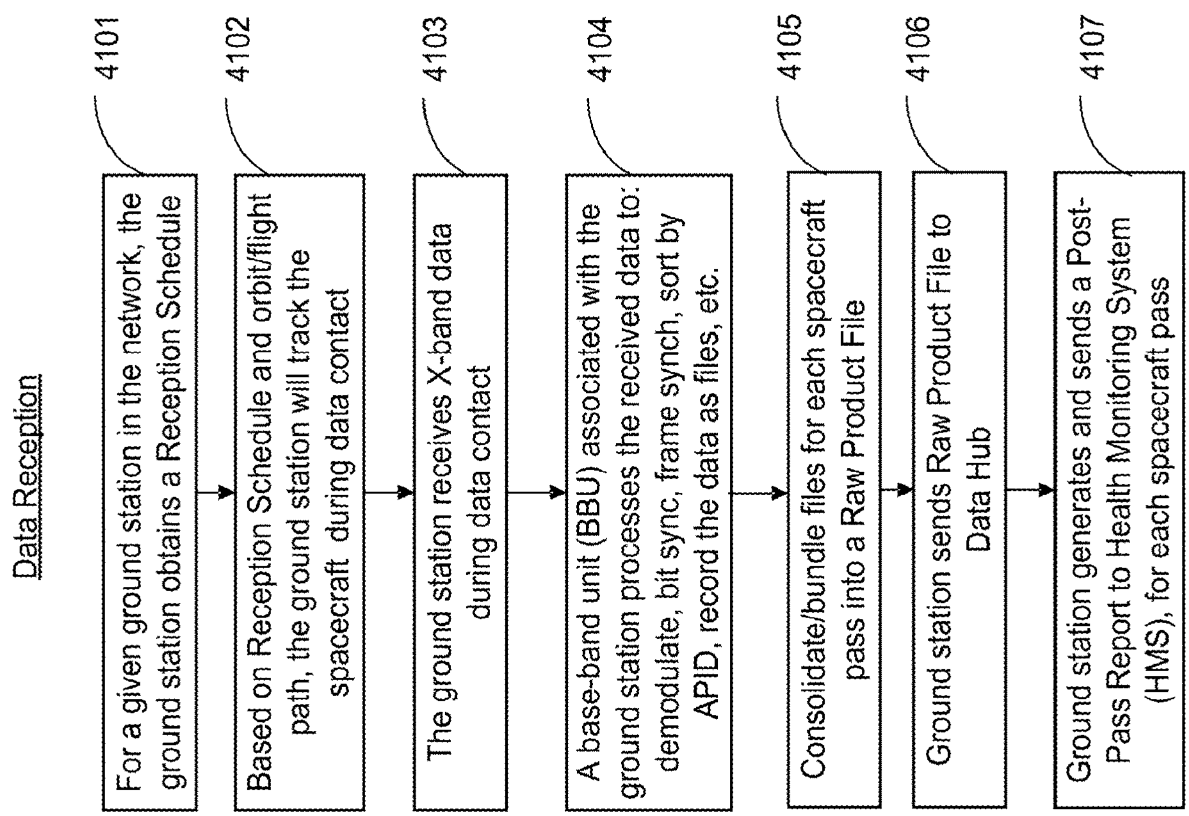
FIG. 41 is a flow diagram illustrating example computer executable or processor implemented instructions for data reception.

In FIG. 41, at block 4101, for a given ground station in the network, a ground station obtains a Reception Schedule. Based on Reception Schedule and orbit/flight path, the ground station tracks the spacecraft during data contact (block 4102). The ground station receives X-band data during the data contact (block 4103). A base-band unit (BBU) associated with the ground station processes the received data to: demodulate, bit sync, frame synch, sort by APID, record the data as files, etc. (block 4104). The ground station consolidates or bundles the files for each spacecraft pass into a Raw Product File (block 4105). The ground station sends Raw Product File to the Data Hub (block 4106). In a non-limiting example embodiment, the format of the Raw Product File is a Cortex file, but other formats may be used. The ground station generates and sends a Post-Pass Report to Health Monitoring System (HMS), for each spacecraft pass (block 4107).

From the perspective of the Data Hub, based on the planning session, the Data Hub receives an Expected File List from the CPS and then waits for the expected data to arrive from Ground Stations.

After the data has arrived, the Data Hub 522 executes a number of computer executable instructions. The Data Hub collects Space Packets by DHU Data ID, including searching for start-of-file (SOF) and/or end-of-file (EOF) Space Packets, and filtering duplicate Space Packets based on data quality. It can be appreciated that if there are duplicates of received data, the Data Hub selects the highest quality data and discards the other duplicated data. After the processing of each Raw Product File (e.g. having a Cortex Data File format), the Data Hub generates a Data Hub Log regarding the received data, and sends this log report to the CPS/OMS. The Data Hub also combines sorted Space Packets, into the original Downlink Files and once the files are complete creates and releases Level-0 Product Files.

The computer executable instructions further include the Data hub creating a Data Quality Report for each Level 0 Product File. In case a Downlink File is missing from the Space Packets, the Data Hub waits to receive the rest of the file for a configurable period of time. This is in case the remainder of the file is being received at another Ground Station.

In cases when the Data Hub detects a missing data, a time-out, or the number of Space Packets with errors exceeding a configurable data quality threshold, the Data Hub includes such conditions or errors in the Data Hub Log. After sending the Data Hub Log to the CPS/OMS, the Data Hub waits to receive a Workflow Control File from the OMS that will instruct the Data Hub to either wait for re-downlinking of Space Packets, or to release the file as is, or to discard the file. Error handling is further described below.

In an example embodiment, the Data Hub Log includes information about each file that is in the Expected File List. Each file is extracted from the Expected File List and is noted in the Data Hub Log, unless the file has been included in a previous Data Hub Log with a status of Complete or Failed. It can be appreciated that data, which does not pertain to a file from the Expected File List, is also included in the Data Hub Log. For each expected file, the Data Hub Log includes: DHU Data ID; file status (e.g. nothing received, incomplete (such as partially received data), completed, or failed); flags whether the SOF or EOF were found and whether a time-out has been reached; the number of expected Space Packets (approximate) extracted from the Expected File List; the number of received Space Packets with no errors; the number of received Space Packets with errors and a list of the Space Packet ranges for the erroneous packets; the number of missing Space Packets and a list of the Space Packet ranges for the missing packets; and other log and status information.

In addition to the Data Hub 522 sending the Data Hub Log to the CPS 518 or OMS 514, or both, the Data Hub also sends a Data Quality Report to the Processing System 515, per Level 0 Product Basis. It is noted that the Level 0 Product Basis pertains to the downlink of raw data. A Data Quality Report (DQR) indicates errors in data. The Data Hub also sends the Data Hub Log and the Data Quality Report to the HMS 521.

Figure 42:
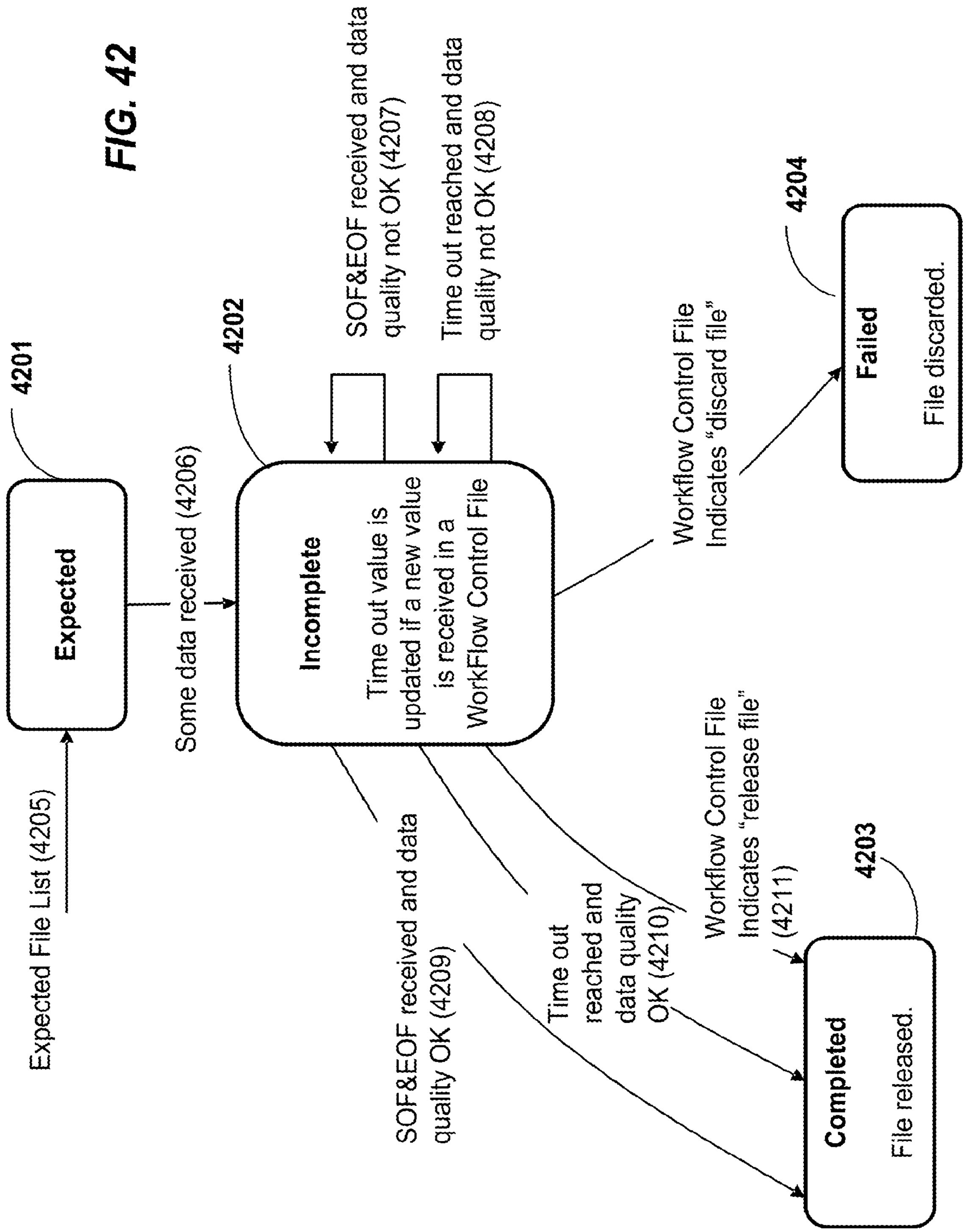
FIG. 42 is a state diagram for a data hub file.

A simplified state transition diagram for the handling of each Downlink File is shown in FIG. 42. The possible states of a downlink file include an expected state 4201, an incomplete state 4202, a completed state 4203, and a failed stated 4204. Initially, a downlink file is in an expected state 4201, as extracted or identified by the Expected File List 4205. After some of the data has been received 4206, the downlink file is designated an incomplete state 4202.

The downlink file remains in the incomplete state if the SOF and EOF have been received by the Data Hub, and the data quality is not of sufficiently quality 4207. The downlink file also remains in the incomplete state if the time out has been reached and the data quality is not of sufficient quality 4208.

The downlink file moves from the incomplete state 4202 to the completed state 4203 if at least one of several possible conditions is met. An example condition is that the SOF and EOF have been received and the data quality is of sufficient quality 4209. Another example condition is if the time out period has been reached and the data quality is of sufficient quality 4210. Another example condition is if the workflow control file indicates the command "release file" for the given downlink file 4211. When the downlink file is in a completed state 4203, the downlink file is released. For example, the downlink file is sent to the processing system 515.

The downlink files moves from the incomplete state 4202 to the failed state 4204 if the workflow control file indicates the command "discard file" for the given downlink file. In the failed state, the downlink file is discarded.

Figure 43:
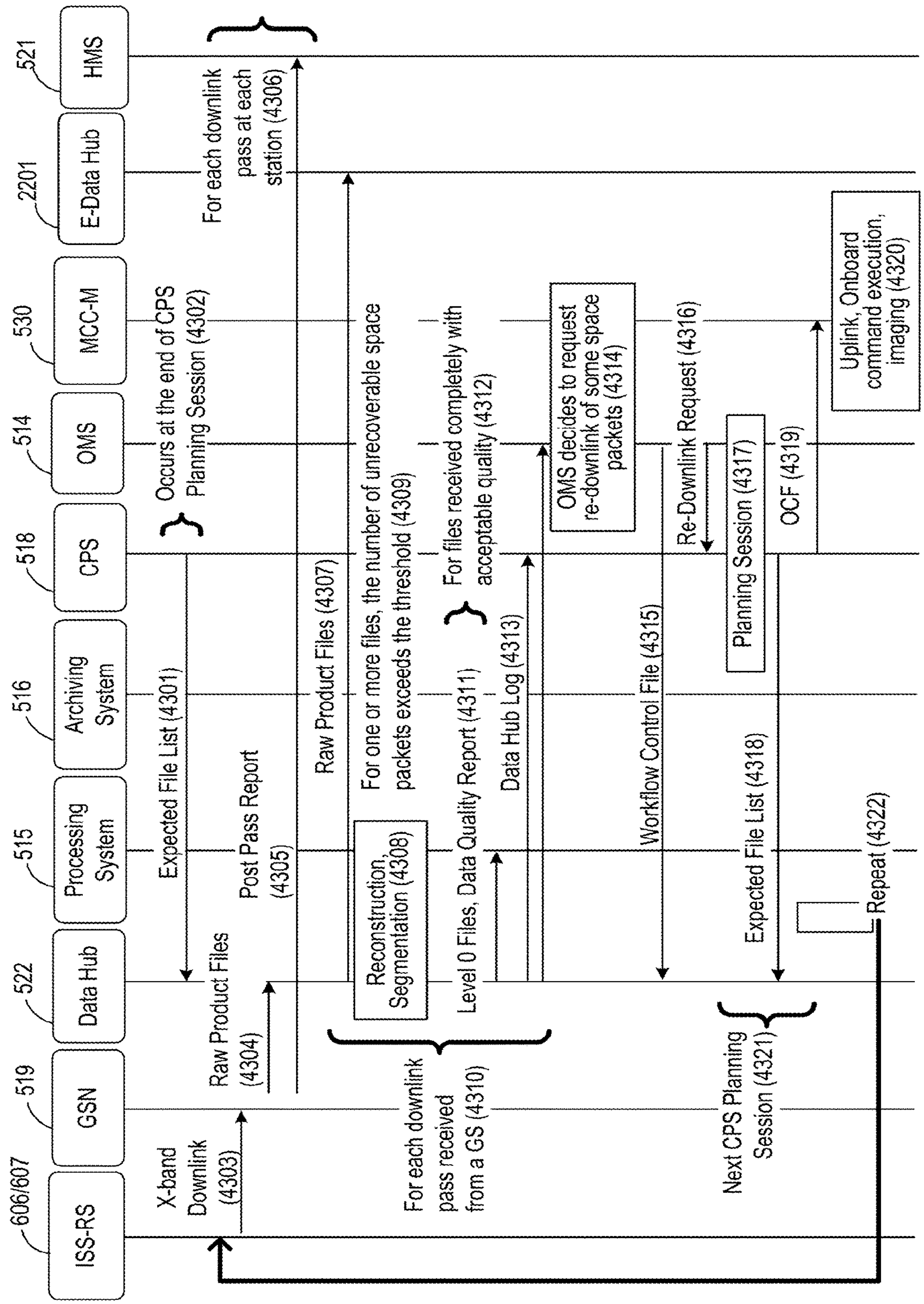
FIG. 43 is a flow diagram illustrating example computer executable or processor implemented instructions for retasking a downlink.

Turning to FIG. 43, an example embodiment of computer executable instructions is provided for implementing a downlink re-tasking, which may be desirable when the Data Hub determines that the data quality in a received file is below the thresholds or the Data Hub determines that the file is missing. Such conditions may arise due to a number of reasons, some which include: a command is cancelled by the mission control center 530 or the terminal computer 611; a command fails to be executed on board the space segment; there is a bad downlink (e.g. the signal-to-noise ratio is too low); and the antenna has failed or there is other ground station failure.

In general, the Data Hub is the system that detects a missing file, or missing/corrupted data and reports this condition to the rest of the system.

At the end of the planning session 4302, the CPS sends an expected file list to the Data Hub 4301, which outlines the expected list of files. From the Data Hub's perspective, the spacecraft sends downlink files via the X-band to one or more ground stations 4303, and the one or more ground stations send the raw product files to the Data Hub 4304. The one or more ground stations also send a post-pass report to the HMS 4305. Operations 4303, 4304 and 4305 occur for each downlink pass at each ground station 4306.

Continuing with FIG. 43, for each downlink pass when the Data Hub receives files from a ground station, a number of operations are performed 4310, such as operations 4307, 7308, 7309, 7311, 4312, and 4313. The Data Hub sends Raw Product Files 4307 to the E-Data Hub 2201. The Data Hub reconstructs the image take files and the video take files, as well as segment out these files from each other. In the course of attempting to reconstruct and segment the files, the Data Hub determines that, for one or more files, the number of unrecoverable space packets exceeds a threshold 4309, or that the data is corrupted.

However, for files that have been received completely with acceptable quality 4312, the Data Hub sends Level 0 files and the Data Quality Report to the Processing System 4311.

The Data Hub generates and sends the Data Hub Log to the CPS and to the OMS 4313. After receiving the Data Hub Log, the OMS sends a request to re-downlink some space packets 4314, such as for the corrupted or missing space packets. The OMS sends the Workflow Control File to the Data Hub 4315 and sends a re-downlinking request to the CPS 4316.

During a next CPS planning session 4312, the CPS executes a planning session 4317 which takes into account the re-downlinking request, and then sends another expected file list to the processing system 4318. The CPS also sends another OCF to the mission control center 4319, where the OCF includes the re-downlinking request. The mission control center uplinks the OCF to the spacecraft 4320, and the space segment executes the commands of the OCF. The process of re-downlinking is repeated 4322, returning to operation 4303.

Ancillary Data Files and space segment Log Files are handled in a similar way as the downlink files, although the files are may not be included in the Expected File List.

Assuming the new image take and video take data, and other data, has been completely received and is of sufficient quality, this raw data is archived. It can be appreciated that raw data, such as Level 0 files, may be provided by the Data Hub. Examples types of Level 0 files include image data, video data, spacecraft ancillary data, and imaging system ancillary data. Data may also be provided to the processing system from an External Imagery Provider or the Web Platform, or both.

Figure 44:
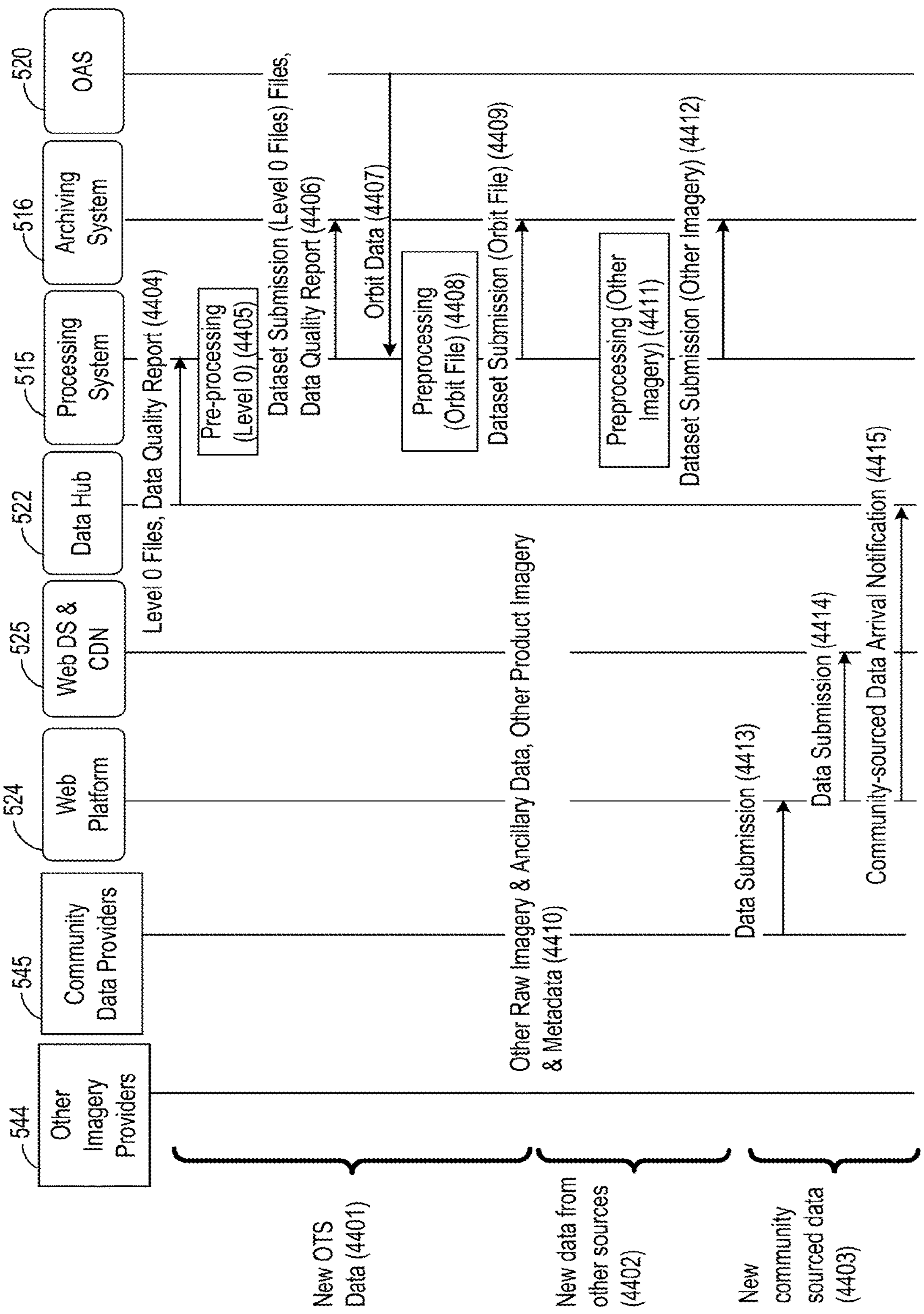
FIG. 44 is a flow diagram illustrating example computer executable or processor implemented instructions for archiving new raw image or video data, or both, and ancillary data.

Turning to FIG. 44, after the arrival of new image or video data, an example embodiment of computer executable instructions is shown for archiving the data. The processes are separated for new data obtained by the space segment 4401, new data obtained by other sources 4402, and new data sourced from a community data network 4403.

In the process 4401, the Data Hub sends Level 0 files and a Data Quality Report to the Processing System. The Processing System pre-processes the Level 0 files 4405, which is a downlink format and converts Level 0 to Level 1, which has sensor models included. The Processing System also submits the pre-processed Level 0 files and the Data Quality Report to the Archiving system 4406 for storage.

The Orbit and Attitude System sends orbit data to the Processing System 4407. The Processing System pre-processes the orbit data to create an orbit file 4408, and sends this orbit file to the Archiving System 4409. In an example embodiment, the pre-processing of the orbit data includes compiling the data and filtering the data to make the data in the orbit file more accurate prior to sending the orbit file to the Archiving System.

In the process 4402, other imagery providers send raw imagery and ancillary data to the processing system 4410. The data may also include other product imagery and metadata. Non-limiting examples of metadata include Sun angle, geometry, cloud mask, black fill, bounding box, ownership and copyright information, conversion parameters, etc. The Processing System pre-processes this external data 4411 and submits the same to the archiving system 4412.

Figure 47:
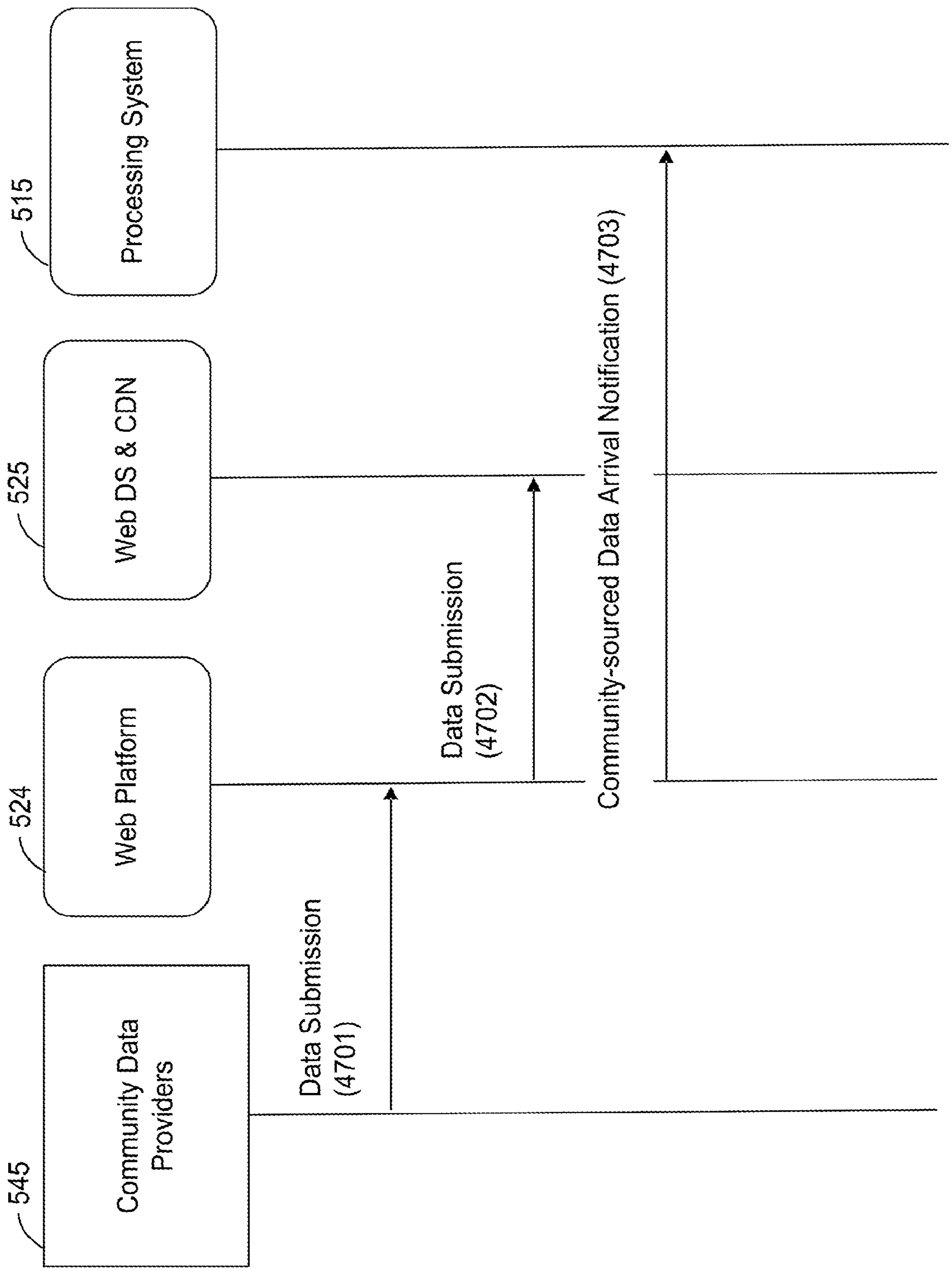
FIG. 47 is a flow diagram illustrating example computer executable or processor implemented instructions for submitting community-sourced data.

In the process 4403, the community data providers submit data to the Web platform 4413. The Web platform sends this data to the Web DS and CDN 4414 and further sends a notification about the community-sourced data to the Data Hub 4415. This process is shown in isolation in FIG. 47, which shows the similar corresponding operations 4701, 4702 and 4703.

Figure 45:
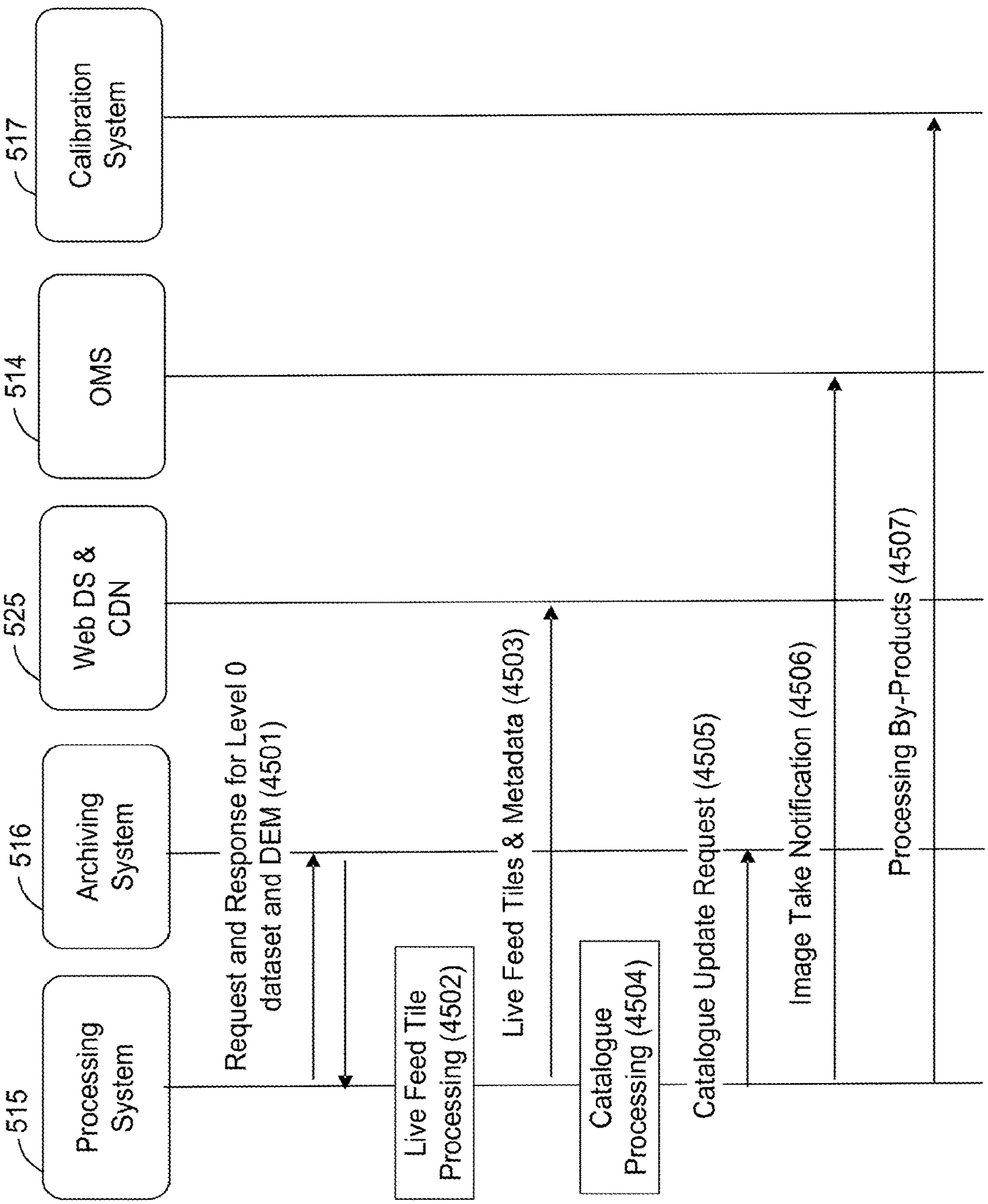
FIG. 45 is a flow diagram illustrating example computer executable or processor implemented instructions for processing acquired MRC data.

After the image take data, or data from the MRC, has been received and archived, the example computer executable instructions of FIG. 45 are performed. The Processing System sends a request to the Archiving System for the Level 0 dataset and DEM, and the Archiving System responds by providing the requested data 4501. The Processing System then performs live feed tile processing 4502 and then sends the live feed tiles and metadata to the Web DS and CDN 4503. The live feed tile processing includes generating synthetic, or pseudo-live feed tiles and metadata to span gaps of data, since the last MRC data was received. In this way, the image or video product will appear to be a continuous and unbroken strip of imagery that can be traversed over all time. In an example embodiment, the live feed tiles are configured to be of a lower image quality compared to other images that have been processed to enhance the image quality. The Processing System also implements Catalogue Processing 4504. In an example embodiment, catalogue processing produces images for sufficient commercial quality.

The Processing System the sends a catalogue update request to the Archiving System 4505. The Processing System also sends an image take notification to the OMS 4506 and sends the processing by-products to the Calibration System 517.

Figure 46:
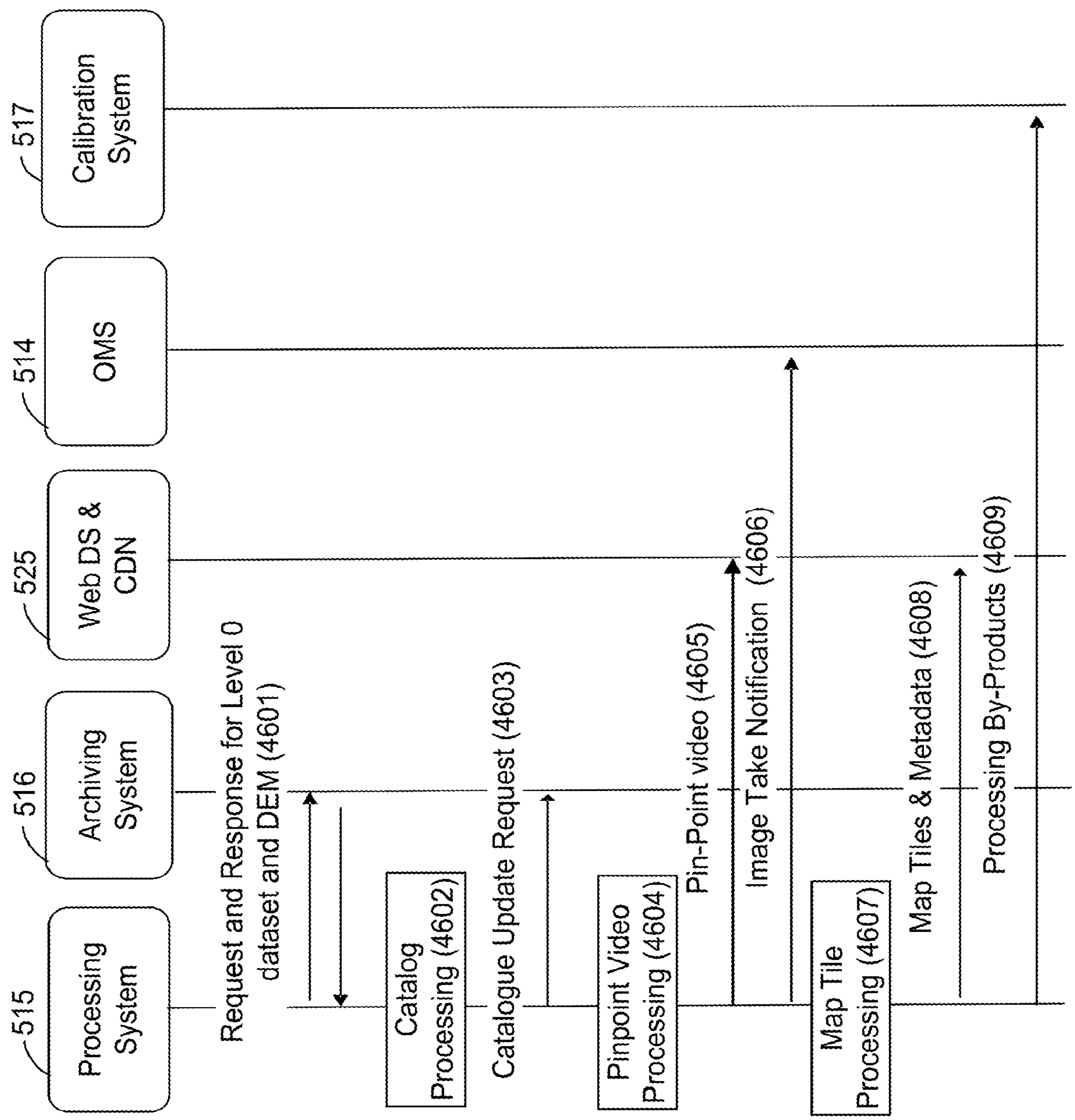
FIG. 46 is a flow diagram illustrating example computer executable or processor implemented instructions for processing acquired HRC data.

In another aspect, after the video take data, or other data from the HRC, has been received and archived, the example computer executable instructions of FIG. 46 are performed. The Processing System sends a request to the Archiving System for the Level 0 dataset and DEM, and the Archiving System responds by providing the requested data 4601. The Processing System implements Catalogue Processing 4602. The Processing System the sends a catalogue update request to the Archiving System 4603.

The Processing System performs pinpoint video processing 4604. It will be appreciated that a pin point herein refers to an area of interest within a polygon on a map. After, the Processing System sends the generated pin-point video to the Web DS and CDN 4605. The Processing System also sends an image take notification or video take notification to the OMS.

The Processing System also performs map tile processing 4607. The map tile processing includes selecting the best tiles (e.g. using down-selection). Desired tiles, for example, are those images or tiles that are cloud-free, or have little cloud cover. The desired tiles are merged with the most recent map tiles on the Web, which includes retrieving them from the Web DS and CDN. In an example embodiment, tiles are processed when not already in a cache, and are visible within a viewport on a browser (e.g. Internet browser) or application, which are rendered and served to the viewport. The processed map tiles and metadata are then sent to the Web DS and CDN 4608. The processing by-products are sent to the calibration system 4609.

In another aspect of data processing, product generation is based on raw data already in the archive in response to a user order. The OMS 514 will send the Processing System 515 a Product Generation request. The Processing System will send two data retrieval requests to the Archiving System 516: one request for DEM data, and one for the raw data from the HRC or MRC. When the product generation is completed, OMS is notified, and the product is submitted to the PDS 526.

It can be appreciated that different product types are associated with different processing levels for the data. For customer products, Level 1B products are images that have been corrected for sensor projection and Level 2B products are images that have been corrected for orthographic projection using image processing algorithms. It is appreciated that currently known or future known image processing techniques can be used in combination with each other, or alone, to correct the orthographic projection.

It will also be appreciated that when product generation is completed, the Processing System will transfer the products to the PDS 526 and send a message to the OMS 514. The PDS 526 may then send the data to the customer's computing device, or initiate sending of the data product in another way.

Event-Based Image Tagging

Figure 48A:
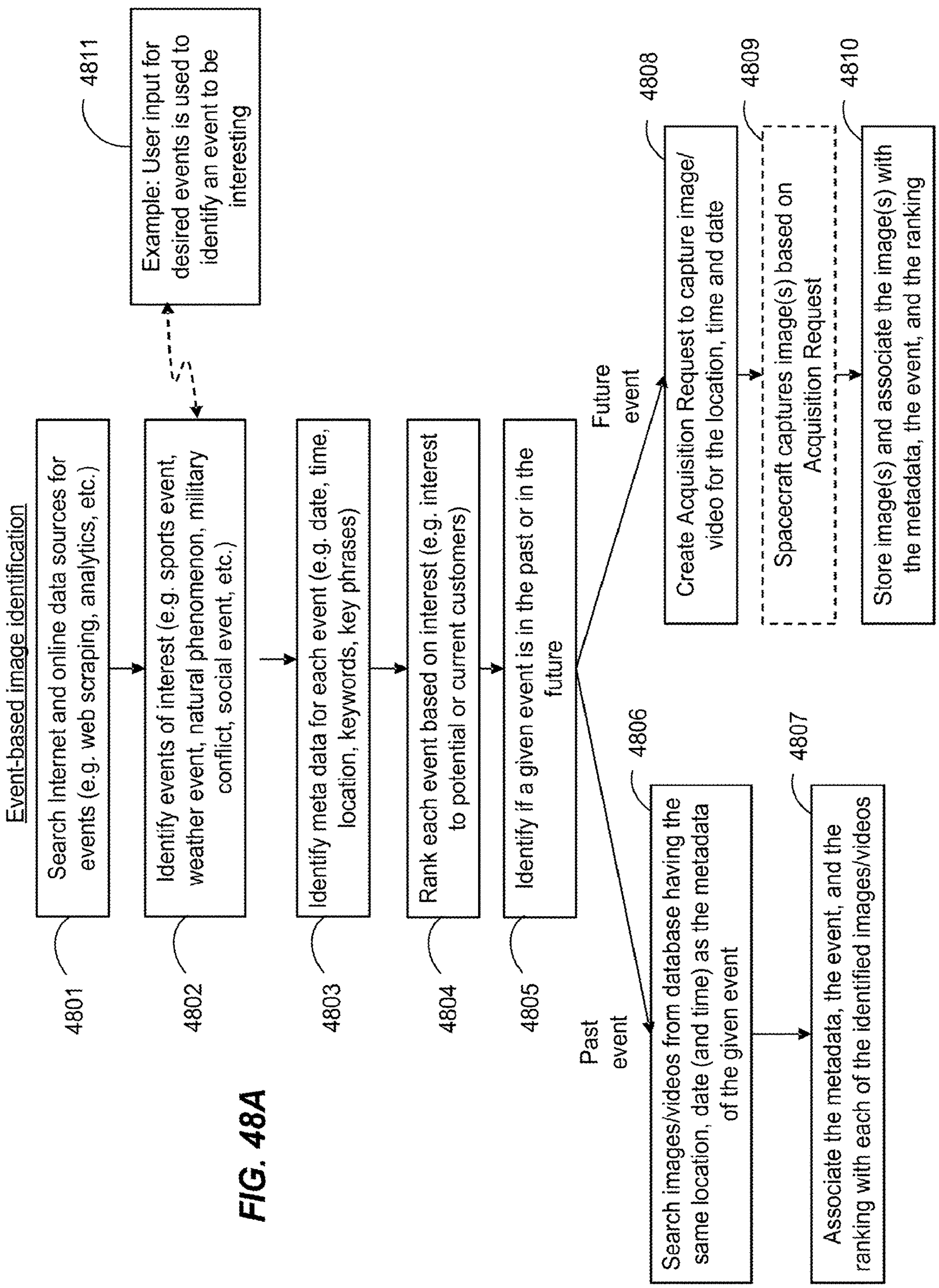
FIG. 48A is a flow diagram illustrating example computer executable or processor implemented instructions for event-based image identification.

Another approach to generate Acquisition Requests or to process the data is to tag the data based on events. Turning to FIG. 48A, example computer executable instructions are provided for event-based image identification. These instructions are implemented by the ground segment of the Earth observation system.

At block 4801, a computing device searches the Internet and online data sources for events. Currently known and future known techniques for Web scraping, data mining, analytics, semantic analysis, machine learning, and other automated search techniques, can be used with the principles herein to search and identify events. At block 4802, the computing device identifies events of interest. Non-limiting examples of interesting events include a sports event, a weather event, a natural phenomenon, a military conflict, a social event, etc. In an example embodiment, user input identifying desired events is used to identify whether an event is of interest (block 4811). For example, a user is interested in events related to hurricanes.

At block 4803, the computing device identifies metadata for each event (e.g. date, time, location, keywords, key phrases). At block 4804, the computing device ranks each event based on interest (e.g. interest to potential or current customers). In an example embodiment, the computing device applies ranking algorithms configured to analyze monetization, semantics, and usage patterns, and to also analyze trending topics to determine what imagery to display to the user. Such ranking algorithms may use k-means and z-score indexes for ranking. The ranking approaches may also include, for example, the use of Bayesian statistics, clustering, and other types of machine learning approaches. At block 4805, the instructions include identifying if a given event is in the past or in the future.

If the identified event is in the past (e.g. a few minutes ago, a few hours ago, a few days, weeks, months or years ago, etc.), the computing device searches for images/videos from one or more databases (e.g. Archive System, Web DS and CDN, external database, or combination thereof) (block 4806). The sought after images have the same location, date (and time) as the metadata of the given event. At block 4807, when the images matching the conditions of the metadata are found, the computing device associates the metadata, the event, and the ranking with each of the identified images/videos.

If the identified event is a future even, the computing device creates an Acquisition Request to capture image/video for the location, time and date (block 4808). At block 4809, the spacecraft captures the image(s) based on Acquisition Request. The computing device stores the image(s) and associates the image(s) with the metadata, the event, and the ranking (block 4810).

Using the above process, the ground segment can automatically identify future events of interest and capture images of those events. Additionally, past events of interest are automatically identified, and the saved images are tagged so that users interested in such past events can easily find the saved images.

Figure 48C:
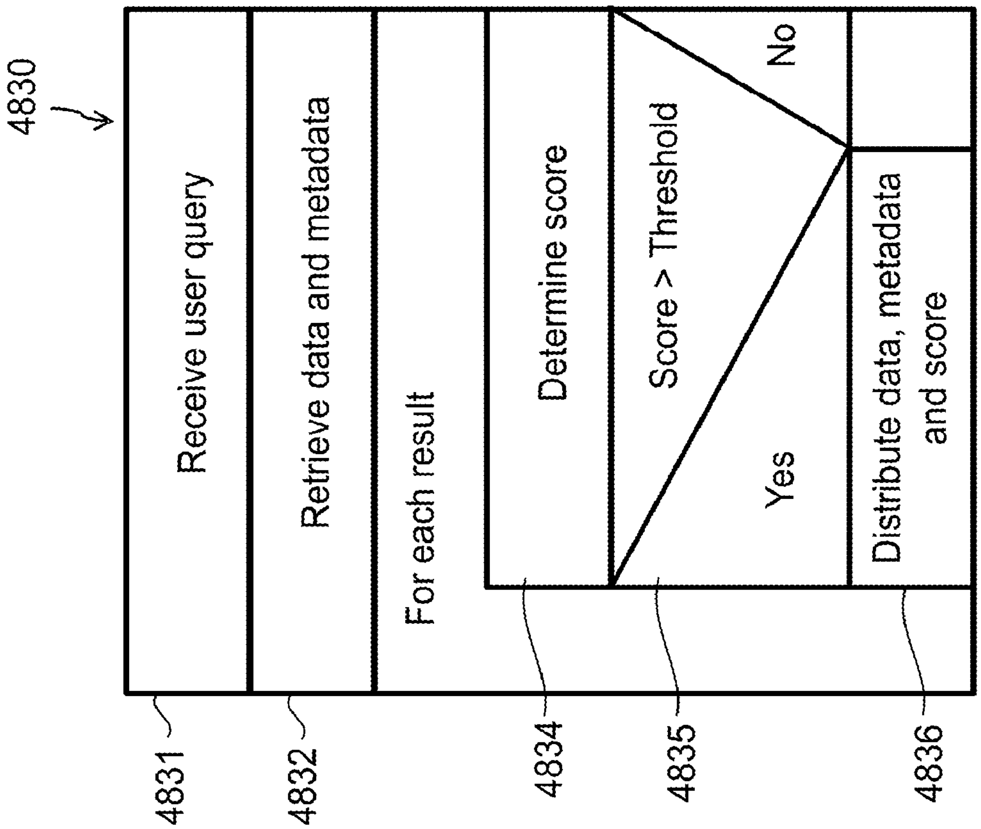
FIG. 48C is a flow diagram illustrating example computer executable or processor implemented instructions for event-based image identification.
Figure 48B:
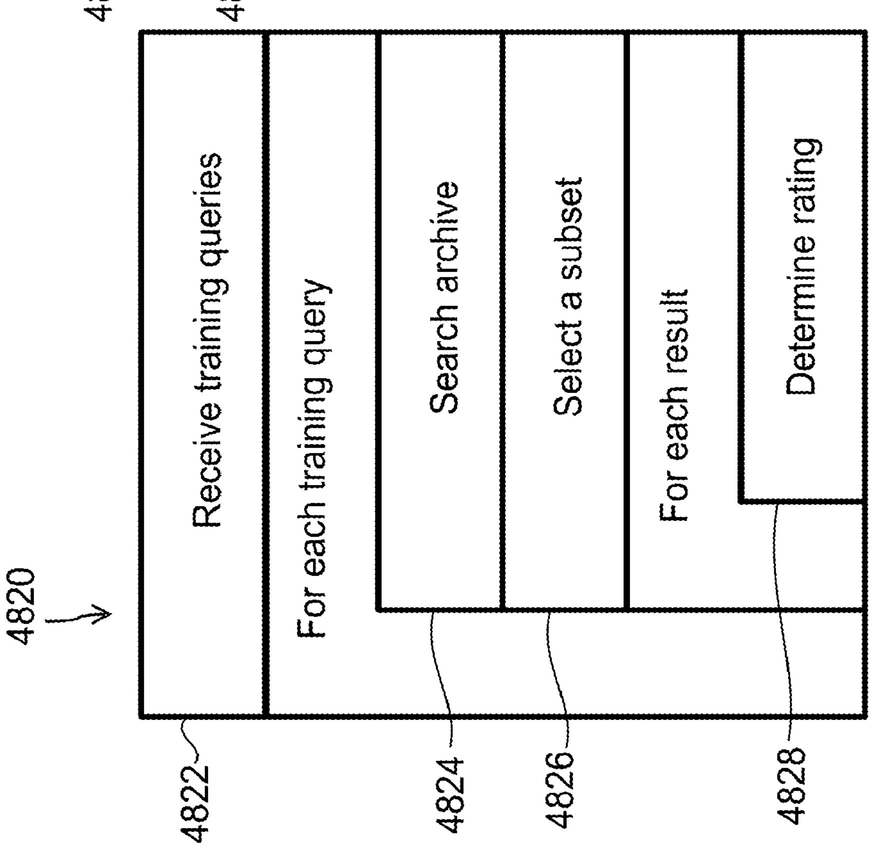
FIG. 48B is a flow diagram illustrating example computer executable or processor implemented instructions for event-based image identification.

FIG. 48B is a Nassi-Shneiderman diagram illustrating a method 4820 for determining a rating for data and metadata. At block 4822, a system to electronically distribute geospatial data and metadata to a user via a Web platform receives a number of geospatial queries, known as training queries. The purpose of these queries to establish a rating for geospatial data and metadata residing in an archive on the system.

For each training query, the system searches the archive and generates a set of results satisfying the training query (block 4824). At block 4826, the system selects a subset of results. For each result in the selected subset, the system determines a rating based at least in part on one or more of a commercial value of the geospatial data and the associated metadata, a measure of a usage pattern of the geospatial data and the associated metadata, a measure of semantic assessment of the geospatial data and the associated metadata, or a trend associated with the geospatial data and associated metadata (block 4828).

FIG. 48C is a Nassi-Shneiderman diagram illustrating a method 4830 for allocating a score to data and metadata reflecting the relevance of the data and metadata to the user. At block 4831, the system receives a geospatial query from the user. At block 4832, the system retrieves a set of geospatial data and metadata satisfying the user's geospatial query from the archive.

For each result in the set of retrieved geospatial data and metadata, the system determines a score reflecting a relevance to the user of the retrieved geospatial data and associated metadata result, the score based at least in part on the user's geospatial query and the rating associated with the data and the metadata (block 4834). If, at block 4835, the system determines the score is greater than a configurable threshold, the system distributes the retrieved geospatial data and associated metadata to the user via the Web platform (block 4836).

Natural Environment and Sentiment Taming

In another aspect of processing the image data, it is herein recognized that images can be difficult to search. The methods described herein provide a way to understand the content of the image, and to tag the image based on sentiment associated with the content of the image.

Figure 49:
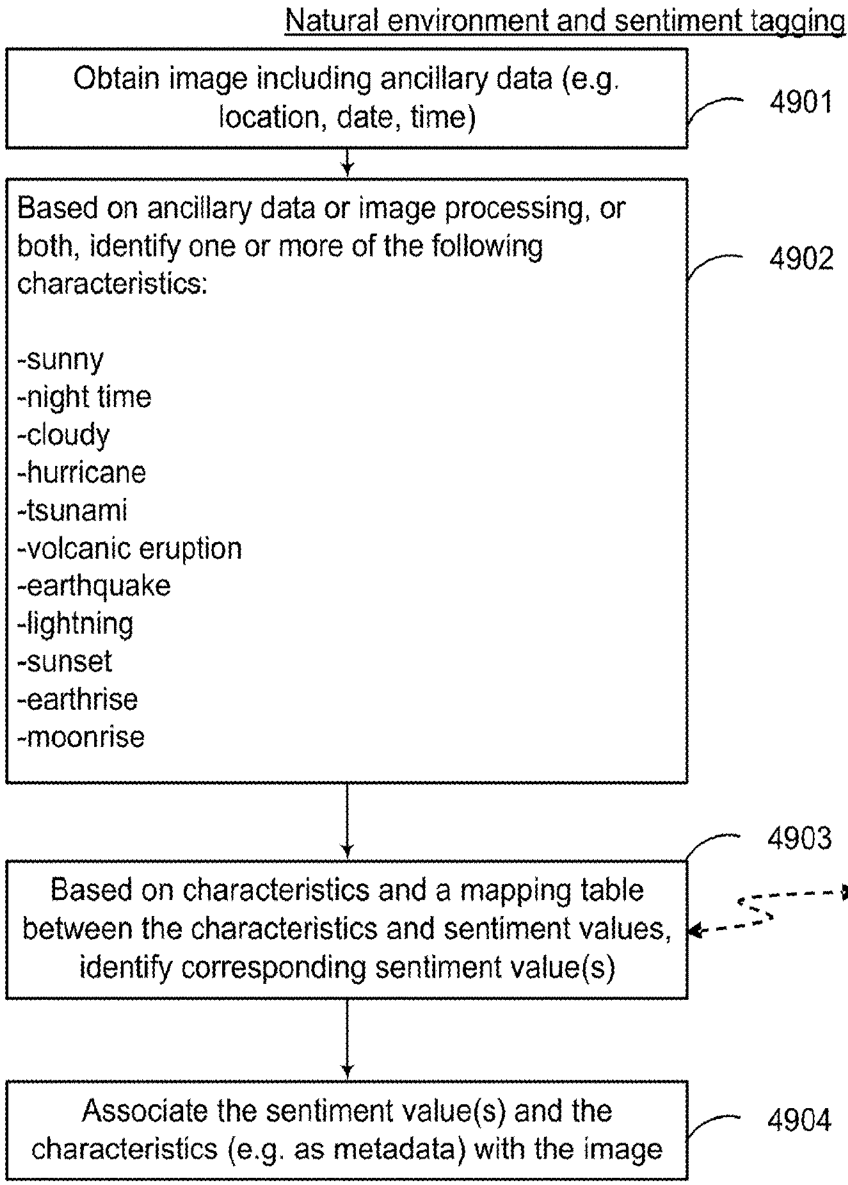
FIG. 49 is a flow diagram illustrating example computer executable or processor implemented instructions for sentiment tagging of image and video data.

Turning to FIG. 49, example computer executable instructions are provided for identifying the natural environment associated with an image, and applying a sentiment tag. At block 4901, a computing device in the ground segment obtains an image including ancillary data (e.g. location, date, time). Based on the ancillary data or image processing, or both, the computing device identifies one or more characteristics about the environment of the image (block 4902). Non-limiting example characteristics include: sunny, night time, cloudy, hurricane, tsunami, volcanic eruption, earthquake, lightning, sunset, earthrise, and moonrise. These characteristics can be determined a number of ways. For example, based on the position of the spacecraft at the time the image was captured, the computing device can use a look-up table or other meteorological database to identify the weather and solar illumination level. Natural phenomena can be identified by correlating the location and time of an image with an events database. Regarding the sunrise and moonrise, the computing device can compute the location of where an image was taken of the Earth based on the orientation angle of a camera (e.g. camera 202) looking at the horizon or limb of the Earth and the location of the spacecraft. Based on this location and the time the image was taken, the computing device can access orbital and astronomical databases to cross-correlate the moonrise and sunrise events with the image. Other methods for identifying characteristics associated with an image can be used. Other methods may include using image processing, or third party input.

At block 4903, based on the identified characteristics and a mapping table between the characteristics and sentiment values, the computing device identifies corresponding sentiment value(s). An example table is shown in 4905. For example, a sunny characteristic is associated with the sentiments happy and bright. In another example, a comet characteristic (e.g. which occurs when there is a comet in the image) is associated with the sentiment wishful or wish. In another example embodiment, the characteristic of a hurricane is associated with the sentiment values fierce and angry.

At block 4904, the computing device associates the sentiment value(s) and the characteristics, for example as metadata, with the image. In this way, when a user searches for "happy" images, the image of a sunny landscape appears. In another example embodiment, when a user searches for "wishful" images, an image of a comet appears.

Order Management

In another aspect of the Earth observation system, using the systems described herein, a user can interact with the Web platform 524 to view and obtain image data.

Figure 50:
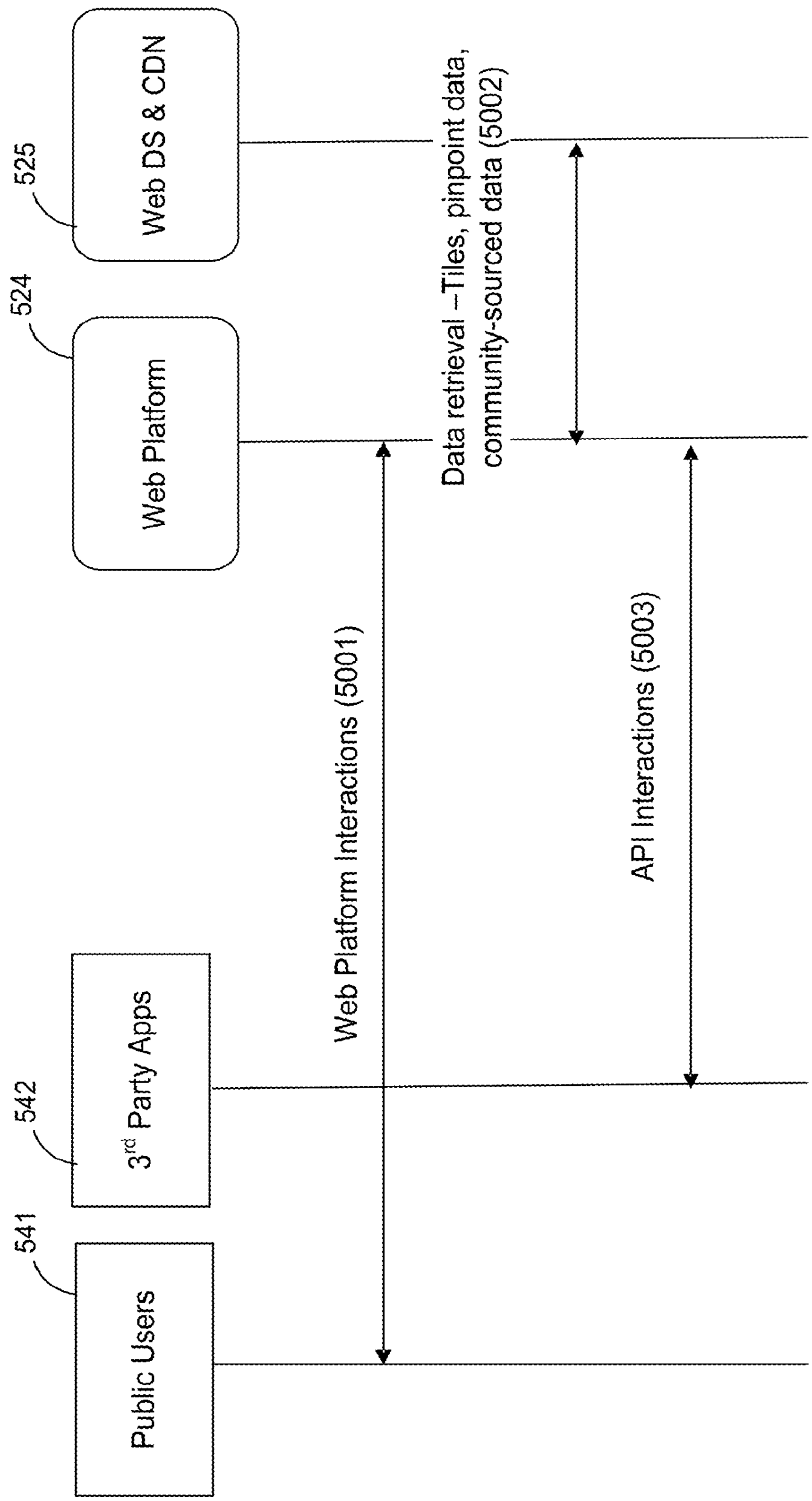
FIG. 50 is a flow diagram illustrating example computer executable or processor implemented instructions for public users interacting with the Web platform.

Turning to FIG. 50, example computer executable instructions are shown explaining the interactions with the Web platform 524. Public users, through their computers or computing devices, can access the Web platform to exchange data 5001. Similarly, third-party applications on mobile devices, tablets, or other computing devices can interact with the Web platform using an API (application programming interface) 5003. The Web platform in turn interacts with the Web DS and CDN to retrieve data and transmit or display the same via the Web platform 5002. In an example embodiment, the Web platform retrieves image tiles, video tiles, pinpoint data, community-sourced data, or combinations thereof.

Figure 51:
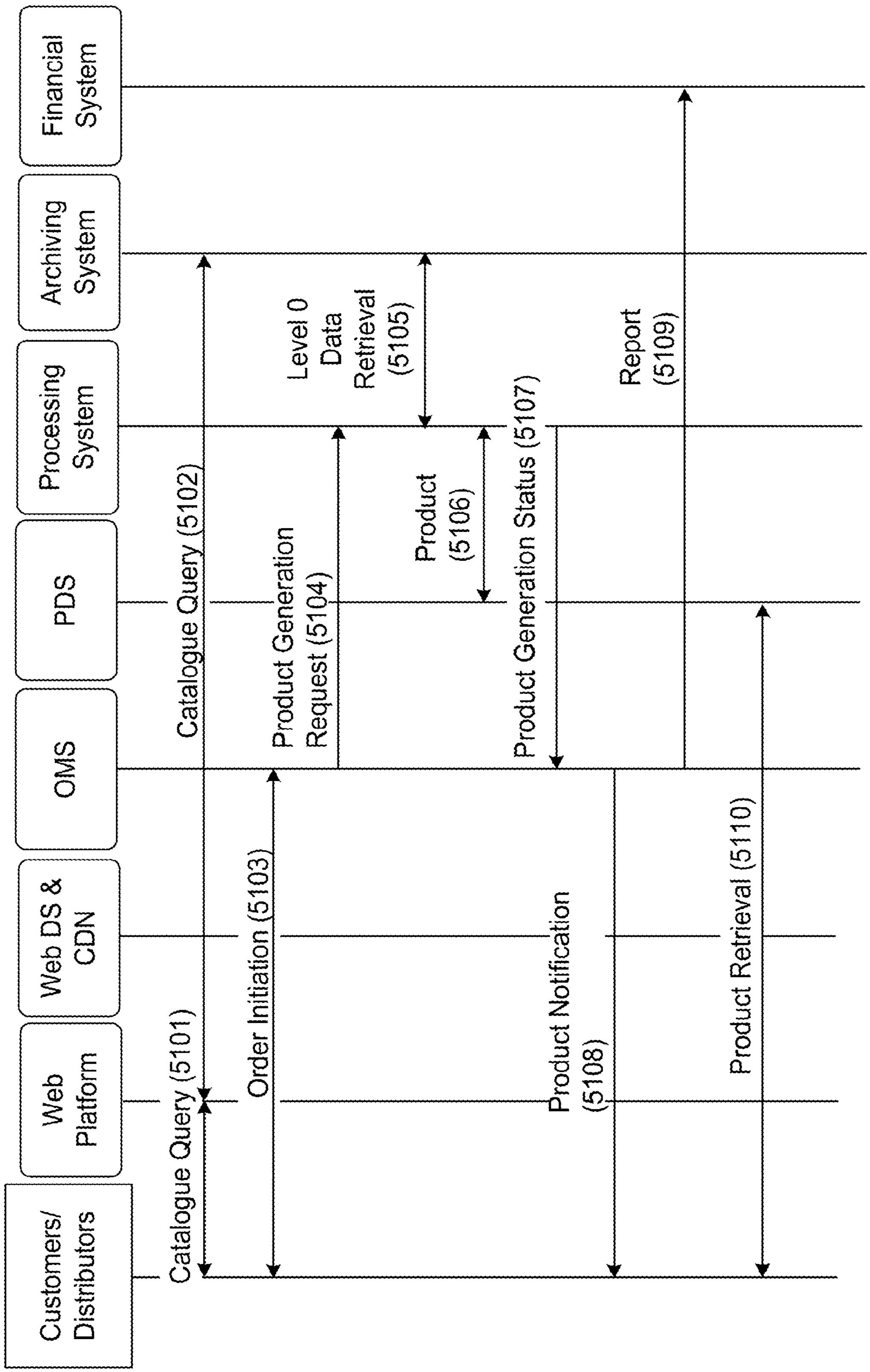
FIG. 51 is a flow diagram illustrating example computer executable or processor implemented instructions for ordering data from the archive.

Turning to FIG. 51, example computer executable instructions are shown for ordering data that exists in the Archiving System 516. A customer or distributor searches the catalogue on the Web platform 5101, for example using a graphical user interface (GUI) provided by the Web platform. The catalogue query is sent from the Web platform to the Archiving System 5102 and the data available for ordering is sent back to the Web platform for the customer to view. The customer makes a selection and initiates an order with the OMS 5103. The OMS computes and sends a product generation request to the Processing System 5104. The Processing System retrieves the Level 0 data from the Archiving System 5105. The Processing System may further process the data before sending the data to the PDS 5106. In an example embodiment, the Level 0 data is not further processed and is sent as it is to the PDS. The Processing System also produces and sends a product generation status to the OMS that the product is ready 5107.

The OMS sends a product notification to the user's computing device (e.g. via email, text, instant messaging, social network, or by a message on the Web platform) 5108. The OMS also sends a report about the product to the financial system for accounting purposes 5109.

The customer then uses their computing device to retrieve the product from the PDS 5110.

Figure 52:
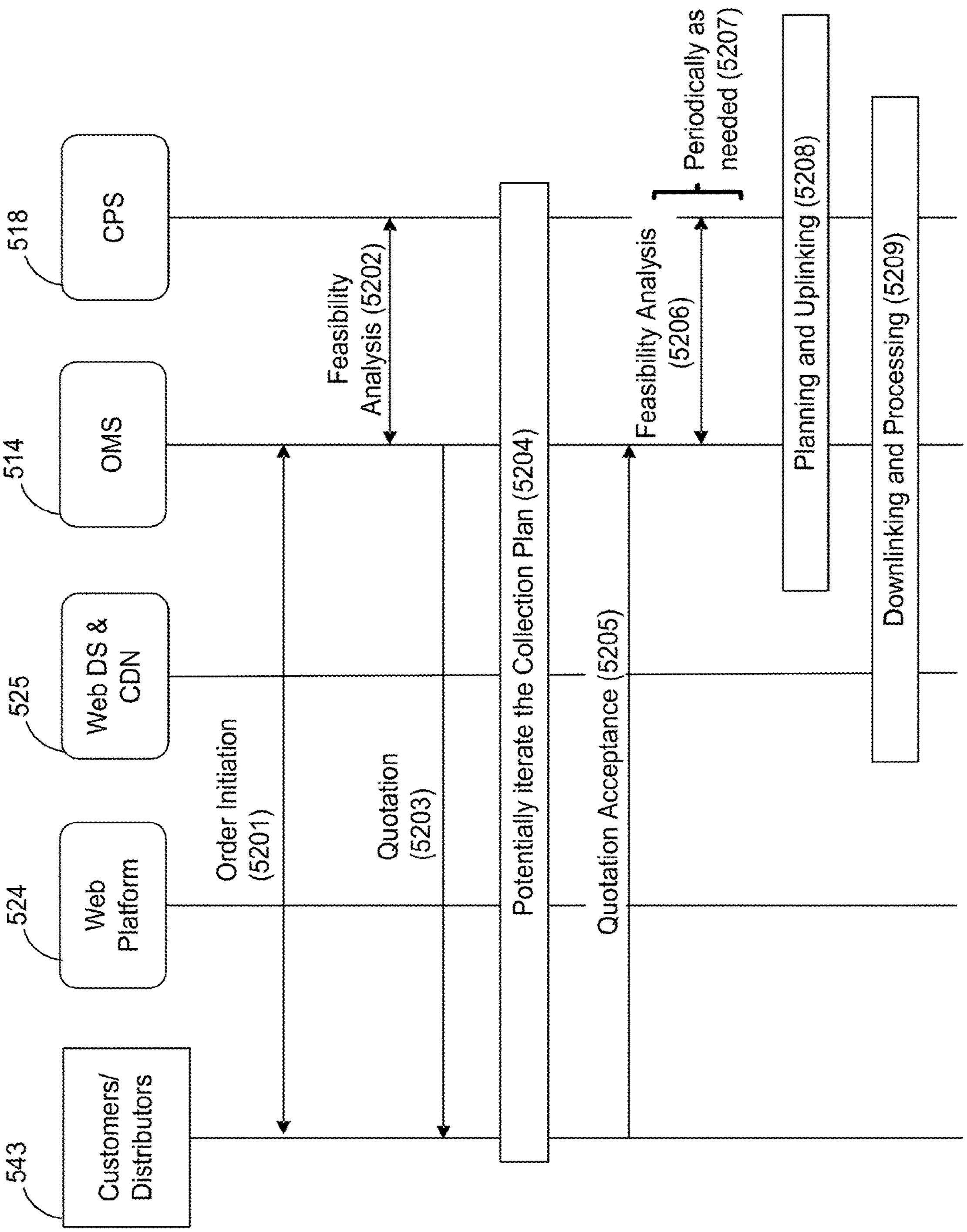
FIG. 52 is a flow diagram illustrating example computer executable or processor implemented instructions for ordering data through a new data acquisition.

Turning to FIG. 52, example computer executable instructions are shown for ordering data that new image data, such new camera acquisition data from the spacecraft. The customer sends an order initiation to the OMS via the Web platform 5201. The OMS and the CPS compute the feasibility of the order 5202, and if the order is feasible, the OMS sends a quotation to the customer 5203. The feasibility analysis may include the automated generation of a collection plan, which is also sent with the quotation to the customer. Based on parameters from the customer, the collection plan may be recomputed over one or more iterations 5204.

When the OMS receives the quotation acceptance 5205, the OMS and CPS may, or may not, re-compute the feasibility analysis 5206 based on the period of time elapsed since the initial analysis 5207. Then, the planning and uplinking operations 5208 and the downlinking and processing operations 5209 are executed. These operations were described above.

Figure 53:
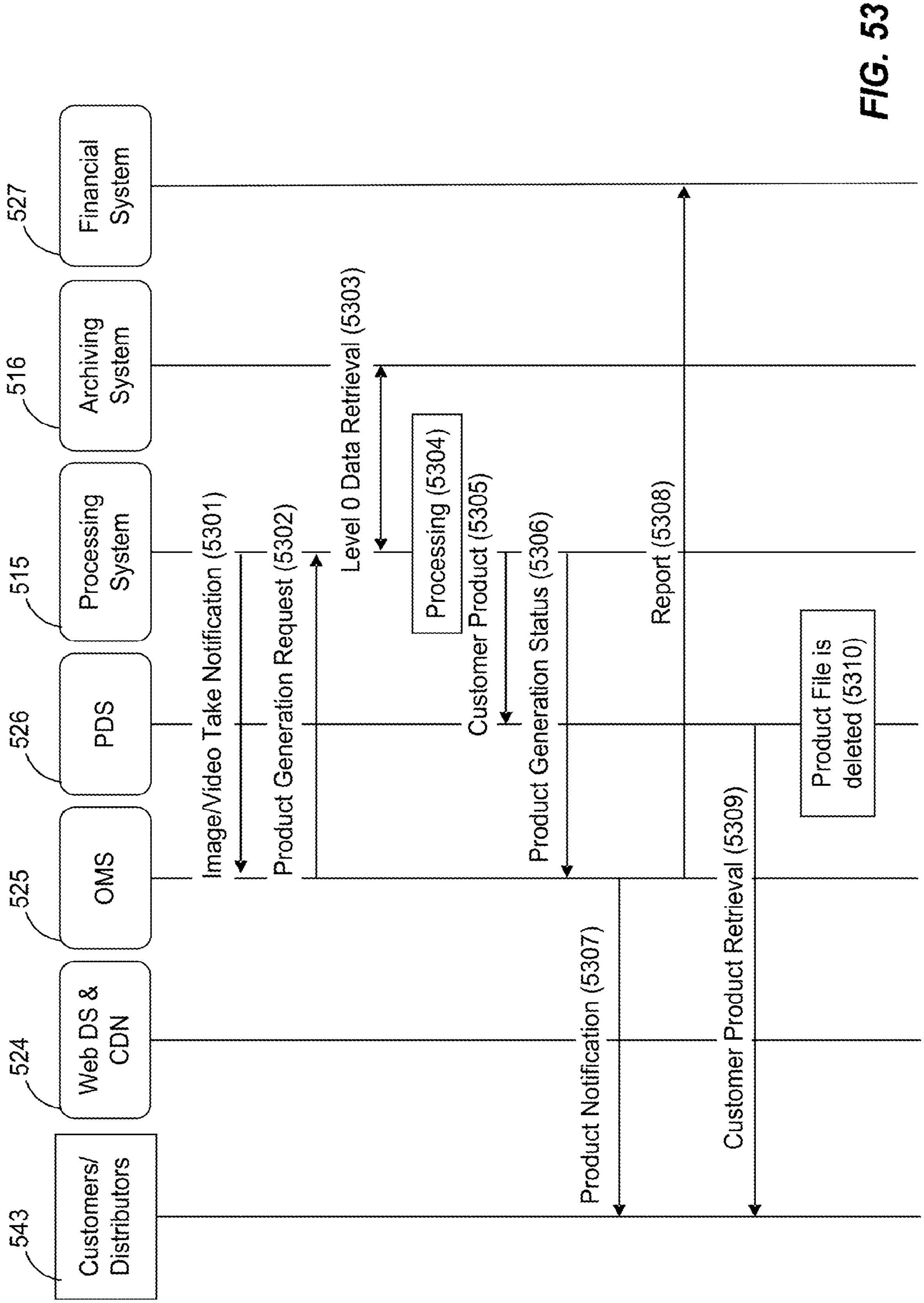
FIG. 53 is a flow diagram illustrating example computer executable or processor implemented instructions for generating a data product based on archived data.

Turning to FIG. 53, example computer executable instructions are shown for generating a product for newly archived data. This process can occur after the process described in FIG. 52. In FIG. 53, the Processing System sends an image or video take notification to the OMS regarding data what was just archived 5301. The OMS sends a product generation request to the Processing System 5302. In response, the Processing System retrieves the Level 0 data from the Archiving System 5303 and processes the retrieved data 5304 to generate a customer product. The Processing System then sends the customer product to the PDS 5305 and sends a product generation status report to the OMS 5306. When the OMS receives notification that the customer product is ready, the OMS sends the product notification to the customer 5307 and sends a report regarding the same to the Financial System 5308. The PDS sends the customer product to the customer 5309 and then, in an example embodiment, deletes the customer product from the ground segment 5310.

It can be appreciated that there are various types of customer products that can be ordered. Table 10 describes some of the types of data to be ordered through the OMS or through the Web platform. Other types of data and services are made available through the Web platform.

TABLE 10

| Products and services to ordered | | | | |
|---|---|---|---|---|
| Video and Image Files | | | Archive Data | New Acquisition (Tasking) |
| HRC | Video | Point target<br>Path | Applicable to all | Applicable to all<br>Possible variations: |
| | Image | Single image<br>Area coverage composed of multiple images (single pass or multiple passes) | | Single take, or repeated coverage<br>Request a time frame, or on a specific pass<br>Priority level |
| MRC | Image | Single Image<br>Area coverage composed of multiple images (single pass or multiple passes) | | |

The above products may include processing of the collected data to a specified level.

Other possible products and services include: image/video products; standard image and video products; super resolution images; stereo pairs; change detection; change monitoring reports; activity monitoring reports; mosaics; 3D city models; Digital Elevation Models (DEMs) which describe terrain; Digital Surface Models (DSMs) which describe terrain and any features on the terrain (e.g. trees, buildings, etc.); subsidence monitoring reports; sightlines for buildings and signage; annotated images and videos; broadcast-ready videos (e.g. edited to include content from other sources); large area background collections; and calibration collections.

Although the data products are configured to be sent to the customer over wired or wireless networks, or both, it is recognized that the customer may desire to have the data product on a physical memory media (e.g. USB key, DVD, CD, etc.). Therefore, the ordering system may include automatic data storage processes to automatically store data onto a physical memory media and automatically ship or mail the same to the customer.

In another aspect of the ordering process, the contents of an order are described here. The order includes general order information, such as the customer information (e.g. identification, contact information, etc.) and the information the customer needs or the information the application needs. Non-limiting examples of the information requested by the customer or the application include imaging or processing parameters, or both, such as sung angles, the type of product, the areas of interest, time constraints and privacy requirements.

The order also includes a tasking request. There may be zero, or one, or multiple tasking requests in an order. Each taking requests includes: an area of interest (e.g. geographic coordinates or attached Shape/KML file); priority level; time frame (e.g. earliest and latest time that the imagery is allowed to be acquired); a camera selection (e.g. MRC, HRC, other cameras); and the length of video (e.g. number of frames or time), where video data is being ordered.

The tasking request may also include other constraints, for example, including: quality level or maximum compression ratio; the maximum acceptable cloud cover; sun elevation and azimuth angles; incidence elevation and azimuth angles (e.g. for the HRC); preferred ground station for downlinking; and security access settings.

The order may also include a product request. There may be zero, or one, or multiple product requests in an order. The product request, for example, includes: identification of raw imagery; processing level; a resampling kernel (e.g. normal or sharpen); and data specifying geolocation accuracy (e.g. systematic or precision).

The OMS or the Web platform may provide weather forecast information in relation to a product order, which can be used to assist a customer in assessing the cloud cover risks within the time period and location of interest.

Figure 54:
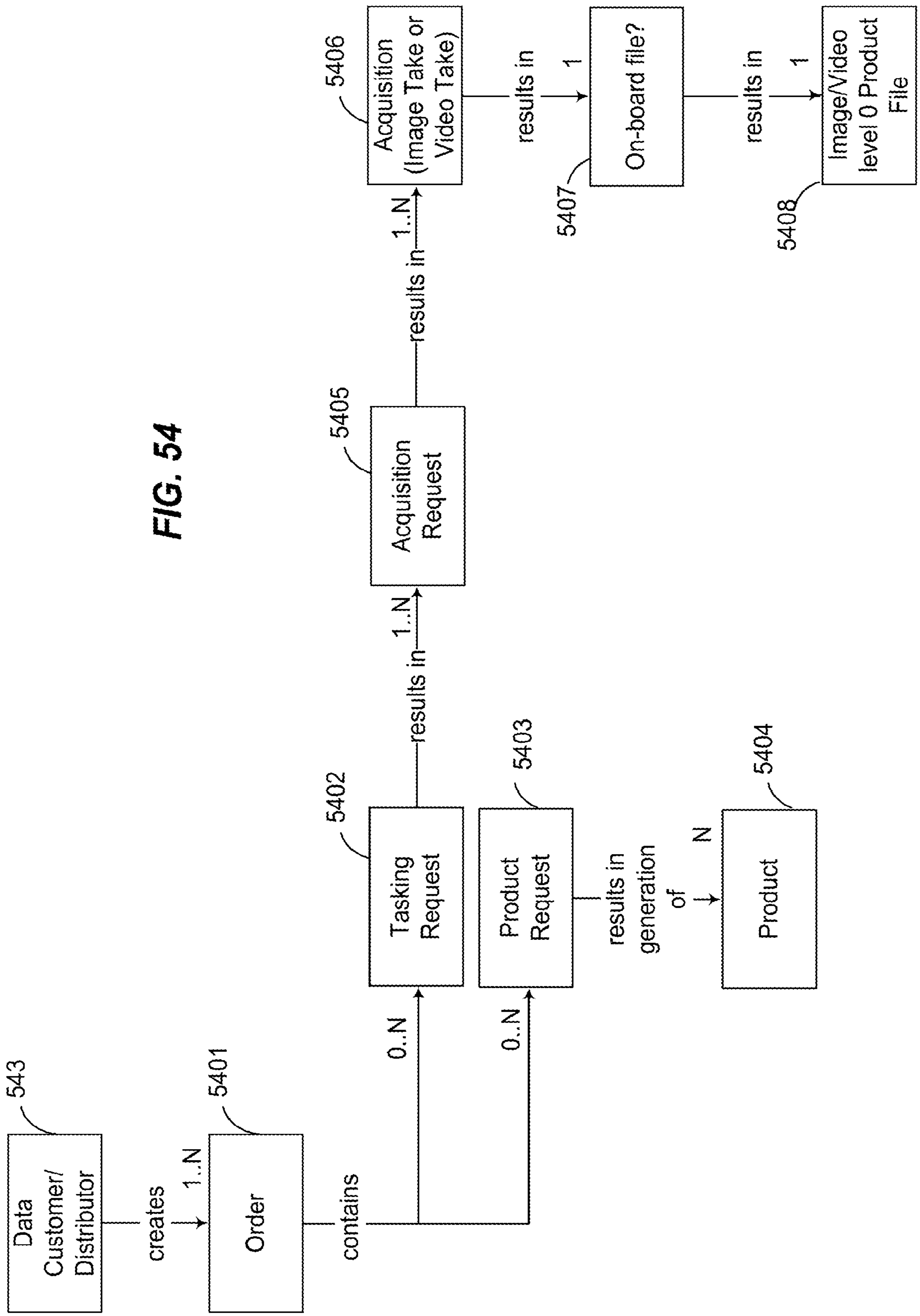
FIG. 54 is an entity relationship diagram related to the ordering process.

Turning to FIG. 54, an entity relationship diagram shows various system entities participating in the ordering process. The customer or distributor 543 creates one or more orders 5401. Each order contains zero to N tasking requests 5402 and zero to N products requests 5403. Each product request results in the generation of 1 to N products 5404. Each tasking request results in 1 to N acquisition requests 5405.

Each acquisition request results in 1 to N acquisitions (e.g. image takes or video takes) 5406. Each acquisition results in an on-board file (e.g. a file on the space segment) 5407. Each on-board file results in an image/video product file of Level 0 5408.

Figure 55:
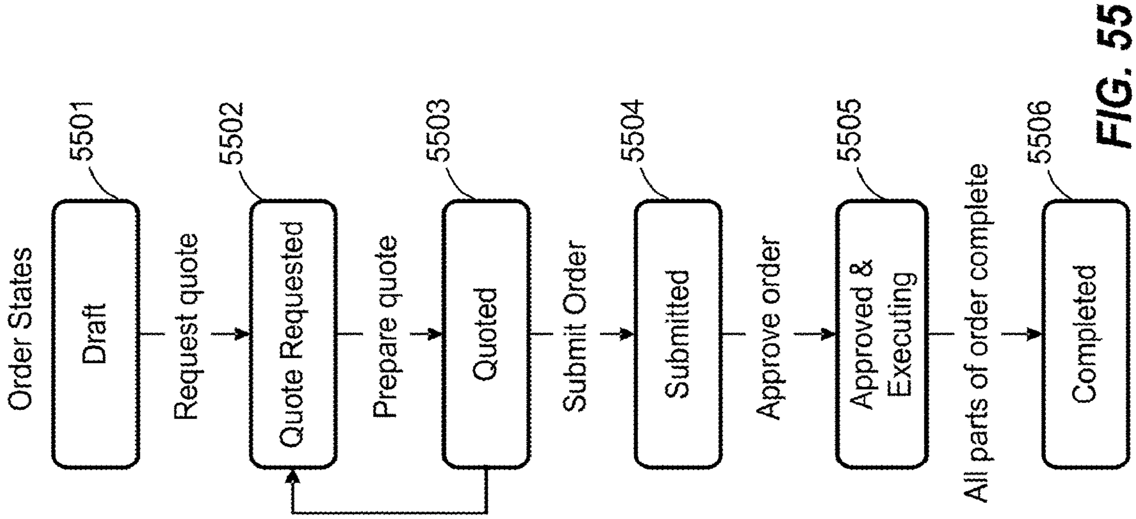
FIG. 55 is a state diagram for an order.

Turning to FIG. 55, an example embodiment of the order states are displayed. The order is initially in a draft state 5501. After requesting the quote, the order transitions to a quoted requested state 5502. After the quote is prepared, the order transitions to a quoted state 5503. After the order is submitted, the order transitions to a submitted state 5504. After the order is approved, the order transitions to an approved and executing state 5505. After all parts of the order are complete, the order transitions to a completed state 5506.

Figure 56:
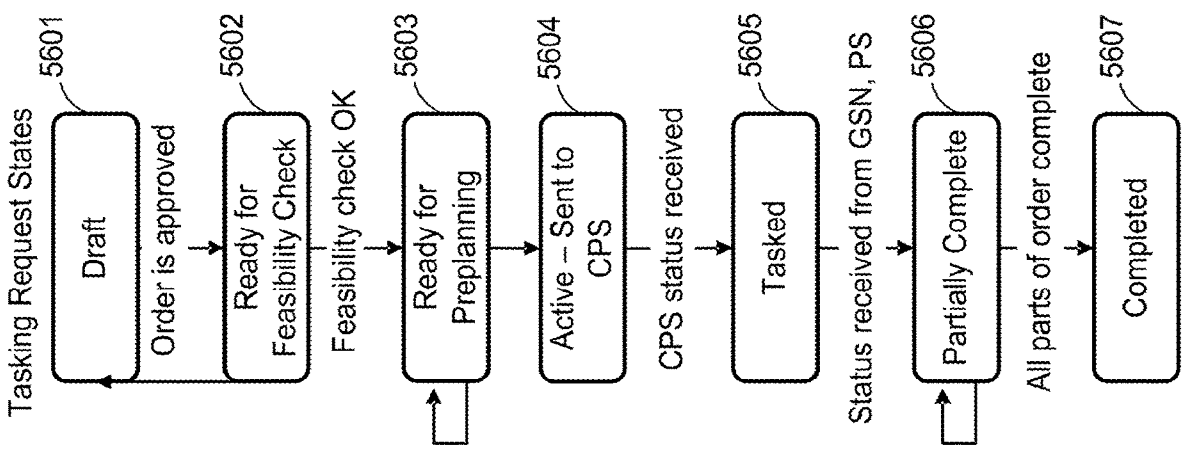
FIG. 56 is a state diagram for a task request.

Turning to FIG. 56, an example embodiment of the tasking request states are displayed. The tasking request is initially in a draft state 5601. After the order is approved, the tasking request transitions to a state ready for feasibility check 5602. If the feasibility check succeeds, the request transitions to a preplanning state 5603, before moving to an active state 5604. In the active state, the taking request is sent to the CPS. After the CPS status is received, the tasking request transitions to a tasked state 5605. After receiving a status update about the task from the GSN and Processing System, the request transitions to a partially complete state 5605. After all parts of the order are complete, the request transitions to a completed state 5607.

Figure 57:
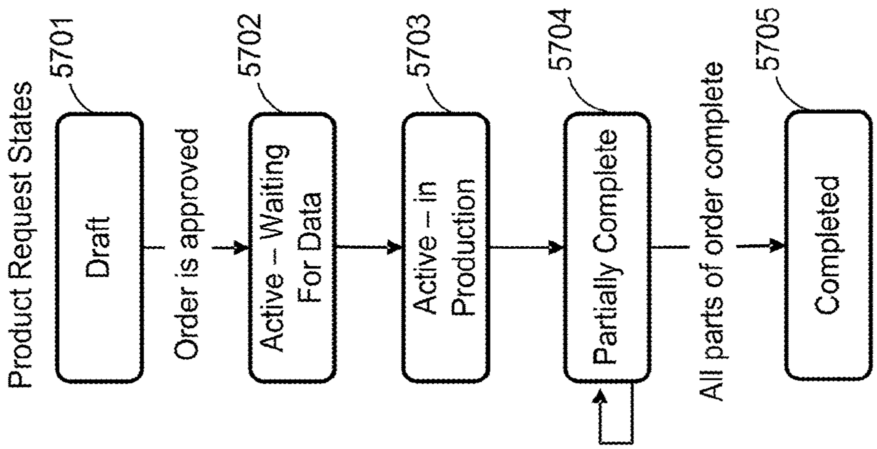
FIG. 57 is a state diagram for a product request.

Turning to FIG. 57, an example embodiment of the product request states are displayed. Initially, the product request is in a draft state 5701 and, when the order is approved, the product request transitions to an active state 5702, which includes waiting for data. The request then transitions to another active state, indicating the product is in production 5703. The product request then transitions to a partially complete state 5704. After all parts of the order are complete, the product request transitions to a completed state 5705.

In another aspect of the ordering process, the Web platform 524 collects inputs from the public users 54. The number of inputs could be in the many thousands. The inputs are filtered by a combination of automatic means to arrive at a shorter list of specific requests that will be turned into orders. The algorithms to be employed to select orders from the public consider various factors, including popularity voting, lottery, rewards for activity, etc.

For example, the Web platform 524 is configured to receive votes for areas of interest over which the space segment will collect imagery data. Areas with the most votes are selected for imaging.

In another example for selecting an order, a public user who has gained a online status above a certain threshold (e.g. absolute or relative threshold) is granted access by Web platform 524 or the OMS 514, or both, to put in a specific collection request. For example by earning a sufficient number of reward points for interactions with the Web platform, the status of a particular user increases.

In another example for selecting an order, potential collection opportunities are presented to public users and are auctioned to the highest bidder.

Figure 58:
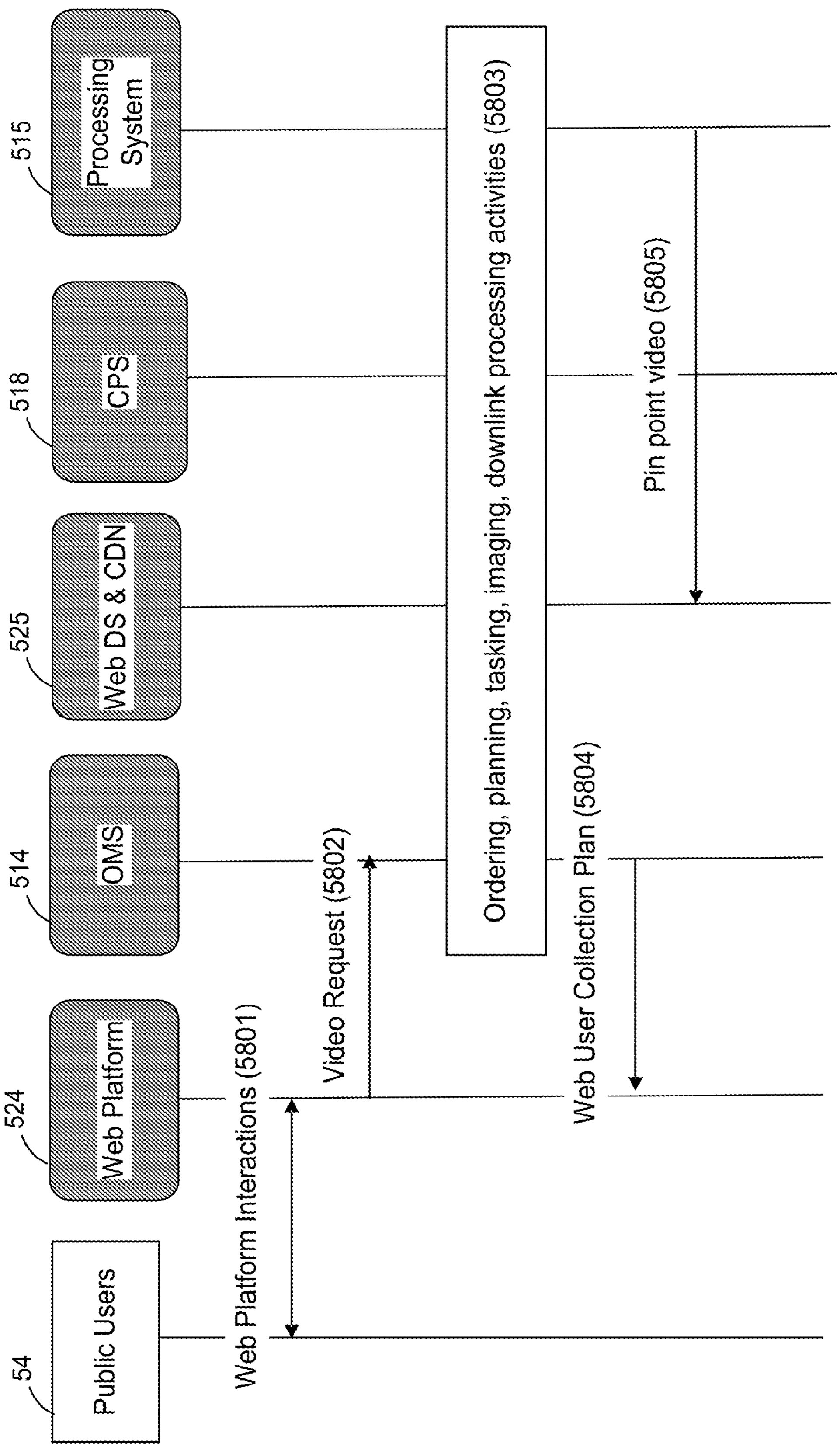
FIG. 58 is a flow diagram illustrating example computer executable or processor implemented instructions for a public user ordering new data.

Turning to FIG. 58, example computer executable instructions are shown for a public user ordering new data. A public user, or multiple public users, engage the Web platform to order new data 5801. The Web platform sends a video request or image request to the OMS 5802. The processes of ordering, planning, tasking, imaging, downlinking, and processing are performed to obtain the requested video or image 5803. The planning may include the OMS sending a collection plan to the Web platform, which can be viewed by the public user 5804. After processing the data, in the case of video, the Processing System sends pin point video data to the Web DS and CDN 5805. The user then obtains the requested video.

Figure 59:
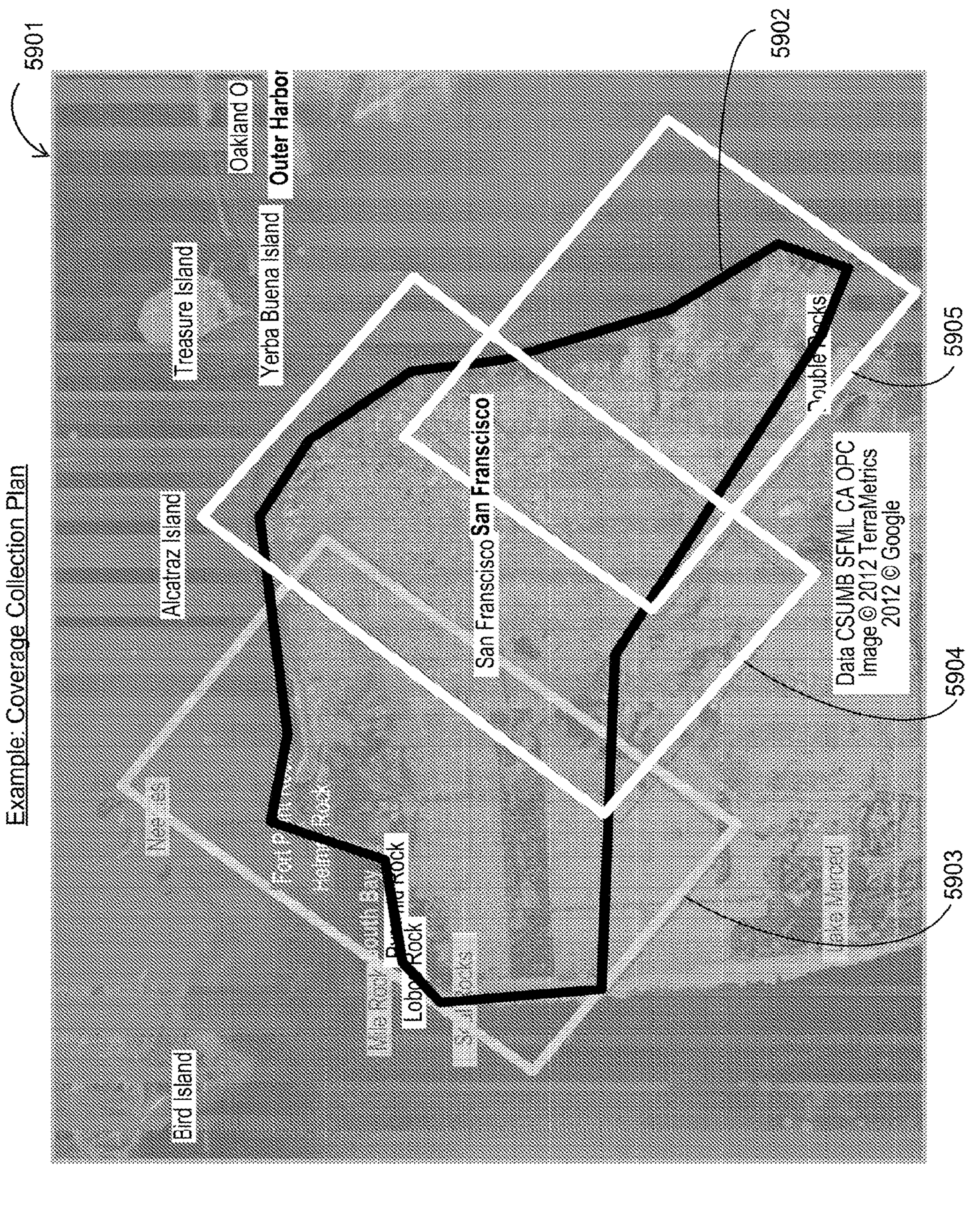
FIG. 59 is an illustration of an example coverage collection plan.

Turning to FIG. 59, the map 5901 shows an example of a coverage collection plan. The desired region to be imaged by a customer is outlined by the boundary line 5902. The image or video collection areas (e.g. rectangles 5903, 5904, and 5905) are then overlaid the region 5902. The customer purchases each of the collection areas 5903, 5904 and 5905.

As noted above, users may browse a catalogue database through the Web platform to search for raw image data and raw video data. In an example embodiment, a GUI, separate from the Web platform for public users, is provided for customers to view the catalogue. In an example embodiment, the catalogue displays everything that is available for retrieval or purchase.

The catalogue system provides a Web accessible interface that allows users to search/browse for raw image data (e.g. each dataset corresponds to one MR Image Take) and raw video data (e.g. each dataset corresponds to one HR Video Take).

The catalogue system can be searched by several criteria. Non-limiting example search criteria include: geographic area (e.g. either polygon or screen extent; the polygon inputted by the user via a GUI); a time range; a specific camera; incidence elevation angle; sun elevation angle; compression ratio; and other data.

The catalogue system's GUI is configured to display a geographic view of footprints of datasets on a world map, and optionally also browse imagery overlaid on the map. The GUI is also configured to allow a user to browse images and to display a tabular view of datasets that match the search criteria. The GUI also displays a listing of all metadata for datasets as they are selected by the user. The GUI is also configured to receive user input selections for user desired datasets, and is further configured to save the list of user selected datasets for later use outside of the catalogue, for example placing an order with the OMS 514.

User Interfaces

Figure 60:
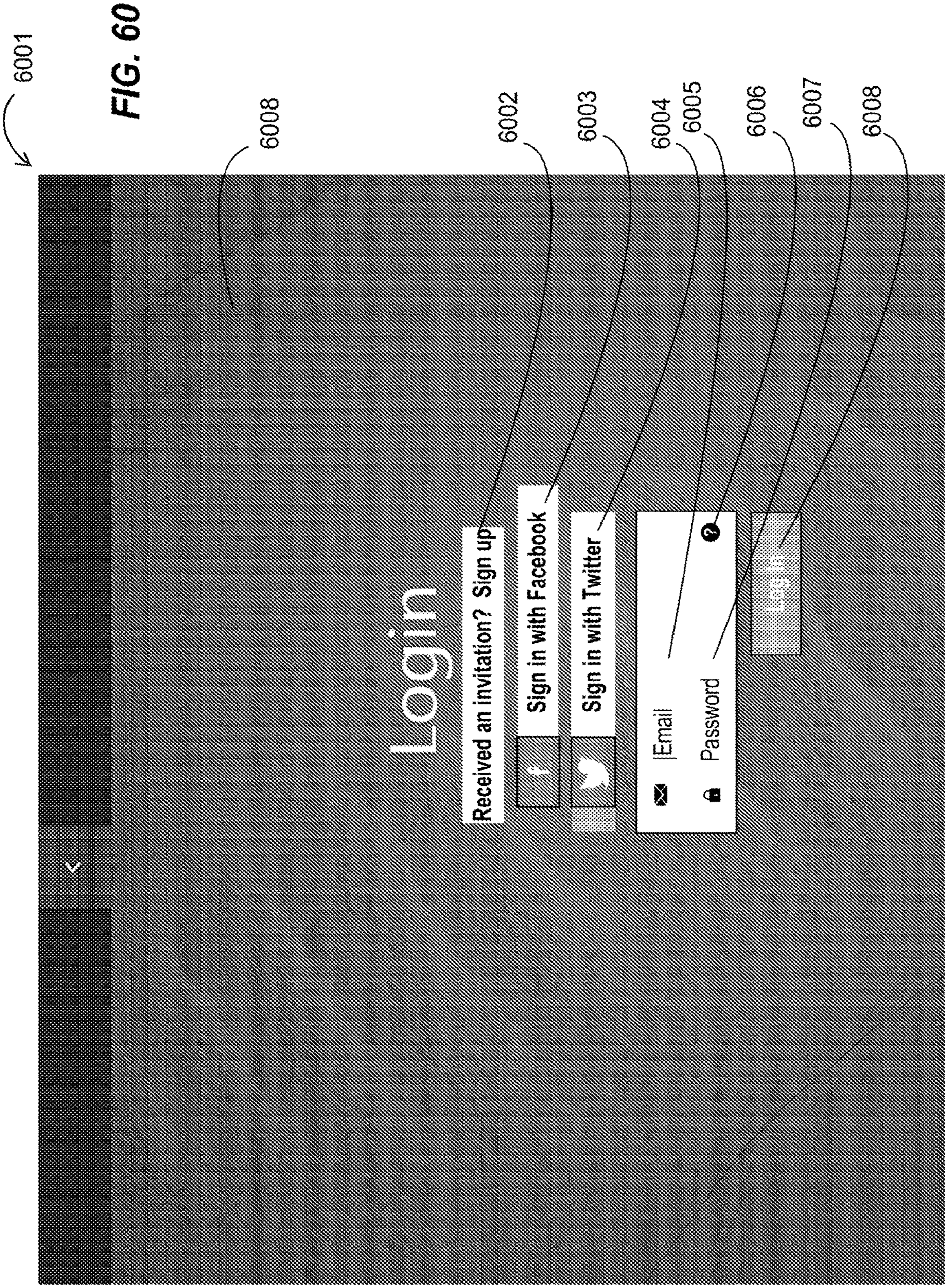
FIG. 60 is an example of a login GUI displayed by the Earth observation system.

Turning to FIG. 60, an example GUI 6001 of a login page is presented. The login page is used to login into the Web platform 524. The background 6008 of the login page includes streaming video captured from the spacecraft 100. The streaming video may be live, or may be significantly delayed. In an example embodiment, the streaming video in the background is representative of the current location that the spacecraft is currently or recently imaging. This provides the user with an indication of the location of the spacecraft when viewing the login page.

In another example embodiment, the Web platform identifies the location of the user viewing the login page, for example based on the user device's IP address. The Web platform then displays streaming video that shows the location of the user. The video data may be recent. In this way, the user is engaged with the relevant data on the Web platform even from the login page.

Continuing with FIG. 60, the login page also includes a control 6002 to initiate signing up or establishing a login account. GUI controls 6003 and 6004 initiate a login procedure using social data network platforms. For example, a user can log into the Web platform using their Facebook account or their Twitter account.

The login GUI 6001 also includes text fields 6005 and 6007 to receive the user's email and password. Other types of login identifiers, in alternative or in addition to an email address, may be used. A control 6006 is configured to, when selected by the user, initiate a password recovery process. After the text fields 6005, 6007 have been populated with data, and the user selects the login control 6008, the main Web page is displayed.

Figure 61:
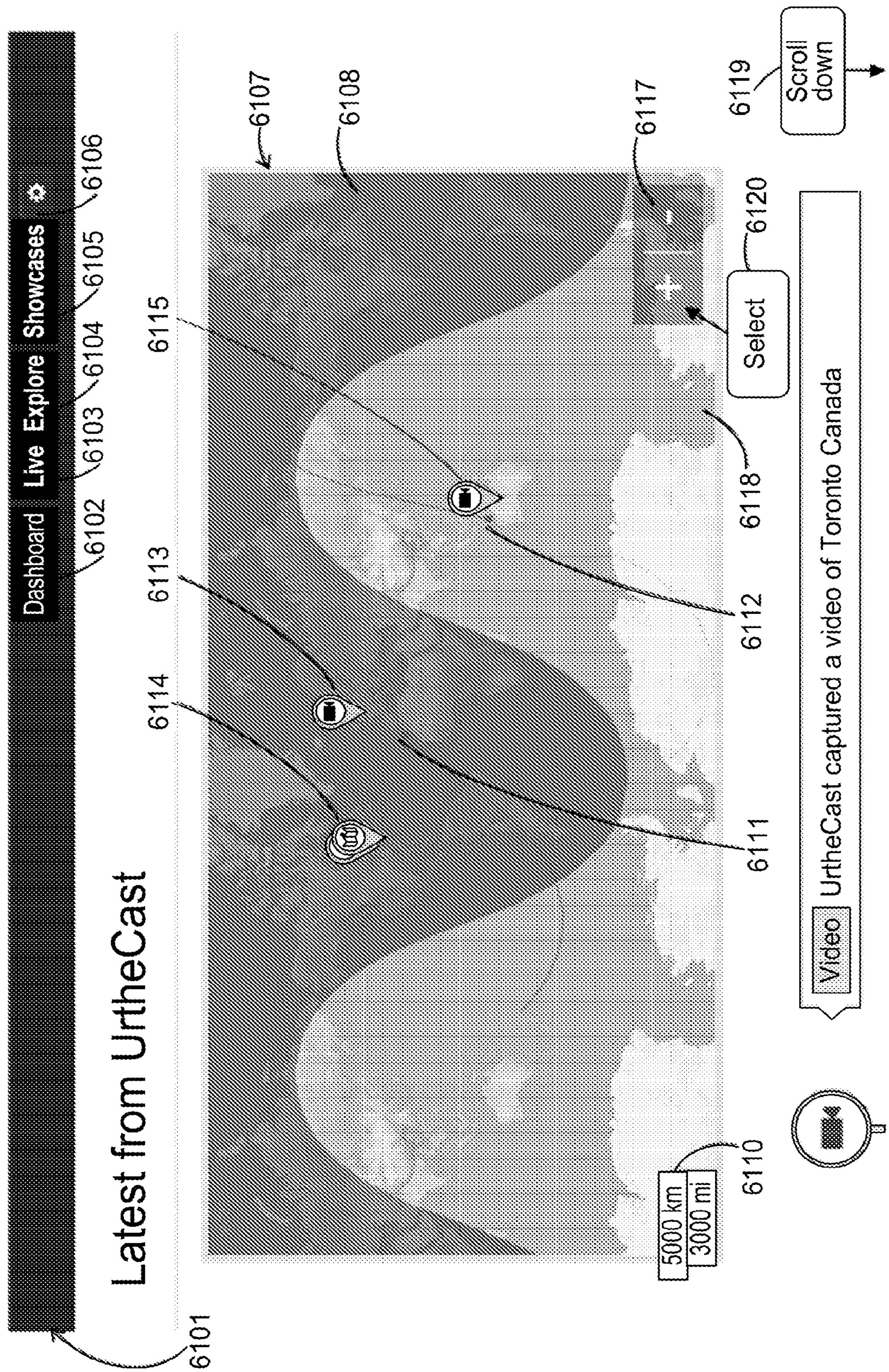
FIGS. 61 to 64 are examples of a dashboard GUI.

Turning to FIG. 61, a dashboard GUI 6101 is displayed. This GUI 6101 is displayed, for example, after logging into the Web platform. The dashboard control 6102 is highlighted, indicating the page being displayed is the dashboard. Control 6103, when selected, causes the Web platform to display the live GUI. Control 6104, when selected, causes the Web platform to display the explore GUI. Control 6105, when selected, causes the Web platform to display the showcases GUI. The control 6106, when selected, causes the Web platform to display a settings GUI.

The dashboard GUI 6101 includes an interactive map display 6107 that shows the current locations 6111 and 6112 of one or more spacecraft, in this case two spacecraft. The orbit paths are also shown, both recently traversed orbits and orbits to be soon traversed by the spacecraft. The map display 6107 also shows pinpoint controls 6114, 6113 and 6115 located on the map. The pinpoint control 6114 indicates imagery was collected at a location in North America. The pinpoint control 6113 indicates that video imagery was obtained for a specific location in Europe. Similarly, pinpoint control 6115 indicates that video imagery was obtained for a specific location in Australia. The pinpoint controls are selectable by a user. When a given pinpoint control is selected, the data associated with the given pinpoint control is displayed.

The interactive map 6107 also shows the current night time regions 6108 of the Earth and the current day time regions 6118. The night regions are displayed with a darker shadow, while the day time regions are displayed more brightly. The interactive map 6107 is continuously updated to show the current location(s) of the spacecraft and the current day and night time zones. Furthermore, as new imagery data or event data is made available, the interactive map 6107 is updated to show new pinpoint controls for the new imagery or event data.

The interactive map 6107 also includes a distance scale 6110 and a zoom in/out control 6117.

Figure 62:
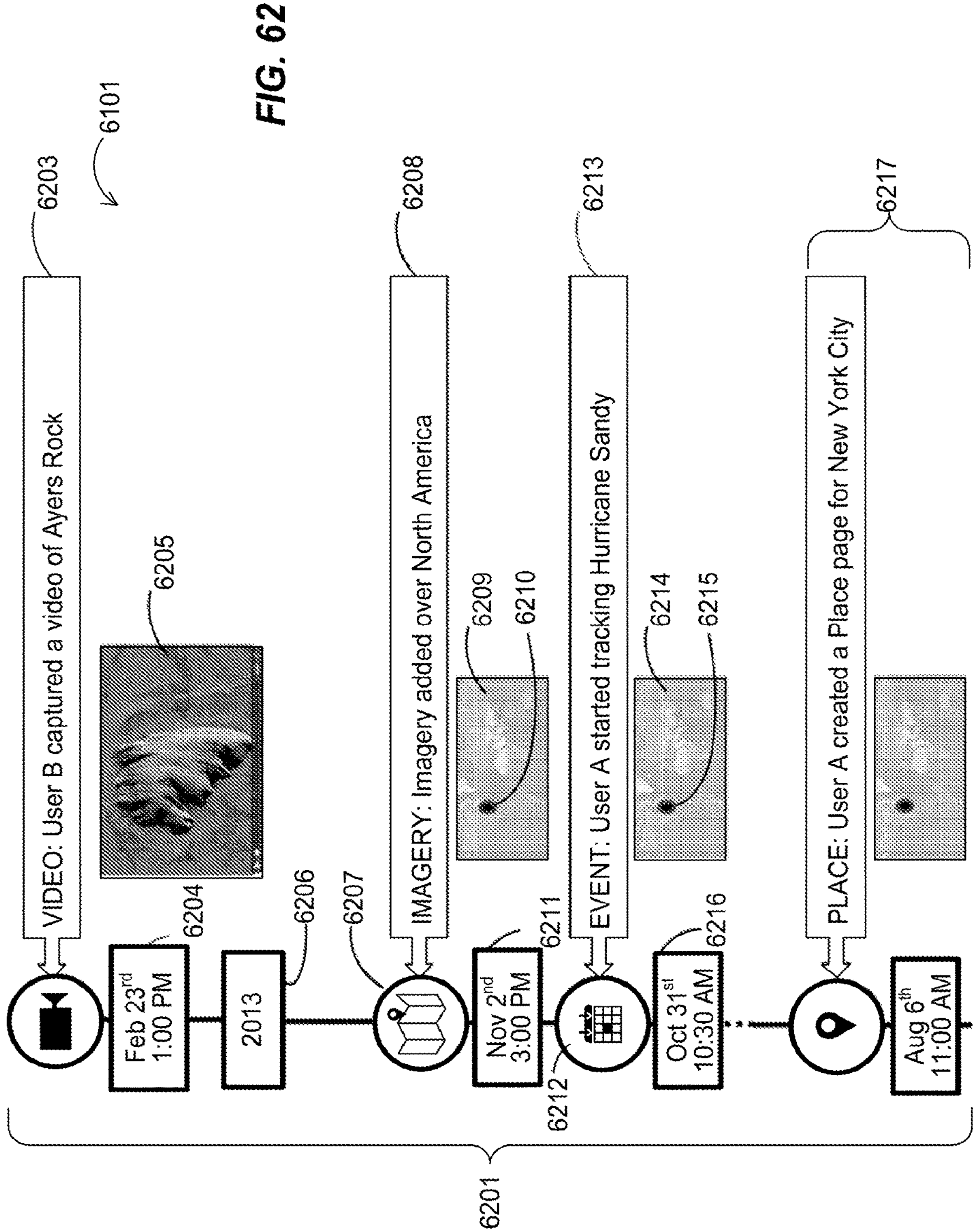

When the user scrolls down 6119 on the dashboard GUI 6101, a timeline 6201 is shown, as per FIG. 62.

In FIG. 62, the timeline 6201, part of the GUI 6101, shows a video icon 6202 indicating that a video was captured. The description of the video 6203 is shown (e.g. User B captured a video of Ayers Rock). The time and data of when the video was captured 6204 is also shown in the timeline. The video itself can be played by selecting the image 6205.

The timeline also includes an indicator of the year 6206. In this example embodiment, the most recent events of the timeline are shown near the top, but can be reversed in another example embodiment.

The timeline also includes an imagery icon 6207, a description of the imagery 6208, and a time and date of when the imagery was acquired 6211. A map 6209 is displayed in associated with the imagery icon 6207, and the map 6209 includes a marker 6210 that indicates the location of the image on the Earth.

The timeline also includes an event icon 6212, a description of the event 6213, and the time and date 6216 of the event. A map 6214 displayed in association with the event icon 6212 includes a marker 6215 showing the location of the event on the Earth.

Another set of data 6217 specific to a place is also included on the timeline. It can be appreciated that many instances of events, video, imagery, places, and other types of data can be shown on the timeline.

Returning back to FIG. 61, if Web platform detects that a user has selected 6120 the control 6117 to zoom in on the interactive map 6107, the Web platform then increases the resolution of the interactive map 6107. A zoomed-in example of the map 6107 is displayed in FIG. 63.

Figure 63:
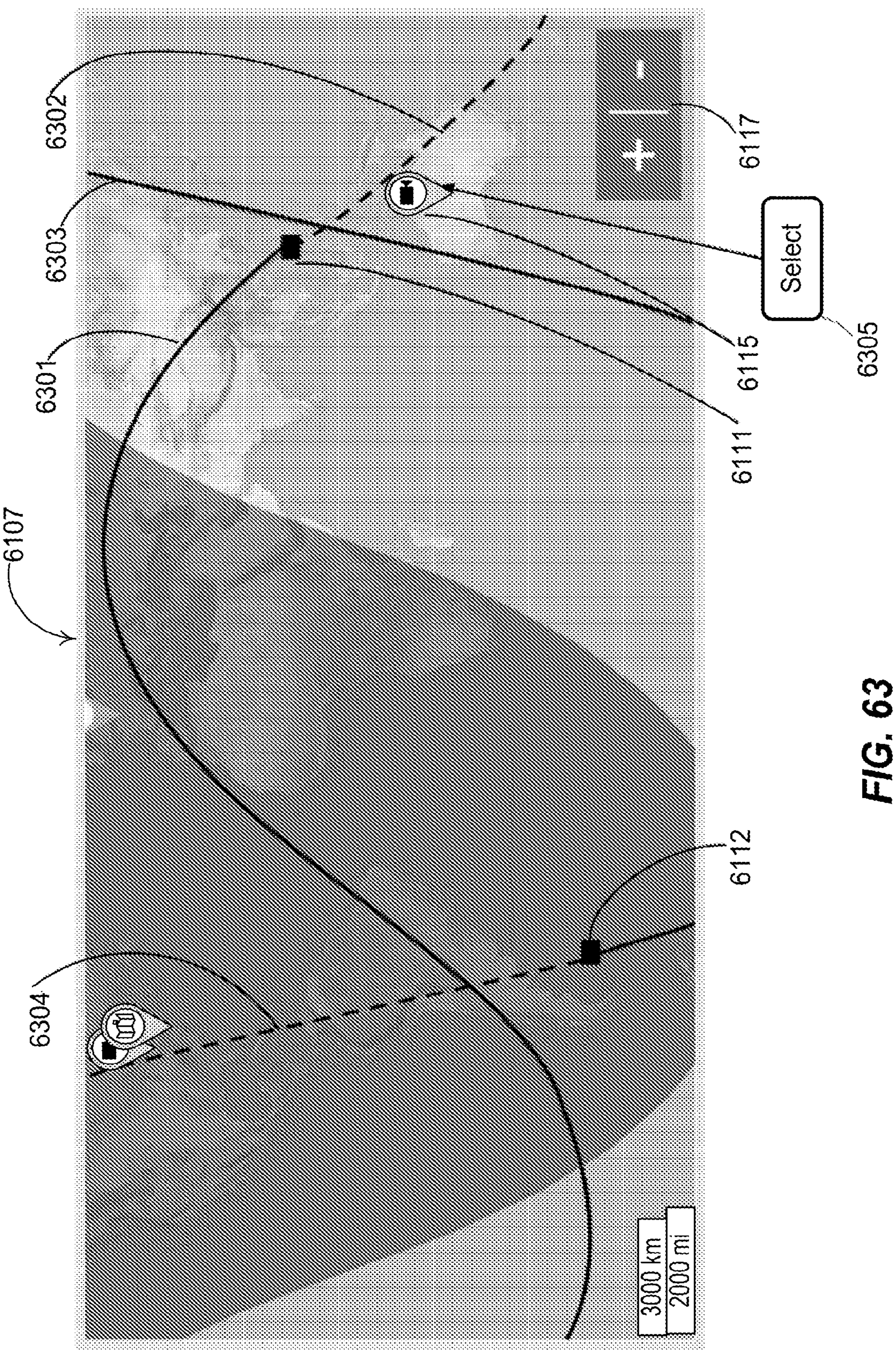

Turning to FIG. 63, the position 6112 of a spacecraft is displayed. The solid line 6303 shows the orbit path that was already travelled by the same spacecraft, while the dotted line 6304 shows the path of the same spacecraft that will be soon travelled. A user can use this predicted orbit path to determine when and where the spacecraft will be, and can schedule when images or video will be taken.

Similarly, the position of the other spacecraft 6111 is displayed. The already travelled orbit path of this other spacecraft is shown by the solid line 6301 and the orbit path to be travelled is shown by the dotted line 6302. It can be appreciated that, by displaying where a spacecraft has recently travelled, a user can determine where and when recent images have been acquired by the spacecraft.

Figure 64:
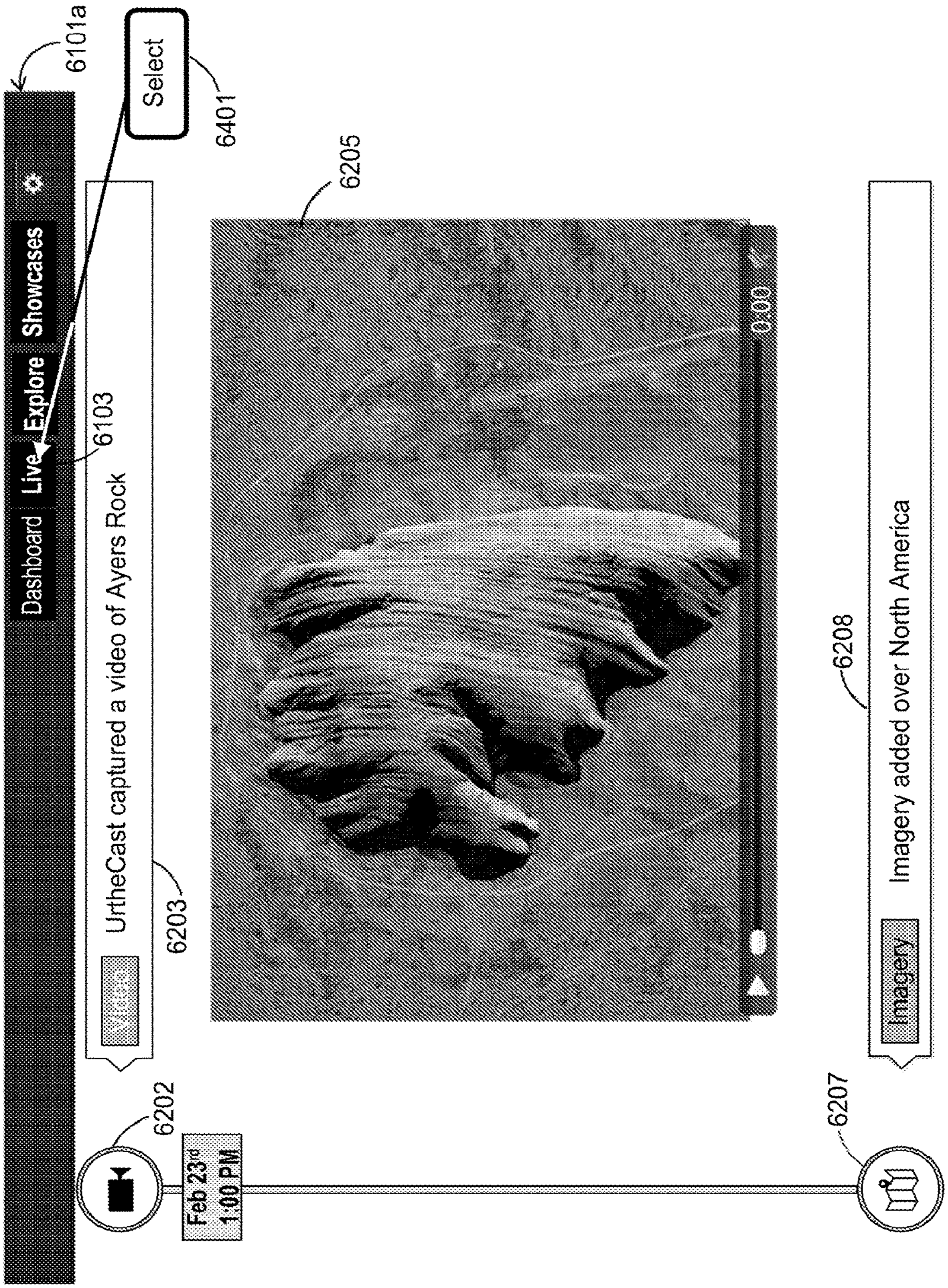

When the Web platform detects a user input 6305 selecting the pinpoint control 6115, the Web platform displays the data associated with the pinpoint control 6115, which is shown on the timeline 6201. Turning to FIG. 64, the relevant portion of the timeline is shown, which displays the data associated with the pinpoint control 6115.

In FIG. 64, the video icon 6202 and the related data of Ayers Rock in Australia is displayed.

Figure 65:
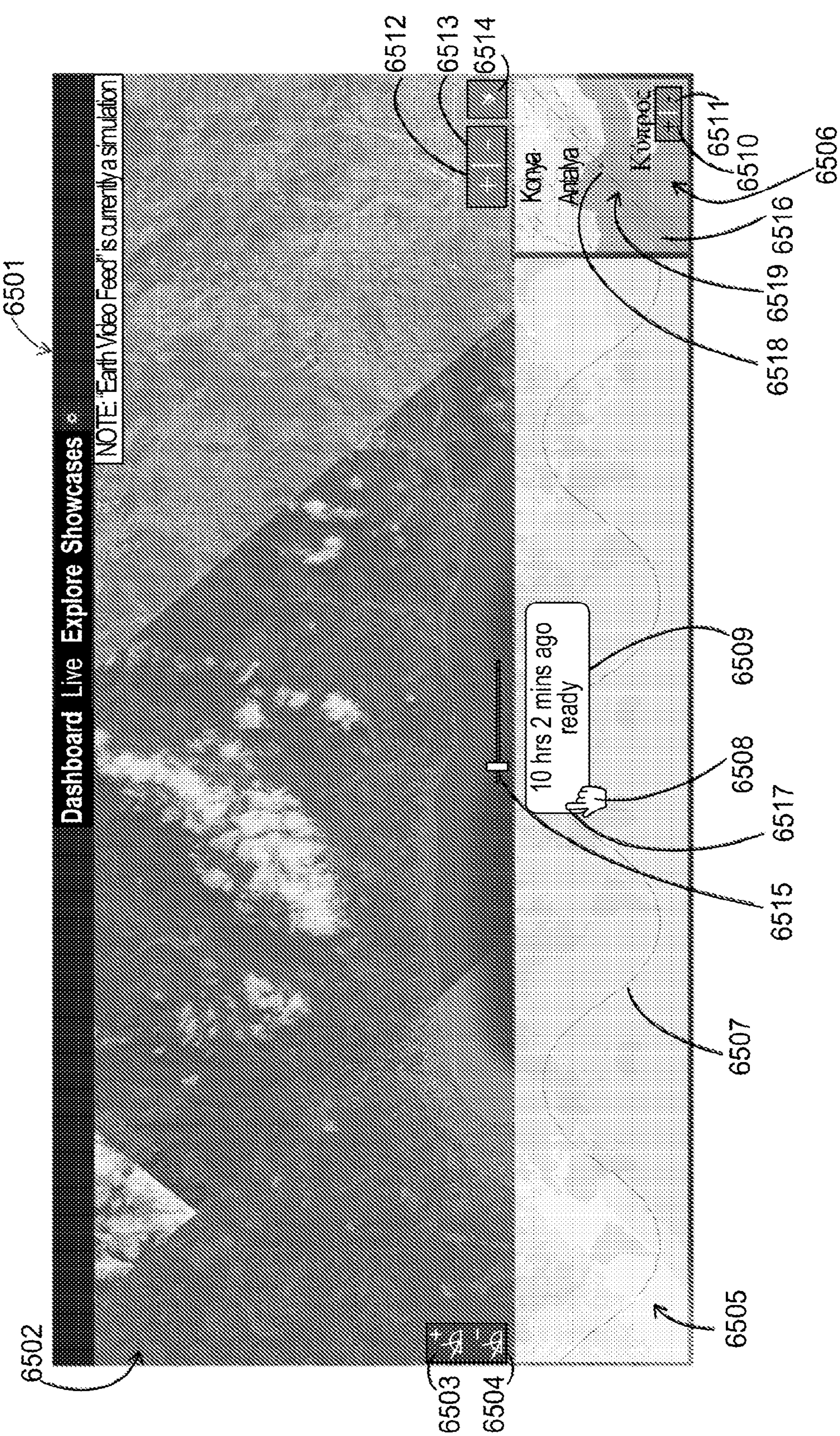
FIGS. 65 to 69 are examples of a live GUI.

When the Web platform detects a user input 6401 selecting the live control 6103, the Web platform displays the live GUI, such as shown in FIG. 65.

Turning to FIG. 65, the live GUI 6501 displays streaming video 6502 collected from the spacecraft 100. The streaming video may be live, in other words, near or almost current to the spacecraft's current captured images or video. The video may be a compilation of images obtained from the MRC. In another example embodiment, the video data being streamed is captured by the HRC.

In another example embodiment, the GUI 6501 includes various controls to allow the user to view past streaming imagery.

The streaming video section 6502 includes control 6503 and 6504 to increase and decrease the zenith viewing angle of the Earth. Controls 6512 and 6513 may be used to increase and decrease the zoom setting of the streaming video. Control 6514 is used to collapse the secondary interactive maps 6505 and 6506, thereby increasing the available space for displaying the streaming video section 6502. The same control 6514 can be used to restore the display of the secondary interactive maps 6505 and 6506, as currently shown in FIG. 65. The speed control 3515 is used to control how fast the video imagery is displayed (e.g. the playback rate).

The extended secondary interactive map 6505 shows the orbit path of the spacecraft over many orbital cycles around the Earth. This is like a timeline. The map 6505 shows the map of the Earth, but linearly repeated as a pattern. This shows the repeated orbiting path of the spacecraft around the Earth. The position of the spacecraft 6517 in relation to the orbit path 6507 is shown, and that position 6517 is associated with the currently displayed video image 6502. When a user moves a pointer 6508 or selects the position 6517, a pop-up message 6509 is displayed indicating the time of when the video image was collected. The time may be an absolute time, or may be a relative time indicating how long ago from the current time the image was collected. In the example in FIG. 65, the displayed image 6502 was obtained 10 hours and 2 minutes ago, from the current time.

The localized secondary interactive map 6506 shows a zoomed-in view of the position of the spacecraft 6518 along the orbit path 6515. A band 6519 encompassing the orbit path 6515 is also displayed. The band 6519 shows the width of the imagery captured by the spacecraft. The controls 6510 and 6511 can be used to zoom in and out of the localized secondary interactive map.

It will be appreciated that the location of the spacecraft in the secondary interactive maps 6505 and 6506 is continuously updated as the spacecraft moves along the orbit path. At the same time, the streaming video 6502 is continuously updated to reflect or match the position of the spacecraft. In other words, the streaming video shows what is being viewed by a camera on the moving spacecraft, and the location of the moving spacecraft is correspondingly being continuously updated in the secondary interactive maps 6505 and 6506.

Figure 66:
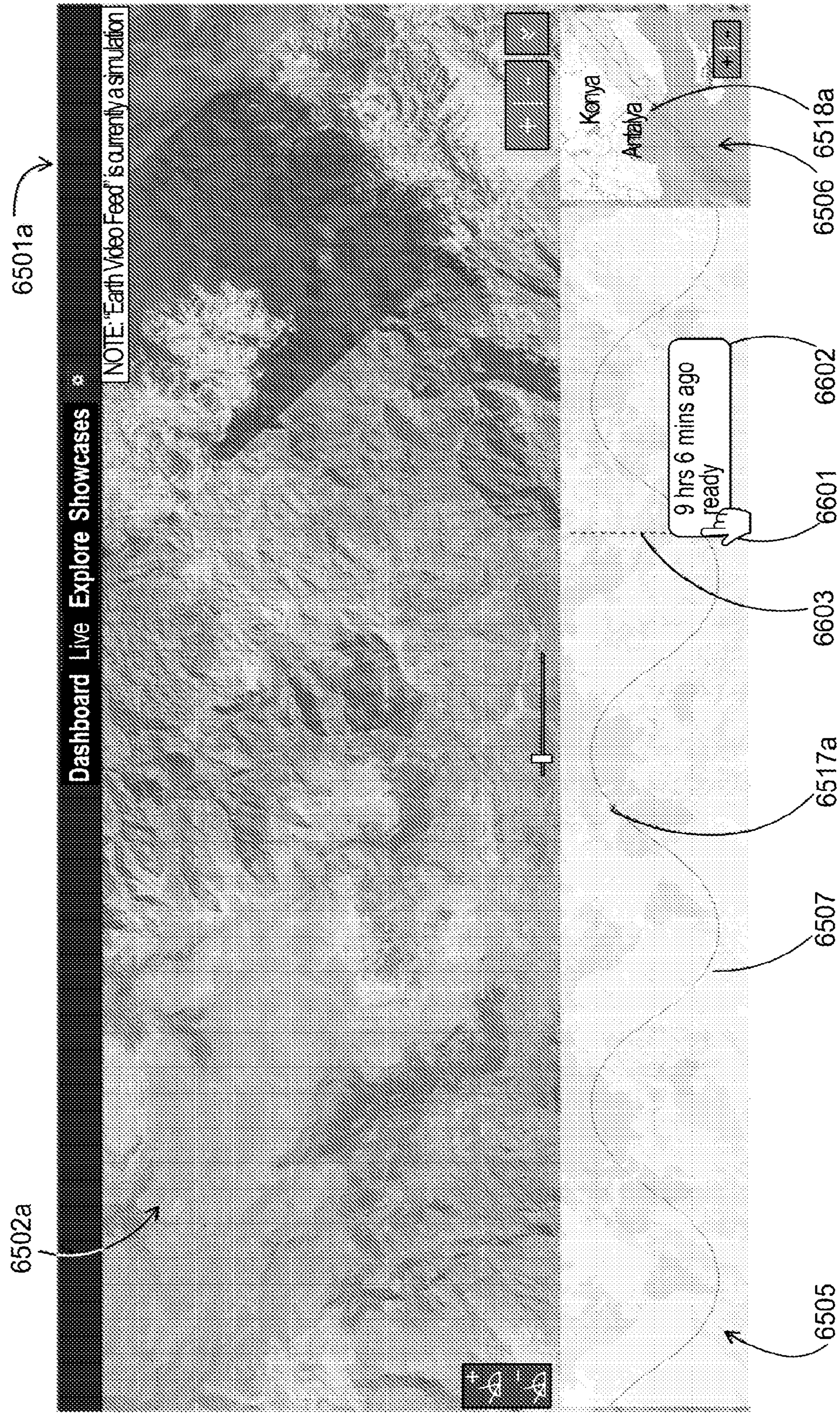

Turning to FIG. 66, the same GUI 6501 is shown but at some later time, and thus is referenced with the same numeral having the suffix 'a', i.e. the numeral 6501*a*. A different instance or image of the same streaming video 6502, and is thus referenced with the same numeral having the suffix 'a', i.e. 6502*a*. The different instance of the image 6502*a* corresponds with the new position 6517*a* of the spacecraft shown in the extended secondary interactive map 6505 and the new position 6518*a* in the local secondary map 6506.

When the Web platform detects that the user has selected or positioned a pointer over another location 6601 on the orbit path 6507, the Web platform displays a line 6603 indicating the cross section in time of the orbit. The Web platform also displays a pop-up message 6602 indicating that at that other location 6601 of the orbit, imagery was captured at a certain time (e.g. 9 hours and 6 minutes ago from the current time), and provides a status regarding the imagery. In the example in FIG. 66, the status for the imagery is "ready".

It will be appreciated that selecting the position 6601 will cause the GUI 6501 to display video imagery at that position and time along the orbit 6507, and the location of the spacecraft along the orbit pat 6507 will move to the position 6601.

Figure 67:
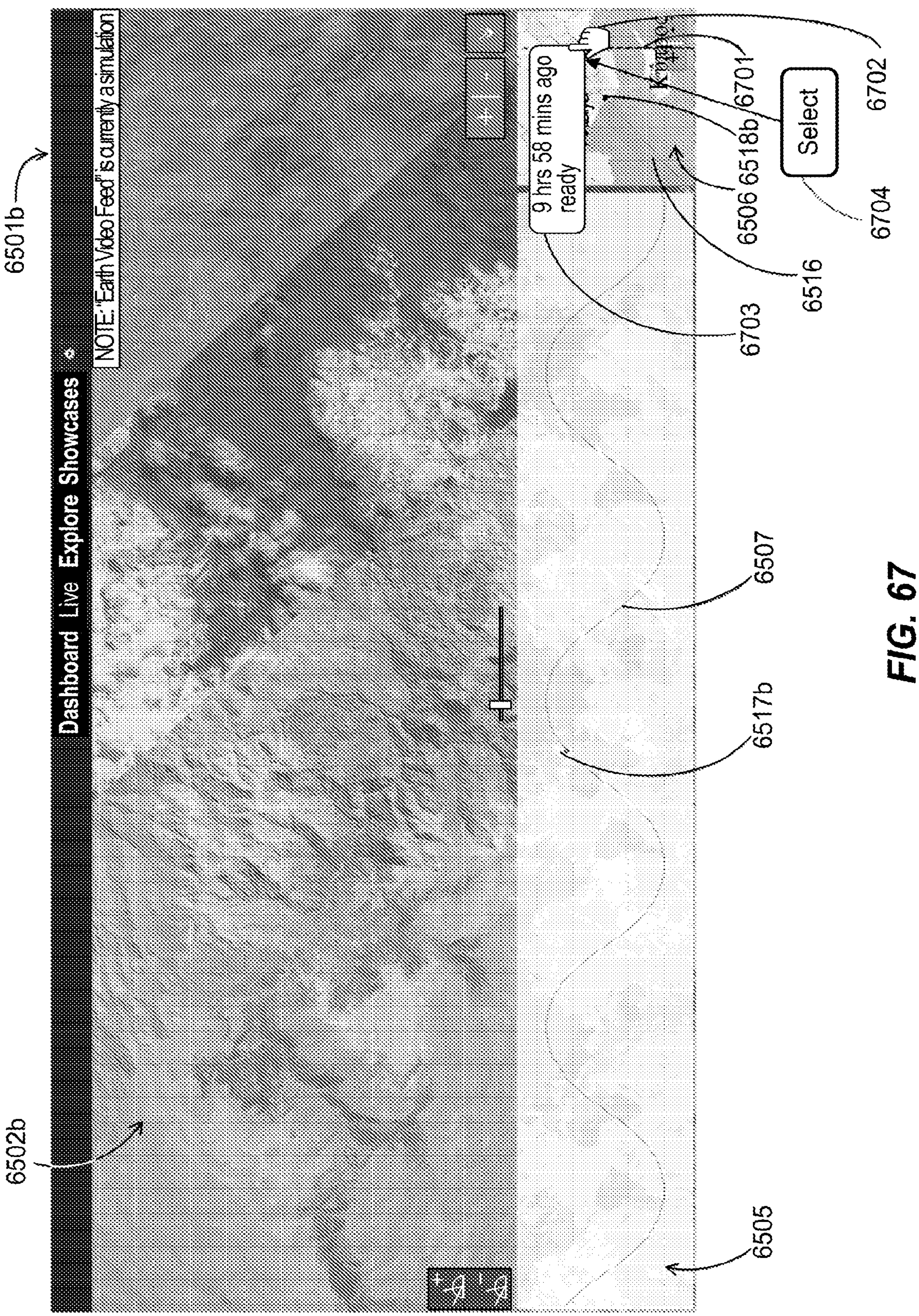

Turning to FIG. 67, another instance of the live GUI 6501*b* is shown, including another streaming video instance 6502*b*, another corresponding location instance 6517*b* of the spacecraft in the map 6505, and another corresponding location instance 6518*b* in the map 6506.

When the Web platform detects that the user has selected or positioned a pointer over another location 6702 on the orbit path 6516 in the local secondary interactive map 6506, the Web platform displays a line 6701 highlighting the linear position along the orbit 6516. The Web platform also displays a pop-up message 6703 indicating that at that other location 6702 of the orbit, imagery was captured at a certain time (e.g. 9 hours and 58 minutes ago from the current time), and provides a status regarding the imagery. In the example in FIG. 67, the status for the imagery is "ready".

In the example, the Web platform receives a user input selection 6704 with respect to the other position 6702. In response, the Web platform displays the GUI shown in FIG. 68.

Figure 68:
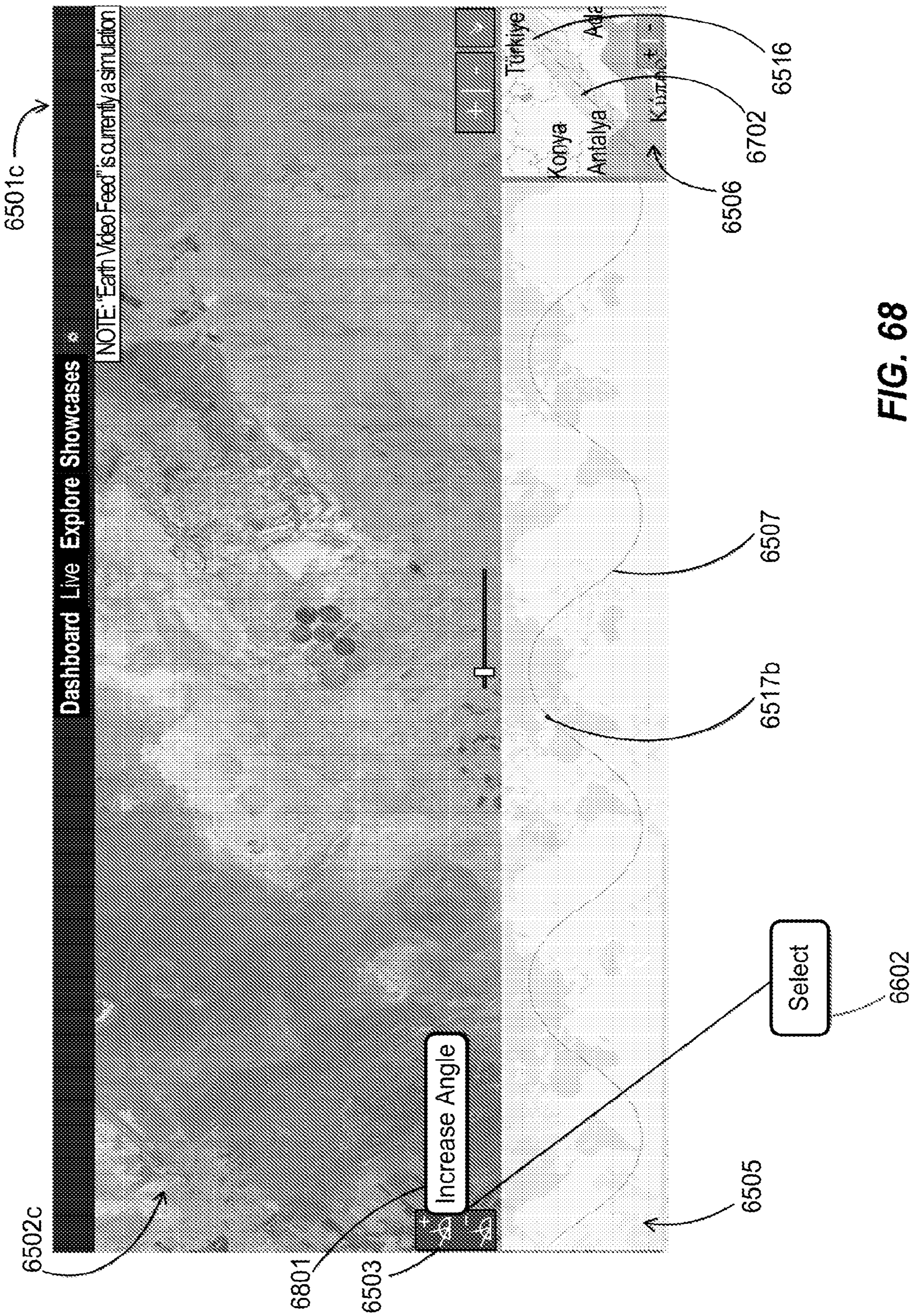

Turning to FIG. 68, another instance of the GUI 6501*c* is shown. The location of the spacecraft in the map 6506 is now located at position 6702, in response to the input 6704 in FIG. 68. The same position 6517*b* is correspondingly shown in the map 6505. The instance of the stream video 6502*c* being displayed corresponds with the time and location of the spacecraft shown in the secondary maps 6505 and 6506.

It can be appreciated that the interactive secondary maps 6505 and 6506 are configured to allow a user to control the display of streaming video be selecting a location and a time along the orbit.

When the Web platform detects that the user has selected or hovered over the control 6503 to increase the elevation viewing angle, the pop-up message 6801 is displayed indicating the action to increase the zenith viewing angle. After detecting the user input selection 6602, the GUI in FIG. 69 is shown.

Figure 69:
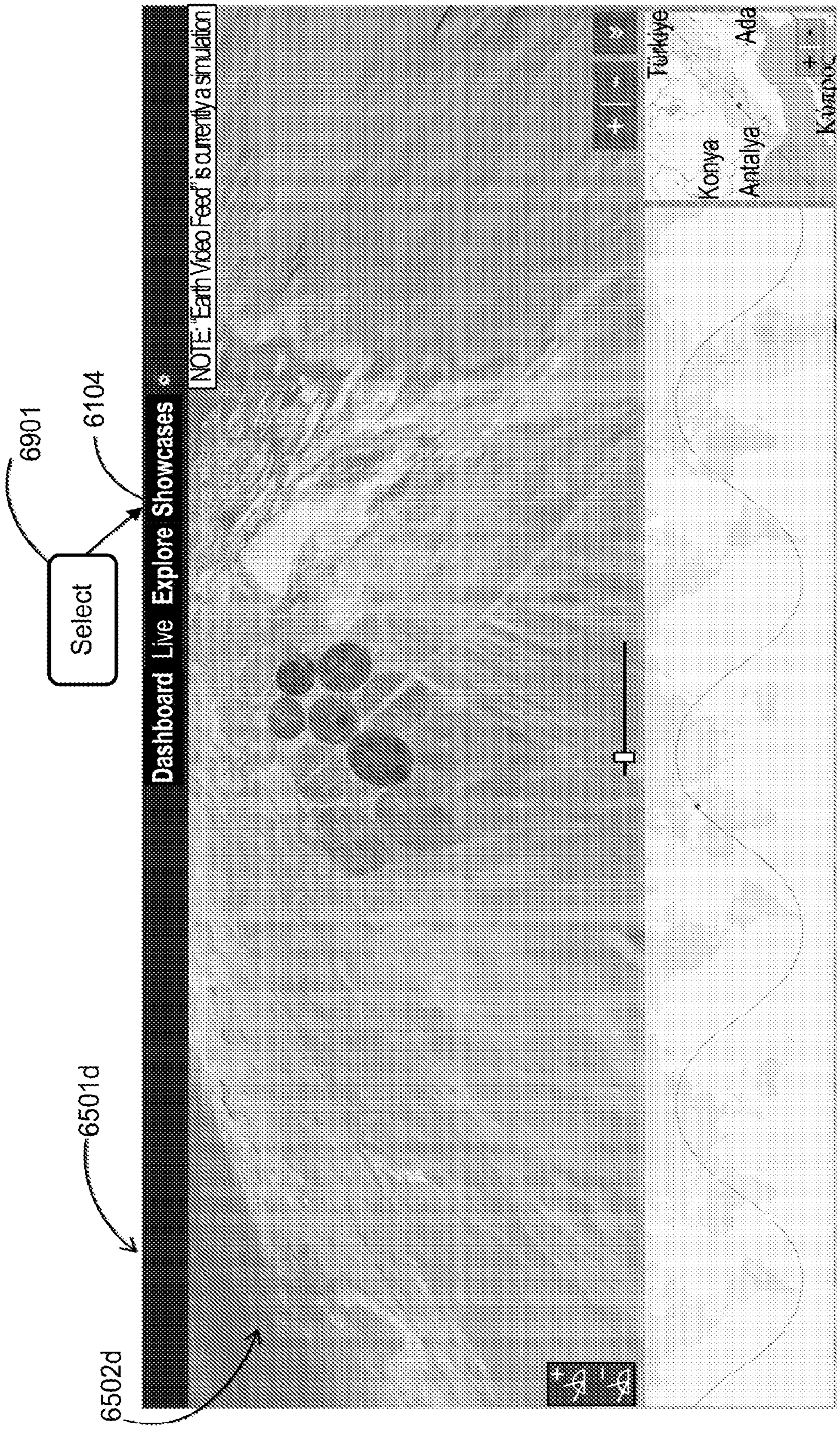

In FIG. 69, which is a continuation of FIG. 69, the GUI 6501*d* shows the streaming video image 6502*d* of the Earth's surface, but at an increased zenith viewing angle.

Figure 70:
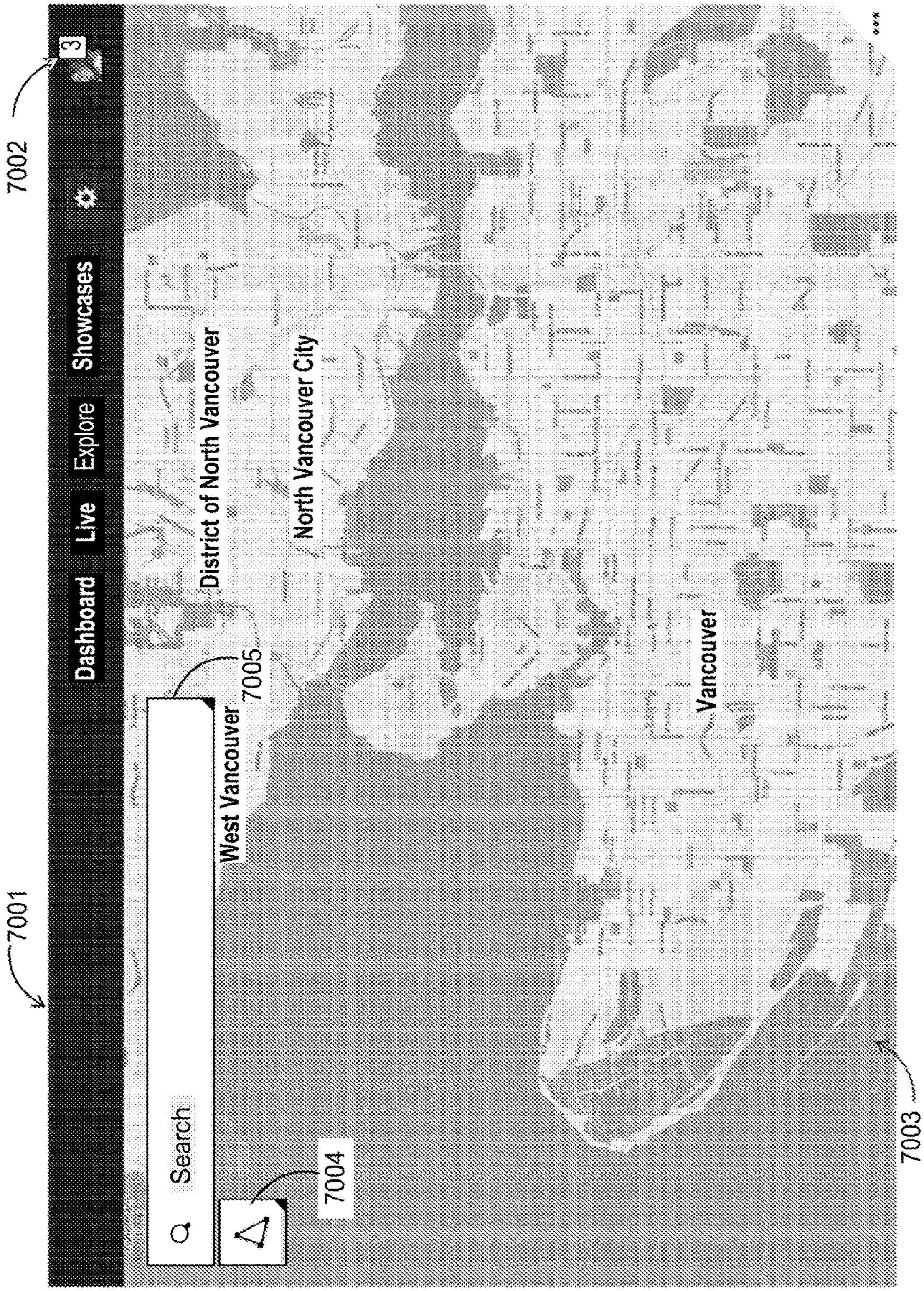
FIGS. 70 to 76 are examples of an explore GUI.

After the Web platform detects the selection input 6901 with respect to the explore control 6104, the GUI in FIG. 70 is shown.

In FIG. 70, the explore GUI 7001 is displayed. The GUI includes an indicator 7002 showing the number of messages waiting for the user. The GUI show the map 7003 of an area of the Earth. In an example embodiment, the initial location of the map being displayed is the estimated location of the user (e.g. as determined by IP address, GPS, or other positioning services). The GUI 7001 also includes a text field 7005 to enter in search terms. A polygon tool 7004 is also included.

For the polygon tool, the user can selected several points to create a polygon area over a section of the map. The Web platform then searches for images, data, and events located within the polygon map. The polygon tool therefore provides an intuitive and visual way to search a map, even if the name of a place is not known or is not provided.

Figure 71:
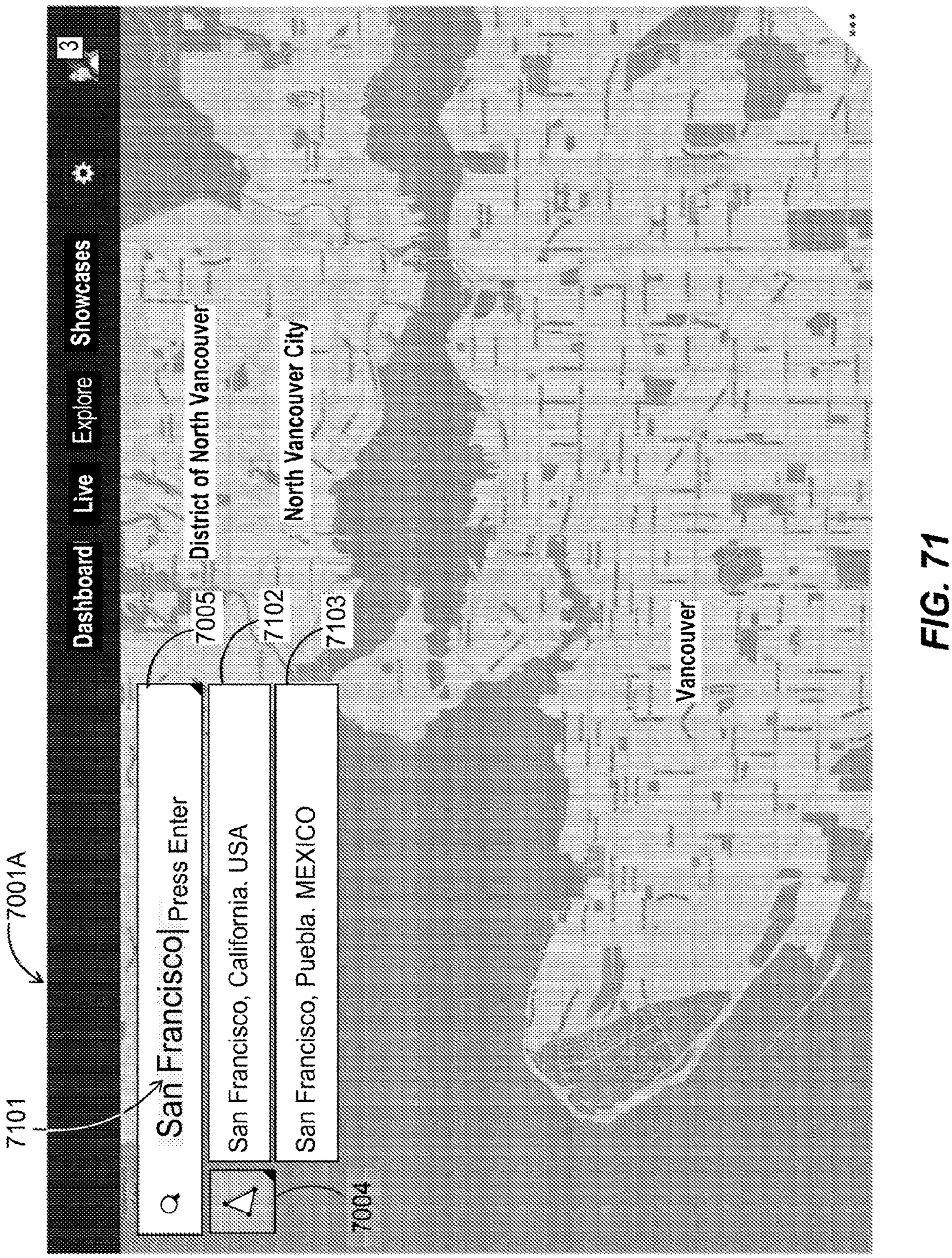

Turning to FIG. 71, another instance of the GUI 7001*a* is shown, and the user has entered in a search term 7101 (e.g. San Francisco) into the search field 7005. Recommendations 7102 and 7103 of different locations are provided. As the text search is being engaged by the user, the icon for the polygon tool 7004 is greyed out.

Figure 72:
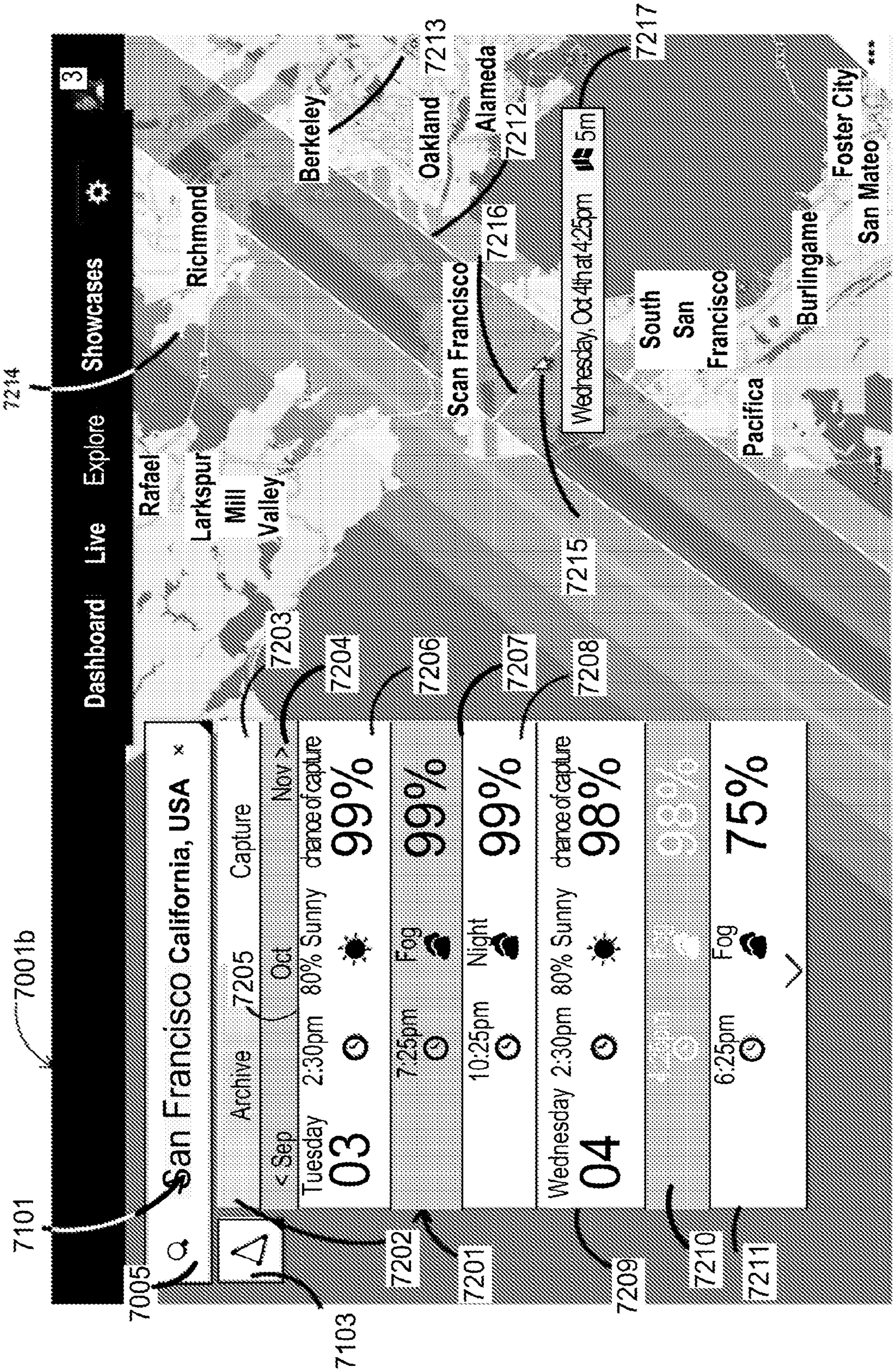

Turning to FIG. 72, continued from FIG. 71, another instance of the GUI 7001*b* is shown, where the user has selected the city San Francisco, California, USA as the search term. Consequently, a capture schedule 7201 is shown. The capture tab 7203 is highlighted as the capture schedule is shown. The archive tab 7202 is also shown, and when selected, will show archived image or video data, or both, for the searched place (e.g. San Francisco, USA).

The capture schedule 7201 show the date, time, weather forecast and/or illumination information for upcoming image captures for the searched city of San Francisco, USA. The schedule also shows the estimated percentage (%) chance that the image will be captured. This information is based the predicted orbit path of the spacecraft, and the weather forecast associated with the positions and times of the spacecraft. The user can scroll through the dates using the controls 7204.

In particular, the example capture schedule shows an entry 7204 that on Tuesday, October 3rd, the spacecraft will capture an image of San Francisco at 2:30 pm. The weather at the time will have an 80% chance of being sunny, and there will be a 99% chance of capturing the image. Other entries 7206, 7207, 7208, 7209, 7210, and 7211 show various values for similar types of data.

The GUI 7001*b* also shows several orbit paths 7212, 7213, 7214 that are overlaid the map of San Francisco and the surrounding area. In this example, the user's pointer 7215 is positioned along a certain location 7216 of the orbit path 7212. The location 7216 is visually indicated with a line across the path 7212, and the path 7212 is highlighted as well to visually distinguish itself from other orbit paths. A pop-up box 7212 is also displayed and it includes the message indicating the predicted date and time the spacecraft will be passing over that location 7216 (e.g. Wednesday, October 4th at 4:25 pm). The pop-up box 7212 also includes the resolution of the expected imagery, which in this example indicates a 5 meter resolution. Furthermore, the scheduled imagery corresponding to the user's pointed position 7216 is also highlighted in the capture schedule 7201. In this example, the entry 7210 is highlighted and it indicates the same date and time as the pop-up box 7217, and the entry 7210 further indicates that the weather forecast for that date and time will be foggy. The entry 7210 also indicates a 98% chance that the spacecraft will be able to capture the image. It can be appreciated that this type of GUI can be used to place orders for acquisition requests.

Figure 73:
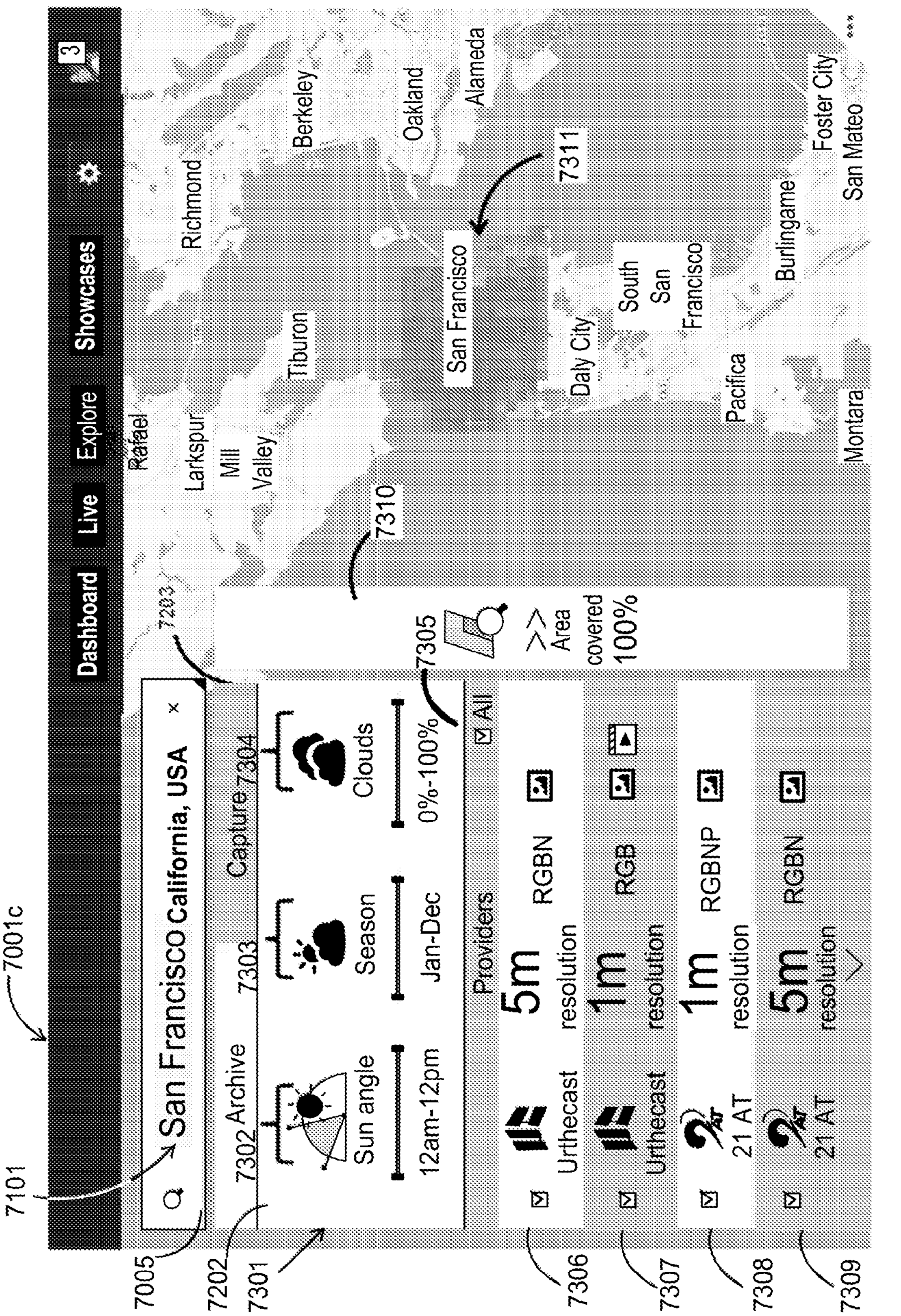

Turning to FIG. 73, another instance of the explore GUI 7001*c* is displayed. In this GUI, the archive tab 7202 is highlighted and the archived data 7301 for the searched location (e.g. San Francisco, USA) is displayed. One or more search tools 7302 are displayed to search through the archived images. An example search tool 7302 allows the user to select the sun angle for the archived images of the city San Francisco, for example by determining a range of times during the day. Another search tool 7303 allows a user to select the season for the city of San Francisco, for example by selecting the range of months. Another search tool 7304 allows a user to select the cloud cover based on percentage of cloud cover in an image. Other search criteria can also be used.

The Web platform uses these search criteria to show only those images that meet the selected criteria.

An option box 7305 allows a user to determine if image and video data from all data providers should be displayed or only data from select providers. In this case, all image providers have been selected. Thus, images from 3rd parties will be shown in addition to those images acquired from the spacecraft 100.

Entries 7306, 7307, 7308, 7309 are displayed as archived results corresponding to the searched location (e.g. San Francisco), and according to the search criteria set using controls 7301. Each entry includes an option box indicating whether or not the data from the entry is selected for downloading or detailed viewing, an indicator of which company or organization provided the data, an image resolution value, a specified camera sensor, an image spectrum value, and an indicator of whether the data is image data, video data, or both. For example, entry 7306 shows the following information: the option box is checked; the image data is provided by the company Urthecast; the image resolution is 5 m; the spectrum is 4-band Red Blue Green and Near-Infrared (RBGN); and the data includes image data only In an example embodiment, all the entries matching the search criteria are shown and the user can uncheck the option boxes to remove certain search result entries.

A control shows the percentage of the searched area that is covered by the available archived images. In this example, using the archived images, 100% of the area of San Francisco is covered or imaged.

The map of San Francisco is also overlaid by a mosaic of small rectangles 7311. Each rectangle represents an image or video, and is positioned on the map to indicate the location shown in the image. The images shown in the mosaic 7311 relate to those images returned from the search criteria (e.g. location, sun angle, month, cloud cover, providers, and selected archived entries).

Figure 74:
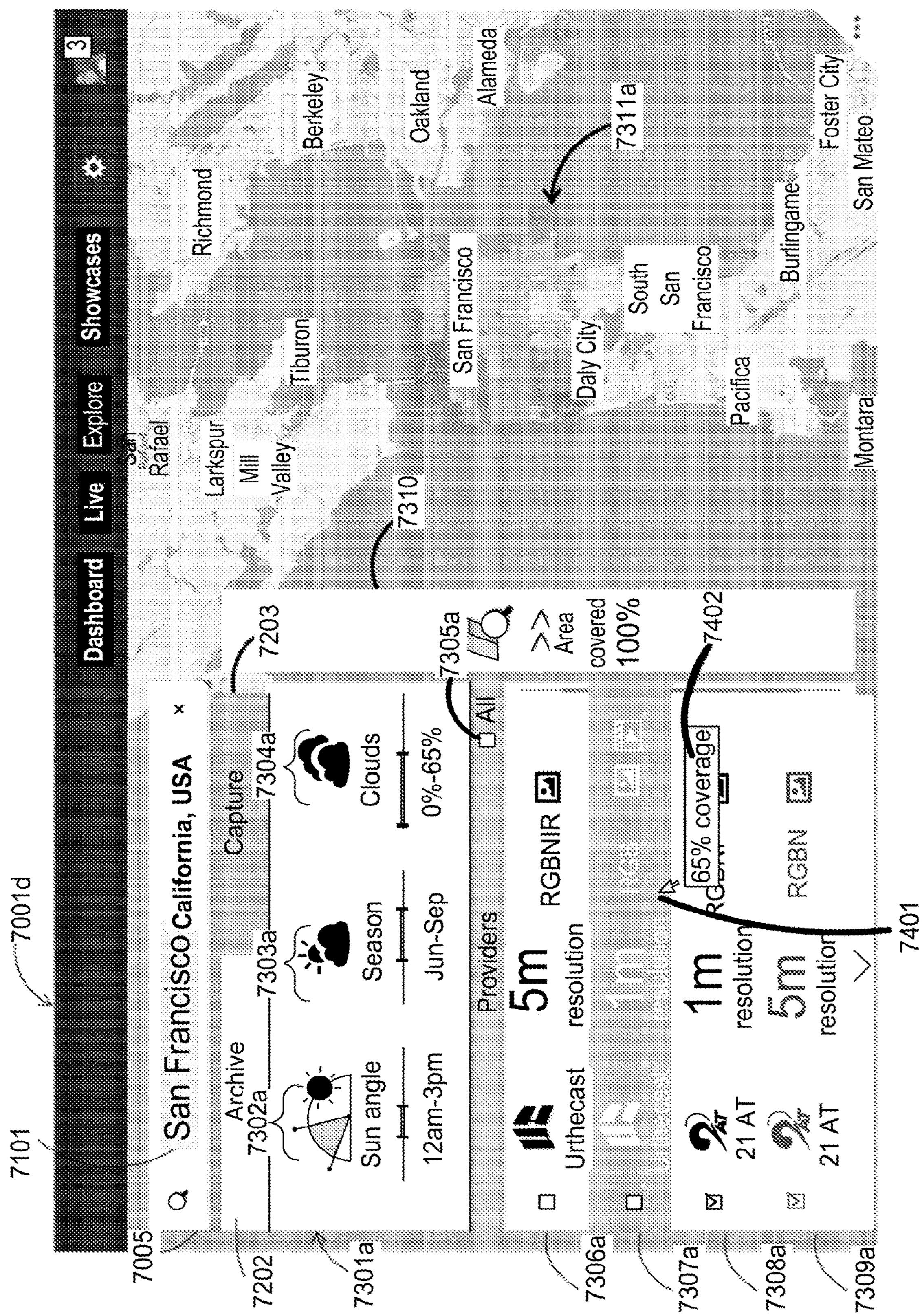

Continuing from FIG. 73, and now turning to FIG. 74, another instance of the GUI 7001*d* is displayed. The search criteria 7301*a* have been modified. For example, the sun angle control 7302*a* shows the criterion of the image being captured between 12:00 am and 3:00 pm. The season control 7303*a* shows the criterion of the image being captured between the months of June and September. The cloud control 7304*a* shows the criterion of the image having between 0% and 65% cloud cover. The "All Providers" option box 7305*a* is not selected.

Several entries 7306*a* and 7307*a* are no longer selected, while other entries 7308*a* and 7309*a* remain selected. The mosaic of rectangles representing the images 7311*a* is now less dense. The control 7310 still indicates that with the selected data sets, 100% of San Francisco is covered.

In FIG. 74, the user has hovered over or selected the entry 7307*a*, for example, using the pointer 7401. When the Web platform detects this action, the pop-up box 7402 is displayed and it indicated the percentage of the area of the searched city (e.g. San Francisco) being covered by the entry 7307*a*. In this example, the image data from the entry 7307*a* covers 65% of the area of San Francisco.

Figure 75:
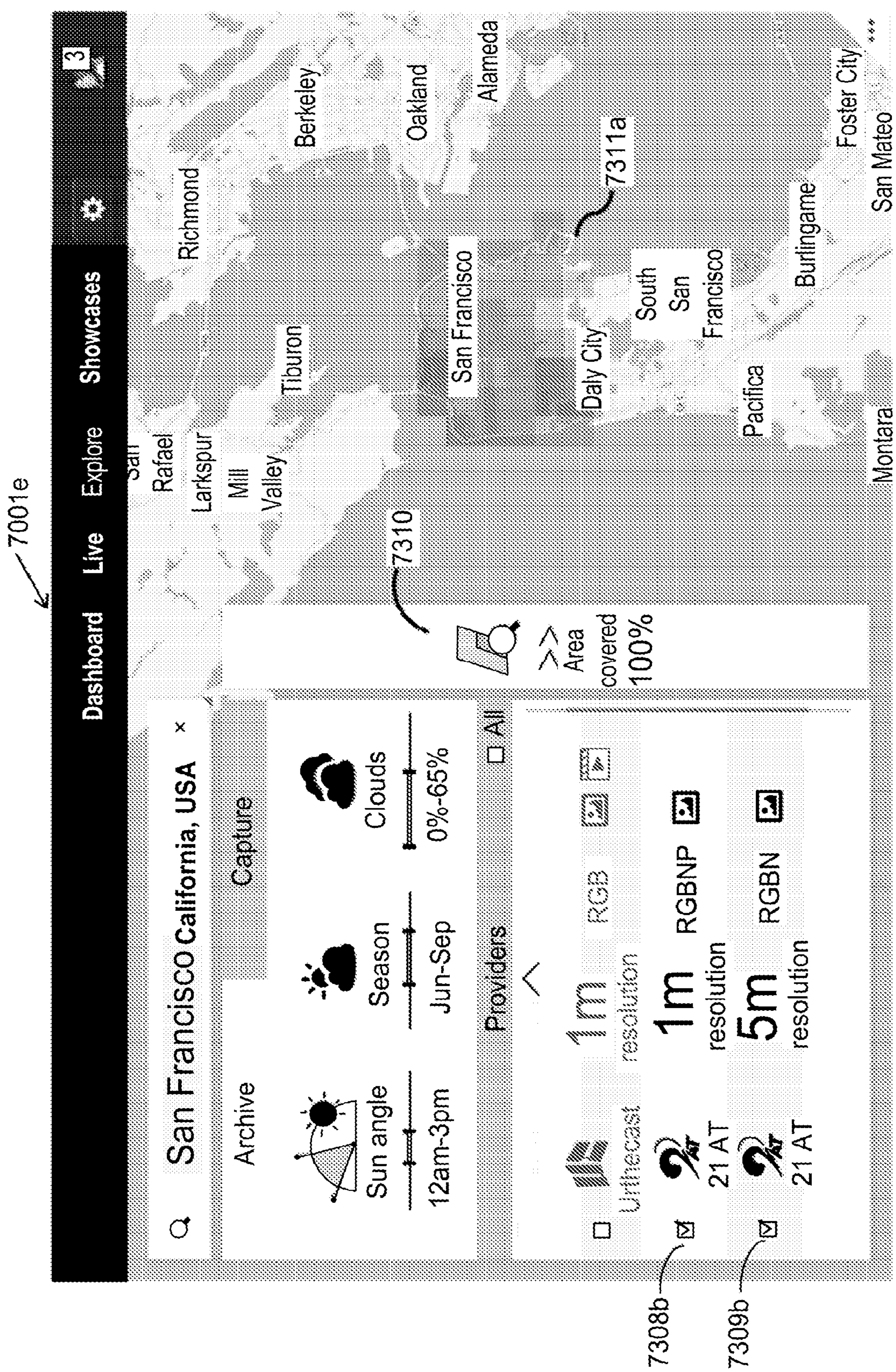

Turning to FIG. 75, continued from FIG. 74, a further instance of the GUI 7001*e* is shown. The user has selected the images from the archive for downloading and then selects the control 7310 to choose image processing settings.

Figure 76:
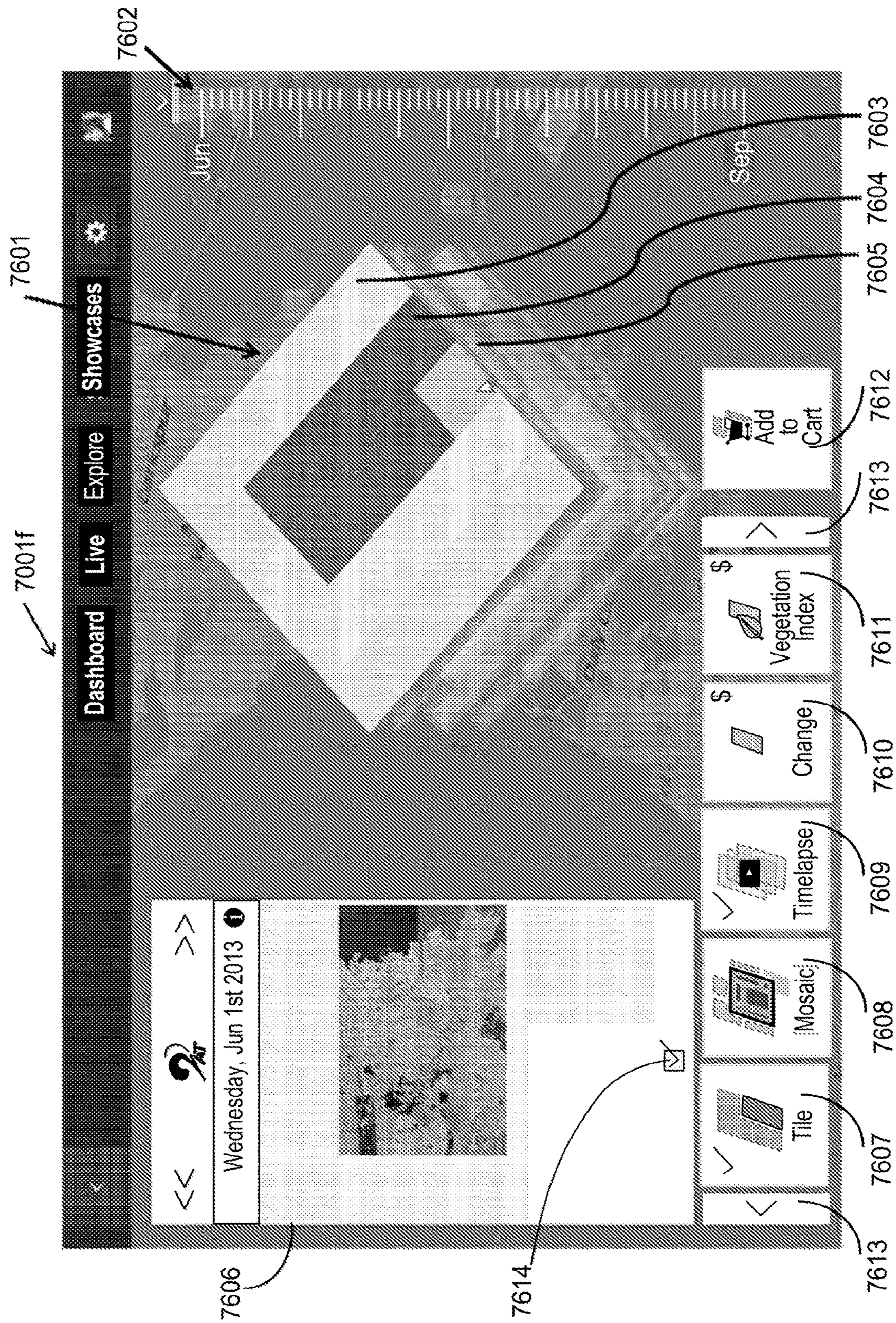

The selection of image processing settings is shown in FIG. 76, which is continued from FIG. 75.

Turning to FIG. 76, another instance of the GUI 7001*f* is shown. It includes the selected archived data entries 7606. The check box 7614 allows the user to select whether or not to keep the image data for the entry 7606. The GUI 7001*f* also displays a stack of images 7601 available for the region, and based on the data from the archived entry 7606. The stack includes abstractions of images 7603 and 7605, for example. The stack of images 7601 are overlaid the searched city (e.g. San Francisco). The GUI also includes a time scale 7602, which is a control configured to adjust the time of the imagery captured. In an example embodiment, the most recent images are placed on top of the stack 7601. The image abstraction 7603 is most recent and is stacked on top. The abstraction 7603 shows a highlighted area 7604, which indicates the area covered by that particular set of recent images.

Processing tools are displayed in the GUI 7001*f*, which can be used to further process the raw image data. For example, the tools include a tile tool 7607, which when selected, generates an image as a set of tiles. A mosaic tool 7608, which when selected, compiles multiples images together to form a mosaic-like image. A time lapse tool

7609, which when selected, compiles images of the same place, but of different times, together into a time lapse video. A change tool 7610, which when selected, identifies where features in an image have changed. For example, the position of boats, the existence of buildings, the shape of coastlines, or other features may have changed, and the tool 7610 will generate a visual or written report, or both, indicating the change. The change tool 7610 employs image recognition and image processing techniques. A vegetation index tool 7611, which when selected, analyzes the images to compute a vegetation index value. For example, this can be based on the color of the images (e.g. green) and the texture of the images (e.g. forests have certain textures when imaged from above).

These image processing options are available to be selected. The controls 7613 can be used to browse through and select other processing tools. The control 7612 allows the user to add the selected processing options to the cart for checkout and purchase.

Figure 77:
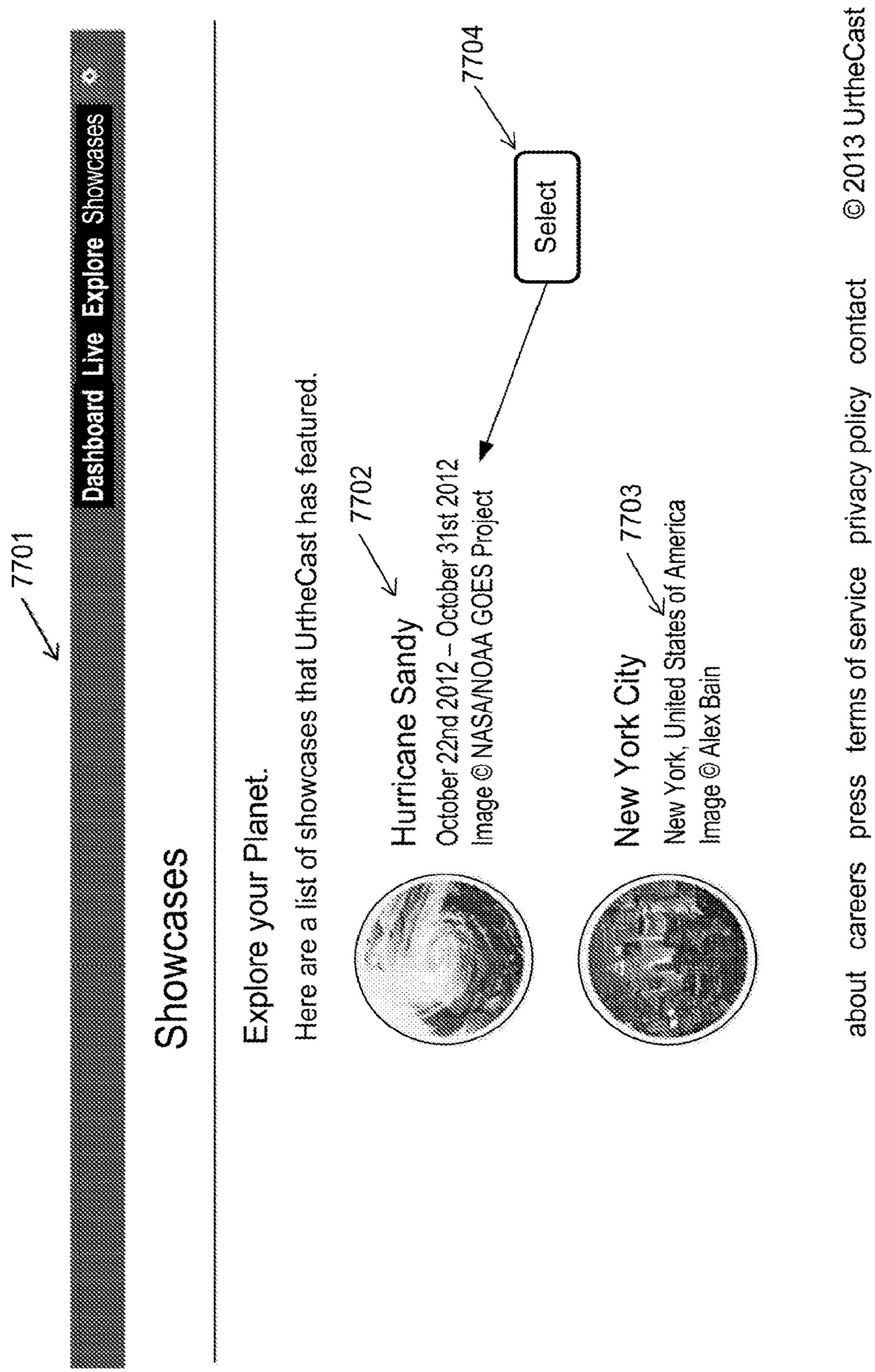
FIGS. 77 to 83 are examples of a showcases GUI.

Turning to FIG. 77, an example GUI 7701 shows different showcases of events and places. For example, the Hurricane Sandy event 7702 is showcased, and the New York City place 7703 is showcased. When the Web platform detects that a user input selection 7704 is received for the event 7702, the Web platform displays the GUI of FIG. 78.

Figure 78:
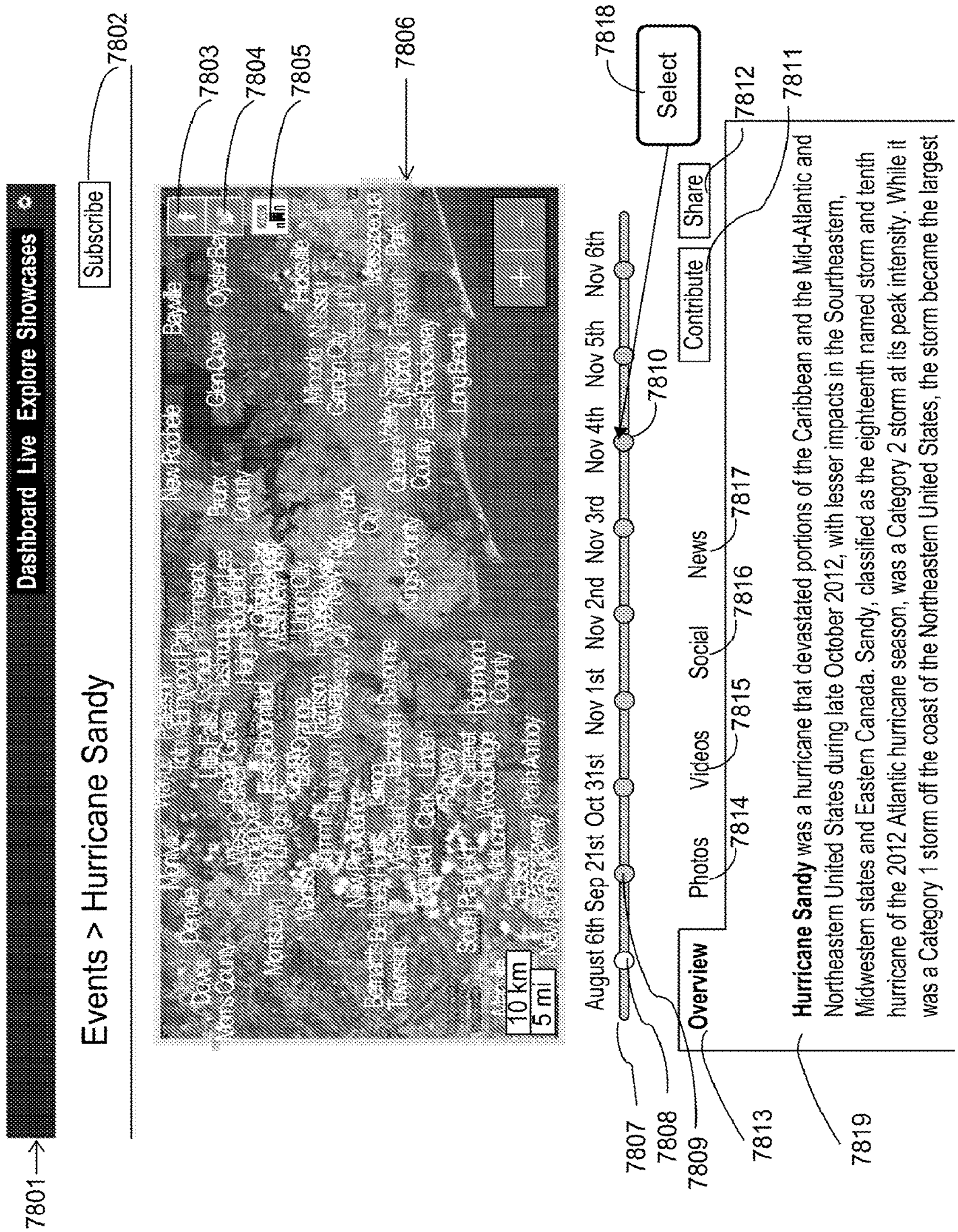

Turning to FIG. 78, continued from FIG. 77, the GUI 7801 is displayed and it show the Hurricane Sandy event page. A subscribe control 7802 allows a user to track any new data received in relation the Hurricane Sandy event.

The GUI includes a map 7806 showing where the event occurred. Various controls 7803, 7804, 7805 to link or share data about the event over social data networks are provided.

The GUI 7801 also includes a timeline 7807 tracking different times for the event. The timeline includes certain dates 7807, 7808, 7810, each of which are controls. The control of August 6 7807 is currently selected, and thus the image 7806 is of the hurricane event captured on August $6^{th}$.

An overview 7819 of the event is displayed. The tabs 7813, 7814, 7815, 7816, and 7817 allow a user to respectively view overview data, photos, videos, social data, and news, all of which are related to the event. Control 7811 allows a user to contribute data (e.g. image data, text data, etc.) to the event page. Another control 7812 allows the user to share the data from the event page.

Figure 79:
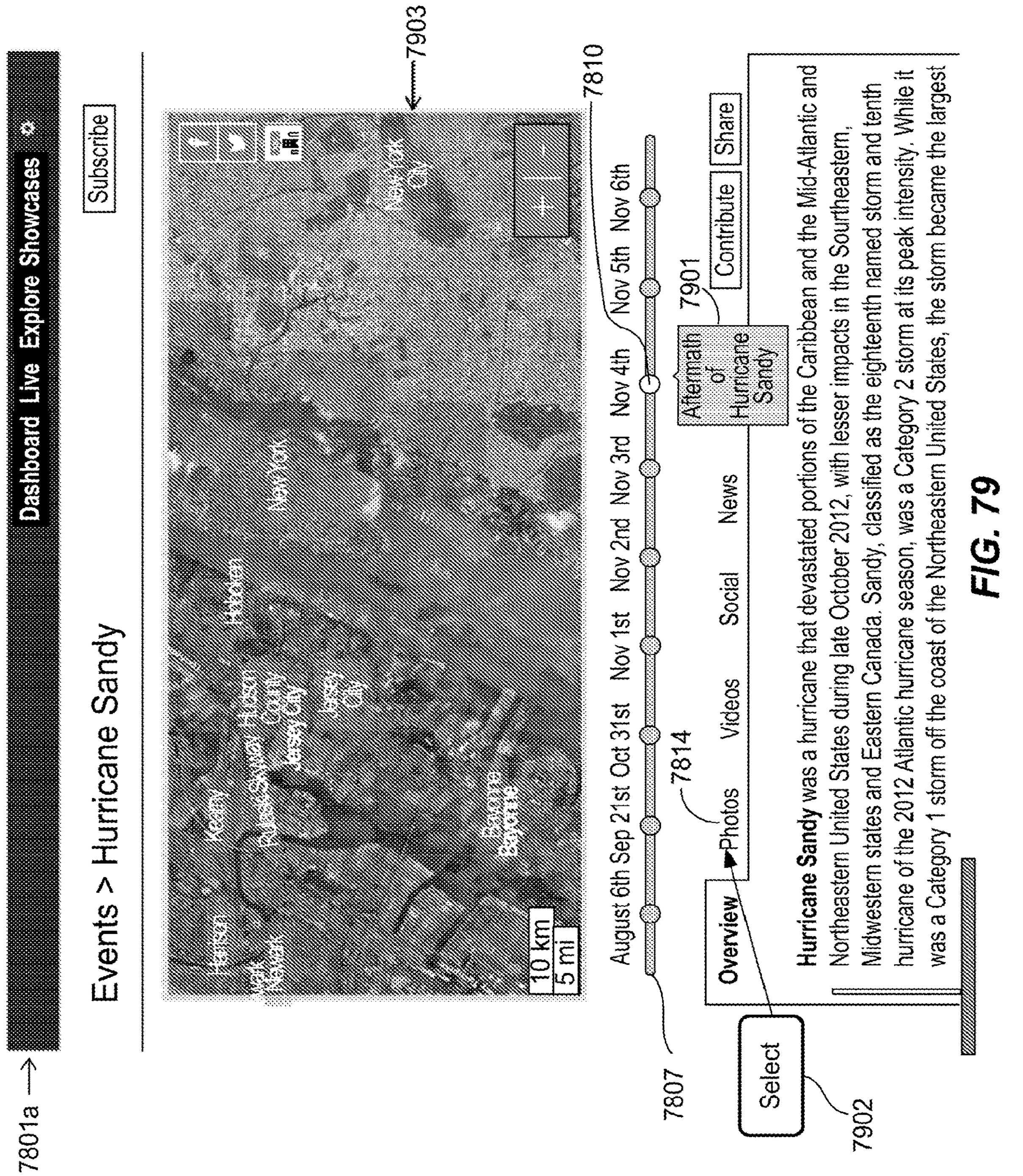

When a user selection input 7818 is received with respect to control 7810 along the timeline, the GUI is updated as per FIG. 79.

Turning now to FIG. 79, continued from FIG. 78, the GUI 7801*a* shows a new image 7903 of the event, corresponding to the date November $4^{th}$ associated with the control 7810. The control 7810 is also highlighted in FIG. 79, and a message box 7901 provides an overview of the event for this selected date. In this example, the message box 7901 reads "Aftermath of Hurricane Sandy".

Figure 80:
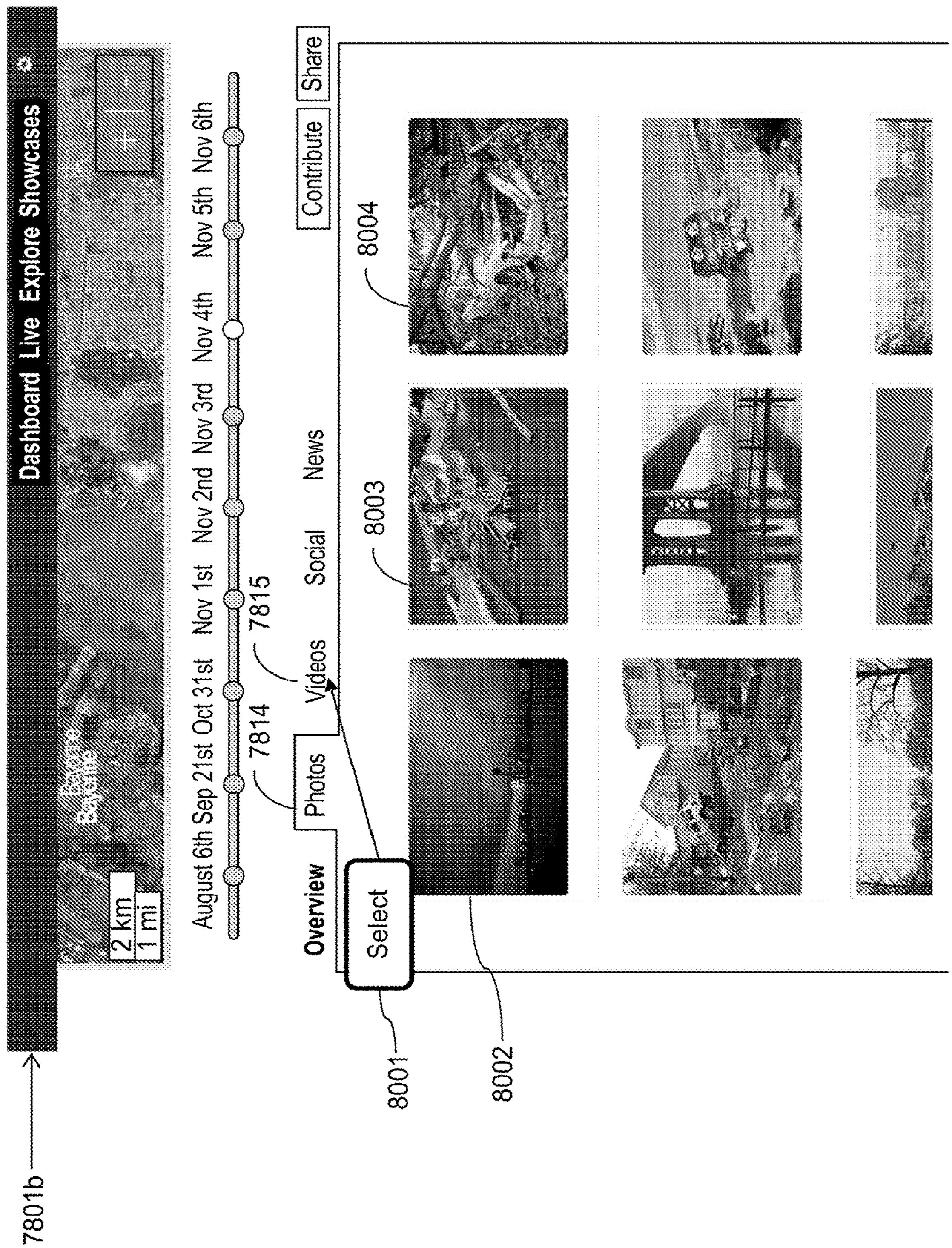

When a user selection input 7902 is received with respect to the control tab 7814 for photos, the GUI in FIG. 80 is shown.

In FIG. 80, the instance of the GUI 7801*b* is displayed and it includes images 8002, 8003, 8004 of the event. The images may be community sourced. The images may be captured from the ground, or captured from a spacecraft, or both.

Figure 81:
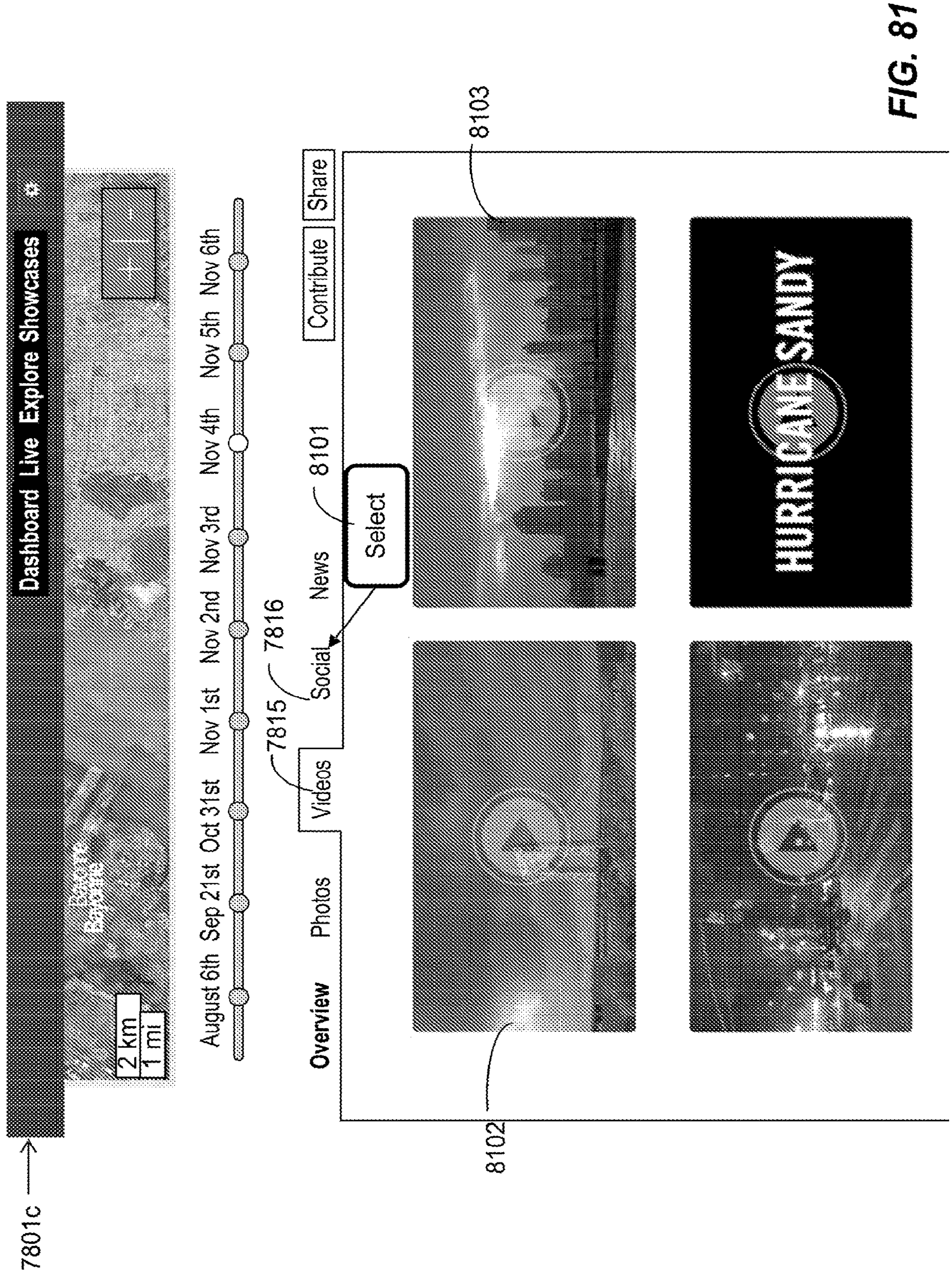

When a user selection input 8001 is received with respect to the control tab 7815 for videos, the GUI in FIG. 81 is shown.

In FIG. 81, using the GUI 7801*c*, videos of the event 8102, 8103 can be viewed. The videos may be community sourced. The videos may be captured from the ground, or captured from a spacecraft, or both.

Figure 82:
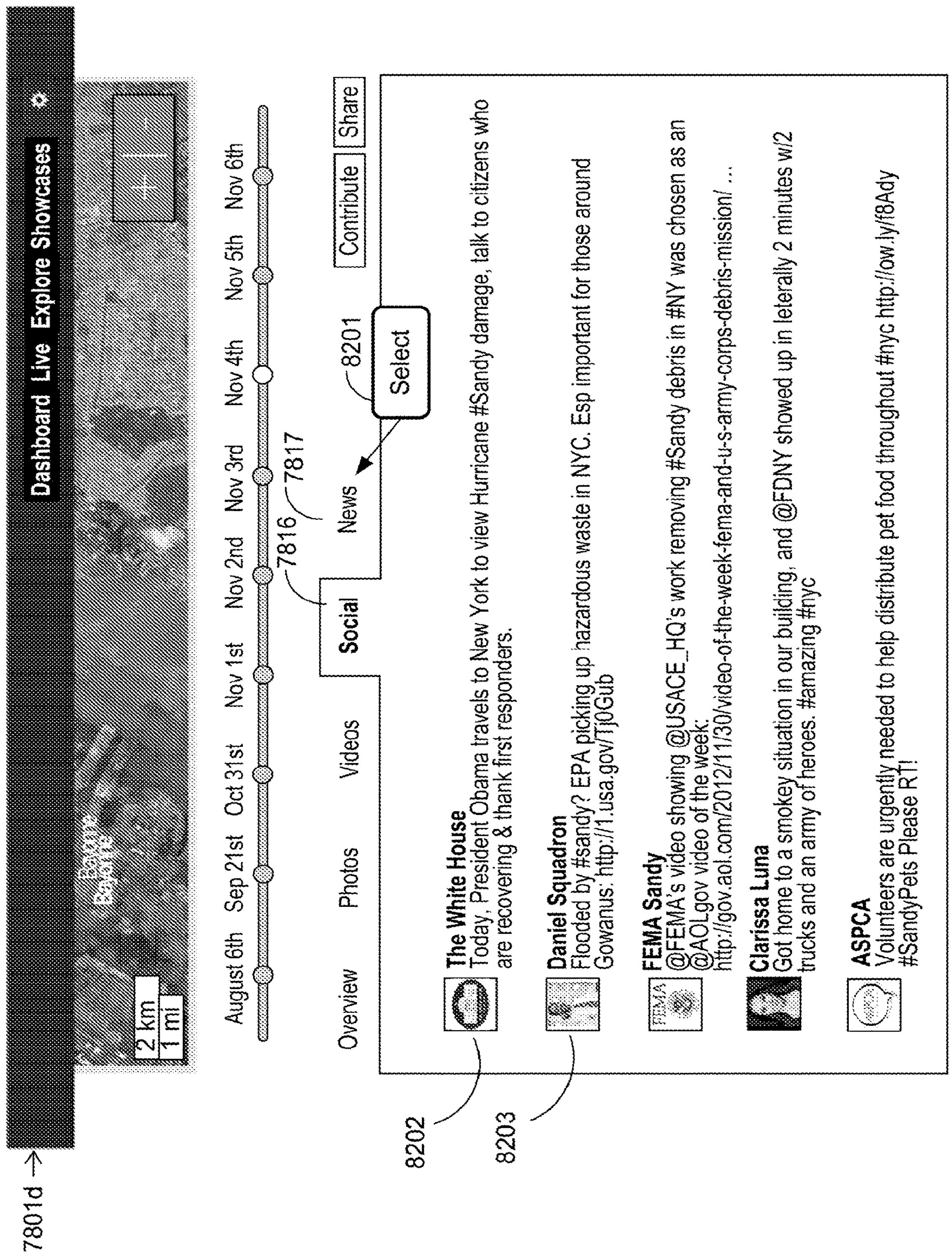

When a user selection input 8101 is received with respect to the control tab 7816 for social data, the GUI in FIG. 82 is shown.

In FIG. 82, using the GUI 7801*d*, social updates and posts of the event 8202, 8203 can be viewed.

Figure 83:
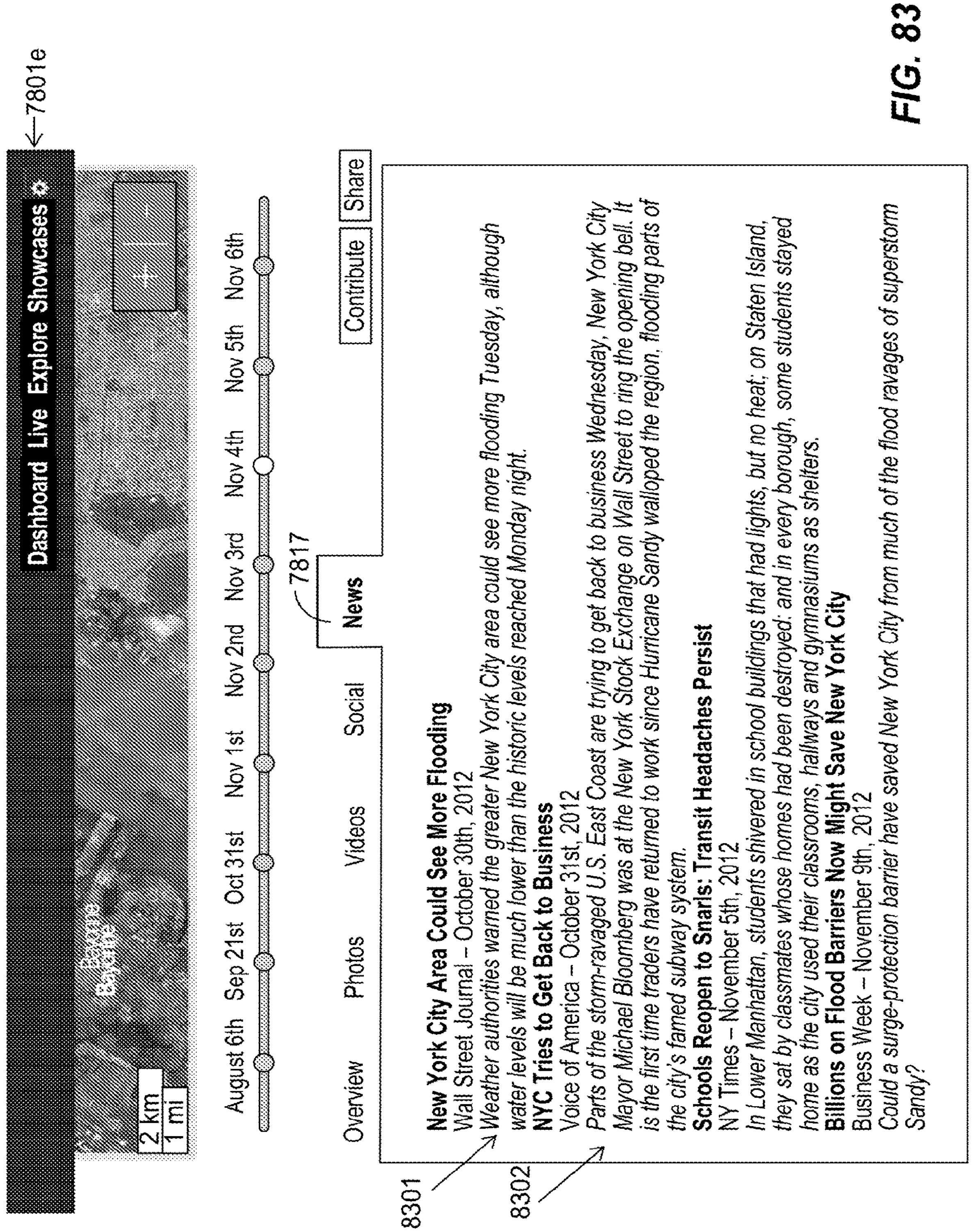

When a user selection input 8201 is received with respect to the control tab 7817 for news data, the GUI in FIG. 83 is shown.

In FIG. 83, using the GUI 7801*e*, news updates and posts of the event 8301, 8302 can be viewed.

Figure 84:
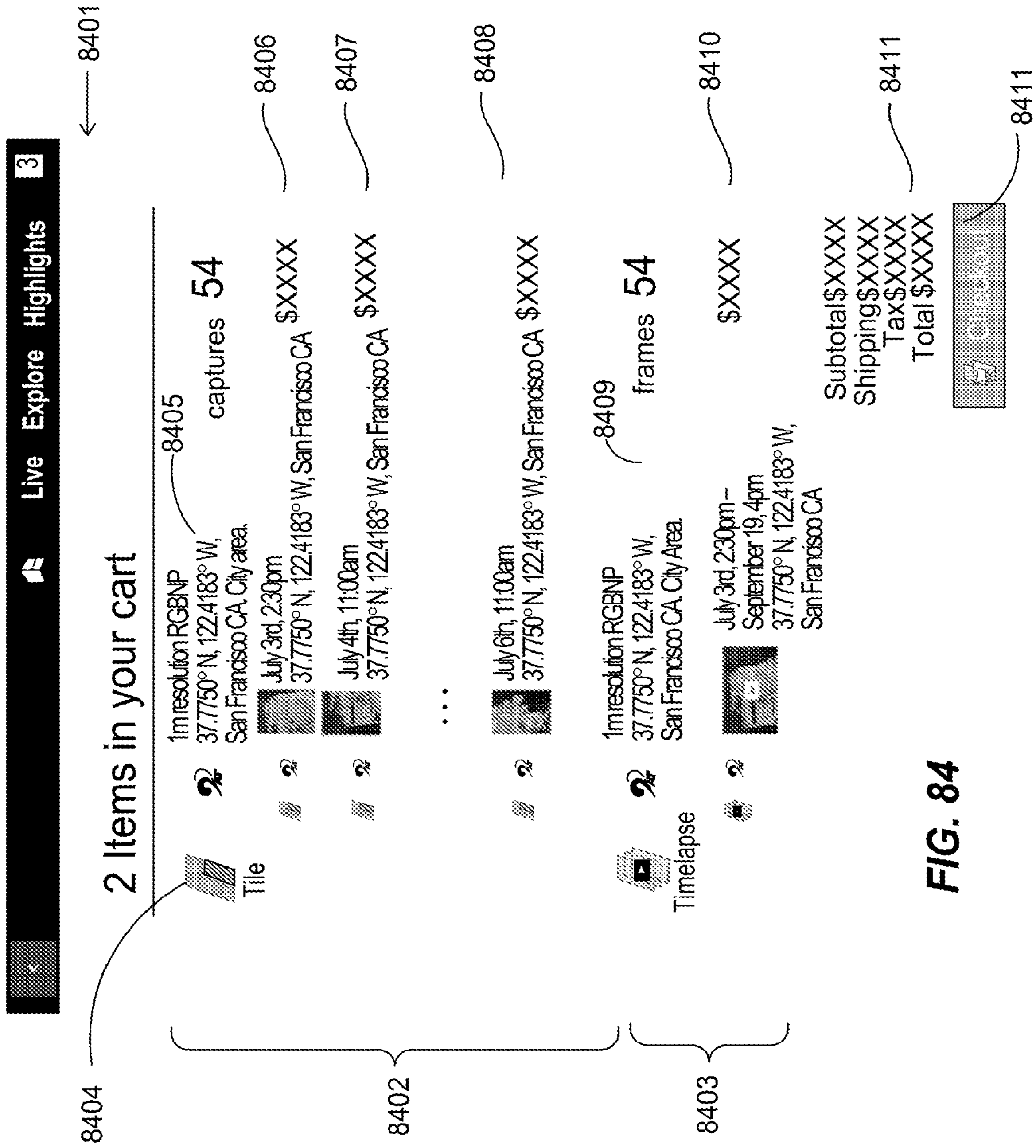
FIG. 84 is an example of a checkout GUI.

Turning to FIG. 84, an example embodiment of a checkout GUI 8401 is displayed. The Web platform displays this GUI to facilitate the purchase and ordering of image products and acquisition requests. The GUI shows products processed according to image tiles 8402 and products processed according to a time lapse 8403.

The image tiles show the icon 8404 and the summary of tile captures 8405. The detailed breakdown of the captures 8406, 8407 and 8408 are also shown. Each capture may show the date and time of the capture, the location of the capture (e.g. by coordinates), and the associated price.

The time lapse data includes a summary of the time lapse 8409, such as the number of frames. The detailed view of each time lapse 8410 is also shown, and it displays the time and date, location, and the associated price.

The GUI shows the totalled cost information 8411 and includes a "checkout" button 8411 to purchase the products.

In other example embodiments, the GUI features shown in FIGS. 85 to 88 can be incorporated into any of the live GUI 6501, or other GUIs.

Figure 85:
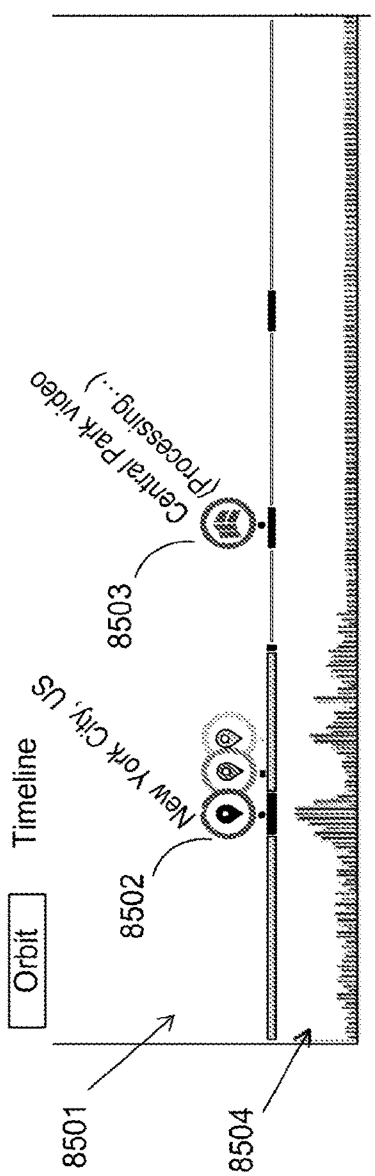
FIGS. 85 to 87 are different GUI examples showing events relative to a time line.

Turning to FIG. 85, a timeline GUI 8501 shows images being pinpointed with respect to certain events, places, etc., but along a timeline. For example, a pinpoint 8502 indicates an image of New York City has been acquired at a certain time. The pinpoint 8503 indicates that video of the location Central Park has been acquired, but is currently being processed. The bars 8504 indicate popularity of the pin point (e.g. location, video, event, etc.). In an example embodiment, the popularity is an index value. In an example embodiment, the popularity is a measure of the number of times a pin point has been shared or bookmarked such that the higher the popularity the higher the bar.

Figure 86:
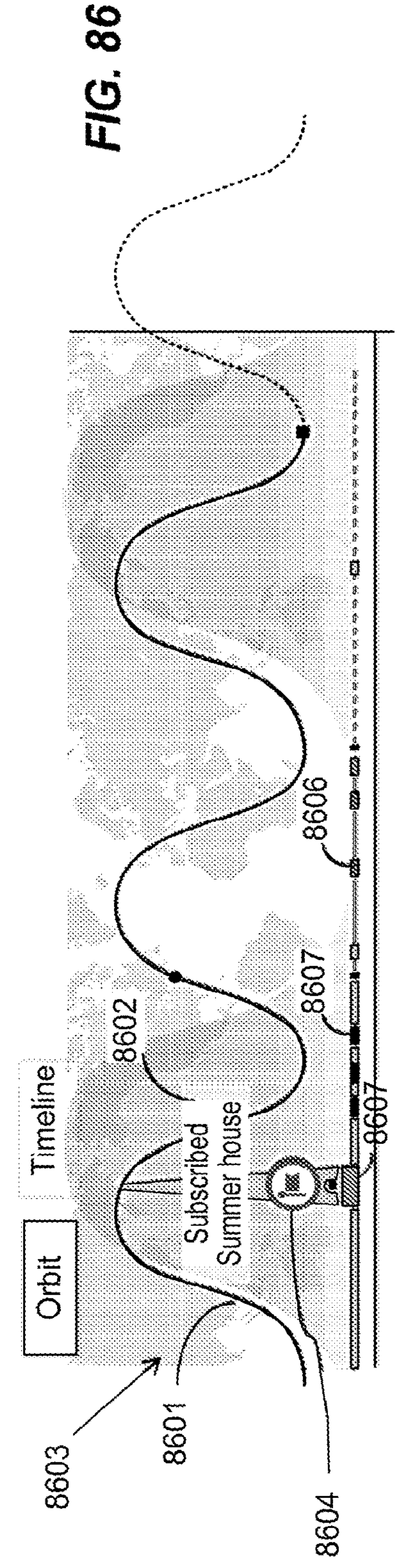

Turning to FIG. 86, another example timeline GUI 8603 is displayed. It shows the orbit path and time 8601 of a spacecraft and includes events along the timeline. For example, an icon 8604 and a highlighted bar 8607 show that an event has occurred at a certain location and time. When the user selects the event 8607, the icon 8604 and a description 8602 is shown. The description, for example, reads "Subscribed Summer house". Other event bars 8607 and 8606 are shown along the time line. When a user selects these event bars, detailed data will be shown about the event relative to the orbit 8601, similar to the event bar 8607.

Figure 87:
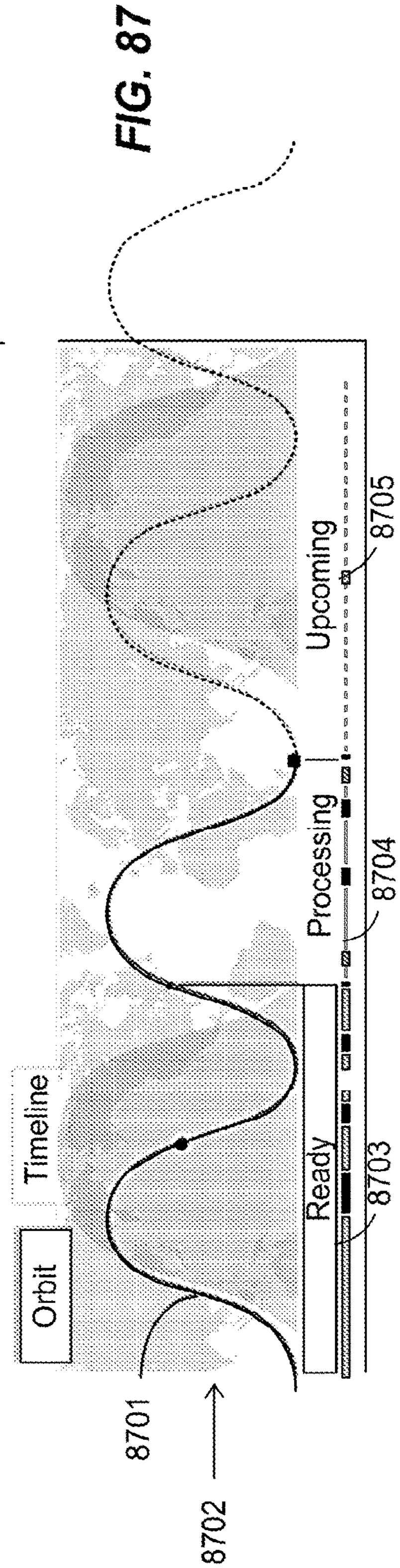

Turning to FIG. 87, another example timeline GUI 8702 is displayed. It includes the orbit 8701 and further includes bars 8703, 8704, and 8705 indicating respectively which of the data is ready for viewing, which of the data is being processed, and which of the data will be captured. These status bars are shown relative to the traveled orbit and the to-be travelled orbit of the spacecraft.

Figures 88A, 88B, 88C:
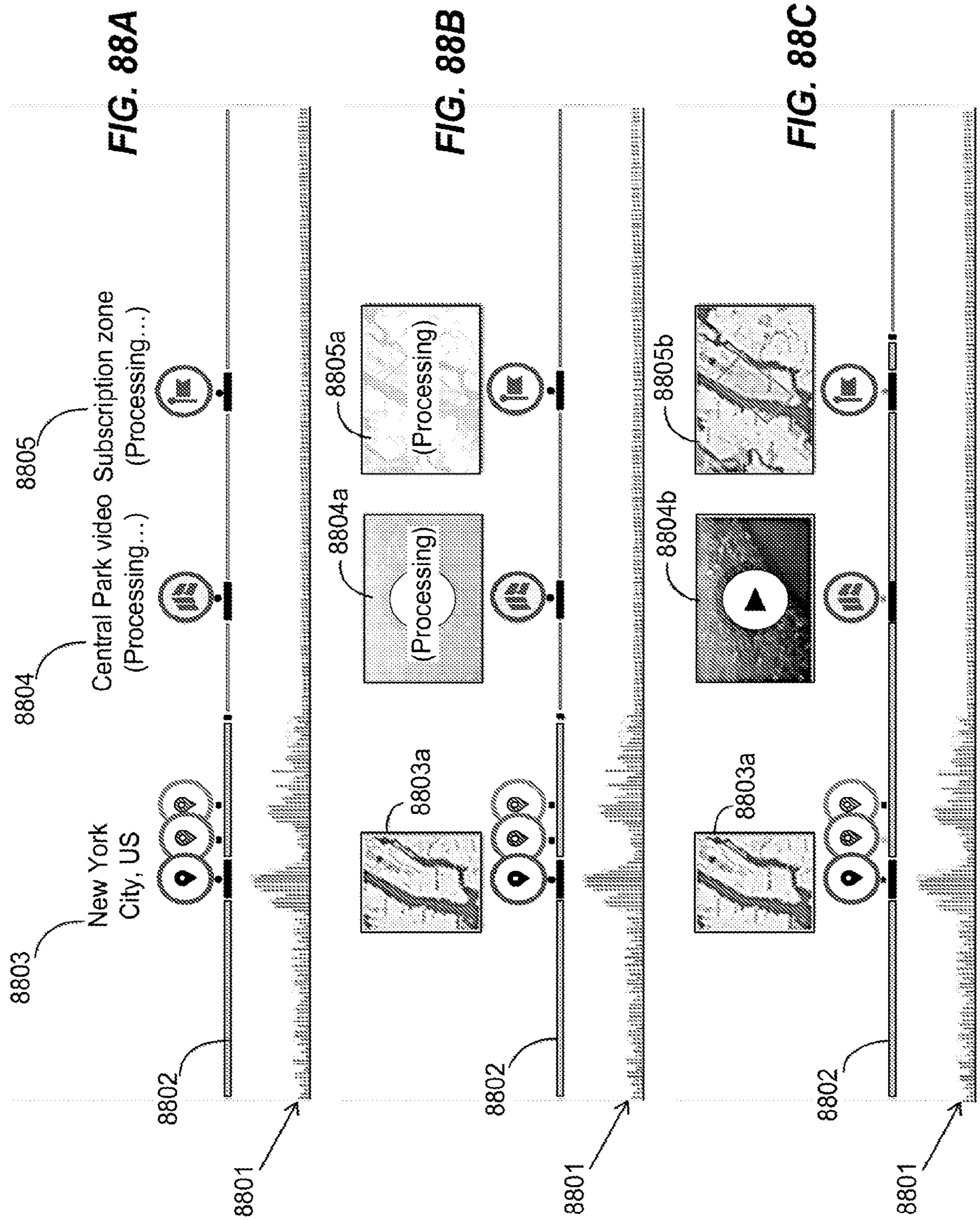
FIGS. 88A, 88B, and 88C show different stages of a GUI, showing the transition between different status updates for images.

Turning to FIGS. 88A, 88B and 88C, three example stages of another example GUI are shown.

In FIG. 88A, the GUI includes a time line 8802 with events 8803, 804, and 8805. The GUI also shows a bar graph 8801, which refers to popularity. Event 8803 shows that the corresponding imagery has been processed, while events 8804 and 8805 have associated imagery that are being processed.

FIG. 88B subsequently shows that the event 8803*a* includes a thumbnail of the acquired image, while the events 8804*a* and 8805*a* show thumbnails but include an indicator that the images are still being processed.

FIG. 88C subsequently shows that all the events 8803*a*, 8804*b* and 8805*b* show thumbnails indicating that the images or videos are ready to be viewed.

It will be appreciated that systems and methods, including computer algorithms, are provided herein relating to remote sensing. An Earth observation platform is also provided, which can obtain imagery, video, and other remote sensing data of the Earth or objects intentionally placed into orbit of planetary objects. The remote sensing data may also be obtained from the International Space Station, other manned (spacecraft, aircraft), or unmanned aerial vehicles (UAVs, spacecraft probes). A sensor captures observation data and transmits the data to ground stations on the Earth. The ground stations receive the Earth observation data. An archiving system stores the sensor observation data. Customers or users use an order management system to place orders for the observation data, which specify processing parameters for the Earth observation data. Based on the orders, a processing system retrieves the Earth observation data from the archiving system and processes the Earth observation data according to the parameters to generate an Earth observation data product. This system provides unique tools for searching, browsing, and analyzing the data as well as capabilities for interacting with the system through an API. The system is configured to combine observation data (e.g. remote sensing data) from sources produced internally by the observation platform and by third parties.

The elements in the GUIs described or shown herein are just for examples. There may be many variations to these GUI elements without departing from the spirit of the invention. For instance, buttons, images, graphs, and other GUI controls may be displayed and operated in a differing order, or buttons, images, graphs, and other GUI controls may be added, deleted, or modified. The teachings of U.S. provisional patent application Ser. No. 61/911,914 are incorporated by reference herein, in its entirety.

The steps or operations in the flow charts described herein are just for examples. There may be many variations to these steps or operations without departing from the spirit of the invention. For instance, the steps may be performed in a differing order, or steps may be added, deleted, or modified.

Although the above has been described with reference to certain specific embodiments, various modifications thereof will be apparent to those skilled in the art as outlined in the appended claims.

The invention claimed is:

1. A system to electronically distribute geospatial information via a Web platform, the system comprising:

at least one processor; and at least one nontransitory processor-readable medium communicatively coupled to the at least one processor and which stores at least one of processor-executable instructions or data, the processor-executable instructions or data, when executed by the at least one processor, causes the at least one processor to:

search online data sources to identify potential events of interest;

identify, in association with each of the identified potential events of interest, a metadata;

categorize, based on the metadata the identified potential events of interest, into a first category of events comprising potential events of interest that occurred in the past and a second category of events comprising potential events of interest that is expected to occur in the future;

associate geospatial data matching conditions of the metadata for the potential events of interest in the first category of events with the metadata;

create an acquisition request to capture new geospatial data matching conditions of the metadata for the potential events of interest in the second category of events;

cause a Web interface to be provided to a requester, the Web interface including user input elements which allow the requester to submit a request for geospatial information;

receive the request for geospatial information from the requester via the Web interface, the request comprising information that specifies the requested geospatial information via at least one location specification criteria and via at least one non-location specification criteria;

retrieve one or more sets of the geospatial data and the associated metadata which satisfy the request for geospatial information; and cause the requested geospatial information to be provided to the requester in a form of the retrieved one or more sets of data.

2. The system of claim 1 wherein the metadata comprises a location, and wherein the at least one location specification criteria comprises at least one value that specifies a geographic area of interest.

3. The system of claim 1 wherein the metadata comprises a date, a time, and one or more keywords, and wherein the at least one non-location specification criteria comprises an event of interest, a date associated with the event of interest, and a time associated with the event of interest.

4. The system of claim 1 wherein the system further comprises an order management system, and an archival system communicatively coupled to the order management system, the archival system operable to store an archive of Earth based geospatial data including both geospatial sensor source data and metadata associated with the geospatial sensor source data.

5. The system of claim 4, further comprising:

a geospatial data processing system, the geospatial data processing system comprising:

at least one geospatial data processor; and at least one geospatial data nontransitory processor-readable medium communicatively coupled to the at least one geospatial data processor and which is operable to store at least one of processor-executable instructions or data, when executed by the at least one geospatial data processor, causes the at least one geospatial data processor to selectively process geospatial data retrieved from the archival system to generate processed geospatial data, to distribute the processed geospatial data to the requester via a network.

6. The system of claim 5, further comprising a Web data storage and content delivery network comprising a number of non-transitory processor readable media which is operable to store the processed geospatial data.

7. The system of claim 1 wherein the Web-interface is provided to the requester with one or more user selectable boundary drawing tools to define a boundary about a geographic area of interest to specify the at least one location specification criteria.

8. The system of claim 1 wherein for the request for geospatial information, the at least one processor ranks two or more sets of geospatial data based at least in part on a degree to which the respective sets of geospatial data satisfy the at least one non-location specification criteria in the request, and provides an indication of the ranking to the requester via the Web interface.

9. The system of claim 1 wherein the requested geospatial information is provided to the requester in a form of a presentation of at least one thumbnail image from the retrieved one or more sets of data.

10. The system of claim 1 wherein the requested geospatial information is provided to the requester in a form of an export of the retrieved one or more sets of data.

11. The system of claim 1 wherein the Web interface is at least one of an application programming interface or a Web-based graphical user interface.

12. A method of distributing geospatial information via a Web-based platform which comprises at least one processor and at least one nontransitory processor-readable medium communicatively coupled to the at least one processor and which stores at least one of processor-executable instructions or data, the method comprising:

searching online data sources to identify potential events of interest;

identifying, in association with each of the identified potential events of interest, a metadata;

categorizing, based on the metadata, the identified potential events of interest into a first category of events comprising potential events of interest that occurred in the past and a second category of events comprising potential events of interest that is expected to occur in the future;

associating geospatial data matching conditions of the metadata for the potential events of interest in the first category of events with the metadata;

creating an acquisition request to capture new geospatial data matching conditions of the metadata for the potential events of interest in the second category of events;

receiving, by the Web-based platform, a user request for a geospatial source data product from a user via a Web-based interface, the user request for the geospatial source data product logically associable with information that specifies at least one location specification criteria and at least one non-location specification criteria;

generating, by the Web-based platform, an order in response to the user request for the geospatial source data product;

causing a searching of an archive of the geospatial data to identify one or more associated metadata that at least partially satisfies the at least one location specification criteria and the at least one non-location specification criteria associated with the user request for the geospatial source data product;

receiving the geospatial data and the associated metadata which were identified from the searching of the archive; and distributing, by the Web-based platform, at least one set of the received geospatial data and the associated metadata which at least partially satisfies the at least one location specification criteria and the at least one non-location specification criteria associated with the user request for the geospatial source data product.

13. The method of claim 12 wherein receiving the geospatial data from the archive includes receiving geospatial imagery data and the associated metadata.

14. The method of claim 12 wherein receiving the user request for a geospatial source data product includes receiving the request from the user via an application programming interface.

15. The method of claim 12 wherein the at least one set of the received geospatial data and the associated metadata is distributed to the user by presenting at least one map tile corresponding to the request.

16. The method of claim 12 wherein the at least one location specific criteria includes an area of interest, and wherein the at least one set of the received geospatial data and the associated metadata is distributed to the user by providing, through the Web-based platform, a set of base map data for the area of interest.

17. The method of claim 16 wherein the at least one set of the received geospatial data and the associated metadata is distributed to the user by providing, through the Web-based platform, at least one of: a catalog of geospatial observation data available via the Web-based platform for the area of interest, wherein the catalog comprises at least one of a catalog of image products and metadata available via the Web-based platform, or a timeline of geospatial observation data available via the Web-based platform for the area of interest.

18. The method of claim 12, further comprising notifying the user, from time-to-time, of a change in the geospatial source data product.

* * * * *